United States Patent [19]

Deran

[11] Patent Number: 5,010,478

[45] Date of Patent: Apr. 23, 1991

[54] ENTITY-ATTRIBUTE VALUE DATABASE SYSTEM WITH INVERSE ATTRIBUTE FOR SELECTIVELY RELATING TWO DIFFERENT ENTITIES

[76] Inventor: Roger L. Deran, 1958 Menalto Ave., Menlo Park, Calif. 94025

[21] Appl. No.: 393,093

[22] Filed: Aug. 2, 1989

Related U.S. Application Data

[63] Continuation of Ser. No. 850,961, Apr. 11, 1986, abandoned.

[51] Int. Cl.[5] .......... G06F 15/417

[52] U.S. Cl. .......... 364/200; 364/280.7; 364/282.1; 364/283.1; 364/283.3

[58] Field of Search ... 364/200 MS File, 900 MS File, 364/518, 521; 340/721, 734

[56] References Cited

U.S. PATENT DOCUMENTS 4,128,891 12/1978 Lin et al. .......... 364/900

4,479,196 10/1984 Ferrer et al. .......... 364/900

OTHER PUBLICATIONS

Pullin et al., "Method for Performing Fullscreen Database Updates", IBM TDB, vol. 26, No. 4, Sep. 1983, pp. 2169-2171.

DeBry, "Set Attribute Order for IBM 3270 Data Stream", IBM TDB, vol. 23, No. 5, 10/1980, pp. 2005-2006.

Everest, "Database Management Objectives, System Functions, and Administration", McGraw-Hill Book Company, 1986, pp. 244-251.

Merrett, "Relational Informational Systems", Reston Publishing Co., 1984, pp. 131-155.

Symonds, "Interactive Graphics in Data Processing, Auxilliary-Storage Associative Data Stimulus for PL/1," IBM Syst. J., Nos. 3 & 4, 1968, pp. 229-245.

"Editor-Based User Interface", IBM TDB, vol. 28, No. 5, Oct., 1985, pp. 2166-2168.

Howard et al., "Attribute-Value-Entity Index Algorithm", IBM TDB, vol. 16, No. 8, Jan., 1974, pp. 2738-2739.

*Primary Examiner*—Thomas C. Lee

[57] ABSTRACT

A user interface for a database management system uses an interactive display to display information selected from the database in magnitude ordered rows comprising a set of items. Each row is an assertion consisting of a plurality of components including an entity, an attribute and a value of the attribute. The components are arranged in that fixed order in decreasing significance, respectively. In the database management system, the database is itself also stored in this format. A database engine in the database management system utilizes a B-tree index to the database and a meta accessing method for items from the database in a working cache.

7 Claims, 7 Drawing Sheets

INFINITY LAYERS

10

| | |
|---|---|
| PRESENTATION 18 | THE ITEM EDITOR, APPLICATIONS PROGRAMS |
| CONSISTENCY 16 | INVERSION, CLASSIFICATION, GENERALIZATION |
| REPRESENTATION 14 | THE ENCODING OF COMPONENTS OF ITEMS |
| ENGINE 12 | THE ITEM SPACE |

FIG. 2

DBMS LIMITATIONS

| 20 | PARAMETER | INFINITY ENTITY-ATTRIBUTE 22 | TYPICAL RELATIONAL 24 |
|---|---|---|---|
| MAXIMUM | ATTRIBUTES PER DATABASE | INFINITE | 20 TO 1024 |
| " | ATTRIBUTES PER RELATION | INFINITE | 10 TO 255 |
| " | BYTES PER VALUE | APPROXIMATELY 30(NOTE 1) | 30 TO 255 |
| " | BYTES PER KEY | APPROXIMATELY 30(NOTE 2) | 10 TO 30 |
| " | BYTES PER RELATION | INFINITE | 65K TO 16M |
| " | BYTES PER TUPLE | INFINITE | 255 TO 4096 |
| " | BYTES PER ATTRIBUTE | INFINITE | 30 TO 255 |
| " | INVERSIONS PER DATABASE | INFINITE | 0..255 |
| " | INVERSIONS PER RELATION | INFINITE | 0..10 |
| " | RELATIONS OPEN | INFINITE | 2..20 |
| " | RELATIONS PER DATABASE | INFINITE | 1..255 |
| " | SORT DEPTH | INFINITE (NOTE 3) | 1..10 |
| " | TUPLES PER RELATION | INFINITE | 1000..16M (65K COMMON) |
| " | VALUES PER ATTRIBUTE | INFINITE | 1 |
| MINUMUM | VALUES PER ATTRIBUTE | 0 | 1 |
| " | BYTES PER ATTRIBUTE | 0 | 1 TO 255 |

NOTE 1: LONGER VALUES ARE STORED AS MULTIPLE, SHORTER VALUES.
NOTE 2: LONGER KEYS ARE AUTOMATICALLY ABBREVIATED (OR UNNECESSARY.)
NOTE 3: SORTING IS RARELY NEEDED, SINCE INVERSION IS COMPLETE.

COMPONENT ENCODING

| BYTE 0 | LENGTH | COMPONENT TYPE | EXPLANATION |
|---|---|---|---|
| 0 | 1 | -INFINITY | |
| 1 | 1 | SYMBOLIC | CONTAINS ALPHANUMERIC VALUES 128..255 ASCII, BUT WITH UC, LC INTERLEAVED. |
| 2 | 1 | BINARY | NEGATIVE EXPANSION ("BINARY-INFINITY") |
| 3..34 | 33..2 | " | TWO'S COMPLEMENT NEG. BINARY INTEGER |
| 35 | 1 | " | BINARYZERO |
| 36..67 | 2..33 | " | POSITIVE BINARY INTEGER |
| 68 | 1 | " | POSITIVE EXPANSION ("BINARY + INFINITY") |
| 69 | 1 | DECIMAL | NEGATIVE EXPASION ("DEC.-INFINITY") |
| 70 | 5 | " | +FOURBYTEEXPONENT,-DECIMAL NUMBER |
| 71 | 3 | " | +TWOBYTEEXPONENT,- DECIMAL NUMBER |
| 72 | 2 | " | +ONEBYTE EXPONENT,-DECIMAL NUMBER |
| 73 | 1 | " | ZEROEXPONENT,-DECIMAL NUMBER |
| 74 | 2 | " | -ONEBYTEEXPONENT,-DECIMAL NUMBER |
| 75 | 3 | " | -TWOBYTE EXPONENT,-DECIMAL NUMBER |
| 76 | 5 | " | -FOURBYTEEXPONENT,-DECIMAL NUMBER |
| 77 | 1 | " | DECIMALZERO |
| 78 | 5 | " | -FOURBYTEEXPONENT,+DECIMAL NUMBER |
| 79 | 3 | " | -TWO BYTEEXPONENT,+DECIMAL NUMBER |
| 80 | 2 | " | -ONEBYTEEXPONENT,+ DECIMAL NUMBER |
| 81 | 1 | " | ZEROEXPONENT,+DECIMAL NUMBER |
| 82 | 2 | " | +ONEBYTEEXPONENT,+DECIMAL NUMBER |
| 83 | 3 | " | +TWOBYTEEXPONENT,+DECIMAL NUMBER |
| 84 | 5 | " | +FOURBYTEEXPONENT,+DECIMAL NUMBER |
| 85 | 1 | " | POSITIVE EXPANSION("DEC.+INFINITY") |
| 86..126 | | SPECIAL | CODES FOR SPECIAL PURPOSES |
| 127 | 1 | +INFINITY | |
| 128..255 | | | ILLEGAL AS BYTE ZERO OF A COMPONENT |

FIG. 3

ENTITY-ATTRIBUTE VALUE DATABASE SYSTEM WITH INVERSE ATTRIBUTE FOR SELECTIVELY RELATING TWO DIFFERENT ENTITIES

This is a continuation of application Ser. No. 850,961 filed Apr. 11, 1986, now abandoned.

BACKGROUND OF THE INVENTION

1. Field of the Invention

This invention relates to an improved database interface, database management system (DBMS) and database engine employing the "Entity-Attribute" data model. More particularly, it relates to such a database interface, management system and engine that incorporates a data model that corresponds closely to an information organization scheme that a human user would employ naturally. Most especially, the invention relates to such a database interface, management system and engine that is significantly faster in the execution of its data manipulation functions than conventional database management interfaces, systems and engines.

The invention further relates to improvements in interactive data storage and retrieval by computer with a video display terminal, keyboard, one or more direct access mass storage devices such as flexible or fixed disks, a processor, and random access memory. More particularly, it further relates to a method of externally displaying and internally representing computer-stored information which has advantages in: (1) ease of use; (2) ease of learning; (3) simplified combination and separation of databases which were possibly created at different times or by different users; (4) simplified internal manipulation of data; and (5) increased performance. Even more specifically, the invention relates to the combination of the prior-art Entity-Attribute semantic data model or some variant of it with the supporting "Item Space" logical data structure. Most specifically, the invention relates to: (1) the display of Entity-Attribute structured information on an interactive video terminal or on paper in a value-ordered, one-row-per-Attribute mode; (2) the encoding of the connection between an Entity and an Attribute into one or more "composite keys", hereafter called "Items"; (3) the simplified internal manipulation of information so encoded, such as especially the directness of merging separate databases into one or of separating one database into several; (4) the increased performance flowing out of the simplification of the internal manipulation of information so encoded; (5) the increased performance flowing out of the compatibility of information so encoded with the "Engine", which uses an improved B-tree algorithm; (6) the improvements to the B-tree algorithm utilized in the Engine.

2. Description of the Prior Art

A variety of data models are employed in prior art database management systems. The most widely known and employed data models in the prior art are of the hierarchical, network and relational types. The hierarchical model is the oldest of these models. IBM's Information Management System is representative of this type. In this approach, a plurality of subordinate records are organized under a root record, with as many levels as are appropriate. One of the major shortcomings of the hierarchical model is that real world situations frequently do not fit into a hierarchical structure. As a result of constraints imposed by the hierarchical model, such a database contains redundant information in its records, the consistency of which must be maintained manually. Insertions and deletions of some kinds of information produce anomalies, or unavoidable inconsistencies, in the database.

As a result of these and other shortcomings of the hiearchical model, the 1971 Conference on Data Systems and Languages resulted in the CODASYL model, which is the most widely used network data model. In the network data model, database queries follow the data in looped chains to find the requested information. While the network data model essentially eliminates the above difficulties of the hierarchical model, a major problem of this approach is the complexity of the database designs that typically result. Normalization difficulties occur with the network approach as well, which will be explained below in connection with the relational model.

A relational database consists of a series of tables, each table being composed of records of a certain type. The intuitiveness and simplicity of the relational model are immediately apparent. These characteristics give the relational model much of its appeal. Most of the important commercially available microcomputer database management systems at the present time are relational databases. One aspect of this model is the complete absence of explicit links between record occurences. This is both a significant strength of relational database management systems because it allows very simple and powerful query languages, and a significant weakness, because it makes relational database management systems notably slow. However, the generality of the model and the increased ease of producing both database designs and query procedures have made the relational model the most popular for recent database management systems.

An area of concern with relational database management systems is normalization. Normalization refers to the degree of semantic correctness in the database design. Consider a simple relational database having only one relation, i.e., Person. The fields of the relation are the person's name, street address, zip code, and child. This is satisfactory as long as the person has only one child. However, the real world situation of more than one child can be handled only by adding another complete instance of relation, with all the fields the same except for the child field. This means that the database is not normalized. The problem with this example is solved by splitting the Person relation into two relations: PersonAddr and PersonKidz. This solves the normalization problem, but creates a new database. Construction of the new database requires enumeration of the entire database, splitting each relation into its new pieces, and even for a simple data model, this can be very expensive in time and storage space.

The lack of normalization, though obvious in the above example, can be subtle in many database applications. Detecting a lack of normalization depends on the database designer's degree of understanding of issues involved in normalization and his or her familiarity with the material to be represented in the database. The degree of difficulty of modifying a relational database after its structure has been redesigned makes what seems like a simple change, adding information to what is already there, a process of creating a new database, into which the contents of the old database are dumped.

A variant of the relational model, called the binary relational model, breaks down the information in the database into the smallest possible pieces at the outset, to avoid normalization problems. This model has two fields: a key and an attribute. The key is used for retrieval and may be called an entity name. When a value is placed in an attribute value field, the result is a data model having entity-attribute-value triples. This model is called the entity-attribute model, and the present invention concerns improvements in that model.

The Entity-Attribute data model has many variants, and there are many systems in use which employ some form of it. Even the LISP programming language has a feature—property lists—which exhibits the fundamental characteristics of an Entity-Attribute system, although the terminology is different. Much of the recent work in the field of Artifical Intelligence has been in developing "knowledge representation languages" in order to encode general knowledge and facts for "expert systems". Knowledge representation languages and systems have proven the descriptive power of the Entity-Attribute or similar models. However, these systems address the needs of programmers and "knowledge engineers" rather than everyday users. The need for a truly simple user view into a database is as urgent as the need for database flexibility and representational power.

Relational model databases abound also. These systems organize data into tables or "mathematical" relations. Unfortunately, the mathematics of relations escapes most everyday users of databases, and the quest for ease-of-use amounts to little more than a tradeoff between representational power and simplicity. For example, relational systems for everyday users rarely allow true relational joins, and many can only use a single table at a time, even though the representational utility of the model fundamentally relies on ability to decompose relations into multiple "normalized" relations.

Idea processors have a superficial similarity to the Item Editor, in that they allow what appears to be highly flexible data structuring. In reality, however, these systems are not databases at all, since they enforce no formal semantics, at least as "understood" by the idea processor. Instead, they merely serve as indexing methods for collections of "snippets" of text, or, even more simply, as improved text editors which can selectively hide certain levels in a user-defined "outline" hierarchy.

The value-ordered one-row-per-Attribute display, or "Item Editor", allows everyday users to construct and edit fully general Entity-Attribute databases in much the same way as they would edit text using modern word processors. In fact, an Item Editor scrolls the display "window" up and down over the sequence of Items like a word processor scrolls the display window up and down over a document. The person perusing and editing the single sequence of Items in an Item Editor has a single, uniform visual image to contend with, either through the display or paper—this contrasts with the non-visual, abstract, inquiry- or view-dependent concept of a database with which relational DBMS programmers and database administrators are familiar.

SUMMARY OF THE INVENTION

Accordingly, it is an object of this invention to provide a database interface, management system and engine in which access to data in the database occurs more rapidly than in prior art database interfaces, management systems and engines.

It is another object of the invention to provide such a database interface, management system and engine which matches well with the conceptual structures and processes that people ordinarly use when organizing and analyzing a body of information.

It is a further object of the invention to provide such a database interface, management system and engine which allows new types of information to be entered in a database created with the system without requiring the creation of a new database.

It is yet another object of the invention to provide such a database interface, management system and engine in which normalization is not required.

It is still another object of the invention to provide such a database interface, management system and engine which is free of insertion/deletion anomalies.

It is a still further object of the invention to provide such a database interface, management system and engine which utilize an improved B-tree algorithm and special data structures to provide improved performance, storage efficiency and reliability.

It is another object of the invention to provide such a database interface, management system and engine which is fast enough in operation to allow use of a single access method to data in the database.

It is a further object of the invention to provide a user interface to a database management system that allows the user to "thumb through" data in the database.

It is yet another object of the invention to provide such a user interface which allows the user to navigate in the data in an improved manner.

It is a still further object of the invention to provide such a database interface, management system and engine which provides improved consistency through the use of inversion.

The attainment of these and related objects may be achieved through use of the novel database interface, management system and engine herein disclosed. A user interface for a database management system in accordance with the invention has an interactive display means configured to present magnitude ordered information from the database in a plurality of rows. A means is provided for storing the information. A circuit means is connected between the storing means and the interactive display means to provide information signals to the interactive display means for displaying the information to the user. The information signal providing circuit means is configured to cause the interactive display means to display the information in magnitude ordered rows comprising a set of items. Each row is an assertion consisting of a plurality of components including an entity, an attribute and a value of the attribute, arranged in that fixed order in decreasing significance, respectively. A user input means is connected and configured to select information from said storage means for display on said interactive display means.

A database managment system in accordance with the invention has a means for storing information as a magnitude ordered set of items. Each item is an assertion consisting of a plurality of components including an entity, an attribute and a value of said attribute arranged in that fixed order in decreasing significance, respectively. A circuit means is connected to supply and receive information signals from and to the storing means. An information processor is connected to supply and receive the information signals from the circuit means.

A database engine in accordance with the invention is a data storage and retrieval system having a secondary, direct-access, non-volatile, storage means, configured to store and retrieve data in fixed-length units. The engine has a primary random-access, high-speed storage means. A cache, direct-access, high-speed storage means is configured to store and retrieve data in the fixed length units. A computing means communicates with the secondary storage means, the primary storage means and the cache storage means. The computing means is configured to create a basic index in the form of a tree structure. Nodes of the basic tree index are the fixed length units stored in the secondary memory. Branches of the tree are addresses of such fixed length units. The basic tree index provides key-sequence access or random access by key to data stored in the secondary storage means. The computing means is further configured to carry out a meta access method providing random-access by key and key-sequential access to data stored in the cache. The data is stored in the cache in the form of the fixed length units of data as stored in the secondary storage means, and in the form of fixed length units of the basic tree which reside in copies of the fixed length units of data as stored in the secondary storage means. Each such copy or modified copy of the fixed length units of data in the cache are accessable with the meta accessing method by key values in a range of key values belonging to each such copy or modified copy of the fixed length units. Such range of key values belonging to each such copy or modified copy are a set of key values for which access of the basic tree index depends on the contents of such copy or modified copy.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a block diagram of a database management system in accordance with the invention.

FIG. 2 is a table comparing parameters of the invention with the prior art.

FIG. 3 is a table showing component encoding in a database management system in accordance with the invention.

DETAILED DESCRIPTION OF THE INVENTION

Figure 4:
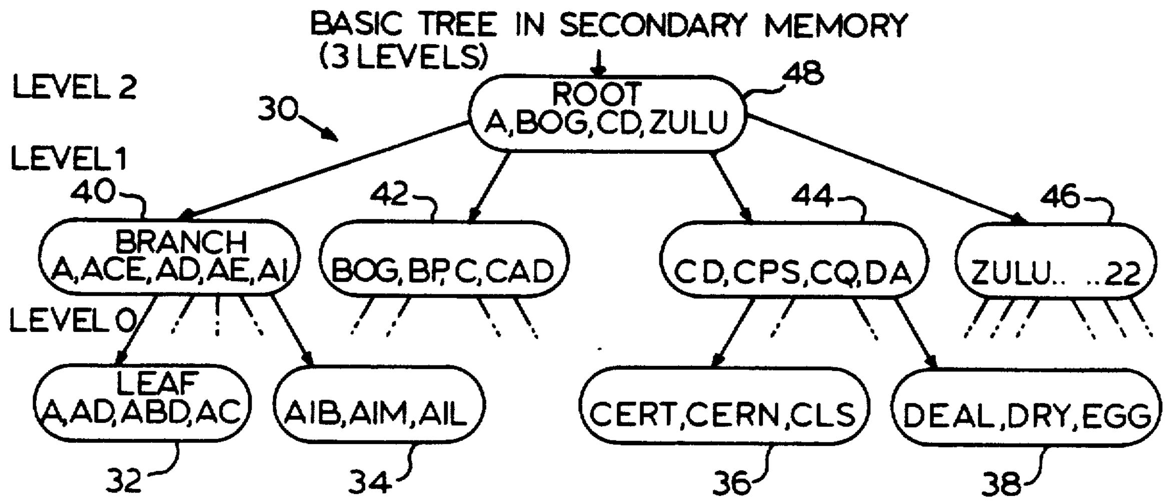
FIG. 4 is a block diagram of a data tree used in a database engine in accordance with the invention.

Turning now to the drawings, more particularly to FIG. 1, there is shown a database management system 10 in accordance with the invention. The database management system 10 includes a database engine layer 12, a representation layer 14 above the engine layer 12, a consistency layer 16 above the representation layer 14, and a presentation layer 18 above the consistency layer 16. The presentation layer 18 provides the direct user interface to the system 10 and also contains any applications software adapting the database management system to particular uses. The consistency layer 16 maintains agreement or consistency between items in the database, through the use of inversion, classification and generalization. The representation layer 14 handles the encoding of components of items in the database. The database engine layer 12 provides keyed data storage and retrieval on disk or disk file. It also performs access and updates of data in the database. The four layers 18–12 in the database management system 10 will be described below in further detail from the top down, i.e., from the presentation layer 18 to the database engine layer 12.

Before describing the invention further, there are certain terms that will be used in the description, which are defined in the following glossary section:

IMPLEMENTATION-LEVEL CONCEPTS (For programmers)

B-Tree

A B-Tree is an efficient structure for data sorting, storage and retrieval on direct access storage devices such as magnetic disk. Conventional B-Trees provide access of a record of data based on a key. The key names the record and determines the order of records in the database. In Infinity, there is no record part in a B-Tree entry, and the data is stored with the key. Since the distinction between name and data is blurred, the term "key" is misleading, and we replace it with the term "Item." The "key" part of an Item is at the left end, while the "data" part is at the right. The "key"/"data" boundary depends on characteristics of the stored information.

Item

An Item is a contiguous string of characters from 0 to 99 bytes in length which is stored in the Infinity B-Tree. The B-Tree stores Items in ascending order, according to the binary value of the bytes of the Items, with most significant byte first. This rule is similar to that for the alphabetization of words. A single Item is normally used for storing a single, independent fact. An Item is the smallest piece of information that can be changed or retrieved in one operation by the Infinity B-Tree.

Cursor

A Cursor is 100 contiguous RAM memory bytes which are used for storing one Item. The first byte is dedicated to storing the length of the Item contained in the Cursor. The other 99 bytes are for storing the Item itself. A Cursor is used by a program as a moving "pointer" into the sorted sequence of Items in the B-Tree. Cursors are modified by the B-Tree retrieval or "Cursor moving" functions First, Next, Last, and Previous. A Cursor is required for the B-Tree modification functions Insert and Delete.

Prefix Compression

The infinity B-Tree efficiently stores Items having identical prefixes; this is called "Identical Prefix Compression" or just "Prefix Compression." If a given set of 1000 Items begin with the same 40 bytes, the storage required is almost 40,000 bytes less with Prefix Compression than without it. Users of the B-Tree are unaware of Prefix Compression except as it affects storage requirements.

The data organization used by Infinity is depdent on Prefix Compression. Without it, Infinity databases would grow in memory requirements by perhaps an order of magnitude.

ASSERTION-LEVEL CONCEPTS (For Users) (GRAMMAR-LEVEL CONCEPTS)

Assertion (Fact or Statement)

An Assertion is like a simple declarative sentence in a natural language. It states a single fact. Hence the concepts in this section all have grammatical analogues. Grammatical synonyms appear parenthesised, after each applicable Infinity term. An Infinity database is a set of Assertions.

Assertions have three Components: EntityName, AttributeName, and Value. The Value Component actually can be more than one Component; it is defined as the third through last Components. The Value may also be empty. Multi-Component values are uncommon but important in certain situations.

Most Assertions require one Item for storage. Longer Assertions may be broken down into multiple Items according to the ItemChaining rules.

Component (Noun-Phrase or Verb-Prase)

Each Assertion is composed of a concatenated string of Components. The Components are identified by scanning over them one-by-one from the beginning (left end) of the Assertion. Thus each Component must delimit itself in some way. By default, Components are constructed according to the universal Component rules, which provide a simple delimiting and scanning method. However, the Infinity programmer may define SpecialComponent rules using different delimiting and scanning methods. SpecialComponent rules are normally used only for Values.

EntityName (Subject)

The first Component of an Assertion.

AttributeName (Verb)

The second Component of an Assertion.

Value (Object)

The third through last Components of an Assertion. May be empty.

Attribute or Property (Predicate)

The second through last Components of Assertion. Includes AttributeName and Value, if any.

MODEL-LEVEL CONCEPTS (For Users)

Entity-Attribute Model

The EA model is the set of data organization rules followed by Infinity and documented in this glossary. The world is thought of as a collection of distinct Entities, each of which has a set of distinct Attributes. There are no limits on the number of Entities or on the number of Attributes for any Entity. Attributes are in turn broken down into AttributeNames and Values. Since a Value may be the EntityName of another Entity, Entities may refer to each other and form Connections. Inter-Entity references are normally mutual; this mutuality is called Inversion. The AttributeNames occurring in the mutual references are Inverses, and are permanently associated. No AttributeNames other than defined Inverses are ever used in a mutual reference.

Whenever a new Value is attached to an Entity, the AttributeName it is attached by is looked up for a possible Inverse. If an Inverse is found, another attachment is made, this time with the Value becoming the EntityName and the original EntityName becoming the Value. Conversely, whenever a Value is detached from an Entity, the Attribute is looked up for an inverse, and if found, the inverse is detached as well.

Entity

An Entity can be any object, idea, person, quantity, or other thing. Each Entity is defined by a set of Assertions (Facts or Statements) which have the same EntityNames (Subjects). A database in Infinity is composed of a set of Entities and their Attributes.

Infinity is useful for representing any kind of data which can be thought of in some way as a "network" or "graph" of nodes (Entities) and arcs (Connections). This includes all tabular data, such as that stored in Relational databases.

Examples of Entities are: a certain person; a person's name; a person's social security number; A certain train; an invoice; a type of animal; an electrical connection; a word; a paragraph; or a topic of a book.

Most entities have convenient names that people use to talk about them. Many do not, though, and are referred to indirectly by using more conveniently named Entities. In Infinity, we give all Entities an "EntityName", although many will be "internal"—i.e. meaningful only to Infinity.

Attribute

An Attribute is a "Property" or "Characteristic" of an Entity. Examples of Attributes are: the child of a person; the length of a road; the type of an Entity; or the color of a car. (It is no accident that we use the "the x of a y" phraseology. Most natural languages use the Entity-Attribute model extensively, as exemplified by the existence of possesives, the genitive case in some langauges, and many property-related pronouns.)

In Infinity, Attributes have simple names called "AttributeNames." which are mostly less than 8 characters long for convenience, and are without imbedded spaces. The first letter of each word in a name is capitalized in order to keep the words separate after the spaces have been removed. This is only a convention—there are no actual limits on AttributeNames.

BINARY RELATIONS (Background Information)

Connection

A Connection is a joining together of two Entities. Every connection is an instance of a particular Connection type, called a Binary Relation. A single connection corresponds to two Assertions which are Inverses in the EA model.

Binary Relation

A binary relation is a type of Connection. It is set of Connections each of which serve a similar purpose. A single Binary Relation corresponds to two Attributes which are Inverses in the EA model.

A symmetrical Binary Relations

Most Binary Relations are asymmetrical; the two connected Entities in any one Connection play different "roles/" Examples are: the parent/child relation; the property/owner relation; or the supplier/purchaser relation. The slash separates the EA model Inverse Attribute Names in each of these examples.

Symmetrical Binary Relations

Many Binary Relations are symmetrical; the two connected Entities play indistinguishable roles. Examples of symmetrical Binary Relations include: Electrical circuit "arcs" which connect pairs of "nodes;" chemical plant pipes which connect pairs of "joints" such as tees; and automobile roadways which connect intersections. We tend to think of symmetrical binary relations as defining networks of some kind, although simpler structures can be symmetrical as well.

Entity-Relation Model

The ER model is a variant of the EA model which replaces invertable Attributes with Binary Relations. The two models have equal expressive power.

Binary Relational Model

Is a fully-normalized Relational Model.

THE RELATIONAL MODEL (Background Information)

The relational model is currently thė most popular database model. In it, data is organized into tabular form, and tables are related via "relational joins", which create new virtual or actual tables.

The relational model gained significant theoretical popularity when it was shown to be better than the CODASYL Network model of 1960's vintage. It gained significant programmer popularity when programmers realized that it fit in well with the ubiquitous "flat" file structure supported by the file system of nearly every modern operating system.

A process called normalization is used to help in determining the proper breakdown of data into tables. The process depends on "functional dependencies" in the data, which must be known in advance. Normalization points out problems such as "Insertion/Deletion Anomalies" in a particular table structure and suggests a way to break down the table into smaller tables (with fewer columns in each). The normalization process continues, further breaking down the tables, until no more problems are found.

The normalization process is so difficult for most users to understand that there are almost no correctly normalized relational databases in use. Furthermore, normalization usually calls for an unacceptably inefficient and logically scattered structure consisting of many small tables. As a result, many users must deal with mysterious conceptual problems that arise from an incorrect choice of table structure.

The Entity-Attribute model corresponds to a maximally normalized relational model, hence there is no more normalization required, or even possible. No "Insertion/Deletion Anomalies" or other problems exist. No change in the "Functional Dependencies" in the data after the database is created can require a change in the structure of the database.

The relational model also has difficulties (which may usually be overcome) in representing data that does not fit into tabular form, such as: text; multi-valued fields; null-valued fields; sparse tables; symmetrical relations; long sequences; and recursive structures such as trees.

THE DATABASE MANAGEMENT SYSTEM

The system is a fast, concurrent DBMS for IBM PC compatibles which uses an "Entity-Attribute" data model to achieve high flexibility. In the following description, the database management system of this invention is often referred to as "Infinity." Infinity eliminates most of the finiteness of a conventional DBMS; the table of FIG. 2 compares some key parameters of Infinity with those of typical relational DBMS's. Column 20 of the table lists the parameters being compared. Column 22 shows the characteristics of the database management system of this invention, referred to as "Infinity Entity-Attribute." From the characteristics of many of the parameters and the description of the invention, the origin of the name should be apparent. Column 24 shows the corresponding characteristics of a typical relational database management system.

In Infinity, all information is stored in one logical space as a set of 'Entities' which each have an unlimited number of 'Attributes' to relate them. Entities and Attributes can be created and deleted dynamically and in any order with no wasted space or time-consuming compactions or structure redefinitions required. The 'EA' model is quite natural and simple to most people and yet is actually more descriptive than the Relational model. Furthermore, the EA model has no need for the complex mathematical procedure called 'Normalization', which splits up Relations and scatters relevant data over multiple smaller Relations in order to avoid 'Insertion and Deletion Anomalies' and other still poorly understood problems.

The Entity-Attribute model is ideal for interactive use. Entities can be created or deleted without need for identifying their kind or structure in advance. Attributes can be attached to one another, forming a 'Binary Connection' (or 'Inter-Node Arc', or 'Link'.)

Because they have such a uniform structure, Entity-Attribute databases may be merged together more easily than most other types. This feature makes EA databases suitable for interchange between independent or networked personal computers in much the same way as text files are interchanged. Infinity provides a simple standard for representing and transmitting such data.

ITEM EDITOR USER INTERFACE

A look at the Infinity ItemEditor will help understand the Infinity EA model. A general purpose tool for editing Infinity databases, the ItemEditor is a fullscreen, interactive window into a sorted list of 'Items' An Item contains an EntityName at the left, an AttributeName in the middle, and an AttributeValue at the right; all are connected by underlines. An ItemEditor window into a name-and -address database might show:

```
Johnson, D._city_San Francisco
Johnson, D._state_CA
Johnson, D._street_483 W Chestnut
Johnson, D._phone_(415) 555-2838
Johnson, D._phone_(415) 555-2839
Johnson, D._phone_(415) 555-7001
Johnson, D._parent_Smith, D.
Johnson, D._zip_93401
Smith, B._phone_(805) 838-2803
Smith, B._child_Johnson, D.
```

-continued

| |
|---|
| Zimmerman, R.__phone__(213) 388-9665 |

Johnson has three phone numbers, and Smith and Zimmerman have no addresses. No space is wasted for Smith or Zimmerman's unknown addresses, yet they can be added at any time. The 'parent' and 'child' AttributeNames are inverses, and are used here to connect Johnson as the child of Smith. The repetitions of Smith' and Johnson's names and Johnson's 'phone' AttributeName can be suppressed on the display if desired.

```
Johnson, D.__city__San Francisco
            state__CA
            street__483 W Chestnut
            phone__(415) 555-2838
            (415) 555-2839
            (415) 555-7001
            parent Smith, D.
            zip 93401
Smith, B.__phone__(805) 838-2803
child__Johnson, D.
Zimmerman, R.__phone__(213) 388-9665
```

In this way, the list of Items can be viewed as a list of non-redundant EntityNames, attached to non-redundant AttributeNames, attached to a list of AttributeValues. This "Entity-centered" view cannot be achieved with a relational system, which requires that information relating to, say Johnson, be distributed among many relations in which Johnson is a (partial) key.

The Item Editor provides a highlighted Edit Line which is used to "thumb" through the database. Rather than constructing command lines and waiting for search operations to complete, the user can employ familiar typing and editing conventions to fill out the edit line. By typing into this line or using CTRL characters to auto-fill it, users control which portion of the database is in view. At all times the display of items dynamically adjusts to show items which alphabetically follow the contents of the edit line.

When the highlighted area is empty, the first item in the database is displayed beneath it, followed by the second item, etc. The user might type "Tho" causing the item that is after "Tho" alphabetically to appear beneath the edit line, such as:

| |
|---|
| Thorson, Jack M.__city__San Francisco |

Without knowing the exact spelling of a particular item, or, without knowing for sure whether an object is even in the database, the user can browse rapidly without instituting formal, time-consuming searches.

Users construct new items for insertion into the database by typing and correcting freely, within the edit line. Once constructed, the item is inserted with one keystroke (the Ins key on the IBM PC.)

When deleting an existing item, the up and down arrow keys provide an easy way to stuff the edit line with the exact contents of the item to be deleted. Then the item can be removed from the database in one keystroke (Del on the IBM PC.)

Navigating, or doing a long vertical hop through the database, is performed using the "Invert" key. This key automatically modifies the edit line so that it contains the "Inverse" of its previous contents, and the rest of the screen adjusts to follow. An Inverse is obtained by interchanging the EntityName with the AttributeValue, and changing the AttributeName to its defined Inverse AttributeName. Thus if "parent" is the inverse of "child", then the inverse of:

```
Smith, B.__child__Johnson, D.
is
Johnson, D.__parent__Smith, D.
```

The inverse of every Item inserted or deleted is automatically inserted or deleted as well. The user defines the inverse of an Attribute by Inserting an Item like:

| |
|---|
| parent__Inverse__child |

Item Editor "Power Tools"

In addition to the single-Item-at-a-time editing facilities provided by the Item Editor, the interactive user will want to occasionally apply "power tools", which generally affect more than just one Item and its inverse. Power tools correspond to the inquiry languages of other systems, but go beyond inquiry languages in that they can be used during the process of creating and editing the formal structure of the database, while inquiry languages require well-defined formalisms. Power tools are not "smart" ; they don't "know" about the meaning of the data. Some examples of power tools are:

(1) Change the name of a given Entity in every Item in which it occurs in the database;

(2) Search the Entity Names, Attribute Names, Attribute Values, or a combination of these for a given pattern of characters, such as is possible in many text editors. This is a "fuzzy" type of match like that in text editors;

(3) Make inferences of certain kinds. For example, joining the two binary relations represented by two Attribute Names constitutes a kind of immediate inference;

(4) Perform set operations on the sets of Attribute Values attached to a given Attribute Name on a given Entity;

(5) Perform set operations on the sets of Items in different databases. A simple union of the sets of Items of databases having compatible structures constitutes a merging of the databases. Compatibility between databases means (a) there are no synonyms or aliases—the same Entity Names identify the same Entities (this includes Attribute Names, which occur as Entity Names in some Items); (b) there are no name collisions—different Entities have different Entity Names; (c) they were created with a common understanding of the intrinsic meaning of those Attribute Names which occur in both databases; and (c) they adhere to a common set of consistency rules.

(6) Check the logical consistency or acceptability of a database or part of it by testing according to rules defined within the database itself. Such rules could be organized in the simple "if-then" pattern matching structure of productions.

Periodic Publishing as an Informally Distributed Database

Most power tools would not be useful in a multi-user environment where real-time updates to a database are immediately shared with other users. In such situations, the ideas of locking, transactions, commitment, logs, and so on come into play. But there are many database jobs which can be done off-line, in a one-user-per-database mode, with periodic "publications" of the database or its changes.

Local Area Networks and Electronic Mail make the regularly published database idea particularly attractive. Individual users of Item Editors with power tools can create and maintain individual databases which can then be published via the electronic mail and automatically merged into the databases of other interested users. Most electronic mail systems support the concept of "distribution lists", whereby users may register their interests and receive only the kinds of mail that they want. Thus a publication of an update of a certain database can go out to a certain distribution list of users automatically. If the publications are frequent, each user will feel as though his or her personal database is on-line.

It is not necessary that only one user maintain an entire database. Several users can contribute updates which are merged by a third, checked for consistency and accuracy, and then published, perhaps ending up back in the databases of the contributors.

Figure 9:
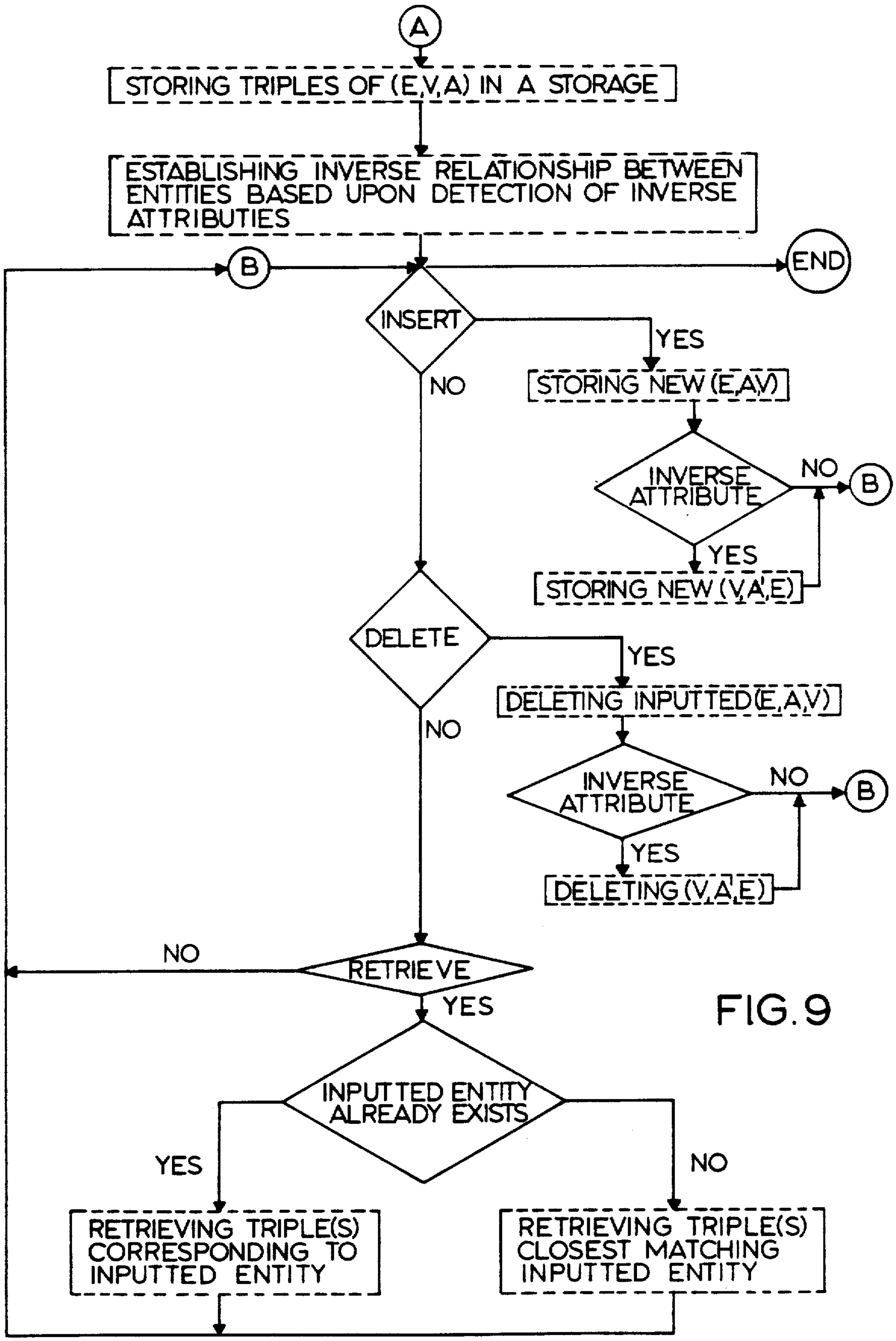
FIG. 9 is a flow chart which shows the operations of the system.

All of this is similar to what is presently done with text files. However, text files must always be manually edited if they are to be meaningfully merged. Entity-Attribute Item Spaces, on the other hand, can be meaningfully merged without further editing, so long as a few compatability arrangements are made beforehand by the database creators While the application of the power tools should always be able to bring a pair of databases eventually into compatible forms, the disparity will diminish as the level of formality and standardization of the database structures increases. Entity-Attribute Item Spaces can move about on the formal-informal continuum. FIG. 9 summarizes the operations of the system discussed hereinabove.

CONCURRENT B-TREE IMPLEMENTATION

Infinity requires only a single supporting data structure: a B-Tree with efficient variable-length keys and common-prefix compression. No traditional file structures are used, so Infinity is file system independent. Infinity can use as its media either an entire disk drive or a single, contiguous, random-access file. (In principle multiple files or disks can be 'spanned' as well.) When used with a disk directly, performance is enhanced due to both the elimination of conventional file system overhead and the possibility of using head motion optimization, concurrent (DMA) I/O, and other features.

The Infinity B-Tree is written in assembly language for maximum performance. The implementation makes a minimum of assumptions about the operating system and hardware configuration, so the design of Infinity is extremely portable. It is even suitable for hardware speedups or 'casting in silicon' and was written with an eventual back-end processor in mind. But the most important speed feature is concurrency: multiple processes may access the B-Tree without the page faults of one process causing delays for another.

The Reliability features in Infinity may be of more importance to many users than the speed. Infinity uses a proprietary index update protocol to insure that power failures or other catastrophes will never leave a database in an internally inconsistent state. Only the most recently Inserted, "uncommitted" Items may be lost. The extensive internal validity checking is user-invokeable, one time or on every I/O.

CONSISTENCY LAYER

The Consistency Layer of Infinity is supported by the Representation and Engine Layers, described below.

Infinity Layers

This section discusses the built-in rules that the Consistency Layer applies to an Infinity database in order to maintain agreement or consistency between more than one item or assertion. In particular, inversion, classification, and generalization each organize multiple items into distributed structures which make the same information available in several places. If such item structures are allowed to fall out of agreement, or be inconsistent, the results are unpredictable or incorrect, and will depend on how the database is accessed.

The built-in rules are not guaranteed to fulfill all consistency requirements of all possible databases; in fact, applications programs or other parts of the Presentation Layer above will commonly enforce their own additional consistency rules, based on a deeper understanding of the entities being represented. The built-in rules do, however, provide a certain amount of enforced agreement between variants of the Presentation Layer in order to maximize inter-application compatibility.

Inversion

The most fundamental consistency constraint for the Entity-Attribute Model is inversion. Inversion provides a symmetrical representation for each entity-to-entity connection, even though the entity-attribute format assymetrically forces one of the entities to be thought of as an attribute of the other.

Symmetry is achieved by duplicating the connection, with each entity attached as, an attribute of the other in turn. With such an inverted connection, either entity can be looked up in order to find out the other.

The symmetrical representation now requires an indication of the direction of the connection, or else the direction information will be lost. Two common ways of doing this are used in entity-attribute models: (1) the connection type is named with a single name and the direction is designated separately; or (2) the connection type has two names, one used for each direction. Infinity uses the latter method. In the former, the "backward" direction is often indicated by suffixing "of" to the attribute name for the "forward" direction. However, the "forward/backward" idea is still representationally asymmetrical, and is an unnecessary complication. Furthermore, there is often a need for an undirected connection; the "forward/backward" designation must disappear. In Infinity, undirected connections are simply given the same attribute name for both directions. Following are some examples of inversions.

| | |
|---|---|
| An Inverted Directed Connection | |
| | Dobbs, J._has child_Dobbs, M. |
| | Dobbs, M._has parent_Dobbs, J. |
| An Inverted Undirected Connection | |
| | Dobbs, J._dances with_Dobbs, M. |
| | Dobbs, M._dances with_Dobbs, J. |

The "Inverse" Attribute

Defining two attribute names as inverses is done by connecting them together via the "inverse" attribute. In order to define that the "has child" attribute is the inverse of the "has parent" attribute, one inserts the item:

| |
|---|
| has child_inverse_has parent |

Now, this item has an inverse as well:

| |
|---|
| has parent_inverse_has child |

In other words, the inverse attribute is its own inverse, and it is undirected. The fact that inverse is its own inverse is reflected in the item:

| |
|---|
| inverse_inverse_inverse |

The mandatory existence of this unique item is a consistency rule.

Consistency Rules for Inversions

1. The inverse_inverse_inverse item is permanent.
2. An item "X_A_Y" must have an inverse "Y_B_X" in the database if and only if there is an item "A_inverse_B" that defines the inverse attribute "B."

Note that it is not necessary for every attribute to have an inverse.

Classification

Built on top of inversion are several structures, the most fundamental one being classification. A class is a set of entities which share some qualities. A class differs from a set in that a class can have only entities as members, whereas a set can have anything as a member, including other sets which may be vaguely defined or even infinite. Of course, it is always possible to define a new entity to represent any particular set, but this is not necessary in the pure set domain.

In Infinity, the name of a class, such as "person," is an entity which can participate in connections with other entities. Thus "person" can have attributes just like any other entity. The special attributes "is a," and "has example" are inverses, and are very important, since they connect the class to the entities that are in it. Since our previous examples showed two people, they would both be in the "person" class:

| |
|---|
| Dobbs, J._is a_person |
| Dobbs, M._is a_person |
| Person_has example_Dobbs, J. |
| Person_has example_Dobbs, M. |

It is possible to find examples of a class given the class name, or to find the class name of an entity given its entity name. Note that an entity may be in more than one class.

Classes themselves are entities in the special class "class." The class "person" is defined by being an example of the class "class:"

| |
|---|
| class_has example_person |

-continued

| |
|---|
| person_is a_class |

The class "class" is an example of itself:

| |
|---|
| class_is a_class |
| class_has example_class |

Consistency Rules for Classes

1. The item "is a_inverse_has example" and its inverse are permanent.
2. The item "class_is a_class", and its inverse, are permanent.
3. An item "X_is a_Y" (or "Y_has example_X") may exist if and only if "Y_is a_class" exists. (Only classes may have examples.)
4. An Item "X_A_Y" may exist if and only if an item "X_is a_Y" exists. (Every entity must be in at least one class.)
5. An item"X_A_Y" may exist if and only if "A_is a_attribute" exists.

Rule 2 establishes the class "class" which has all of the classes in the database as examples. Thus all the classes may be enumerated easily.

Rule 3 insures that only classes may have examples The "is a" attribute may have only a class name as its value.

Rule 4 insures that every entity is in at least one class. This is an important constraint, since it guarantees that all entities may be found via the "has example" attribute for some class; no entities are "free floating."

Rule 5 maintains a class of attributes, so that all the attributes may be enumerated easily.

Generalization

A class which must necessarily include every member of another class can be considered as the "more general" or as a generalization of the other class, which is a specialization of it. This situation can be indicated by the "contains/contained by" attributes:

| |
|---|
| animal_contains_person |
| person_contained by_animal |

"Contains" and "contained by" may be read "has subset" and "has superset," or "has subclass" and "has superclass." Another way to read this is "Every person is an animal." Or, "For every X, if X is a person, then X is an animal." Thus the "contains" attribute permits the expression of one type of categorical sentence and the logic of categorical sentences (syllogism and so on) can be used to make inferences.

Another kind of categorical sentence is the negative of the kind we have just seen. For example, the negative of "every person is an animal" is "For every X, if X is a person, then X is not an animal." (We are using the term negative in the sense used in the logic of categorical sentences.) The negative can be expressed using "contains no." Since no person is an inanimate object, we could say:

| |
|---|
| person_contains no_inanimate object |

-continued

| |
|---|
| inanimate object_contains no_person |

Note that "contains no" is undirected (it is its own inverse.) Naturally, it is not common to assert both the affirmative and the negative forms of the same categorical sentence at the same time, i.e. that "X_contains_Y" and that "X_contains no_Y," because there would necessarily be no Y's, in which case there may as well not be a class for Y's. The database will usually have only one or the other form relating the same two classes at a particular time, but it is not necessarily so.

Both of the above types of categorical sentence are universal in that they apply to every element of a class. Another type is the particular categorical sentence, which applies only to some element of a class. An example is "Some person is a burglar," (which we might presumeably know because burglaries exist), or "There exists an X such that: X is a person and X is a burglar." This can be expressed in Infinity as follows:

| |
|---|
| person_contains a_burglar |
| burglar_contains a_person |

Note that "contains a," like "contains no," is undirected. Also note that "contains a" is still true if there are more than one "contained" example; it could have been called "contains at least one."

The negative of the above would be "Some person is not a burglar," or "There exists an X such that: X is a person and X is not a burglar." This can be expressed with:

| |
|---|
| person_contains a non_burglar |
| burglar_contains at most part of_person |

Note that the same effect could be obtained if the negative of the right hand class were available: "person_contains a_non burglar." However, negative classes will normally not be available because they are too large: a negative class would contain the entire rest of the database. Further note that "X_contains a non_Y" does not imply "X_contains_Y" and also that it is possible that both "X_contains a non_Y" and "Y_contains a non_X." Lastly, note that there is no implication that the example asserted to exist must be in the database. We might know that some burglar exists without knowing the burglar's identity.

In the logic of categorical sentences, contradictories are sentences which cannot both be true or both be false. Contradictories are exactly opposites. The contradictories in Infinity can be summarized as follows:

X_contains_Y_contradicts X_contains at most part of_Y

X_contained by_Y contradicts X_contains a non_Y

X_contains a_Y contradicts X_contains no_Y

The concepts of contraries and subcontraries from the logic of categorical sentences do not apply in Infinity since we adopt the hypothetical point of view, which, in contrast to the existential point of view, does not presuppose that each class must contain at least one entity.

A non-categorical but useful concept from the set domain is that of proper subset, which is indicated by "contains morethan/contains less than:"

| |
|---|
| person_contains more than_burglar |
| burglar_contains less than_person |

Note that "X_contains morethan_Y" implies "X_contains_Y"and "X_contains a non_Y."

Optimizations for Generalizations

Contains is a transitive relation, which means that if "A_contains_B" and "B_contains_C" then "A_contains_C" (and similarly with "contained by.") Some or all of the connections transitively derivable may actually exist in the database. It is possible to "fill-in" the generalizations or specializations for a class so that the full transitive closure of the "contains" (or "contained by") attribute is explicit: this can be a great speed advantage. Normally, the generalizations and specializations will be inferred as needed.

Another space saving is the upwards propagation of examples. If an entity is an example of a class, then it must be an example of all generalizations of the class as well. Thus it is necessary to assert explicitly the membership of an entity only in the most specific classes. Membership in the more general classes can be inferred automatically or, to eliminate the delay of inference, be "filled-in" or made explicit.

Consistency Rules for Generalizations

These rules are concerned only with contains, since it defines the generalization hierarchy. For efficiency, contains is always explicit, even when it is implied by "contains more than."

1. The item "entity_is a_class" is permanent. (However, not all entities need be explicitly examples of the "entity" class.)
2. No item "entity_contained by_X" exists. ("Entity" is the most general class.)
3. An item "X_contained by_Y" or "Y_contains_X" can exist if and only if:
   a. "X_is a_class" and "Y_is a class" exist, and
   b. "X_contains+_Y" does not exist, where "contains+" represents the transitive closure of the "contains" attribute.

Traits

Analogous to the upwards propagation of examples is the downwards propagation of traits through inheritance. A trait can be any quality defined to be possessed by a class. A class can inherit traits from any of its direct or indirect superclasses (any class that contains it). Thus a trait of the class "animal" would be a trait of the class "person," given that "animal_contains_person."A trait of the class "class," which is the most general, is inherited by all classes.

The "Attribute Of" Trait

The "attribute of/has attribute" trait describes the appropriateness of using a given attribute with an entity of a given class. "Parent_has attribute_animal" is an example which says that only animals can meaningfully have parents. "Has attribute_attribute of_class" indicates that "has attribute" can be attached only to classes. "Attribute of_attribute of_attribute" indicates that "attribute of" can be attached only to attributes. Since "attribute of" is a trait, it applies to all the direct or indirect subclasses of any class to which it is directly attached.

| |
|---|
| child of_attribute of_animal |
| parent of_attribute of_animal |

"Child of " and "parent of" apply, then, also to persons and burglars, which may have parents and children. But "attribute of" can be applied to the built-in attributes as well, in order to keep the database consistent at this low and very important level;

| |
|---|
| attribute of_attribute of_attribute |
| inverse_attribute of_attribute |
| is a_attribute of_entity |
| has example_attribute of_class |
| contains_attribute of_class |
| contained by_attribute of_class |
| contains no_attribute of_class |
| contains a_attribute of_class |
| contains a non_attribute of_class |
| contains at most part of_attribute of_class |
| contains more than_attribute of_class |
| contains less than_attribute of_class |
| has attribute_attribute of_class |

The inverses of these assertions are (with prefixes suppressed):

| | |
|---|---|
| attribute_has attribute_inverse | attribute of |
| entity_has attribute_is a | |
| class_has attribute_has example | |
| | contains |
| | contained by |
| | contains no |
| | contains a |
| | contains a non |
| | contains at most part of |
| | contains more than |
| | contains less than |
| | has attribute |

"Attribute of/has attribute" can be used either to verify the consistency of an existing database or to help a user in creating a new database. If a user is unfamiliar with the structure of the database but wishes to add a new entity, only the class of the entity need be defined in order for the system to provide a "template" or "check-list" of attribute names which might apply. These attribute names will normally be self-descriptive, but the user can of course examine the definitions of any of them, especially their "attribute of's" and "description's."

The "Unique Attribute" Class

Many attributes really cannot be used with multiple values on the same entity. In other words, two items of the form "X_A_Y" and "X_A_Z" cannot both exist in the database at once. For example, the "has mother" and "has father" attributes of a person must be unique. Such attributes are placed in a special subclass of attribute called "unique attribute":

| | |
|---|---|
| has mother_inverse_mother of | |
| has father_inverse_father of | |
| has mother_is a_attribute | |
| | unique attribute |
| has father_is a_attribute | |
| | unique attribute |
| unique attribute_contained by_attribute | |

"Mother of" and "father of" are not unique attributes. The only built-in unique attribute is inverse.

| | |
|---|---|
| inverse_is a_attribute | |
| | unique attribute |

Note that although all unique attributes are also attributes, we normally explicitly indicate this fact using both "X_is a_unique attribute" and "X_is a_attribute."

THE REPRESENTATION LAYER

The Representation Layer of Infinity is supported by the Engine Layer, described below. The Representation Layer is mainly the encoding of components of items.

Component Encoding

Three main types of components or data elements are used in items: symbolic, binary, and decimal. These may each be used in a variety of ways that determine their exact interpretations. However, each has a default interpretation used by the Item Editor. Although the Item Editor may misinterpret components which have been used in a non-default way, the Item Editor user will not normally modify or use these components since they are normally created and used by an application program.

Parsing Components

Each Component of an item in a cursor can be parsed by a simple rule to find its end. The rule is as follows.

1. Check that we are not at the end of the cursor already.
2. Look up the first byte in a table called ComponentLenTab.
3. Add the table entry to the offset into the cursor in order to skip over the fixed portion of the component.
4. Place a 255 sentinel byte after the last byte of the Cursor.
5. Skip over the variable part of the component by skipping bytes greater than or equal to 128.

This rule is extremely fast, yet allows considerable flexibility in the component encoding. The (partial) contents of the ComponentLenTab are:

Component Encoding, shown in FIG. 3.

Symbolic Components

Symbolic components are normally strings of characters. The length of a symbol is 1, as stored in ComponentLenTab, since the only fixed part is the first byte itself. The characters are binary values from 128 to 255; the top-most bit of each character byte is on.

Straight ASCII is not used because it sorts incorrectly. One change is that the uppercase and lowercase letters are interleaved as follows:

aAbBcCdDeEfFgGhHiIjJkKlLmM-
nNoOpPqQrRsStTuUvVwWxXyYzZ

This interleaving still does not allow for capitalization-independent ordering as used in a dictionary. Also, there are special codes for foreign languages. In Spanish, for example, the letter pairs 11 and ch are special cases which sort as one character, following 1 and c respectively. The conversion between symbol characters and ASCII can be done quickly using tables.

Binary Components

The binary format is used primarily for integers, but may be used to store adjusted binary floating point or other data types. The binary format is very fast to encode, since there are no restrictions on the byte values used. For storing integers, leading zeroes are removed from positive numbers, and leading ones are removed from negative, two's complement numbers. This compaction keeps the components independent of processor register lengths and eliminates overflows that require restructuring the database by increasing the lengths of all the stored integers. When storing non-integers, the leading zeroes can be left intact for speed. Conversion routines for storing either integers or binary float as binary are discussed below.

Normally, there are no variable-part bytes in an integer, but they may be used for special purposes. The values of the variable part are from 128 to 255, and are considered 7-bit binary.

Decimal Components

The decimal format is intended to encompass any decimal data type likely to be found in any computer system. It can expand its exponent to four bytes, if necessary, and the mantissa has an unlimited variable length.

The exponent is an unsigned binary integer zero, one, two, or four bytes in length. The sign of the exponent is determined by the first component byte. (The exponent will normally be stored as two's complement in a long register during software arithmetic operations.) Exponent bytes are ones complemented if either the exponent is negative or the mantissa is negative, but not if both are negative.

The mantissa is stored as a base 100 fraction, with negatives 99's complemented. Each base 100 digit is biased by 128, so the values range from 128 to 227, even if 99's complemented. Negatives are indicated by a different set of first component bytes. Conversion between packed BCD and biased base 100 can be done quickly using tables.

PURPOSE OF THE ENGINE

The Engine provides computer-based data storage and retrieval capabilities for applications programs using direct access storage devices such as fixed or flexible disks together with random-access memory for data cacheing. The single access method provided can be called keyed random or sequential access, with variable length keys, and with the data concatenated onto the key rather than being stored separately. The Engine uses an improved B-tree algorithm and special data structures, which provide performance, storage efficiency, and reliability advantages, which are discussed below in more detail.

Client access to all data is by key—either randomly or sequentially—rather than via pointers, hashing, or simple sequential. Using only one access method is simpler to deal with from a client programmer's standpoint, but would normally be too slow. The Infinity Engine is fast enough to allow this simplification.

The Engine is not a complete database management system per se, since it does not have any knowledge of the semantics (meaning) or the organization (data formats) of the data it stores. Instead, the Engine is used as a component in larger systems, such as the Infinity Database Management System, which define a mapping between the structures stored by the Engine and the concepts being represented. This mapping is particularly easy to establish using the Engine and its associated "Entity-Attribute model" data structuring methods, and the resulting system is more flexible than most "Relational model" systems.(see "Infinity Database Management System Consistency Layer" for a discussion of the flexible Entity-Attribute data model used by the Infinity Database Management System.)

"Prefix compression" is a feature of the Engine which is very important if the Engine is to be used for storing Entity-Attribute structures the way the Infinity Database Management System does, since long common prefixes are the rule rather than the exception under this organization. The lack of prefix compression might increase the total storage requirements of any given set of Items manyfold. The lack of prefix compression would not render the Engine useless, but only storage inefficient; an example of a useful but nonrefix-compressing Engine equivalent is an "Engine Simulator" which duplicates the interface to the Engine and can temporarily store a small number Items for the purpose of testing and demonstrating applications programs until a better Engine is available.

Standard B-trees as Data Access Methods

For a general discussion on B-trees, see Knuth, Donald E., *The Art of Programming,* vol. 3, on Sorting and Searching, pp. 471–480 (Addison-Wesley, 1973). A B-tree is logically one of many possible means for storing, incrementally modifying, and selectively retrieving a value-ordered sequence of "keys." For our purposes, a B-tree can be defined as follows. A B-tree is a balanced L-level tree with each node or "cell" containing between B/2 and B branches. Each pair of adjacent branches in any cell is associated with a "key" which is in magnitude greater than that to be found in any cell below the left adjacent branch, and in magnitude less than or equal to that to be found in any cell below the right adjacent branch. A B-tree thus strictly orders the keys and defines a unique search path from the root to the leaves for any given key. Insertion of a new key into such a tree can be accomplished usually by merely inserting the key into the proper sequential position of the leaf (bottom level, level 0) cell; if there would then more than B keys in the leaf cell, it must be "split" into two new leaf cells each having B/2 keys, and some key which divides the ranges of the new cells must be inserted into the proper cell at the next level up, recursively. Our definition differs from the traditional in that non-leaf keys do not carry information, but merely serve to direct the search; the occurrence of a given key at a non-leaf level does not imply that it occurs in the logical value-ordered sequence of keys.

Systems which use B-trees for data access on disk typically use one disk data "block" (or "sector") or more for each B-tree cell, and provide a "cache" or copy in primary memory for one or more B-tree cells so that commonly needed cells are available without disk I/0. The set of cells in the cache can vary from time to time; usually each cell newly read from disk goes in the cache, in place of some less important cell. The choice of cell to replace is called the replacement algorithm; a typical algorithm is 'least-recently-used'.

A B-tree 30 as used in the database engine of this invention is shown in FIG. 4. We will hereinafter refer to level 0 cells 32, 34, 36 and 38 in the B-tree 30 as the "Leaf" level. Similarly, level 1 cells 40, 42, 44, and 46 we will call "Branch level"; the highest level cell 48, level 2, (but below the Ground level) we will call the "Root level". The Ground level is unique to infinity and is nominally 64. The binary relation constituted by the branch pointers will be hereinafter be called the "Parent/Child" relation. The "Parent" cell of a given cell is the one at the next higher level which contains the branch pointer to the given cell. The "Parent key" of a given cell is the key in the Parent cell which is associated with the branch pointer to the given cell.

The Infinity Modified B-tree Algorithm

Terminology

Cells may in principle be any size, but are standardized at 256 bytes long, so that offsets into a cell are one byte. The 256 bytes needed to store a cell we will hereinafter call a "page", whether on disk or in the cache. Pointers to cache pages are called PageNums, and their length is PageNumLen, which is dependent on the size of the cache, but typically one byte. Pointers to disk cells are called CellNums, and their length is dependent on the size of the disk, but typically two to four bytes.

The Meta Tree

Figure 5:
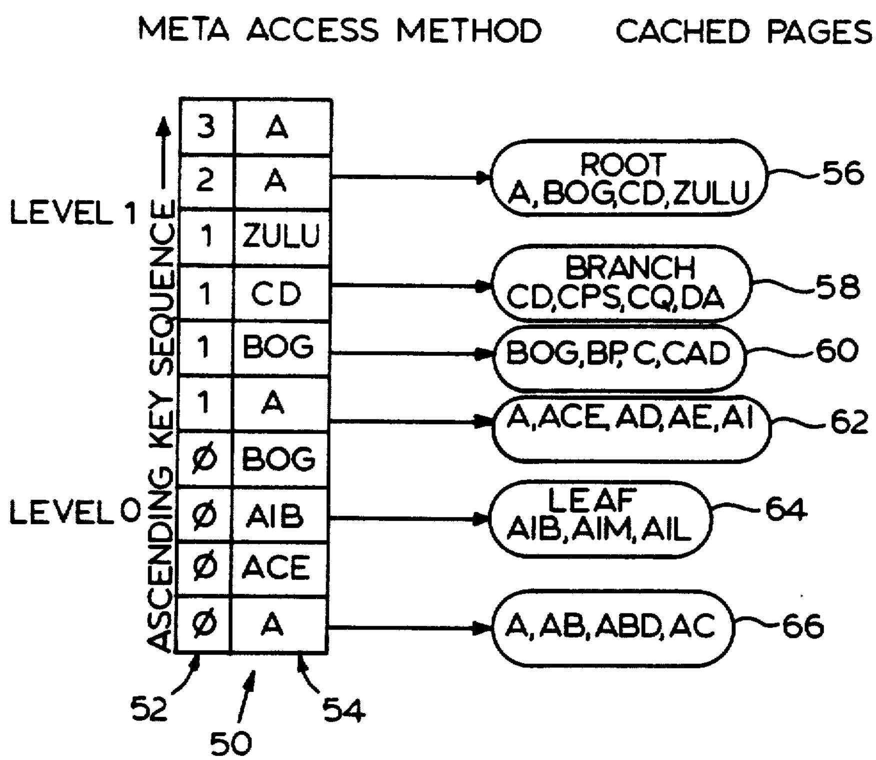
FIG. 5 is a block and flow diagram of an access method used in a database engine in accordance with the invention.

The essential performance- and reliability-improving concept of Infinity is the "MetaTree", an example of which is shown at 50 in FIG. 5. The MetaTree 50 is a B-tree in its own right, but it occupies only RAM memory, rather than some RAM and some disk memory, as does the B-tree 30 proper, which we will hereinafter refer to as simply the BTree (no hyphen) 30. Terms which can be applied to either tree 30 or 50 may be prefixed hereinafter by a "B" when they refer to the BTree 30, or by "Meta" when they refer to the MetaTree 50.

The MetaTree 50 indexes all of the BTree cells 32–48 which are in the RAM cache, including BTree cells of all levels, not just those at the leaf level. The MetaTree Item for any BTree cell 32–48 is the concatenation of the level number 52 (one byte) with the first Item 54 in the BTree cell. Thus any level of the BTree 30 is directly indexable via the MetaTree 50, and the levels appear in ascending order during a Item-sequential scan of the MetaTree 50. An important feature of the MetaTree is that data in all cached BTree cells 32–48 can be accessed through the MetaTree 50 without reference to the parent BTree cells 32–48. When used in this way, the MetaTree can be thought of as one level deeper; the MetaTree together with its "sub leaf" level of cached BTree cells 56, 58, 60, 62, 64, 66 is called the BMetaTree.

The MetaTree 50 is very quick to search, since:

(1) The MetaTree has fewer levels than the Btree, since it indexes only the contents of the cache, which is smaller than the disk (and we assume the disk is approximately full of indexed data);

(2) The MetaTree contains, as the branching pointers, cache page numbers instead of disk page numbers, which would have to be translated to cache page numbers by means of some other data structure.

(3) The format of data in the cells is particularly suited to searching using the macro or micro instructions available in typical computers. The format is simple enough to allow dedicated hardware designs using custom microprogramable controllers, SSI, or even VLSI.

The simplicity of the data format is possible because the Engine does not "know" anything about the semantics of the data. It does not know a special method for comparing the magnitudes of, say, dates. Instead, dates or other keys must be converted into format accepted by Infinity, which is called an "Item". An Item is a contiguous string of binary bytes from 0 to a maximum length called MaxItemLen. MaxItemLen is typically 99 bytes. The comparison of two Items is performed simply by comparing the binary values of their byte strings, with most significant byte at the beginning of the string. If an Item is a prefix of another, it is the lesser. In this way, Items behave as binary fractions, with an implied "binary point" preceding the first byte.

When an Item is stored in memory outside of the Engine, it is contained in a "Cursor". A Cursor is MaxItemLen+1 contiguous bytes of memory, with the first byte dedicated to storing the length of the contained Item, and the subsequent MaxItemLen bytes dedicated to storing the value of the Item.

Cursor Storage Format

```
+------------------------------+
| Len | MaxItemLen bytes of text |
+------------------------------+
```

When a cursor is being used with the MetaTree, however, the prefixed BTree level number byte is placed in the length byte of the cursor, and the actual length is stored separately.

The MetaTree occupies cache pages as needed for its purposes, leaving the rest to be used for BTree pages. The basic structure of cells in the MetaTree and the BTree are identical, so that much of the program code used to manipulate and search the two trees can be shared.

The MetaTree also makes it possible to provide concurrency, insofar as client programs whose accesses require disk I/0 can be put on an internal wait queue so that other requests can be serviced. Some methods for concurrency in BTrees are known in the art but none provides the degree of concurrency provided by the MetaTree approach. This will be discussed under Concurrency below.

Cell Data Format

Figure 6:
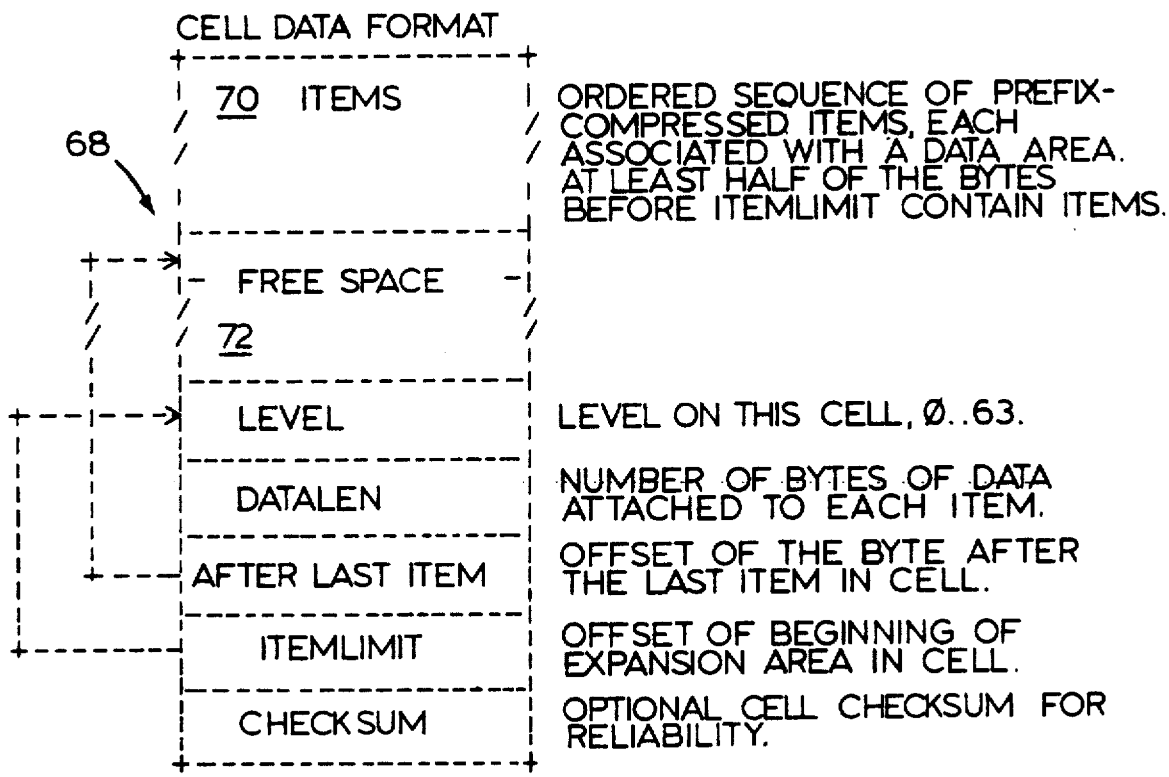
FIG. 6 is a block diagram of a cell data format used in a database engine in accordance with the invention.

The cell data format 68 is shown in FIG. 6. Items in a cell are stored packed at the front 70, with free space 72 following, and an area of cell-specific values called the expansion area at the end. The initial area containing Items will normally occupy at least half of the space below ItemLimit. This does not apply to the GroundCell or to the RootCell. This half-full rule supercedes, for any B-tree using variable-length keys, the ½ b rule, where b is the constant maximum number of fixed-length keys a cell can contain.

Additional information can be stored in any cell's ExpansionArea by reducing the value of ItemLimit. The absolute minimum for ItemLimit is MinItemLimit, which is sufficient to allow at least two Items in any cell. The GroundCell's ExpansionArea includes the BRootLevel, along with information describing the characteristics of the disk and any information which must be committed at the same moment as the rest of the BTree.

Figure 7:
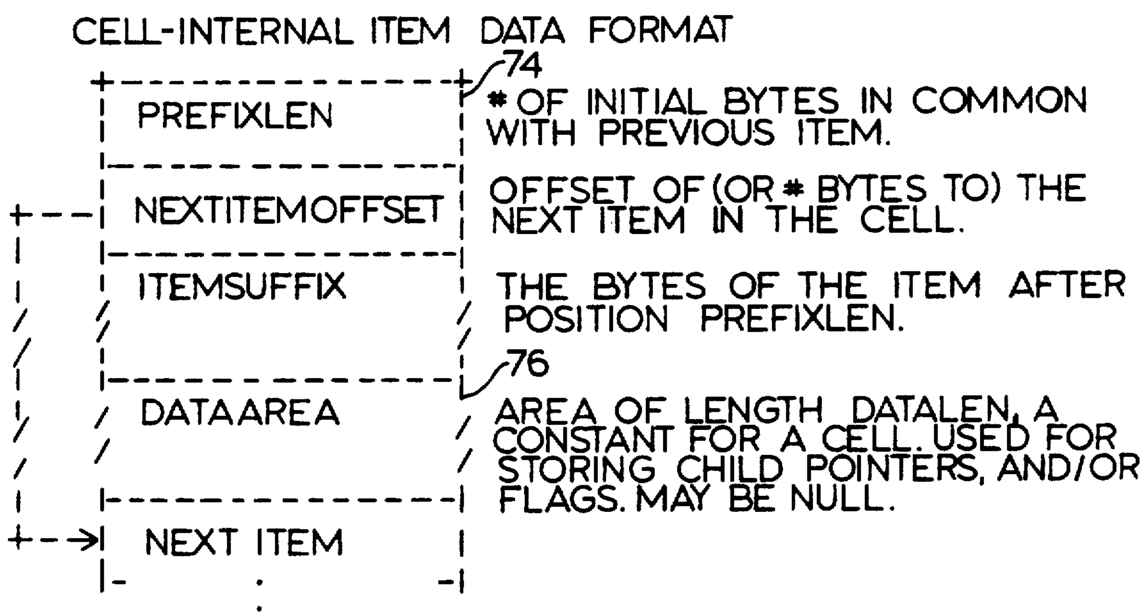
FIG. 7 is a block diagram of another cell data format used in a database engine in accordance with the invention.

The Items in a Cell are stored as shown in FIG. 7. Each stored Item except the first in a cell is "prefix compressed". This means that the initial bytes that it has in common with its immediate predecessor are not stored. The number of bytes so omitted is indicated by the PrefixLen value at the beginning 74 of every Item.

Figure 8:
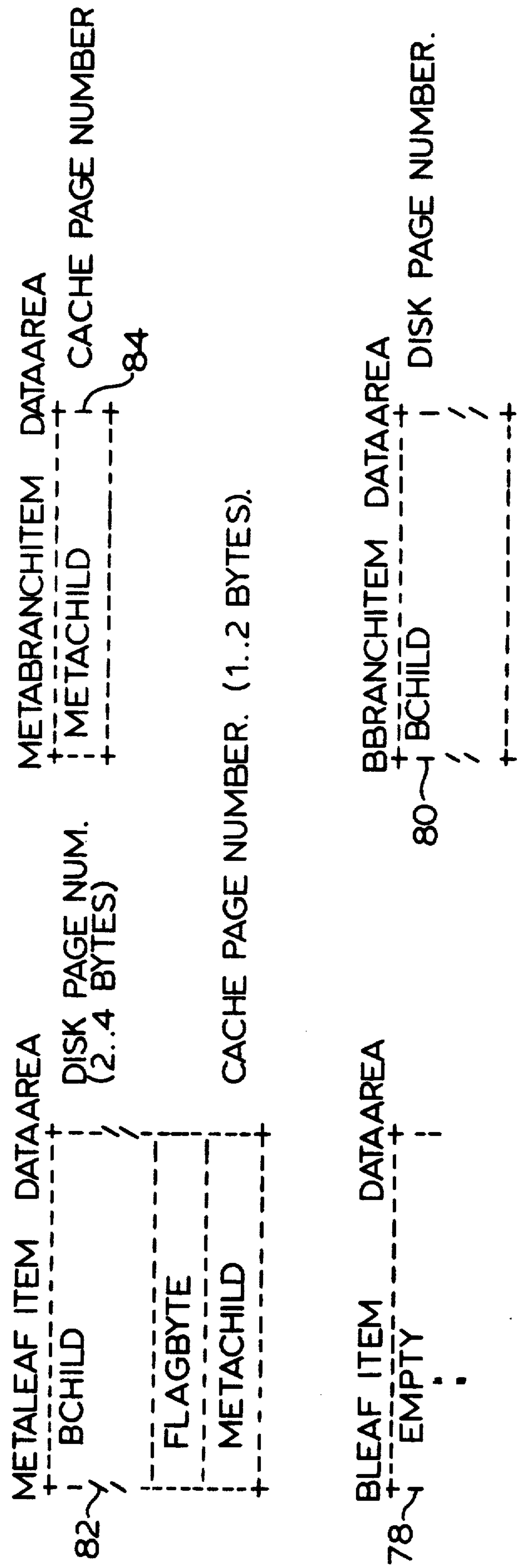
FIG. 8 is a block diagram useful for a further understanding of the access method shown in FIG. 5.

The beginning of the DataArea 76 of an Item is located by skipping over the Item and indexing backwards by DataLen, which is a cell-constant value. The use of the DataArea 76 depends on the type of the cell, as shown in FIG. 8. BTree leaf cells 78 have DataLen=0, so there is no DataArea. BTree index cells 80 have only a disk page number in the DataAreas. MetaTree leaf cells 82 contain space in the DataArea for: a disk page number, which points at the BTree cell on disk; a flag byte; and a cache page number, which points at the BTree cell in the cache. MetaTree index cell 84 DataAreas contain only a cache page number, which is the MetaChild pointer. The cache page number pointers in MetaTree cells 84 always occur last, so they may always be found by indexing backwards by PageNumLen from the end of the DataArea.

Working with Prefix Compressed Items

Searching a Cell for an Item in a cursor is very efficient, given the following algorithm:

Search a Cell for an Item in a Cursor (1) Set a pointer to the first Item, which is never compressed; Set a pointer to the cursor, which moves forward during matching; and place a zero after the last Item in the next PrefixLen position to serve as a sentinel.

(2) Compare the initial Item and the cursor, setting MatchLen=number of matching bytes, but not more than cursor length or InitialItem length, and moving the cursor pointer over the matched bytes. (Remember, the initial byte of an internal cursor is not the cursor length, but is considered part of the value.) If the two are identical, stop. If the InitialItem is larger than the cursor, we are searching in the wrong cell.

(3) Move to the next Item in the Cell.

(4) SkipLongerPrefixes. This means skip over every item whose PrefixLen>MatchLen. If after last Item, stop.

(5) Compare the ItemSuffix and the part of the cursor under the cursor pointer, moving cursor pointer forwards one byte and incrementing MatchLen for every matching byte, but not farther than the end of the Cursor or the end of the ItemSuffix. If an exact match, stop. If the end of the ItemSuffix is found before a value difference, goto (3). If the end of the cursor is found before a value difference, stop. If the differing byte is greater in the Item, stop. Otherwise, goto (3).

An additional speed improvement is gained by recognizing that every ItemSuffix is at least one byte long except for the null Item, which is handled as a special case. An intermediate loop can be placed surrounding SkipLongerPrefixes but within the main Search loop:

(4a) If the byte under the cursor pointer is greater than the first byte of the ItemSuffix, which must exist, then goto (3).

During this loop, the byte under the cursor pointer can be kept in a register.

The search algorithm is fast because most of the searching is done by SkipLongerPrefixes, which is extremely simple:

SkipLongerPrefixes (1) If the PrefixLen of the Item pointed at is less than or equal to MatchLen, stop.

(2) Increment the Item pointer.

(3) Add the offset pointed at by the ItemPointer to the ItemPointer.

(4) goto (1).

Reconstructing a complete Item in a cursor given a pointer to a compressed Item in a cell requires scanning the cell from the beginning. A simple algorithm simply copies each ItemSuffix over the cursor; after the desired Item's ItemSuffix has been copied, the Item has been reconstructed. A faster algorithm, which can incrementally reconstruct an Item in a cursor when the cursor is known to already contain the complete value of a preceding Item in the cell, ScanFromItem, is as follows:

ConstructPrefix (assume 256 byte cells, hence one byte offsets)

(1) First Pass. Scan the Items in the Cell from ScanFromItem to DesiredItem to find MinItem, which is the one with the smallest PrefixLen, MinPrefixLen. After the scan, zero the cursor from MinPrefixLen to DesiredItemPrefixLen.

(2) Second Pass. Scan the Items in the Cell from MinItem to DesiredItem, and while skipping Items whose PrefixLen>DesiredItemPrefixLen, write each scanned Item's offset within the cell into the cursor at position PrefixLen.

(3) Third Pass. Set a pointer SourcePtr to MinItemSuffix. Scan the bytes in the cursor from MinPrefixLen to DesiredItemPrefixLen. With each scanned byte ScanByte, if ScanByte is nonzero, then it is an index of an Item in the cell, so set SourcePtr to point at the ItemSuffix of the indexed Item. Before scanning the next cursor byte, copy one byte from under SourcePtr to the scan position in the cursor, thus changing ScanByte to the correct Item value.

In case the cursor is known to contain the complete value of an Item less than DesiredItem but not less than the predecessor of DesiredItem, ConstructPrefix is not needed because DesiredItemSuffix may simply be copied over the cursor at position PrefixLen. This is the case after a Search, as described above.

The Flag Byte

The FlagByte, which occurs in the DataArea of each MetaLeafItem preceding the MetaChild page number, contains the following bits:

| | | | |
|---|---|---|---|
| PairBit | EQU | 10000000B | ;Item is left part of Pair. |
| InRAMBit | EQU | 01000000B | ;In RAM. PageNum valid. |
| DirtyBit | EQU | 00100000B | ;Cell is modified and InRAM. |
| IOBit | EQU | 00010000B | ;I/0 is in progress to/from disk. |
| AllocBit | EQU | 00001000B | ;CellNum is valid. |
| MoveBit | EQU | 00000100B | ;Move Cell. (Range change etc) |
| RawCellBit | EQU | 00000010B | ;Cell has RawData, not Items. |

The PairBit indicates that the MetaItem and its successor define an ItemPair for some cell. An ItemPair serves as a kind of cache of the information represented on disk in the cell's BTree ParentItem (the "BParentItem)and its successor. The ItemPair defines a range of Items over which the cell applies, in the same way as the BParentItem and its successor, except that the ItemPair can exist in memory without the BParentCell. The CellNumber from the BParentItem is stored in the DataArea of the ItemPair as well.

The InRAMBit is on if the ItemPair's cell is in the cache. The of the cache page number is valid only if the InRAMBit is on.

The DirtyBit is on if an InRAM cell has been modified in any way, in which case it needs to be written to disk. The DirtyBit can only be on for an InRAM cell.

If the IOBit is on, then if DirtyBit is on then the cell is writing or soon to be written, or else the DirtyBit is off, and cell is reading or soon to be read. In some situations a false "cell reading" state is created artificially by setting IOBit=1 and DirtyBit=0. This prevents a cell which is being worked on in some special way from being modified or examined by other client processes. When the cell is complete, IOBit is reset and DirtyBit is set. In other cases, false "cell writing" state is created artificially by setting IOBit=1 and DirtyBit=1 to prevent a cell from being modified but to allow it to be examined. Normally, the IOBit is turned off by disk I/0 completion, but if no I/0 has been initiated, the IOBit will stay on indefinitely.

The AllocBit indicates that the cell currently owns an allocated page on disk, whether or not the cell has been stored in that page on disk.

The MoveBit indicates that the cell needs to be moved to a new location on disk before being written, even if it is already allocated a disk page. The MoveBit is set whenever the cell's Item range changes as a result of being merged with adjacent cells or being split into two cells. It is also set for any BBranch cell which changes for any reason.

The RawCellBit is an optional feature which allows leaf pages to be used for other purposes than storing Items. It will not be further discussed.

The Legal states for the PairBit, InRAMBit, DirtyBit, and IOBits are shown below:

| PairBit | InRAMBit | DirtyBit | IOBit |
|---|---|---|---|
| 0 | 0 | 0 | 0 |
| 0 | 0 | 1 | Illegal |
| 0 | 1 | 0 | Illegal |
| 0 | 1 | 1 | Illegal |
| 1 | 0 | 0 | 0 |
| 1 | 0 | 1 | Illegal |
| 1 | 1 | 0 | 0=>Preemptable 1=>Reading |
| 1 | 1 | 1 | 0=>AwaitingIndexUpdate; 1=>Writing or about to. |

Searching and Updating the BTree

The six essential client program interface functions are:

| | |
|---|---|
| First(cursor) | move cursor forwards to nearest stored Item ≧ cursor. |
| Next(cursor) | move cursor forwards to nearest stored Item > cursor. |
| Last(cursor) | move cursor forwards to nearest stored Item ≦ cursor. |
| Previous(cursor) | move cursor forwards to nearest stored Item < cursor. |
| Insert(cursor) | store the cursor's Item. |
| Delete(cursor) | remove the cursor's Item from storage. |

These functions all use an internal function called BFind, which returns a pointer to the nearest Item greater than or equal to the cursor, reading cells from disk into the cache if necessary. BFind starts at the leaf level, and uses the BMetaTree to search for the BLeaf cell containing the given cursor. If the BLeaf cell is cached, it will be found directly. If not, then the next BTree level upwards is searched via the BMetaTree. This process repeats, moving upwards until some level is found where a cached cell contains the cursor. The process always terminates at the root, since the root is always kept present in the cache. Then the process moves downwards, one level at a time, making a child ItemPair from the nearest-greater-than-or-equal BItem (the NGEBItem) and its predecessor, reading the child cell from disk, and searching the child cell to find the child NGEBItem.

The Index Update Process

A background process called "Index Update" or "IU" cycles through the cache, initiating the asynchronous writing of modified or "dirty" cells to disk, and indexing each such written cell at the next higher level. The process begins with the cached leaf cell with the lowest Item and proceeds through leaf cells with ascending Items, then through levels by ascending level until the root is reached. This ordering is available directly from the MetaTree, as described above. After the root is processed, Index Update waits for all pending writes to complete, and then writes out a special cell called the "ground cell" which is always at a known location on the disk and which points to the newly written and possibly moved root cell. The ground cell has a constant nominal level of 64, whereas the level of the root cell varies depending on the amount of data being stored.

Structural Integrity Preservation

The writing of the ground cell commits the Index Update cycle; before the writing of the ground cell a catastrophe such as power failure will leave an intact BTree structure. The purpose of the commit cycle is not, however, to provide a guarantee of consistency at a higher level, i.e., semantic consistency according to the client programs. Rather, the commit cycle is a reliability feature insofar as catastrophes will not leave unpredictably confused structures on disk that will later cause either the retrieval of erroneous data or system failure.

In order to guarantee semantic consistency, the client program must maintain a transaction log of its own. Such a log would record, among other things, Index Update commits and client transaction updates (Inserts and Deletes) in the order of occurrence. In the event of a catastrophe, the log is read starting two Index Updates back, and the updates are repeated. This works because any update is guaranteed to take permanent effect no later than the second subsequent Index Update cycle. An update may take permanent effect immediately, however.

The Index Update process is the only source of calls on the disk space allocator and on the cell write function. Index Update never overwrites an existing Branch cell or any BLeaf cell whose Item range has changed. Each modified Branch cell goes in a new location on disk, and since each motion of a cell requires a modification of its parent cell, the effect is that each modification of any leaf cell requires moving the entire path of cells from the leaf to the root. The performance penalty of this additional modification is insignificant for several reasons: (1) the writes occur in a "background" process at low priority; (2) the higher-level cells on the path to the root are shared with many other writing paths due to update locality; (3) the lower- level cells on the path to the root which are not shared are usually stored nearby to the leaf cell and incur no additional seeks; (4) the writes tend to be in ascending order on the disk, so head motion optimization is effective; (5) many BLeaf cell updates can be performed in place before a split or merge changes the cell's Item range, which then incurs the more expensive index updating.

Concurrency

During the Index Update process, the BTree structure is changing while client calls are calling BFind, which relies on the BTree structure. This would lead to confusion were it not for the fact that BFind begins at the bottom of the BTree and searches upwards, instead of downwards as is conventional. The upwards search is only possible due to the ability of the MetaTree or some similar in-memory structure to locate a BCell at a given BLevel by Item without using any of the BTree structure.

In order to keep BFind working only with up-to-date BCells, i.e. those BCells that have been processed by the current Index Update cycle, Index Update always completes the modification of the BParent of a given cell before allowing the given cell to be written and then removed from the cache. Only when the given cell is removed from the cache will its BParent become "visible" to BFind over the Item range of the given cell. The Index Update cycle finds each Dirty BCell, sets its BParent cell's DirtyBit to lock it into the cache, then modifies the BParent so that it correctly indexes the BChild cell, and finally, initiates writing of the BChild cell, which will eventually reset the BChild's DirtyBit. Once the DirtyBit is off, the cell becomes pre-emptable and may be removed from the cache if space is needed.

In order to avoid the special problem of a client-process-caused Insertion splitting a BLeaf cell after it is indexed in its BParent but before it is actually written, IU sets the IOBit of the BLeafCell. A writing cell cannot be modified in any way until the I/0 completes, or the results will be unpredictable. Whenever a cell is to be modified by any client process, the process first waits for the IOBit to go off if it is on, and then sets the DirtyBit. When IU actually starts the write, StartWriteCell leaves the IOBit on, then reset its on completion.

Disk Space Allocation

The management of disk space is performed by a dual bit map. Each bit map, called a CellMap, is an array of bits, with one bit corresponding to each disk page that may potentially be used for storing a BTree cell. The two maps, called "OldCellMap" and "NewCellMap" are necessary in order to prevent the immediate re-use of a deallocated cell within the same Index Update cycle. When a cell is allocated, the OldCellMap is searched for a zero bit, and then the corresponding bit is turned on in both maps. For deallocation, the proper bit in NewCellMap is turned off, and OldCellMap is left unchanged. On commit, NewCellMap is copied over OldCellMap.

The extra bit map is also helpful in performing reconstruction of the cell maps on initialization as follows. Multiple passes over the disk each read in all cells of a certain level. Both maps start out zeroed, the ground cell is read, and its bits are set to 10 (this means OldCellMap[groundcell] = 10, NewCellMap[groundcell] = 0). On each pass, the cells read in a previous pass have state 10; those to be read in the current pass have state 11; and those to be read in the next pass have state 01. As each 11 cell is read, its bits are set to 10, and the cells it points to are set 01. After each pass, we logically OR the NewCellMap onto the OldCellMap.

The above bitmap construction algorithm allows the level number stored in each cell to be compared with a level counter that decrements with each pass, starting at the root level. A faster disk scan can be had by allowing the reading of the levels to mix; one simply sets each pointed-at cell's bits directly to 11 instead of 01. No ORing of the maps is necessary. This speedup is similar to the Warnok algorithm for computing the transitive closure of a binary relation; the binary relation in this case is the parent/child relation of cells in the BTree.

Other Necessary Structures

The parent-pointer table or "ParentTab" is an array of cache page numbers, each entry corresponding to a cache page. For each BTree cell in the cache, the corresponding entry in the ParentTab points at the MetaTree leaf-level Item which indexes it: the BTree cell's "ParentItem". For each MetaTree cell in the cache, the corresponding entry in the ParentTab points at the MetaTree index-level Item which indexes it: the MetaTree cell's ParentItem. The ParentTab constitutes an inversion of all of the cache-page pointers in MetaTree cells. No similar inversion exists for the disk-page pointers in the BTree.

The ParentTab allows, among other things, for a very fast structural update of the MetaTree, since the Insert algorithm need not keep the MetaTree search path on a recursion stack. Instead, the search is iterative, ending at the MetaLeaf level, and splits or merges propagate upwards iteratively via the ParentTab as far as needed.

The segment table or "SegTab" is actually two tables, the ForwardSegTab and the BackwardSegTab. Each table associates with each page in the cache a forwards and a backwards link to two other pages in the cache. These links are used to form bidirectionally linked rings of pages called Segments. There is a single Segment called FreeSeg, which contains all of the free pages in the cache. The PreemptSeg contains all of the BTree cells which are possible to erase from the cache in order to make space for new cells to be read from disk. The PreemptSeg also maintains the priority order of the pre-emptable cells so that only the least recently used cells are pre-empted.

Pre-emption of Cached Cells

Whenever space is needed in the cache, a page from the bottom of the PreemptSeg is removed. The PreemptSeg also contains some Dirty cells since Dirty cells are not removed from the PreemptSeg at the moment they become Dirty. Any such Dirty pages at the bottom of the PreemptSeg are are simply removed as encountered during preemption, and are left floating, in no segment at all. When DirtyPages are written, they move to the IOSeg, which is used by the head-motion-optimizing I/0 module to order the multiple requests by cylinder. When the IO is complete, the page is restored to the PreemptSeg, at the most-recently used position. An I/0 is thus considered a "Use" of a page. Other uses of a Page, such as Inserting or Deleting an Item in it, can be signalled as appropriate via the UsePage function, which moves the page to the most-recently-used position of the PreemptSeg.

The removal a a preemptable page from the cache causes an ItemPair to become obsolete. One or both of the Items in the pair may be possible to delete in order to reclaim space, depending on whether each is participating in an adjacent ItemPair. Rather than removing obsolete or "ZombieItems" on creation during preemption, they can be deleted by the Index Update cycle later. The PageNum part of the DataArea of the ItemPair is set to zero and the entire FlagByte is zeroed as well. Index Update looks for two Items having zero PairBits in a row, and deletes the second Item, returning to the first Item to continue the scan (It is the left Item in a pair which contains the relevant FlagByte.)

During the deletion of the "ZombieItem", the MetaTree may change structurally. This means that the Item before the ZombieItem may move during the deletion. In order to keep track of it, the ScanItem's PageNum is set to point at a special page called the "ZombiePage", which is usually page 1. The changes to the MetaTree also maintain the ParentTab, so it can be used to find the ParentItem of the ZombiePage, which is the Item before the deleted ZombieItem again.

Locking

Processes must not be allowed to switch in the middle of such operations as MetaTree searches and updates. A single, global lock is used to synchronize all processes, including the Index Update process, for this purpose. The entrance to each client interface call requests and waits for the lock, and the exit releases it. The ReadCell function: releases the lock, allowing another client process to enter via a client interface call; initiates the read; suspends the process until the read completes; and requests the lock again. The writing of cells is asynchronous, and the StartWriteCell function does not affect the lock. The Index Update process releases the lock during the wait for outstanding writes to complete.

Avoiding Preemptable-Page Resource Deadlock

The IU cycle "consumes" a preemptable cache page each time it sets the DirtyBit of a cached ParentCell prior to modifying it. The IU cycle creates a preemptable cache page each time it initiates the writing of a ChildCell it has finished processing. Since there are never two Parents for a given cell, the IU process conserves preemptable pages in the worst-case. In most situations, it is a net producer of preemptable pages.

If a considerable amount of contiguous deleting has occurred between IU cycles, IU will have to merge together a group of empty or nearly empty BLeaf cells, and the indexing of the resultant merged cell will in turn cause deletions at the Parent level. The deletions may span a ParentCell, so it is possible that the indexing operation will produce two dirty ParentCells for a single merged Leaf cell. There is still a net conservation of preemptable cells in the worst case, however, since at least one Leaf cell was merged and its page freed. Free pages count as preemptable pages.

If there was Insertion between IU cycles, a BLeaf may have split, and the indexing of the right cell of the split will require an insertion at the BParent level, which may in turn cause a split. Thus two BLeaf cells are consumed, and up to two BParent cells are produced.

In spite of the fact that the IU process is a net conserver of preemptable pages, it is necessary to continuously maintain a preemptable page counter and compare it to a threshold value, below which client Insert and Delete operations are temporarily prevented. Without the counter, the cache may suddenly fill with dirty pages, leaving no work space at all for IU. When the threshold is crossed, the IU process is awakened, and a new cycle is started, if one was not already in progress.

Cell Packing

The IU process merges or balances every cell, "LowCell," it finds in the cache which is less than half full with the cell to its right, "NextCell," so long as both cells have the same BParent. Before merging or balancing, the NextCellmay need to be read into the cache.

EvenBalancing moves data from NextCell into LowCell so that both are more than half full. LeftBalancing moves as much data as possible into LowCell, leaving NextCell with the remainder. Left-balancing can be applied selectively instead of Even-balancing in order to achieve storage efficiencies better than 50% minimum/75% average, which is the result otherwise. However, each LeftBalancing may leave NextCell less than half full, thus requiring another merge or balancing. There is thus a tradeoff between increased storage efficiency due to LeftBalancing and increased delay due to additional cell reads. Average storage efficiency may be improved while leaving minimum unchanged by preventing extra reads merely for the purpose of LeftBalancing.

The Example System

The assembly language source code for an example system is provided as Appendices 1-8 to this application. Some features in this system are not explained above because they are non-critical and only partially implemented in the example system. They are discussed below.

"Shadowing" is an optional feature for preventing client process delays on cell writes. When a cell is to be modified by a client process update, the system may simply delay until the IOBit is 0, then set the DirtyBit and proceed with the modification. Instead, shadowing: (1) makes a copy of the cell being written, which can be done because the writing cell is legal to examine, if not to modify; (2) removes the writing cell from the BMetaTree; (3) installs the copy cell into the BMetaTree in place of the writing cell; and (4) creates a temporary "ShadowItem" in the MetaTree to serve as the MetaParentItem of the writing cell only until it completes writing. The ShadowItem is made unique by adding 64 to its most significant byte, which places it above the BRootMetaParentItem, which is at nominal BLevel 64. ShadowItems are deleted by IU.

Volume name prefixing is an optional feature which inserts a fixed-length string of bytes called the "VolName" after the BLevel byte and before the rest of the bytes of each MetaItem in the MetaTree. The length of a VolName is VolNamePrefixLen, which is a boot-time constant. The purpose of the VolName is to make it possible to simultaneously manage multiple BTrees, such as when multiple disk drives are used. VolNames are not part of any BCell or BItem, so a given BTree is not dependent on its VolName. Thus the VolName of a particular BTree may be bound at the time the BTree is opened for use. The addition VolNamePrefix does not add complications by creating a distinction between BItems and MetaItems, since BItems are already one byte shorter than MetaItems (the BLevel byte).

TightPacking is an optional flag which turns on Left-Balancing during cell packing in IU.

Additional space is provided in the ExpansionArea of the BGroundCell for information describing the characteristics of the disk, including: TracksPerCylinder; SectorsPerTrack; BytesPerSector; the Helix rate (offset of sector zero for between tracks); CylOne, the first available cylinder; MaxCellNum, the largest legal cell number; and CellNumLen.

An optional feature called PagedCellMaps allows for BTrees so large that their CellMaps do not fit in memory. PagedCellMaps are read dynamically into the cache as needed, and a CellMapValidity flag in the GroundCell's ExpansionArea is committed at the same time as the rest of the BTree. The copy of the validity flag on disk is turned off before updates to the maps begin, so that a catastrophe before commit will leave the CellMaps flagged as invalid and they will be recreated when the BTree is next opened. The pages of a PagedCellMap require their own MetaParentItems; the logical space for these MetaItems is already reserved—any MetaItem with initial byte>=128 can be used.

Modules

Each module in the system occupies its own separate file. The modules are written in 8080 assembly language and routinely transliterated into 8086 assembly language, but the principles of the system are applicable to system programming languages such as C.

| Module name(s) | Purpose |
|---|---|
| SYS-PC,IO | Contains all operating system and device dependencies. |
| TESTER | Above the Engine level: provides Item Editor, testing. |
| PAGE | Manages cache pages. Manages sets of pages called 'segments' which are bidirectional rings of pages. There are segments for: MetaTree pages, free pages, pre-emptable pages, dirty pages, and bad pages. Cell order within the preemptable segment is used by the least-recently-used page replacement algorithm. |
| KERNEL | Multi-tasking switcher, semaphores. |
| CELL | Functions that work with single MetaTree or BTree cells, without knowledge of their being connected into trees. |
| MTREE | MetaTree searching, inserting, deleting, and so on. |
| ALLOC | Manages disk pages for use in storing BTree cells: allocate, deallocate, re-create allocation maps. |
| BTREE | Btree searching, inserting, deleting, and so on. |
| IU | Index Update: the process which cycles through the cache, writing dirty pages to disk and indexing them at successively higher levels until the root is reached, at which time the disk structure is committed. |
| VALIDITY | Functions which can test data structures for characteristics which they are expected to exhibit during the operation of the system. A non-essential reliability feature and debugging aid. |

-continued

| Module name(s) | Purpose |
|---|---|
| UTILS | General purpose functions: move, scan, multiply, bitmap search. |
| DATA | Global variables and tables. |

The Infinity Database Engine is a high-speed, high-reliability software component available to systems builders. It provides keyed data storage and retrieval on disk or disk file. Accesses and updates are performed by a proprietary algorithm which: preserves integrity through catastrophes such as power failure; efficiently uses a large RAM cache; and allows a high degree of concurrency.

This product is written in optimize 8086 assembly language for maximum performance. Infinity makes a minimum of assumptions about the operating system and hardware configuration, so its basic design is portable. It is even suitable for "casting in hardware" and was written with an eventual back-end processor in mind. The product is written in 8086 assembly language. It provides keyed data storage and retrieval on disk or disk file. Its accesses and updats are performed by a proprietary algorithm which ensures a degree of integrity through power failure. The product requires 64K of resident memory space in an 8086 PC. This space is utilized for code space, bit map, and cache.

PERFORMANCE FEATURES

Very high speed: 500 non-faulting searches per second., 250 non-faulting updates per second on IBM PC; nominal single-seek for cache faults with large cache;

Full concurrency: no significant limit to the number of concurrent readers and updaters; no artificial delays due to internal locking;

Large caches: up to 32K (64K and 1MB versions are planned) with no cache-size dependent degradation in speed of non-faulting operations (most caching systems are a tradeoff);

Hysteresis-like effects: no split/merge thrashing (A run of deletions will not waste time merging or balancing soon-to-be emptied Cells for example);

Smoothed, localized disk allocation: the allocation strategy knows about cylinders and seeking;

Head motion optimization and asynchronous I/0: can be integrated with supplied device drivers for systems with DMA and interrupt-on-completion or other asynchronous I/0 interface;

Low inter-process interference: The cache faults of one process do not slow down a non-faulting process (with asynchronous I/0);

STORAGE FEATURES

No limit to database size except for media limitations: The length of block numbers is bound at boot-time and can be up to 20 bytes Variable length keys: each key can be 0 to 100 bytes long, and is stored without wasted space. (Longer keys can easily be split up by the client software into components less than 100 bytes long);

Prefix and suffix compression: Duplicate key prefixes are stored only once per cell to save space and speed searches. Suffix compression shortens index cell keys.

Tunable compaction: The usual 50% minimum and 75% average storage efficiencies can be incrementally improved at the expense of speed.

RELIABILITY FEATURES

Integrity preservation protocol: a power failure or other catastrophe will leave a valid structure on disk; only uncommitted data in RAM is lost.
Complete structure validation: mount-time validation of entire on-disk structure, instant on-demand validation of all in-RAM structures including all cached data.
Extensive internal consistency checking.

PROGRAM INTERFACE

Infinity passes Keys in and out in a "Cursor", which is a 100 byte string preceded by one byte containing the current length. The complete value contained in a Cursor is called an "Item"; the database stores nothing more than a sequence of Items ordered as binary fractions, MSB at front. No other interpretation of the contents of an Item is made. Instead, the client software determines how the components of the Item are delimited and encoded to achieve a desired ordering. Using a uniform internal data format, removes the data conversion and magnitude comparison functions from the data storage function normally the worst DBMS bottleneck.

Basic function calls provided include:

| | |
|---|---|
| Insert | Add given Item to database |
| Delete | Remove given Item from database; |
| First | Find nearest Item ≧ given Item; |
| Next | Find nearest Item > given Item; |
| Last | Find nearest Item ≦ given Item; |
| Previous | Find nearest Item < given Item; |
| Create | Make a new, empty database |
| Open | Begin using a given file or disk as a database |
| Close | Finish using the current database; |
| Update | Write all in-cache modifications to disk; |

THE ENTITY-ATTRIBUTE MODEL

The lack of a separate "data field" in Infinity is no oversight. The intention is that an Item should contain both key and data concatenated. A recommended method is concatenating key and data with a special value—the "AttributeName" —separating them. The AttributeName is a data type determined by the client hence it can be quite long or extensible, and there is no essential limit on the number of AttributeNames that can be used. An AttributeName identifies the data following it—like a field in a record. The AttributeName and the data following it within an Item constitute a complete "Attribute". The data before the Attribute in the Item is an "EntityName" that the attribute is "attached to."

This "Entity-Attribute" organization can completely replace the conventional fixed-length record, and to great advantage. Attributes can be attached or detached independently, without the need to read or lock an entire record; new Attribute-Names may be created without limit and without a batch reorganization; "null valued" or absent Attributes require no storage at all; and, perhaps most importantly, the number of values per Attribute per Entity is unlimited. This last fact extends the Entity-Attribute data model beyond the direct representational capability of the Relational model and eliminates the need for the complex procedure called Relational "Normalization."

Infinity Database Engine supports only one database at a time in the embodiment described. This limitation, like the lack of a data field, is intentional. The client software again takes the responsibility of defining an additional component of each Item called a ClassName, which in this case is prefixed rather than infixed and which identifies a logically distinct database, corresponding to a file in the fixed-length record system.

There is no inherent limit on the maximum number of ClassNames. ClassNames are not always necessary, but tend to help in visualizing the Entity-Attribute model as an extension of the Relational model.

VERSION 1.0 UNDER MSDOS

Version 1.0 of the Infinity Database Engine consists of 30KB of object code running under MSDOS and PCDOS with up to 64KB total space useable (the ".COM" model is used). Version 1.0 can only access a single database (one database occupying one file or one disk) at a time. Multiple databases per instance support could be provided.

It should now be readily apparent to those skilled in the art that a novel database user interface, database management system and database engine capable of achieving the stated objects of the invention has been provided. It should further be apparent to those skilled in the art that various changes in form and detail of the invention as shown and described may be made. It is intended that such changes be included within the spirit and scope of the claims appended hereto.

```
;**********************************************************
;*                                                        *
;*              Infinity B-Tree Tester                    *
;*                                                        *
;*      Insert typed-in strings into the B- or MetaTree,*
;*  delete them, load a predefined batch of words,        *
;*  load or delete from a file, or dump the current       *
;*  MetaTree onto the screen.  PC/MSDOS dependent!!!      *
;*                                                        *
;* Copyright (C) 1982,1983,1984,1985,1986 Roger L.        *
;* Deran. All rights reserved.                            *
;*                                                        *
;**********************************************************
;
;<86>   INCLUDE C:INF-H.ASM
;<86>   INCLUDE C:DATA-H.ASM
;<86>   EXTRN   Trap:NEAR, Move:NEAR, MoveRight:NEAR, Compare:NEAR
;<86>   EXTRN   ConsPutMsg:NEAR, ConsPutC:NEAR, ConsGetLine:NEAR
;<86>   EXTRN   FindMemTop:NEAR, FileOpen:NEAR, GetC:NEAR
;<86>   EXTRN   Insert:NEAR, Delete:NEAR, Find:NEAR, SuffixToCursor:NEAR
;<86>   EXTRN   SkipRightToItem:NEAR
;<86>   EXTRN   InitBTree:NEAR, BOpen:NEAR, BClose:NEAR, BCreate:NEAR
;<86>   EXTRN   BInsert:NEAR, BDelete:NEAR
;<86>   EXTRN   BFirst:NEAR, BNext:NEAR, BLast:NEAR, BPrevious:NEAR
;<86>   EXTRN   BIndexUpdate:NEAR, CheckInRAMStructures:NEAR
;<86>   EXTRN   Install:NEAR, Remove:NEAR
;;<86>  EXTRN   MailList:NEAR, MailPrint:NEAR
;<80>
        INCLUDE C:INF-H.I80
;<80>
        INCLUDE C:DATA-H.I80
;<80>
        EXTRN   Trap, Move, MoveRight, Compare
;<80>
        EXTRN   ConsPutMsg, ConsPutC, ConsGetLine
;<80>
        EXTRN   FindMemTop
;<80>
        EXTRN   FileOpen, GetC
;<80>
        EXTRN   Insert, Delete, Find, SuffixToCursor, SkipRightToItem
;<80>
        EXTRN   InitBTree, BOpen, BClose, BCreate
;<80>
        EXTRN   BInsert, BDelete, BFirst, BNext, BLast, BPrevious
;<80>
        EXTRN   BIndexUpdate, CheckInRAMStructures
;<80>
        EXTRN   Install, Remove
;;<80>  EXTRN   MailList, MailPrint
;
        PUBLIC  Start, Warm, TestVFlag
;
```

```
BEGIN      *    DB      'TESTER'        ;BEGIN is for 'needs' macro.
;
;
;       **** DATA ****
;
TestInsDelFlag  DS      1       ;!=0: Do deletions rather than Insertions.
TestBFlag       DB      OFFH    ;0=>MetaTree; OFFH=>BTree.
TestVFlag       DS      1
TestVector      DB      0       ;!=0: Vector# used to install Engine. (MSDOS)
TestResidentFlag DB     0       ;!=0: We have done our 'KEEP process' already.
;
;       **** PAGE ALIGNED TESTER DATA ****
;
TesterCursorSz  EQU     105     ;We can try too-long items.
;
                need    7
TestDataBuff    DB 0,0,0,0,0,0,0 ;Data to insert with items.
                need    TesterCursorSz+1
TestBuffLen     DS      1
TestBuffSz      EQU     TesterCursorSz
TestBuff        DS      TestBuffSz
        need    TesterCursorSz+1
TestCursorLen   DS      1
TestCursor      DS      TesterCursorSz
FileBlockSz     EQU     256     ;This breaks "SYS" file dependency.
        need    FileBlockSz
TestFileBlock   DS      FileBlockSz
;
TestSPSave      DS      2
;
HelloMsg        DB 'Infinity Database Engine Version 0.1.4 10/23/85',CR,0
CopyrightMsg    DB 'Copyright (C) 1985, Software Software,'
                DB ' all rights reserved.',CR,CR,0
CommandMsg      DB 'O)pen C)lose E)dit L)oad D)ump U)pdate Z)ap '
                DB 'V)alidate I)nstall Q)uit? ',0
EdMsg           DB 'Edit: ESC quits; Typewriter Keys, Arrows chg Cursor; '
                DB 'Ins/Del chg DB; ?',0
EdMsg2          DB 'Edit: Alt-I)nvert; Alt-C)hangeDisplayMode. ?',0
LoadMsg         DB 'Load L)oaderFile W)ordFile P)redefinedWords? ',0
InsDelMsg       DB 'I)nserting or D)eleting? ',0
LoaderFileNameMsg DB 'LoaderFileName? ',0
WordFileNameMsg DB 'WordFileName? ',0
ValidateMsg     DB 'Validate C)ellNames R)amStructures U)pdates N)oUpdates?
',0
;ZapMsg         DB 'Initialize and destroy database (Y or N)? ',0
NotImplMsg      DB 'Not Implemented .. Sorry.',CR,0
        ;
FailureMsg      DB CR,LF,'Error number ',0
;
WarmEntryFlag   DB      0       ;First Warm entry sets this flag.
;
Start   CALL    InitBTree
        JMP     Warm1
```

```
        ;
Warm    MVI     A,OFFH
        STA     WarmEntryFlag     ;So Exit will not re-install us.
        ;
Warm1   LXI     H,HelloMsg
        CALL    ConsPutMsg
        LXI     H,CopyrightMsg
        CALL    ConsPutMsg
        ;
        LXI     H,0               ;On 8086, we use client program's SS!
        DAD     SP
        SHLD    TestSPSave        ;For fatal err Stack rollback.
CmdLoop LHLD    TestSPSave
        SPHL
        ;
        CALL    TestCommandInterpreter
        JNC     CmdLoop
        ;
        ;       Report a failure.
        ;
        PUSH    PSW               ;A=Error code.
        LXI     H,FailureMsg
        CALL    ConsPutMsg
        POP     PSW
        CALL    ConsPutHex        ;Display A in Hex.
        MVI     A,CR
        CALL    ConsPutC
        JMP     CmdLoop
        ;
Exit    LHLD    TestSPSave
        SPHL
;<80>
        RET
        ;
        ;       If TestVector!=0, we are currently installed and must
        ;   remain resident; before we 'KEEP process', we set TestResidentFlag
        ;   If TestResidentFlag!=0, this must be an invocation from the
        ;   interface, and we just return.
        ;
        LDA     TestResidentFlag
        ORA     A
        RNZ                       ;Ret/ already resident. Don't 'KEEP' again!
        LDA     TestVector        ;Not Resident. Are we installed?
        ORA     A
        RZ                        ;Ret/ not installed.
        ;
        MVI     A,OFFH
        STA     TestResidentFlag
        LXI     H,StayingMsg
        CALL    ConsPutMsg
        CALL    FindMemTop        ;HL=MemTop.
;<86>   MOV     DX,BX
;<86>   MOV     CL,4
```

```
;<86>   SHR     DX,CL
;<86>   INC     DX                  ;DX=#Paragraphs to retain.
;<86>   MOV     AX,3100H            ;Terminate but stay resident (KEEP process.)
;<86>                               ;ProcessReturnCode = Success
;<86>   INT     21H                 ;DOS interrupt.
        RET                         ;"unnecessary return"
        ;
;<86>StayingMsg DB 'Terminated but staying resident for program
interface.',CR,LF,0
;
TestCommandInterpreter
        CALL    InitCommand         ;Flush the Command Buffer.
        LXI     H,CommandMsg
        CALL    CommandGetCFolded
        CMC
        RNC                         ;NullLine is not an error.
        CPI     'O'                 ;Open
        JZ      TestOpen            ;Open existing BTree.
        CPI     'C'                 ;Close
        JZ      TestClose
        CPI     'E'
        JZ      Edit
        CPI     'L'
        JZ      TestLoad
        CPI     'D'
        JZ      TestDump
        CPI     'U'                 ;Update
        JZ      BIndexUpdate
        CPI     'Z'
        JZ      TestBCreate         ;Zap: Create new, empty BTree.
        CPI     'V'
        JZ      TestValidate
        CPI     'I'
        JZ      TestInstall
        CPI     'Q'
        JZ      Exit
        CPI     ESC
        JZ      Exit
        RET
;
;       Open (Close) an existing BTree.  Assumes VolNamePrefixLen=1!!! Only
;  works for one file - the one given in the invocation line!!!
;
TestOpen
        LDA     VolNamePrefixLen
        CPI     1
        CNZ     Trap
        LXI     D,TestBuff
        XRA     A
        STAX    D
        MVI     B,1
        JMP     BOpen
;
```

```
TestClose
        LDA     VolNamePrefixLen
        CPI     1
        CNZ     Trap
        LXI     D,TestBuff
        XRA     A
        STAX    D
        MVI     B,1
        JMP     BClose
;
TestLoad CALL   TestL1
        LXI     H,LoadMsg
        CALL    CommandGetCFolded
        CMC
        RNC
        CPI     'L'
        JZ      NotImplemented
        CPI     'W'
        JZ      TestFile        ;Go load/unload from file.
        CPI     'P'
        JZ      TestPredef      ;Go load/unload predef. stuff.
        RET
;
TestL1  LXI     H,InsDelMsg
        CALL    CommandGetCFolded
        CMC
        RNC
        CPI     'I'
        JZ      TCID1
        CPI     'D'
        RNZ
        MVI     A,0FFH
        STA     TestInsDelFlag
        RET
TCID1   XRA     A
        STA     TestInsDelFlag
        RET
;
NotImplemented
        LXI     H,NotImplMsg
        JMP     ConsPutMsg
;
TestDump JMP    TestDumpBTree   ;Until we can dump a loader file.
;
;       (B)Insert or (B)Delete the DE,B-->Item.  We copy it
;  first into TestCursor where we can add the LenByte, which
;  is set to 0 for the Internal BTree calls we make.
;
TestInsDel
        PUSH    H
        PUSH    D
        PUSH    B
        PUSH    PSW
```

```
        LDA     TestVFlag
        ORA     A
        JZ      TID0            ;Jmp/ skip validity check.
        CALL    CheckInRAMStructures
TID0    POP     PSW
        POP     B
        POP     D
        POP     H
        ;
        XCHG
        LXI     D,TestCursor+1
        MOV     C,B
TID01   MOV     A,M             ;Do a Page-Bound Independent Move.
        STAX    D
        INX     H
        INX     D
        DCR     C
        JNZ     TID01           ;Pres B.
        ;
        LXI     D,TestCursor
        XRA     A
        STAX    D
        INR     B
        LXI     H,TestDataBuff
        SHLD    DataPtr         ;For Insert.
        ;
        LDA     TestInsDelFlag
        ORA     A
        JNZ     TID1
        LDA     TestBFlag
        ORA     A
        JZ      Insert
        JMP     BInsert
        ;
TID1    LDA     TestBFlag
        ORA     A
        JZ      Delete
        JMP     BDelete
;
;       Create a BTree.  Assumes VolNamePrefixLen=1!!!
;
TestBCreate
        LDA     VolNamePrefixLen
        CPI     1
        CNZ     Trap            ;Trap VNPL!=1.
        LXI     D,TestBuff
        XRA     A
        STAX    D
        MVI     B,1
        JMP     BCreate
;
TestValidate
        LXI     H,ValidateMsg
```

```
        CALL    CommandGetCFolded
        CMC
        RNC
        CPI     'C'             ;C)ellNames
        JZ      TestDumpMeta
        CPI     'R'             ;R)amStructures
        JZ      CheckInRAMStructures
        CPI     'N'             ;N)oUpdates
        JZ      TV1
        CPI     'U'             ;U)pdates
        RNZ
        MVI     A,0FFH
        STA     TestVFlag
        RET
TV1     XRA     A
        STA     TestVFlag
        RET
;
        DB      'TESTINSTALL'
TestInstall
;<80>
        RET
        CALL    Install
;<86>   CMP     AX,0
;<86>   JL      TI1
        STA     TestVector      ;Vector number used to install Engine.
        PUSH    PSW
        LXI     H,TIMsg1
        CALL    ConsPutMsg
        POP     PSW
        CALL    ConsPutHex
        LXI     H,TIMsg2
        JMP     ConsPutMsg
        ;
TI1     LXI     H,TIErrMsg
        JMP     ConsPutMsg
        ;
TIMsg1  DB      'Engine Interface Installed on interrupt ',0
TIMsg2  DB      'H.',CR,LF,0
TIErrMsg DB     'Unable to install Engine Interface.',CR,LF,0
;
;       Dump BTree to screen.
;
TestDumpBTree
        LXI     D,TestBuff
        XRA     A
        STAX    D
        MVI     B,1
        CALL    BFirst
        JC      TDBT1
        ;
TDBT0   PUSH    B
        LXI     H,TestBuff
```

```
        MOV     C,B
        CALL    TestDisplayCursor
        MVI     A,' '
        CALL    ConsPutC
        POP     B
        ;
        LXI     D,TestBuff
        CALL    BNext
        JNC     TDBT0
TDBT1   CPI     EndOfDBErr
        RZ
        STC
        RET
;
TestDumpMeta
        LXI     D,TestBuff
        XRA     A
        STAX    D
        MVI     B,1
        CALL    Find            ;No MetaFirst for now.
        RC
        ;
TD1     CALL    SkipRightToItem
        JC      TD2             ;Ret/ end of database.
        PUSH    H
        LXI     D,TestBuff
        CALL    SuffixToCursor  ;Move TestBuff forwards.
        LXI     H,TestBuff
        MOV     C,B
        CALL    TestDisplayCursor
        MVI     A,' '
        CALL    ConsPutC
        POP     H
        INR     L               ;HL-->SomeItem.
        MOV     L,M             ;Go to next item.
        JMP     TD1
        ;
TD2     MVI     A,CR
        CALL    ConsPutC
        MVI     A,LF
        CALL    ConsPutC
        XRA     A               ;NOT CARRY.
        RET
;
TestDisplayCursor
        INR     C
        DCR     C
        RZ
        LDA     VolNamePrefixLen
        ORA     A
        JZ      TDC1
        MOV     B,A
TDC0    MOV     A,M
```

```
        CALL    ConsPutHex
        INX     H
        DCR     C
        RZ
        DCR     B
        JNZ     TDC0
        ;
TDC1    MOV     A,M
        CALL    ConsPutCOrHex
        INX     H
        DCR     C
        JNZ     TDC1
        RET
;
ConsPutCOrHex
        CPI     07FH            ;Rubout and above.
        JNC     ConsPutBracketedHex
        CPI     ' '+1           ;SPACE+1 and above.
        JNC     ConsPutC
;
ConsPutBracketedHex
        PUSH    PSW
        MVI     A,'<'
        CALL    ConsPutC
        POP     PSW
        CALL    ConsPutHex
        MVI     A,'>'
        JMP     ConsPutC
;
;       Load or unload the tree quickly with items from the
;  predefined list.  The PredefList is a sequence of zero-terminated strings
;  terminated by a null string.  We don't worry about strings crossing Page
;  bounds because TestInsDel copies the string into TestCursor before use.
;
TestPredef
        LXI     D,PredefWords
TPD0    LDAX    D
        ORA     A               ;Is this the null string?
        RZ                      ;Ret/ null string.
        PUSH    D
        MVI     B,0
TPD00   INX     D
        INR     B
        LDAX    D               ;Loop over string to find length.
        ORA     A
        JNZ     TPD00
        POP     H
        PUSH    D               ;Save DE-->NextString.
        XCHG                    ;DE,B-->ThisString again.
        CALL    TestInsDel      ;Do (B)Insert or (B)Delete from TestCursor.
        POP     D
        RC
        INX     D               ;Skip the string terminator zero.
```

```
        JMP     TPD0
;
;       Load words from a file.
;
TestFile
        LXI     H,WordFileNameMsg
        CALL    CommandGetLine
        RC                      ;HL,C-->FileName.
        PUSH    H
        MVI     B,0
        DAD     B               ;HL-->AfterFileName.
        MVI     M,0             ;Terminate with 0.
        POP     H
        LXI     D,TestFileBlock
        CALL    FileOpen
        RC
        ;
        ;       Now load words and insert them.
        ;
TFL0    LXI     H,TestBuff
        MVI     C,0             ;Len=0
TFL1    PUSH    D
        LXI     D,TestFileBlock
        CALL    GetC
        POP     D
        CMC
        RNC                     ;Ret/ no more chars. NOT CARRY.
        CALL    Letter
        JC      TFL2            ;Jmp/ not a letter.
        CALL    ConsPutC        ;Print the letter.
        MOV     M,A             ;It is a letter.
        INX     H               ;Put it in buffer.
        INR     C
        MOV     A,C
        CPI     TestBuffSz
        JC      TFL1
        RET                     ;NOT CARRY.
        ;
        ;       Not a letter.
        ;
TFL2    MOV     A,C
        ORA     A
        JZ      TFL0            ;If null word so far, loop.
        MVI     A,' '
        CALL    ConsPutC
        ;
        MOV     B,C
        LXI     D,TestBuff      ;DE,B-->Word
        CALL    TestInsDel      ;Do (B)Insert or (B)Delete.
        JNC     TFL0            ;Jmp/ success: loop.
        RET                     ;Ret/ error. CARRY.
;
;       **** Full-Screen Item Editor ****
```

```
;
PageScrollDistance EQU  25-2
TabWidth           EQU  16       ;Must be power of two.
;
                   DB   'EDITDATA'
EdMsgPtr           DW   EdMsg
EdRowCounter       DS   1        ;Counts screen lines in EdDisplayItems.
EdDisplayMode      DB   0        ;0: Normal, !=0: CompressPrefixes.
EdCompressedComponents DB 0      ;# of UndisplayedComponents in EdDispCurCompr
;
EdCursorEditPos    DB   0        ;Position we are editing. <=EdCursorLen.
                   need TesterCursorSz+1
EdCursorLen        DS   1
EdCursor           DS   TesterCursorSz
;
UpArrow            EQU  81H      ;IBM 000,72
DownArrow          EQU  82H      ;       ,80
RightArrow         EQU  84H      ;       ,77
LeftArrow          EQU  83H      ;       ,75
CtlRightArrow      EQU  85H      ;       ,116    "Advance Word"
CtlLeftArrow       EQU  86H      ;       ,115    "Reverse Word"
InsKey             EQU  87H      ;       ,82
DelKey             EQU  88H      ;       ,83
PageUp             EQU  89H      ;       ,73
PageDown           EQU  8AH      ;       ,81
HomeKey            EQU  8BH      ;       ,71
EndKey             EQU  8CH      ;       ,79
CtlHomeKey         EQU  8DH      ;       ,119
CtlEndKey          EQU  8EH      ;       ,117
AltI               EQU  90H      ;       ,23
AltC               EQU  91H      ;       ,46
;
;       Edit Key dispatch table.
;
EdKeyTab           DB   '?'
                   DW   EdQuestionMark
                   DB   UpArrow
                   DW   EdUp
                   DB   DownArrow
                   DW   EdDown
                   DB   CR
                   DW   EdCR
                   DB   RightArrow
                   DW   EdRight
                   DB   LeftArrow
                   DW   EdLeft
                   DB   'H' AND 31       ;^H
                   DW   EdDelChar
                   DB   RUB              ;RUB moves left.
                   DW   EdDelChar
                   DB   CtlRightArrow
                   DW   EdCtlRight
                   DB   CtlLeftArrow     ;CTL-LeftArrow or
```

```
                DW      EdCtlLeft
                DB      'W' AND 31      ;^W delete word left.
                DW      EdDelWord
                DB      InsKey
                DW      EdIns
                DB      DelKey
                DW      EdDel
                DB      HomeKey
                DW      EdHome
                DB      CtlHomeKey
                DW      EdCtlHome
                DB      'X' AND 31      ;^X deletes all left of DisplayCurs.
                DW      EdDelToHome
                DB      'L' AND 31      ;^L deletes all right of DisplayCurs.
                DW      EdDelToEnd
                DB      EndKey
                DW      EdEnd
                DB      CtlEndKey
                DW      EdCtlEnd
                DB      'P' AND 31      ;^P is like PageUp
                DW      EdPageUp
                DB      PageUp
                DW      EdPageUp
                DB      'N' AND 31      ;^N is like PageDown
                DW      EdPageDown
                DB      PageDown
                DW      EdPageDown
                DB      AltI            ;Invert.
                DW      EdInvert
                DB      AltC            ;Compress.
                DW      EdChangeDisplayMode
EdKeyTabLastEntry DB    0       ;Sentinel.
                DW      EdLiteral       ;By default, enter character
literally.
;
                DB      'EDIT'

;
Edit
;<80>
        RET
        CALL    DisplayInit
        ;
        ;       Initialize EdCursor to the first Item in the DB.
        ;
        LXI     D,EdCursor
        XRA     A
        STAX    D
        LDA     VolNamePrefixLen ;This leaves VolName unchanged.
        MOV     B,A
        CALL    BFirst          ;Ignore errors!!!
        MOV     A,B
        STA     EdCursorLen
        STA     EdCursorEditPos
```

```
        ;
        ;       Set the Edit menu line to the normal message.  A '?' gets the
        ;  alternate message.
        ;
        LXI     H,EdMsg
        SHLD    EdMsgPtr
        ;
        ;       Put up the initial display.
        ;
        CALL    InitEdDisplay
        ;
        ;       Loop on keypresses.
        ;
        CALL    EdLoop
        ;
        JMP     TerminateEdDisplay
;
EdLoop  CALL    ConsGetC
        CPI     ESC
        RZ
        CPI     'C' AND 31
        RZ
        CALL    EdProcessKey
        JC      EdLoop          ;Jmp/ key did not affect display.
        CALL    ConsTestForC    ;If a key is pending, skip scrn update.
        JNC     EdLoop1         ;Jmp/ a key is pending.
        CALL    EdDisplay       ;Redisplay screen.
        JMP     EdLoop
        ;
        ;       In this loop, we owe a screen update, and we only loop while
        ;  there is a key in the input buffer.
        ;
EdLoop1 CALL    ConsGetC
        CPI     ESC
        RZ
        CPI     'C' AND 31
        RZ
        CALL    EdProcessKey    ;Ignore CY from ProcessKey.
        CALL    ConsTestForC
        JNC     EdLoop1         ;Jmp/ a key is pending.
        CALL    EdDisplay
        JMP     EdLoop
;
EdProcessKey
        STA     EdKeyTabLastEntry ;Place a sentinel.
        LXI     H,EdKeyTab-3
EdPK1   INX     H
        INX     H
        INX     H
        CMP     M
        JNZ     EdPK1
        INX     H
        MOV     A,M
```

```
        INX     H
        MOV     H,M
        MOV     L,A
        LDA     EdKeyTabLastEntry ;A=Char again.
        PCHL                    ;Jump to address in KeyTab.
;
;       Key function handlers
;
;       Flip the Menu Line.  Should flip back to normal on any other key!
;
EdQuestionMark
        LHLD    EdMsgPtr
        LXI     D,EdMsg
        MOV     A,H
        CMP     D
        JNZ     EQM1            ;Jmp/ don't have EdMsg. Go display it.
        MOV     A,L
        CMP     E
        JNZ     EQM1
        LXI     D,EdMsg2        ;Got EdMsg. Display EdMsg2 instead.
EQM1    XCHG
        SHLD    EdMsgPtr
        RET
;
EdUp    LXI     D,EdCursor
        LDA     EdCursorLen
        MOV     B,A
        CALL    BPrevious
        MOV     A,B
        STA     EdCursorLen     ;Assume CY means EndOfDBErr!!!
        STA     EdCursorEditPos
        RET
;
EdDown  LXI     D,EdCursor
        LDA     EdCursorLen
        MOV     B,A
        CALL    BNext
        MOV     A,B
        STA     EdCursorLen     ;Assume CY means EndOfDBErr!!!
        STA     EdCursorEditPos
        RET
;
;       Insert Item, Delete the third Component, and increment its sequence
;  number, and leave the sequence number alone as the third Component.
;  This is an expedient for entering text.
;
EdCR    LXI     D,EdCursor
        LDA     EdCursorLen
        MOV     B,A
        PUSH    D
        PUSH    B
        CALL    BInsert         ;Mods DE,B. Should handle errors!!!
        POP     B
```

```
        POP     D
        RC
        ;
        LXI     H,EdCursor
        LDA     EdCursorLen
        MOV     C,A
        MVI     A,2               ;Locate the third Component.
        CALL    ScanToComponent ;Mods DE,B.  HL,C--
>ThirdThroughLastComponents.
        RC                        ;Ret/ no third Component.
        ;
        MOV     A,M
        CPI     TAB
        JNZ     EdCR1
        INR     L
        DCR     C
        ;
EdCR1   MOV     D,H
        MOV     E,L               ;Save DE-->LastComponentText.
        CALL    ParseDigits       ;Pres DE,B. Skip one or more digits.
        RC                        ;Ret/ no Initial digits.
        MOV     A,L               ;HL-->AfterDigits. DE-->Digits.
        SUB     E
        MOV     C,A               ;C=#Digits.
        XCHG                      ;HL-->Digits. DE-->AfterDigits.
        CALL    IncASCII          ;Pres DE,B.
        LXI     H,EdCursor
        MOV     A,E
        SUB     L
        STA     EdCursorLen
        STA     EdCursorEditPos
        XRA     A
        RET
;
ParseDigits
        CALL    ParseDigit
        RC
PD1     CALL    ParseDigit
        JNC     PD1
        XRA     A
        RET
;
ParseDigit
        MOV     A,C
        ORA     A
        STC
        RZ
        MOV     A,M
        CPI     '0'
        RC
        CPI     '9'+1
        CMC
        RC
```

```
        INX     H
        DCR     C
        XRA     A
        RET
;
;       Increment the HL,C-->ASCIINumber.  Return CARRY if overflow.
;  Digits are in descending significance.  Pres DE,B.
;
IncASCII MOV    A,L
        ADD     C
        MOV     L,A
        INR     C
IA1     DCR     C
        STC
        RZ                      ;Ret/ CARRY: Overflow.
        DCR     L
        MOV     A,M
        CPI     '0'
        CC      Trap            ;Trap/ Not a digit.
        CPI     '9'+1
        CNC     Trap
        INR     M
        CPI     '9'
        STC
        CMC
        RNZ
        MVI     M,'0'
        JMP     IA1             ;Loop.

;
EdLeft  LDA     VolNamePrefixLen
        MOV     C,A
        LDA     EdCursorEditPos
        CMP     C
        RC
        STC
        RZ
        DCR     A
        STA     EdCursorEditPos
        ORA     A
        RET
;
;       Extend EndCursor by one character from the nearest Item.
;  Should Scroll!!! (Sometimes extending by one char causes a one-line
scroll.)
;
EdRight LDA     EdCursorLen
        MOV     C,A
        LDA     EdCursorEditPos
        CMP     C
        JZ      EdRight1        ;Jmp/ at end of Cursor: go append a char.
        CNC     Trap            ;Trap/ beyond end of Cursor.
        INR     A
```

```
        STA      EdCursorEditPos
        ORA      A
        RET
        ;
EdRight1 LXI     H,EdCursor
        LXI      D,TestCursor
        CALL     Move
        ;
        LXI      D,TestCursor
        LDA      EdCursorLen
        MOV      B,A
        CALL     BNext              ;B:=TestCursorLen.
        ;
        LDA      EdCursorLen
        CMP      B                  ;TestCursor must be longer.
        CMC
        RC                          ;Ret/ TestCursorLen<=EdCursorLen.
        ;
        MOV      C,A
        LXI      H,EdCursor
        LXI      D,TestCursor
        CALL     Compare
        STC
        RNZ                         ;Ret/ EdCursor not a prefix of TestC.
        ;
        LXI      H,TestCursor
        LXI      D,EdCursor
        LDA      EdCursorLen
        INR      A
        STA      EdCursorLen        ;Add one character.
        MOV      C,A
        CALL     Move
        ;
        LXI      H,EdCursorEditPos
        INR      M
        XRA      A
        RET
;
EdCtlLeft CALL   EdLeft
        RC
EdCtlL1 LXI      H,EdCursor
        LDA      EdCursorEditPos
        DCR      L
        ADD      L
        MOV      L,A
        MOV      A,M
        CPI      TAB                ;TAB delimited!!!
        RZ
        CALL     EdLeft
        JNC      EdCtlL1
        XRA      A
        RET
;
```

```
;       Extend Cursor by one Component from nearest Item.
;
EdCtlRight Call EdRight          ;Now append up to a TAB if possible.
        RC
EdCtlR1 LXI     H,EdCursor       ;TAB Delimited!!!
        LDA     EdCursorEditPos
        ADD     L
        DCR     A
        MOV     L,A
        MOV     A,M
        CPI     TAB
        RZ
        CALL    EdRight
        JNC     EdCtlR1
        XRA     A
        RET
;
EdLiteral
        CPI     80H
        CMC
        RC                       ;Ret/ special key!
        CPI     TAB
        JZ      EdLit1           ;Jmp/ Accept TAB.
        CPI     ' '              ;Accept SPACE.
        RC                       ;Ret/ other control chars.
EdLit1  MOV     B,A
        LDA     EdCursorLen
        INR     A
        CPI     TesterCursorSz
        STC
        RZ
        STA     EdCursorLen
        MOV     C,A
        LXI     H,EdCursorEditPos
        INR     M
        SUB     M
        CC      Trap             ;Trap/ EditPos beyond end of Cursor.
        MOV     C,A              ;C=Length to move.
        LXI     H,EdCursor
        LDA     EdCursorEditPos
        ADD     L
        CC      Trap
        MOV     E,A
        MOV     D,H              ;DE-->Destination.
        MOV     L,A
        DCR     L                ;HL-->Source.
        PUSH    H
        CALL    MoveRight        ;Pres B.
        POP     H
        MOV     M,B
        XRA     A
        RET
;
```

```
EdIns   LXI     D,EdCursor
        LDA     EdCursorLen
        MOV     B,A
        PUSH    D
        PUSH    B
        CALL    BInsert         ;Mods DE,B. Should handle errors!!!
        POP     B
        POP     D
        RC
        ;
        CALL    Invert          ;DE,B-->InverseItem.
        CMC
        RNC                     ;Ret/ NonInverted.
        CALL    BInsert         ;Insert the InverseItem.
        XRA     A
        RET
;
EdDel   LXI     D,EdCursor
        LDA     EdCursorLen
        MOV     B,A
        PUSH    D
        PUSH    B
        CALL    BDelete         ;Mods DE,B. Should handle errors!!!
        POP     B
        POP     D
        RC
        ;
        CALL    Invert          ;DE,B-->InverseItem.
        CMC
        RNC                     ;Ret/ NonInverted.
        CALL    BDelete         ;Delete the InverseItem.
        XRA     A
        RET
;
EdDelChar
        LDA     VolNamePrefixLen
        MOV     C,A
        LDA     EdCursorEditPos
        CMP     C
        RC                      ;Ret/ CARRY: Cursor shorter than VNPL!
        STC
        RZ                      ;Ret/ CARRY: Cursor nil.
        DCR     A
        STA     EdCursorEditPos
        MOV     C,A
        LDA     EdCursorLen
        DCR     A
        STA     EdCursorLen
        SUB     C
        CC      Trap
        MOV     C,A             ;C=Length of area to move.
        LXI     H,EdCursor
        LDA     EdCursorEditPos
```

```
        ADD     L
        MOV     E,A
        MOV     D,H             ;DE-->Destination of move.
        MOV     L,E
        INR     L               ;HL-->Source of move.
        CALL    Move
        ORA     A
        RET
;
EdDelWord CALL  EdDelChar
        RC
EdDW1   LXI     H,EdCursor
        LDA     EdCursorEditPos
        DCR     L
        ADD     L
        MOV     L,A
        MOV     A,M
        CPI     TAB             ;TAB delimited!!!
        RZ
        CALL    EdDelChar
        JNC     EdDW1
        XRA     A
        RET
;
EdDelToHome
        CALL    EdDelChar
        JNC     EdDelToHome
        ORA     A
        RET
;
EdDelToEnd
        LDA     EdCursorEditPos
        STA     EdCursorLen
        ORA     A
        RET
;
EdHome  LDA     VolNamePrefixLen
        STA     EdCursorEditPos
        XRA     A
        RET
;
EdEnd   LDA     EdCursorLen
        STA     EdCursorEditPos
        XRA     A
        RET
;
EdCtlHome LDA   VolNamePrefixLen
        STA     EdCursorLen
        STA     EdCursorEditPos
        XRA     A
        RET
;
EdCtlEnd LXI    H,EdCursor
```

```
        LDA     VolNamePrefixLen
        ADD     L
        MOV     L,A
        MVI     A,TesterCursorSz-1      ;-1 For security.
        STA     EdCursorLen
EdE1    MVI     M,0FFH          ;Set cursor to infinity.
        INX     H
        DCR     A
        JNZ     EdE1
        CALL    EdUp
        XRA     A               ;NOT CARRY - force a Display.
        RET
;
EdPageUp
        MVI     C,PageScrollDistance
EdPageUp1
        PUSH    B
        CALL    EdUp
        POP     B
        CMC
        RNC
        DCR     C
        JNZ     EdPageUp1
        XRA     A
        RET
;
EdPageDown
        MVI     C,PageScrollDistance
EdPageDown1
        PUSH    B
        CALL    EdDown
        POP     B
        CMC
        RNC
        DCR     C
        JNZ     EdPageDown1
        XRA     A
        RET
;
EdInvert LXI    D,EdCursor
        LDA     EdCursorLen
        MOV     B,A
        CALL    Invert
        RC                      ;Ret/ NonInvertedAttribute.
        XCHG
        MOV     C,B
        LXI     D,EdCursor
        CALL    Move
        MOV     A,B
        STA     EdCursorLen
        STA     EdCursorEditPos
        XRA     A
        RET
```

```
;
EdChangeDisplayMode
        LXI     H,EdDisplayMode
        MOV     A,M
        CMA
        MOV     M,A
        JMP     InitEdDisplay
;
;       **** Editor Display ****
;
EdDisplayDirty  DB OFFH ;>0: Display is known to need update.
;
        need    TesterCursorSz+1
EdDisplayCursor1Len DB  0       ;Remembers FirstDisplayItem.
EdDisplayCursor1 DS TesterCursorSz
;
        need    TesterCursorSz+1
EdDisplayCursor2Len DS  1
EdDisplayCursor2 DS     TesterCursorSz  ;Not used yet!!!
;
InitEdDisplay
        MVI     A,OFFH
        STA     EdDisplayDirty
        XRA     A
        STA     EdDisplayCursor1Len
        STA     EdDisplayCursor2Len
        JMP     EdDisplay
;
TerminateEdDisplay
        MVI     A,OFFH
        STA     EdDisplayDirty
        JMP     DisplayClear
;
;       Display the entire ItemEditor Screen.
;
EdDisplay
        LXI     H,0
        CALL    DisplayGotoXY
        LHLD    EdMsgPtr
        CALL    DisplayPutMsg
        CALL    DisplayClearToEOL
        ;
        MVI     A,CR            ;Display EdCursor immediately to show what
        CALL    DisplayPutC     ;happened to it.
        MVI     A,LF
        CALL    DisplayPutC
        CALL    DisplayReverseVideoToEOL
        LXI     H,EdCursor
        LDA     EdCursorLen
        MOV     C,A
        CALL    EdDisplayCursor
        CALL    DisplayClearToEOL
        ;
```

```
        MVI     A,CR
        CALL    DisplayPutC
        MVI     A,LF
        CALL    DisplayPutC
        LXI     H,EdCursor
        LDA     EdCursorLen
        MOV     C,A
        CALL    EdDisplayItems
        ;
        LXI     H,1*256+0
        CALL    DisplayGotoXY
        LXI     H,EdCursor       ;Display EdCursor again in order to
        LDA     EdCursorEditPos  ;put the DisplayCursor in the
        MOV     C,A              ;right position!
        CALL    EdDisplayCursor  ;Omit the DisplayClearToEOL.
        ;
        XRA     A
        STA     EdDisplayDirty
        RET
;
;       Display the full-screen list of sequential Items, starting at the
;  HL,C-->Cursor.
;       Should do column-wise prefix compression!
;       If the FirstDisplayItem is the same as for a previous call, we
;  assume the display has not changed and we skip the update.  This rule
;  automatically covers changes due to Insert/Delete too.
;
EdItemDisplayRows EQU   25-2     ;Account for MenuLine and CursorLine.
;
EdDisplayItems
        LXI     D,TestCursor
        MOV     B,C
        CALL    Move             ;Pres B. TestCursor=HL,C-->Cursor.
        ;
        LXI     D,TestCursor
        CALL    BFirst           ;Use BFirst: don't skip Cursor Item.
        JNC     EdD0
        CPI     EndOfDBErr
        STC
        RNZ
        ORA     A
        RET
EdD0    MOV     A,B
        STA     TestCursorLen    ;TestCursor=FirstDisplayItem.
        ;
        LXI     H,TestCursor
        LDA     TestCursorLen
        MOV     C,A
        LXI     D,EdDisplayCursor1
        LDA     EdDisplayCursor1Len
        MOV     B,A
        CALL    CompareAndCopyCursors ;Pres HL,DE,BC.
        MOV     A,C
```

```
        STA     EdDisplayCursor1Len
        JNC     EdD01           ;Jmp/ FirstDisplayItem Changed.
        ;
        LDA     EdDisplayDirty
        ORA     A
        RZ                      ;Ret/ Not forced to update Display.
        ;
EdD01   XRA     A
        STA     EdRowCounter
        STA     EdCompressedComponents
        ;
EdD1    LXI     H,TestCursor
        LDA     TestCursorLen
        MOV     C,A
        LDA     EdCompressedComponents ;Should recompute this on each loop!!!
        CALL    EdDisplayCursorCompressed
        CALL    DisplayClearToEOL
        ;
        LXI     H,EdRowCounter
        MOV     A,M
        CPI     EdItemDisplayRows-1
        RZ
        INR     M
        ;
        MVI     A,CR
        CALL    DisplayPutC
        MVI     A,LF
        CALL    DisplayPutC
        ;
        LXI     D,EdDisplayCursor2
        LXI     H,TestCursor
        LDA     TestCursorLen
        STA     EdDisplayCursor2Len
        MOV     C,A
        CALL    Move            ;EdDisplayCursor2:=TestCursor.
        ;
        LXI     D,TestCursor
        LDA     TestCursorLen
        MOV     B,A
        CALL    BNext
        MOV     A,B
        STA     TestCursorLen
        JC      EdD12
        ;
        LDA     EdDisplayMode
        ORA     A
        JZ      EdD1            ;Jmp/ no compression.
        ;
        ;       Recalculate number of compressed-out (undisplayed) Components.
        ;
        LXI     H,EdDisplayCursor2
        LDA     EdDisplayCursor2Len
        MOV     C,A
```

```
        LXI     D,TestCursor
        LDA     TestCursorLen
        MOV     B,A
        CALL    CompareCursors          ;DE-->DifferencePoint.
        ;
        LXI     H,TestCursor
        LDA     TestCursorLen
        MOV     C,A
        CALL    CountComponentsBefore   ;B=#Comp in HL,C-->Cursor before DE.
        ;
        MOV     A,B
        STA     EdCompressedComponents
        JMP     EdD1            ;Loop.
        ;
EdD12
;!!!    CPI     EndOfDBErr              ;Assume CY means EndOfDBErr!!!
;       STC
;       RNZ
        ;
        ;       Special loop to clear to end of screen on EndOfDB.
        ;
EdD2    CALL    DisplayClearToEOL
        ;
        LXI     H,EdRowCounter
        MOV     A,M
        CPI     EdItemDisplayRows-1
        RZ
        INR     M
        ;
        MVI     A,CR
        CALL    DisplayPutC
        MVI     A,LF
        CALL    DisplayPutC
        ;
        JMP     EdD2
;
;       Compare the HL,C--Cursor with the DE,B-->Cursor, returning
;  HL-->DifferencePointInHLCursor. Mods DE,BC,A.
;
CompareCursors
        MOV     A,B
        CMP     C
        JNC     CompC1          ;Jmp/ B>=C.
        MOV     C,B
CompC1  JMP     Compare
;
;
;       Compare the HL,C-->Cursor to DE,B-->Cursor and if different,
;  Copy former over latter and return NOT CARRY.  Pres HL,DE,C. Ret B=C.
;
CompareAndCopyCursors
        MOV     A,C
        CMP     B
```

```
        JNZ     CACC1           ;Jmp/ Cursorlengths differ.
        PUSH    H
        PUSH    D
        PUSH    B
        CALL    Compare
        POP     B
        POP     D
        POP     H
        STC
        RZ                      ;Ret/ Cursors are the same.
        ;
CACC1   MOV     B,C
        PUSH    H
        PUSH    D
        PUSH    B
        CALL    Move
        POP     B
        POP     D
        POP     H
        XRA     A               ;Return NOT CARRY: DE,B-->Cursor modified.
        RET
;
;       Display HL,C-->Cursor, with initial A components blanked out.
;  Caller should normally DisplayClearToEOL immediately after.
;
EdDisplayCursor
        XRA     A               ;No compression.
EdDisplayCursorCompressed
        ORA     A
        JZ      EDCC2           ;Jmp/ no blanking to do.
        PUSH    PSW
        PUSH    B
        MOV     B,A
        MVI     A,' '
EDCCO   MVI     C,TabWidth      ;DisplayWidth of a short (<16 chars)
component.
EDCCO1  CALL    DisplayPutC
        DCR     C
        JNZ     EDCCO1
        DCR     B
        JNZ     EDCCO
        POP     B
        POP     PSW
        ;
EDCC2   CALL    ScanToComponent ;Mods DE,B. HL,C-->ComponentToDisplay.
EDCC1   CALL    EdDisplayComponent
        RC                      ;Ret/ no more Components.
        MVI     A,TAB           ;TAB to next Component position.
        CALL    DisplayPutC
        JMP     EDCC1
;
;       Display the HL,C-->Component and return CARRY if it was the last.
;
```

```
EdDisplayComponent
        INR     C
        DCR     C
        STC
        RZ                      ;Ret/ CARRY: no Component at all!
        MOV     A,M
        CPI     TAB
        JZ      EdDispC2        ;Jmp/ Skip an Initial TAB in the Component.
EdDispC1 CALL   DisplayPutC
EdDispC2 INX    H
        DCR     C
        STC
        RZ                      ;Ret/ CARRY: EndOfCursor - last Component.
        MOV     A,M
        CPI     TAB
        JNZ     EdDispC1        ;Loop/ not yet at next Component.
        XRA     A               ;Return NOT CARRY: More Components to go.
        RET                     ;We don't display the TAB.
;
;       **** Assertion Level Functions ****
;
InvertCursorPtr DS      2
InvertCursorLen DS      1
        ;
        need    TesterCursorSz+1
InvertCursor1Len        DS      1
InvertCursor1   DS      TesterCursorSz
        ;
        need    TesterCursorSz+1InvertCursor2Len        DS      1
InvertCursor2   DS      TesterCursorSz
        ;
InverseComponentLen EQU 7
        need    InverseComponentLen
InverseComponent DB 'Inverse'
;
;       Invert the DE,B-->Triple into InvertCursor2, returning
;  DE,B-->InvertCursor2.  Mods HL,C,A.
;
Invert  XCHG
        SHLD    InvertCursorPtr ;HL-->CursorToBeInverted.
        MOV     A,B
        STA     InvertCursorLen
        ;
        ;       Retrieve the InvertedAttributeName.
        ;
        LXI     D,InvertCursor1
        CALL    CopyVolNamePrefix ;DE,B-->InvertCursor1.
        ;
        LHLD    InvertCursorPtr ;Append AttributeName
        LDA     InvertCursorLen
        MOV     C,A
        MVI     A,1
        Call    AppendNthComponent ;DE,B-->AppendedToCursor
```

```
        RC                          ;Ret/ no second Component.
        ;
        LXI     H,InverseComponent ;Append 'Inverse'
        MVI     C,InverseComponentLen
        CALL    AppendComponent ;DE,B-->AppendedToCursor
        ;
        PUSH    D
        PUSH    B
        XCHG
        MOV     C,B
        LXI     D,InvertCursor2 ;Save InvertCursor1 in IC2 for Compare.
        CALL    Move
        MOV     A,B
        STA     InvertCursor2Len
        POP     B
        POP     D
        ;
        CALL    BNext               ;Retrieve the Inverse AttributeName.
        JNC     Invert1
        CPI     EndOfDBErr
        STC
        RZ                          ;Ret/ EndOfDB: consider this NonInverted.
        CALL    Trap
        RET
Invert1 MOV     A,B
        STA     InvertCursor1Len
        ;
        LXI     H,InvertCursor1 ;IC2 must be a prefix of IC1.
        LXI     D,InvertCursor2
        LDA     InvertCursor2Len
        MOV     C,A
        CALL    Compare
        STC
        RNZ                         ;Ret/ NonInvertedAttribute.
        ;
        ;       Got InvertedAttributeName.  Now build inverted Cursor
        ;   in InvertCursor2.
        ;
        LXI     D,InvertCursor2
        LHLD    InvertCursorPtr
        CALL    CopyVolNamePrefix       ;DE,B-->InvertCursor2
        ;
        LHLD    InvertCursorPtr ;Append third Component.
        LDA     InvertCursorLen
        MOV     C,A
        MVI     A,2
        CALL    AppendNthComponent
        RC                          ;Ret/ no third Component.
        ;
        LXI     H,InvertCursor1 ;Append InvertedAttributeName
        LDA     InvertCursor1Len
        MOV     C,A
        MVI     A,2
```

```
        CALL    AppendNthComponent
        CC      Trap              ;Must be a third Component in InvertCursor1!
        ;
        LHLD    InvertCursorPtr ;Append first Component.
        LDA     InvertCursorLen
        MOV     C,A
        MVI     A,0
        CALL    AppendNthComponent ;Mods HL,C,A.
        CC      Trap              ;Must still be a first Component in IC!
        XRA     A                 ;NOT CARRY.
        RET
;
;       Copy the VolNamePrefix of HL,C-->Cursor into DE,B-->Cursor,
;   leaving B=VolNamePrefixLen, DE Pres.  Mod HL,C,A.
;
CopyVolNamePrefix
        LDA     VolNamePrefixLen
        MOV     C,A
        MOV     B,C               ;B=TestCursorLen
        PUSH    D
        CALL    Move              ;Pres B.
        POP     D
        RET
;
;       Append the Ath Component of the HL,C-->Cursor onto the DE,B-->Cursor.
;   Mods HL,C,A.  If the Cursor has fewer than A Components, return CARRY.
;
AppendNthComponent
        PUSH    D
        PUSH    B                 ;Save DE-->Cursor.
        CALL    ScanToComponent ;Mods DE,B.
        JC      ANC1              ;Jmp/ got no Nth component.
        MOV     D,H
        MOV     E,L
        MOV     B,C
        CALL    SkipComponent     ;Pres DE,B.
        MOV     A,L
        SUB     E
        CC      Trap
        MOV     L,E               ;HL-->Component.
        POP     B
        MOV     C,A               ;C=ComponentLen
        POP     D
        JMP     AppendComponent ;Returns DE,B-->AppendedToCursor
        ;
ANC1    POP     B
        POP     D
        STC
        RET
;
;       Append the HL,C-->Component onto the DE,B-->Cursor.
;   Return B=NewCursorLen, NOT CARRY. Pres DE. Mod HL,C,A.
;   TAB delimited!!!  We assume Component contains no TABS other than possibly
```

```
;  at front! We do not prepend the TAB on the zeroeth Component.
;
AppendComponent
        PUSH    D
        MOV     A,E
        ADD     B
        MOV     E,A             ;DE-->Where to append.
        LDA     VolNamePrefixLen
        CMP     B
        JZ      AC0             ;Jmp/ FirstComponent: don't append TAB.
        CNC     Trap
        MVI     A,TAB           ;Append a TAB.
        STAX    D
        INX     D
        INR     B
AC0     MOV     A,C
        ORA     A
        JZ      AC2             ;Jmp/ Component is Nil. Leave only the TAB.
        MOV     A,M
        CPI     TAB
        JNZ     AC1             ;Jmp/ Component has no initial TAB.
        INX     H
        DCR     C
AC1     MOV     A,B
        ADD     C
        CC      Trap
        CPI     TesterCursorSz
        CNC     Trap
        MOV     B,A
        CALL    Move            ;Append the Component.
AC2     POP     D
        XRA     A
        RET
;
;       Count complete Components in the HL,C-->Cursor, returning count in B.
;
CountComponents
        CALL    ScanOverVNP     ;Pres DE,B.
        MVI     B,0
        RC
CountC1 INR     B
        CALL    SkipComponent   ;Pres DE,B.
        JNC     CountC1
        RET
;
;       Count complete Components in the HL,C-->Cursor before DE,
;  returning count in B.
;
CountComponentsBefore
        MOV     A,D
        CMP     H
        CNZ     Trap
        MOV     A,E
```

```
        CMP     L
        CC      Trap            ;Trap/ DE<HL.
        MVI     B,0
        CALL    ScanOverVNP     ;Pres DE,B.
        RC
        MOV     A,L
        CMP     E
        RNC                     ;Ret/ At or Beyond DE.
CountCB1 INR    B
        CALL    SkipComponent   ;Pres DE,B.
        JC      CountCB2        ;Jmp/ Just skipped over last Component.
        MOV     A,L
        CMP     E
        JC      CountCB1
        RZ                      ;Ret/ At DE: include the complete Component.
        DCR     B               ;Incomplete Component.
        RET                     ;Ret/ Beyond DE.
CountCB2 MOV    A,L
        CMP     E
        CC      Trap            ;Trap/ DE-->BeyondEndOfCursor.
        RZ
        DCR     B
        RET
;
;       Scan to Ath component in HL,C-->Cursor, leaving HL,C--
>RemainingCursor.
;  Mods DE,B,A.
;
ScanToComponent
        MOV     B,A             ;B=ComponentNum
        CALL    ScanOverVNP     ;Pres DE,B.
        RC
        INR     B
SToC0   DCR     B
        RZ                      ;Ret/ NOT CARRY: At proper Component.
        CALL    SkipComponent
        JNC     SToC0
        RET                     ;Ret/ CARRY: EndOfCursor - too few Components
;
;       Scan HL,C-->Cursor over VNP. Pres DE,B.
;
ScanOverVNP
        PUSH    B
        LDA     VolNamePrefixLen ;Subtract VNPL from CursorLen.
        MOV     B,A
        MOV     A,C
        SUB     B
        JNC     SOVNP1
        POP     B
        RET                     ;Ret/ CursorLen<VNPL!
SOVNP1  POP     B
        MOV     C,A
        LDA     VolNamePrefixLen
```

```
        ADD     L
        CC      Trap            ;Trap/ Cursor crosses Page bound!
        MOV     L,A
        RET
;
;       Skip over the HL,C-->ComponentInACursor. Pres DE,B.
;  If the last component is skipped over, return CARRY.
;       Assumes components delimited by TABs!!!  All Components begin with a
;  TAB except for the zeroeth.  The TAB is optional here for all Components.
;
SkipComponent
        INR     C
        DCR     C
        STC
        RZ                      ;Ret/ end of Cursor.
        INX     H               ;Skip possible TAB delimiter at front!!!
        DCR     C
        MVI     A,TAB           ;Fall into ScanForChar.
;
;       Scan for the character in A in the HL,C-->Cursor.  Return CARRY if not
;  found.  Return HL,C-->RemainingCursorBeginningWithAChar if found.
;
ScanForChar
        INR     C
        JMP     SFC00
SFC0    CMP     M
        RZ
        INX     H
SFC00   DCR     C
        JNZ     SFC0
        STC
        RET
;
;       **** Command Line Input Handler ****
;
CommandBuffSz   EQU     80
CommandBuffLen  DB      0
CommandBuff     DS      CommandBuffSz
;
        DB      'COMMAND'
;
InitCommand
        XRA     A
        STA     CommandBuffLen
        RET
;
;       Get a command character.  If necessary, prompt the user with the
;  HL-->String and read a line, saving all characters entered on the line in
;  CommandBuff for later possible reading.  If NulLine read, return CARRY.
;
CommandGetCFolded
        CALL    CommandGetC
        RC
```

```
        CALL    FoldToUC
        ORA     A
        RET
;
FoldToUC CPI    'z'+1
        RNC                     ;Ret/ >'z'
        CPI     'a'
        RC                      ;Ret/ <'a'
        ADI     'A'-'a'
        RET
;
CommandGetC
        LDA     CommandBuffLen
        ORA     A
        JNZ     CGC1
        CALL    CommandGetCommon ;Refill CommandBuff.
        RC                      ;Ret/ CARRY: NullLine entered.
CGC1    LXI     H,CommandBuff+1
        LXI     D,CommandBuff
        LDAX    D
        PUSH    PSW
        LDA     CommandBuffLen
        DCR     A
        STA     CommandBuffLen
        ORA     A
        JZ      CGC3
        MOV     C,A
CGC2    MOV     A,M             ;Delete char from front of CommandBuff.
        STAX    D
        INX     H
        INX     D
        DCR     C
        JNZ     CGC2
CGC3    POP     PSW
        ORA     A
        RET
;
CommandGetLine
        LDA     CommandBuffLen
        ORA     A
        JNZ     CGL1
        CALL    CommandGetCommon ;Refill CommandBuff.
        RC                      ;Ret/ CARRY: NullLine entered.
CGL1    LXI     H,CommandBuff
        LDA     CommandBuffLen
        MOV     C,A
        ORA     A
        RET
;
CommandGetCommon
        CALL    ConsPutMsg      ;LineLength==0. Must read a line.
        LXI     H,CommandBuff
        MVI     C,CommandBuffSz
```

```
        CALL    ConsGetLine     ;Read text into HL,C-->Buff.
        MOV     A,C
        ORA     A
        STC
        RZ                      ;Ret/ CARRY: NullLine.
        DCR     A
        STA     CommandBuffLen  ;Save LineLength, CR deleted.
        STC
        RZ                      ;Ret/ CARRY: NullLine.
        CMC
        RET
;
;       **** Special Keyboard Interface ****
;
                DB      'CONSGETC'
ConsGetC
;<86>   MOV     AH,0            ;"Read next ASCII into AL, Scan Code into AH."
;<86>   INT     16H
        ANI     07FH            ;Return ASCII with 80H bit off.
        ORA     A
        RNZ
        MVI     A,UpArrow
;<86>   CMP     AH,72
        RZ
        MVI     A,DownArrow
;<86>   CMP     AH,80
        RZ
        MVI     A,RightArrow
;<86>   CMP     AH,77
        RZ
        MVI     A,LeftArrow
;<86>   CMP     AH,75
        RZ
        MVI     A,CtlRightArrow
;<86>   CMP     AH,116
        RZ
        MVI     A,CtlLeftArrow
;<86>   CMP     AH,115
        RZ
        MVI     A,InsKey
;<86>   CMP     AH,82
        RZ
        MVI     A,DelKey
;<86>   CMP     AH,83
        RZ
        MVI     A,HomeKey
;<86>   CMP     AH,71
        RZ
        MVI     A,EndKey
;<86>   CMP     AH,79
        RZ
        MVI     A,CtlHomeKey
;<86>   CMP     AH,119
```

```
        RZ
        MVI     A,CtlEndKey
;<86>   CMP     AH,117
        RZ
        MVI     A,PageUp
;<86>   CMP     AH,73
        RZ
        MVI     A,PageDown
;<86>   CMP     AH,81
        RZ
        MVI     A,AltI
;<86>   CMP     AH,23
        RZ
        MVI     A,AltC
;<86>   CMP     AH,46
        RZ
        XRA     A                  ;Unrecognized keys become 0.
        RET
;
;       Return NOT CARRY if a character is available.
;
ConsTestForC
;<86>   MOV     AH,1               ;"Set ZF=0 to indicate a char is avail."
        INT     16H
        STC
        RZ
        CMC
        RET
;
;       **** Display Screen Interface ****
;
DisplayMaxColumn EQU    79         ;0,0 is upper left.
DisplayMaxRow    EQU    24
DisplayColumnCounter DB 0
;
                DB      'DISPLAY'
;
DisplayInit
;<86>   MOV     AH,0               ;"Set mode".
;<86>   MOV     AL,2               ;80X25 BW
;<86>   INT     10H
        LXI     H,0
        JMP     DisplayGotoXY
;
DisplayPutC
        PUSH    H
        PUSH    D
        PUSH    B
        PUSH    PSW
        LXI     H,DisplayColumnCounter
        CPI     CR
        JZ      DPCCR
        CPI     LF
```

```
         JZ       DPC2
         CPI      TAB
         JZ       DPCTab
         CPI      80H
         JNC      DPCHex         ;Jmp/ >=80H: display hex.
         CPI      ' '
         JNC      DPC1           ;Jmp/ display all printables and SPACE.
         ;
DPCHex   MOV      C,A
         MVI      A,'<'
         CALL     DisplayPutC    ;Recur!
         MOV      A,C
         RAR
         RAR
         RAR
         RAR
         CALL     DPCNibble
         MOV      A,C
         CALL     DPCNibble
         MVI      A,'>'
         CALL     DisplayPutC    ;Recur!
         JMP      DPCExit
         ;
DPCTab   MVI      A,'_'
         CALL     DisplayPutC    ;Recur!
         MOV      A,M
         ANI      TabWidth-1
         JNZ      DPCTab
         JMP      DPCExit
         ;
DPCCR    MVI      M,0
         JMP      DPC2
         ;
DPC1     INR      M              ;Always count the char or we can infinite
loop.
         MOV      C,A
         MOV      A,M
         CPI      DisplayMaxColumn
         MOV      A,C
         JNC      DPCExit        ;Jmp/ at MaxColumn or beyond: prevent wrap.
DPC2                             ;Non-space requiring characters.
;<86>    MOV      AH,14          ;"Write Teletype."
;<86>    MOV      BL,7           ;Foreground color in Graphics Mode - unused.
;<86>    MOV      BH,0           ;Display page.  AL=Char to write.
;<86>    INT      10H
         ;
DPCExit  POP      PSW
         POP      B
         POP      D
         POP      H
         RET
;
DPCNibble ANI     0FH
```

```
        ADI     '0'
        CPI     '9'+1
        JC      DPCN1           ;Jmp/ <'9'+1, i.e. <='9'.
        ADI     'A'-'9'-1       ;MASM CAN'T HANDLE -('9'+1) + 'A'!
DPCN1   JMP     DisplayPutC     ;Recur! (DPCNibble is called within DPC.)
;
;       HL-->Msg terminated by 0.
;
DisplayPutMsg
        MOV     A,M
        ORA     A
        RZ
        CALL    DisplayPutC
        INX     H
        JMP     DisplayPutMsg
;
;       H=Row (Y), L=Column (X). (0,0) is upper left.
;
DisplayGotoXY
        PUSH    H
        PUSH    D
        PUSH    B
        PUSH    PSW
;<86>   MOV     DisplayColumnCounter,BL
;<86>   MOV     DX,BX
;<86>   MOV     AH,2
;<86>   MOV     BH,0            ;Display page.
;<86>   INT     10H
        POP     PSW
        POP     B
        POP     D
        POP     H
        RET
;
DisplayScrollUp
;<86>   MOV     AH,6            ;"Scroll Active Page Up."
;<86>   MOV     AL,1            ;Scroll by one line.
;<86>   MOV     BH,7            ;Attribute to be used on blank line.
;<86>   MOV     CX,0            ;CX=Row,Column of upper left corner.
;<86>   MOV     DX,24*256+79    ;DX=Row,Column of lower right corner.
;<86>   INT     10H
        RET                     ;Should GotoXY!!!
;
DisplayScrollDown
;<86>   MOV     AH,7            ;"Scroll Active Page Down."
;<86>   MOV     AL,1            ;Scroll by one line.
;<86>   MOV     BH,7            ;Attribute to be used on blank line.
;<86>   MOV     CX,0            ;CX=Row,Column of upper left corner.
;<86>   MOV     DX,24*256+79    ;DX=Row,Column of lower right corner.
;<86>   INT     10H
        RET                     ;Should GotoXY!!!
;
DisplayClear
```

```
;<86>   MOV     AH,6            ;"Scroll Active Page Up."
;<86>   MOV     AL,0            ;Zero lines to scroll means clear scroll area.
;<86>   MOV     BH,7            ;Attribute to be used on blank line.
;<86>   MOV     CX,0            ;CX=Row,Column of upper left corner.
;<86>   MOV     DX,24*256+79    ;DX=Row,Column of lower right corner.
;<86>   INT     10H
        LXI     H,0
        JMP     DisplayGotoXY   ;Leave Cursor at top left corner!
;
;       Clear from cursor pos to end of Display line without moving Cursor.
;  Does not affect character attributes.
;
DisplayClearToEOL
;<86>   MOV     AH,3            ;"Read Cursor Pos"
;<86>   MOV     BH,0            ;Display Page
;<86>   INT     10H             ;DX=Row,Column (DH=Row).
        ;
;<86>   MOV     AH,10           ;"Write character at current pos."
;<86>   MOV     BH,0            ;Display Page
;<86>   MOV     CX,80           ;Write 80-CurrentColumn chars.
;<86>   SUB     CL,DL
;<86>   MOV     AL,' '          ;Write a blank.
;<86>   INT     10H
        RET
;
;       Clear from cursor pos to end of Display line without moving Cursor.
;  Resets character attributes to white-on-black, non-blinking, low intensity.
;
        IF      0
DisplayClearToEOL
;<86>   MOV     AH,3            ;"Read Cursor Pos"
;<86>   MOV     BH,0            ;Display Page
;<86>   INT     10H             ;DX=Row,Column
        ;
;<86>   MOV     CX,DX           ;CX=UpperLeftCorner=(CurrentRow,CurrentCol).
;<86>   MOV     DL,79           ;DX=LowerRightCorner=(CurrentRow,79).
;<86>   MOV     AH,6            ;"Scroll Active Page Up."
;<86>   MOV     AL,0            ;Zero lines to scroll means clear scroll area.
;<86>   MOV     BH,7            ;Attribute to be used on blank line.
;<86>   INT     10H
        RET                     ;Leave CursorPos unchanged.
        ENDIF
;
DisplayReverseVideoToEOL
;<86>   MOV     AH,3            ;"Read Cursor Pos"
;<86>   MOV     BH,0            ;Display Page
;<86>   INT     10H             ;DX=Row,Column (DH=Row).
        ;
;<86>   MOV     AH,9            ;"Write attribute/character at current pos."
;<86>   MOV     BH,0            ;Display Page
;<86>   MOV     CX,80           ;Write 80-CurrentColumn chars.
;<86>   SUB     CL,DH
;<86>   MOV     AL,' '          ;Write a blank.
```

```
;<86>   MOV     BL,70H          ;ReverseVideo, LowIntensity, NonBlinking.
;<86>   INT     10H
        RET
;
;       **** Utilities and I/O ****
;
;       Output A in Hex to Console.
;
ConsPutHex PUSH PSW             ;Do top nibble first.
        RAR
        RAR
        RAR
        RAR
        CALL    ConsPutNibble
        POP     PSW
ConsPutNibble
        ANI     0FH
        CPI     10
        JC      CPN1            ;Jmp/ A<10.
        ADI     'A'-10          ;Convert to Letter.
        JMP     ConsPutC
CPN1    ADI     '0'             ;Convert to Digit.
        JMP     ConsPutC
;
;       Unlike ConsPutMsg, display string delimited by C Len.
;
ConsPutString
        INR     C
        DCR     C
        RZ
CPS1    MOV     A,M
        CALL    ConsPutC
        INX     H
        DCR     C
        JNZ     CPS1
        RET
;
;       Ret CARRY if A is not a letter.
;
Letter  CPI     'A'             ;If a letter, enter into word.
        RC                      ;Ret/ not a letter.
        CPI     'Z'+1
        CMC
        RNC                     ;Ret/ is a letter.
        CPI     'a'
        RC                      ;Ret/ not a letter.
        CPI     'z'+1
        CMC
        RET
;
;       **** Predefined Words ****
;
;       Predefined Words to Insert into or Delete from a Tree.
```

```
;
PredefWords
        DB      'ist',0
        DB      'nicht',0
        DB      'gewiss',0
        DB      'zu',0
        DB      'viel',0
        DB      'cant',0
        DB      'think',0
        DB      'any',0
        DB      'foam',0
        DB      'fixation',0    ;10

        DB      'baloon',0
        DB      'digger',0
        DB      'dispersion',0
        DB      'larry',0
        DB      'tight',0
        DB      'truth',0
        DB      'value',0
        DB      'like',0
        DB      'anymore',0
        DB      'thrombosis',0  ;20

        DB      'liver',0
        DB      'ailments',0
        DB      'length',0
        DB      'quisp',0
        DB      'cereal',0
        DB      'sugar',0
        DB      'orangutan',0
        DB      'thousand',0
        DB      'steps',0
        DB      'sea',0         ;30

        DB      'ocean',0
        DB      'quixotic',0
        DB      'don',0
        DB      'mmmm',0
        DB      'beep',0
        DB      'nuzzle',0
        DB      'nozzle',0
        DB      'nizzle',0
        DB      'news',0
        DB      'keyboard',0    ;40

        DB      'board',0
        DB      'bored',0
        DB      'chairman',0
        DB      'helpless',0
        DB      'wrong',0
        DB      'throng',0
        DB      'rhyme',0
```

```
DB      'poem',0
DB      'eclectic',0
DB      'dyadic',0          ;50

DB      'pointillist',0
DB      'jaques',0
DB      'proper',0
DB      'property',0
DB      'heart',0
DB      'songs',0
DB      'rock',0
DB      'roll',0
DB      'music',0
DB      'player',0          ;60

DB      'radio',0
DB      'amounts',0
DB      'words',0
DB      'enumeration',0
DB      'counting',0
DB      'mapping',0
DB      'verbs',0
DB      'magnetism',0
DB      'electricity',0
DB      'science',0         ;70

DB      'bottle',0
DB      'leyden',0
DB      'jar',0
DB      'university',0
DB      'kugelhupf',0
DB      'kugelschreiber',0
DB      'hello',0
DB      'there',0
DB      'how',0
DB      'are',0             ;80

DB      'you',0
DB      'and',0
DB      'what',0
DB      'kind',0
DB      'of',0
DB      'situation',0
DB      'is',0
DB      'this',0
DB      'where',0
DB      'we',0              ;90

DB      'must',0
DB      'always',0
DB      'type',0
DB      'in',0
DB      'words',0
```

```
DB      'with',0
DB      'an',0
DB      'i',0
DB      'before',0
DB      'them',0        ;100

DB      'all',0
DB      'this',0
DB      'distinct',0
DB      'pain',0
DB      'therefore',0
DB      'cannot',0
DB      'begin',0
DB      'said',0
DB      'walrus',0
DB      'tangerine',0   ;110

DB      'dream',0
DB      'fizzle',0
DB      'lastdingo',0
DB      'insertion',0
DB      'deletion',0
DB      'bippy',0
DB      'dogeared',0
DB      'oneword',0
DB      'timeliness',0
DB      'johnson',0     ;120

DB      'huffman',0
DB      'encoding',0
DB      'before',0
DB      'daytime',0
DB      'savings',0
DB      'daylight',0
DB      'zippo',0
DB      'lighting',0
DB      'director',0
DB      'reflector',0   ;130

DB      'convergent',0
DB      'items',0
DB      'bingo',0
DB      'parlor',0
DB      'swanee',0
DB      'thursday',0
DB      'tertiary',0
DB      'quaternary',0
DB      'quad',0
DB      'quingle',0     ;140

DB      'quip',0
DB      'quirk',0
DB      'quark',0
```

```
DB      'program',0
DB      'television',0
DB      'monitor',0
DB      'mince',0
DB      'menagerie',0
DB      'french',0
DB      'farmers',0      ;150

DB      'flippant',0
DB      'figaro',0
DB      'singing',0
DB      'gesungen',0
DB      'sang',0
DB      'silliness',0
DB      'spelling',0
DB      'spielberg',0
DB      'bergab',0
DB      'bergauf',0      ;160

DB      'oder',0
DB      'deutch',0
DB      'woerter',0
DB      'sprechen',0
DB      'speaking',0
DB      'testing',0
DB      'this',0
DB      'thing',0
DB      'will',0
DB      'be',0           ;170

DB      'easier',0
DB      'because',0
DB      'the',0
DB      'sequence',0
DB      'of',0
DB      'insertions',0
DB      'can',0
DB      'be',0
DB      'replicated',0
DB      'as',0           ;180

DB      'desired',0
DB      'errors',0
DB      'will',0
DB      'repeatable',0
DB      'sein',0
DB      'we',0
DB      'wir',0
DB      'seem',0
DB      'shienen',0
DB      'to',0           ;190

DB      'zu',0
```

```
DB      'have',0
DB      'haben',0
DB      'genug',0
DB      'geld',0
DB      'aber',0
DB      'es',0
DB      'willow',0
DB      'real',0
DB      'camino',0        ;200

DB      'palo',0
DB      'alto',0
DB      'menlo',0
DB      'park',0
DB      'santa',0
DB      'cruz',0
DB      'redwood',0
DB      'city',0
DB      'mountain',0
DB      'view',0          ;210

DB      'cupertino',0
DB      'clara',0
DB      'san',0
DB      'jose',0
DB      'mateo',0
DB      'hayward',0
DB      'fremont',0
DB      'francisco',0
DB      'barbara',0
DB      'luis',0          ;230

DB      'obispo',0
DB      'goleta',0
DB      'saratoga',0
DB      'sunnyvale',0
DB      'alviso',0
DB      'milpitas',0
DB      'los',0
DB      'angeles',0
DB      'altos',0
DB      'hills',0         ;240

DB      'sierra',0
DB      'yosemite',0
DB      'sequoia',0
DB      'sempervirens',0
DB      'huddart',0
DB      'merced',0
DB      'sonora',0
DB      'portal',0
DB      'whitney',0
DB      'kern',0          ;250
```

```
        DB      0,0
;
        END

;*********************************************************
;*                                                       *
;*        Infinity DataBase Operating System             *
;*                 Meta-Tree                             *
;*                                                       *
;*     The Infinity Meta-Tree subsystem uses 256 byte    *
;*  cells - matching the SPAM page size.  It stores      *
;*  variable length strings of bytes called Items in     *
;*  binary fractional order, compressing out common      *
;*  inter-Item prefixes within each cell. Complete       *
;*  Items are passed in and out in Cursors, which are    *
;*  writeable Page-contiguous arrays of bytes conven-    *
;*  tionally pointed at by DE with current length in B.  *
;*                                                       *
;* Copyright (C) 1982,1983,1984,1985,1986 Roger L.       *
;* Deran. All rights reserved.                           *
;*                                                       *
;*********************************************************
;
;<86>   INCLUDE INF-H.ASM
;<86>   INCLUDE KERNEL-H.ASM
;<86>   INCLUDE CELL-H.ASM
;<86>   INCLUDE MTREE-H.ASM
;<86>   INCLUDE BTREE-H.ASM     ;DEBUG!!!
;<86>   INCLUDE DATA-H.ASM
;<86>   EXTRN   Trap:NEAR, InitMemory:NEAR, Fill:NEAR, FillPage:NEAR
;<86>   EXTRN   Compare:NEAR, FinishCell:NEAR, AllocPage:NEAR, FreePage:NEAR
;<86>   EXTRN   InsertInPage:NEAR, DelFromPage:NEAR, CheckMetaCellPtr:NEAR
;<86>   EXTRN   ScanToPrevItem:NEAR, Merge:NEAR, Search:NEAR, DelFromPage:NEA
;<86>   EXTRN   GetStaticPage:NEAR, ItemToCursor:NEAR, SuffixToCursor:NEAR
;<80>
        INCLUDE INF-H.I80
;<80>
        INCLUDE KERNEL-H.I80
;<80>
        INCLUDE CELL-H.I80
;<80>
        INCLUDE MTREE-H.I80
;<80>
        INCLUDE BTREE-H.I80     ;DEBUG!!!
;<80>
        INCLUDE DATA-H.I80
;<80>
        EXTRN   Trap, InitMemory, AllocPage, Fill, FillPage, FinishCell
;<80>
        EXTRN   InsertInPage, DelFromPage, GetStaticPage, CheckMetaCellPtr
;<80>
        EXTRN   ScanToPrevItem, Merge, Search, DelFromPage, FreePage, Compare
;<80>
        EXTRN   ItemToCursor, SuffixToCursor
;
        PUBLIC  InitMetaTree, Insert, Insert1, Delete, Delete1, Find
        PUBLIC  DeChild, SubSpaceMetaFirst, SubSpaceMetaNext, SubSpaceMetaLas
```

```
        PUBLIC  SubSpaceMetaPrev, SkipRightToItem, SkipLeftToItem
        PUBLIC  MetaFirst, MetaFindFirst, MetaNext, MetaFindNext
        PUBLIC  MetaLast, MetaFindLast, MetaPrev, MetaFindPrev
        PUBLIC  RelocateItemsSamePage, RelocateItemsDiffPage
;
BEGIN   DB      'MTREE'         ;For 'need' macro.
;
;       Initialize the MetaTree. C=MetaLeafDataLen.
;
InitMetaTree
        PUSH    B               ;Save C=MetaLeafDataLen
        CALL    InitMemory      ;Initialize SegTab, FreeSeg...
        CALL    AllocPage
        MVI     L,0             ;HL-->InitialMetaRootPage.
        MVI     M,0             ;InitItem.PL:=0.
        INR     L
        POP     B
        INR     L               ;Skip over NIO momentarily.
        XRA     A
        MOV     M,A             ;Value:=0.
        INR     L
        MOV     B,C             ;B:=DataLen.
        CALL    Fill            ;DataArea:=0.
        MOV     A,L             ;HL-->AfterInitItem.
        MVI     L,1             ;HL-->InitItem.NIO.
        MOV     M,A             ;InitItem.NIO:=AfterInitItem.
        MVI     L,CAfterLastItem ;ALI:=AfterInitItem.
        MOV     M,A
        MVI     L,CDataLen
        MOV     M,B
        MVI     L,CLevel
        MVI     M,0
        MVI     L,CItemLimit
        MVI     M,CExpansionArea
        CALL    FinishCell      ;Clean it up, do CheckSum...
        ;
        ;       Point MetaRootPage at newly created page.
        ;
        MOV     A,H
        STA     MetaRootPage
        ;
        ;       Zero the ParentTab.
        ;
        XRA     A
        MVI     H,HI ParentOffsetTab
        CALL    FillPage
        XRA     A
        MVI     H,HI ParentPageTab
        CALL    FillPage
        RET
;
;       Insert an item into the database.  DE-->Cursor.
;  B=CursorLen.  DataPtr-->DataArea for new Item.
```

```
;       If cell grows too big, i.e. items would cover over
;  important info at end of cell, then we split cell.
;       For now, concurrency is limited: Insert is atomic, and
;  we disable switching to other tasks that are using Insert
;  or other functions at the same time.  This is done by
;  requesting the database semaphore at the beginning and
;  releasing it at the end of each database operation.
;  When splitting or loading of a cell from disk occurs, this
;  policy becomes troublesome.
;
Insert  MOV     A,B                 ;Don't accept too-long items.
        CPI     MaxItemLen
        JNC     BadParameters
        ;
        PUSH    D                   ;Preserve DE-->Cursor.
        CALL    Find                ;Find Cursor in leaf cell.
        POP     D                   ;Find sets CursorLen.
        CC      Trap
        ORA     A                   ;Zero return is exact match.
        RZ                          ;Ret/ already there.
;
;       Insert entry point for after a Find.
;  DE-->Cursor, CursorLen = length of DE-->Cursor,
;  HL-->where to Insert, as returned by Find or Search,
;  C=MatchLen, as returned by Find or Search,
;  DataPtr-->DataArea for new Item.
;
Insert1 MVI     A,0FFH
        STA     FixPTFlag
        CALL    InsertInPage        ;Insert it in page.
        RNC                         ;ret/ success. SHOULD UNDO SPLIT!!!
        CPI     SplitDoneErr        ;An error.  Was it SplitDone?
        CNZ     Trap                ;trap/ no split!
        ;
        LXI     H,ChildPage         ;A one byte DataArea
        SHLD    DataPtr             ;consisting of just ChildPage.
        LDA     RightCellPage
        STA     ChildPage
        ;
        LDA     LeftCellPage        ;Left cell's ParentTabEntry
        MOV     L,A                 ;is still correct.
        MVI     H,HI ParentPageTab
        MOV     H,M
        INR     H
        DCR     H                   ;H=ParentPage.
        JNZ     Ins2                ;Jmp/ just split non-root cell.
        ;
        ;       Just split Root.
        ;
        LDA     LeftCellPage        ;Validity check: LeftCell=
        MOV     B,A                 ;MetaRoot.
        LDA     MetaRootPage
        CMP     B
```

```
CNZ     Trap
;
;       We just split root.  Create a new one above it.
;   CursorLen is set.  Our use of GetPage here is a
;   cyclic dependency: GetStaticPage is provided by the
;   BTree system, which rests on top of the MetaTree.
;   It Allocates or Preempts a Page and makes it
;   Static (Non-Preemptable.)
;
CALL    GetStaticPage           ;H=L=NewRootPage.
CC      Trap
;
MVI     D,HI ParentOffsetTab
MOV     E,H             ;Fix Parent of new MetaRoot
XRA     A
STAX    D               ;MetaRoot has no Parent, so
INR     D               ;ParentTab entry is zero.
STAX    D
;
XRA     A               ;Build ZeroInitItem.
MOV     L,A
MOV     M,A             ;PrefixLen:=0
INR     L
MVI     M,4             ;NextItemOffset:=4
INR     L
MOV     M,A             ;Suffix:=0
INR     L
LDA     LeftCellPage
MOV     M,A             ;PageNum:=LeftCellPage
;
MOV     E,A             ;Now fix ParentTab
MVI     D,HI ParentOffsetTab
XRA     A
STAX    D               ;Fix POT
INR     D
MOV     A,H
STAX    D               ;Fix PPT
;
MOV     D,E
MVI     E,CLevel        ;Bottom of ExpansionArea
MOV     L,E
LDAX    D
INR     A               ;RootLevel:=LeftCell.Level+1
MOV     M,A
INR     L
MVI     M,1             ;DataLen:=1
INR     L
MVI     M,4             ;AfterLastItem:=4
INR     L
MVI     M,CLevel        ;ItemLimit:=CLevel
MOV     A,H
STA     MetaRootPage
CALL    FinishCell
```

```
        ;
        ;  Got a parent page in H.
        ;
Ins2    LDA     RightCellPage    ;We must insert into parent.
        MOV     D,A              ;D=PageNum of cell to insert.
        MVI     E,CDataLen
        LDAX    D
        MOV     B,A              ;B=RightCellDataLen.
        MVI     E,1              ;DE-->RightCellInitItemNIO.
        LDAX    D
        INR     E                ;DE-->RightCellInitItemText.
        SUB     B
        SUI     2                ;A=RightCellInitItemTextLen.
        STA     CursorLen        ;Setup CursorLen.
        MVI     C,0              ;Initial MatchLen=0.
        MOV     L,C              ;Search from beginning.
        PUSH    D                ;Save DE-->WhatToInsert.
        CALL    Search           ;Find insert spot in page.
        POP     D
        CC      Trap
        ORA     A
        JNZ     Insert1          ;Jmp/ not found: OK.
        CALL    Trap
        RET
;
;       RelocateItems is a Cell level Function that is
;  redefined by MetaTree to handle the ParentTable.
;
;       Relocate the NextItemOffsets of a group of items
;  starting at HL and going to C.  B is the positive or
;  negative relocation distance.  The ParentTab is also
;  updated for the cells whose child pointers are in
;  the relocated items.  RISamePage assumes the relocation
;  occurs within a single page, so it skips the updating
;  of the ParentPageTab.  RIDiffPage updates both PPT and POT.
;  For use on BTree cells, FixPTFlag can be set zero and
;  no ParentTab updating occurs. Preserves HL,DE,BC.
;       Note that the items have already been moved, so their
;  NIOs must be adjusted while we follow the item sequence.
;
RelocateItemsSamePage
        LDA     FixPTFlag
        ORA     A
        JZ      RelocateItems
        ;
        ;       Validity Check: Can't fix PT on BCells.
        ;
        IF      PtrValidity
        CALL    CheckMetaCellPtr ;Traps if not HL-->MetaCell.
        ENDIF
        ;
        MOV     A,L
        CMP     C
```

```
        RNC
        ;
        PUSH    H
        PUSH    D
        MVI     D,HI ParentOffsetTab
RISPO   MOV     E,L                 ;5 Save CurrentItemOffset.
        INR     L                   ;5
        MOV     A,M                 ;7 Get NextItemOffset.
        ADD     B                   ;4 Relocate it by B amount.
        MOV     M,A                 ;7 Put it back in item.
        MOV     L,A                 ;5 Go to next item.
        MOV     A,E                 ;5 A=ItemOffset.
        DCR     L                   ;5
        MOV     E,M                 ;7 DE-->POT[ChildPage]
        INR     L                   ;5
        STAX    D                   ;7 POT[ChildPage]:=ItemOffset
        MOV     A,L                 ;5
        CMP     C                   ;4 C=RelocationEnd.
        JC      RISPO               ;10 = 81
        POP     D
        POP     H
        RET
;
RelocateItemsDiffPage
        LDA     FixPTFlag
        ORA     A
        JZ      RelocateItems
        ;
        IF      PtrValidity
        CALL    CheckMetaCellPtr ;Traps if not HL-->MetaCell.
        ENDIF
        ;
        MOV     A,L
        CMP     C
        RNC
        ;
        PUSH    H
        PUSH    D
        MVI     D,HI ParentOffsetTab
RIDPO   MOV     E,L                 ;5 Save CurrentItemOffset.
        INR     L                   ;5
        MOV     A,M                 ;7 Get NextItemOffset.
        ADD     B                   ;4 Relocate it by B amount.
        MOV     M,A                 ;7 Put it back in item.
        MOV     L,A                 ;5 Go to next item.
        MOV     A,E                 ;5 A=ItemOffset.
        DCR     L                   ;5
        MOV     E,M                 ;7 DE-->POT[ChildPage]
        INR     L                   ;5
        STAX    D                   ;7 POT[ChildPage]:=ItemOffset
        MOV     A,H                 ;5
        INR     D                   ;5 DE-->PPT[ChildPage]
        STAX    D                   ;7 PPT[ChildPage]:=ItemPage
```

```
        DCR     D               ;5
        MOV     A,L             ;5
        CMP     C               ;4 C=RelocationEnd.
        JC      RIDPO           ;10 = 103
        POP     D
        POP     H
        RET
;
;  RelocateItems without fixing ParentTab.
;
RelocateItems
        MOV     A,L
        CMP     C
        RNC
        ;
        PUSH    H
RI1     INR     L               ;5
        MOV     A,M             ;7 Get NextItemOffset.
        ADD     B               ;4 Relocate it by B amount.
        MOV     M,A             ;7 Put it back.
        MOV     L,A             ;5
        CMP     C               ;4 C=AfterLastItem to be moved.
        JC      RI1             ;10 = 42
        POP     H
        RET
;
;       Unlink child from HL-->ParentItem.
;  Pres HL,DE,BC.
;
DeChild LDA     FixPTFlag
        ORA     A
        RZ
        PUSH    H
        itempn
        MOV     A,M
        MVI     M,0             ;ParentItem.ChildPage:=0.
        MOV     L,A
        MVI     H,HI ParentOffsetTab
        MVI     M,0             ;ParentOffsetTab[ChildPage]:=0
        INR     H
        MVI     M,0             ;ParentPageTab[ChildPage]:=0
        POP     H
        RET
;
;       Delete the DE,B-->Cursor from the MetaTree.  The Null
;  item and Zero item cannot be deleted (there can never be a
;  Null item, and there must always be a Zero item.)
;
Delete  MOV     A,B             ;Can't delete the null item.
        CPI     1+1
        JNC     Del0            ;Jmp/ Len>1
        ORA     A
        JZ      BadParameters   ;Jmp/ Len=0. Can't del Nil.
```

```
        LDAX    D               ;Len=1. Don't delete 0 item.
        ORA     A
        JNZ     Del0            ;Jmp/ Not ZeroItem.
        ;
BadParameters
        CALL    Trap
        RET
        ;
        ;  Item is of legal format.  Find it.
        ;
Del0    CALL    Find            ;HL-->LeafItem.
        CC      Trap
        ORA     A               ;NOT CARRY.
        RNZ                     ;Ret/ already deleted.
        ;
        ;       Entry point for after Find.  HL-->where to
        ;  insert, as returned from Find or Search.
        ;
Delete1
        ;
        ;       DEBUG!!! Prevent deletion of GroundCell. Does this
        ; interfere with BClose?
        ;
        IF      0
        MOV     A,M
        ORA     A
        JNZ     Del1Debug
        PUSH    H               ;PrefixLen==0.  If ItemInitByte>=GCLevel,
        INR     L               ;then we are deleting GroundCellPairItem!
        INR     L
        MOV     A,M
        CPI     GroundCellLevel
        CNC     Trap
        POP     H
Del1Debug
        ENDIF
        ;
        MVI     A,0FFH          ;Fix ParentTab.
        STA     FixPTFlag
        CALL    DelFromPage     ;Del HL-->Item from its page.
        RC                      ;Pres H.
        ;
        PUSH    H
        MOV     L,H
        MVI     H,HI ParentOffsetTab
        MOV     C,M
        INR     H
        MOV     B,M             ;BC-->MetaParentItem.
        POP     H
        MOV     A,B
        ORA     C
        JZ      DelAtRoot       ;Jmp/ at root.
        INR     C
```

```
        LDAX    B
        MOV     C,A
        MOV     D,B             ;BC-->AfterParentItem.
        MVI     E,CAfterLastItem ;DE-->ParentCellALI.
        LDAX    D               ;A=ParentCellALI.
        CMP     C               ;Is there a sibling to right?
        JNZ     Del2            ;Jmp/ yes. go try merge/bal.
        ;
        ;       No right sibling.  Delete cell if empty.
        ;
        MOV     D,H             ;E=CAfterLastItem already.
        LDAX    D
        ORA     A               ;Is ALI=0? (NOT CARRY)
        RNZ                     ;Ret/ ALI<>0: not empty.
        MOV     L,H             ;Free the now empty page.
        CALL    FreePageFixPT   ;Free L page. Keep DE,BC.
        MOV     H,B
        MOV     L,C             ;HL-->NextParentItem.
        CALL    ScanToPrevItem  ;Preserves HL,DE,B. C=PrevItem.
        MOV     L,C             ;HL-->ParentItem.
        JMP     Delete1         ;Go delete ParentItem.
        ;
        ;       There is a sibling to right.
        ;  BC-->AfterParentItem, HL-->LeftCellPage.
        ;
Del2    MOV     E,C             ;BC,DE-->AfterParentItem.
        INR     E
        LDAX    D
        MOV     E,A             ;DE-->AfterNextParentItem.
        DCR     E               ;DE-->NextParentItem.PageNum=
        LDAX    D               ;A=RightSiblingPage.
        MOV     D,A             ;DE-->RightSiblingPage.
        PUSH    B
        CALL    Merge           ;Merge H,D pages if possible.
        POP     B
        JNC     Del20           ;Jmp/ merged.
        CPI     MergeTooFullErr ;Got proper error?
        CNZ     Trap
        RET                     ;Did no merge: done.
Del20   PUSH    B
        MOV     L,D             ;Free the right cell.
        CALL    FreePageFixPT   ;Preserves DE,BC.
        POP     H               ;HL-->NextParentItem.
        JMP     Delete1         ;Delete NextParentItem.
        ;
        ;       We just deleted from the root.  If root now
        ;  has one item in it, then delete it, making the cell
        ;  pointed at be the new root.  HL-->Root.
        ;
DelAtRoot
        MVI     L,CAfterLastItem
        MOV     A,M
        MVI     L,1
```

```
        CMP     M               ;If InitItem.NIO=ALI, 1 item.
        STC
        CMC
        RNZ                     ;Ret/ multiple items. Done.
        MOV     L,M
        DCR     L
        MOV     C,M             ;C=ChildPage=NewRoot.
        MVI     L,CLevel        ;If at level 0, don't free it.
        MOV     A,M
        ORA     A
        RZ                      ;Ret/ at level 0. NOT CARRY.
        MOV     A,C
        STA     MetaRootPage    ;Set new MetaRoot.
        MVI     B,HI ParentOffsetTab
        XRA     A               ;The MetaRoot has no parent.
        STAX    B
        INR     B
        STAX    B
        MOV     L,H             ;Free old MetaRoot.
        MVI     A,0FFH
        STA     FixPTFlag       ;Fall through into FPFPT...
;
FreePageFixPT
        LDA     FixPTFlag
        ORA     A
        JZ      FreePage
        MVI     H,HI ParentOffsetTab
        MVI     M,0             ;Free pages have no parent.
        INR     H
        MVI     M,0
        JMP     FreePage
;
;       MetaFirst, MetaNext with SubSpace checking.
;  If we would change Cursor within the SubSpace, i.e., some
;  bytes of the SubSpace Prefix would change, we return
;  SubSpaceErr without changing the Cursor.  (SSMFN does
;  return HL-->NextItem though).
;       Doesn't work for C=0, because there can be no NullItem.
;  Doesn't work for C=1, because then we return EndOfDBErr
;  instead.
;       DE,B-->Cursor, C=SubSpacePrefixLen. Return NOT CARRY:
;  Cursor updated, DE-->AfterCursor.
;
SubSpaceMetaFirst
        CALL    SubSpaceMetaFindFirst
        RC
        JMP     SuffixToCursor
        ;
SubSpaceMetaFindFirst
        MOV     A,B
        CMP     C               ;B must be >=C.
        MVI     A,SubSpaceErr
        RC
```

```
        ;
        CALL    MetaFindFirst
        JMP     SSMFNO
        ;
SubSpaceMetaNext
        CALL    SubSpaceMetaFindNext
        RC
        JMP     SuffixToCursor  ;Return DE-->AfterCursor.
        ;
SubSpaceMetaFindNext
        MOV     A,B
        CMP     C               ;B must be >=C.
        MVI     A,SubSpaceErr   ;This is really bad params.
        RC
        ;
        CALL    MetaFindNext
SSMFNO  JNC     SSMFN1
        CPI     EndOfDBErr
        STC
        RNZ
        MVI     A,SubSpaceErr   ;Convert to SubSpaceErr.
        RET
        ;
SSMFN1  MOV     A,C             ;A:=C=SubSpacePL
        SUB     M               ;If NextPL>=SubpacePL, OK.
        RZ                      ;Ret/ Outside of SubSpace.
        CMC
        RNC                     ;B=NewCursorLen, DE-->AfterCurs
        PUSH    H               ;A:=SubSpacePL-NextPL
        PUSH    D               ;=#Bytes of overlap which must
        PUSH    B               ;be equal.
        MOV     C,A
        MOV     A,E
        ADD     M
        MOV     E,A             ;DE-->Cursor[NextPL]
        INR     L
        INR     L
        CALL    Compare         ;Compare SubSpacePL Bytes.
        POP     B
        POP     D
        POP     H
        RZ                      ;If equal, still in SubSpace.
        MVI     A,SubSpaceErr
        STC
        RET
;
SubSpaceMetaLast
SubSpaceMetaPrev
SubSpaceMetaFindLast
SubSpaceMetaFindPrev
        MVI     A,NotImplErr
        STC
        RET
```

```
;
;       MetaFirst finds MetaTree item that is nearest greater
;  than or equal to the DE-->Cursor and copies it over
;  Cursor, 'moving' the Cursor up to the NGEItem.
;  B=CursorLen.  Return as from SuffixToCursor.
;
MetaFirst CALL  MetaFindFirst
        RC
        JMP     SuffixToCursor  ;Copy NextItem to Cursor.
;
MetaFindFirst
        PUSH    D
        PUSH    B
        CALL    Find
        POP     B
        POP     D
        RC
        ORA     A
        RZ                      ;Ret/ already at EqualItem.
        JMP     SkipRightToItem ;Justify to NextItem.
;
;       MetaNext finds MetaTree item that is nearest greater
;  than but not equal to the DE-->Cursor and copies it over
;  Cursor, 'moving' the Cursor up to the NGTItem.
;  B=CursorLen.  Return as from SuffixToCursor.
;
MetaNext CALL   MetaFindNext
        RC
        JMP     SuffixToCursor
;
MetaFindNext
        PUSH    D
        PUSH    B
        CALL    Find
        POP     B
        POP     D
        RC
        ORA     A
        JNZ     SkipRightToItem ;Jmp/ not equal.
        afteritem
        JMP     SkipRightToItem ;Justify to NextItem.
;
;       MetaLast finds MetaTree item that is nearest less
;  than or equal to the DE-->Cursor and copies it over
;  Cursor, 'moving' the Cursor back to the NLEItem.
;  B=CursorLen.  Return as from SuffixToCursor.
;
MetaLast CALL   MetaFindLast
        RC
        JMP     ItemToCursor
        ;
MetaFindLast
        PUSH    D
```

```
        PUSH    B
        CALL    Find
        POP     B
        POP     D
        RC
        ORA     A
        RZ
        CALL    SkipLeftToItem
        CALL    ScanToPrevItem
        MOV     L,C
        RET
;
;       MetaPrev finds MetaTree item that is nearest less
;  than but not equal to the DE-->Cursor and copies it over
;  Cursor, 'moving' the Cursor back to the NLTItem.
;  B=CursorLe.  Return as from ItemToCursor.
;
MetaPrev CALL   MetaFindPrev
        RC
        JMP     ItemToCursor
;
MetaFindPrev
        PUSH    D
        PUSH    B
        CALL    Find
        POP     B
        POP     D
        RC
        CALL    SkipLeftToItem
        CALL    ScanToPrevItem
        MOV     L,C
        RET
;
;       Skip rightwards from the HL-->item until
;  HL-->SomeItem.  HL therefore does not point after the
;  last item within a cell, although if it points after
;  the last item in the database, we return EndOfDBErr.
;  Preserves DE,BC.
;
SkipRightToItem
        MOV     A,L
        MVI     L,CAfterLastItem
        CMP     M
        MOV     L,A
        STC
        CMC
        RNZ                     ;Ret/ already at NGTItem.
SRTI1   LDA     MetaRootPage
        CMP     H               ;Are we at root?
        JZ      EndOfDB         ;If so, end of database.
        MOV     L,H             ;Go up to parent.
        MVI     H,HI ParentOffsetTab
        MOV     A,M             ;A=Offset of ParentItem.
```

```
        INR     H
        MOV     H,M             ;H=Page of ParentItem.
        MOV     L,A             ;HL-->ParentItem.
        INR     L
        MOV     A,M             ;HA-->AfterParentItem.
        MVI     L,CAfterLastItem
        CMP     M               ;If AfterParentItemOffset<
        JZ      SRTI1           ;ParentALI,then go down.
        MOV     L,A
        ;
        ;       HL-->SuccessorItem at some level.  Follow down
        ;  to leaf.
        ;
STNGT3
        itempn
        MOV     H,M             ;HL-->ChildPage
        MVI     L,CLevel        ;Are we at leaf level yet?
        MOV     A,M
        MVI     L,0             ;HL-->InitItem
        ORA     A
        JNZ     STNGT3          ;Jmp/ not a leaf yet.
        RET                     ;NOT CARRY.
        ;
EndOfDB MVI     A,EndOfDBErr    ;If so, end of database.
        STC
        RET
;
;       SkipLeftToItem guarantees that HL-->EndOfSomeItem,
;  by moving between cells if necessary.  If we are skipping
;  left from the beginning of the DataBase, we return
;  StartOfDBErr, because there is no item to the left.
;  Preserves DE,BC.
;
SkipLeftToItem
        MOV     A,L
        ORA     A               ;NOT CARRY.
        RNZ                     ;Ret/ L>0.
        ;
        ;       Must find predecessor page.  We find it by
        ;  finding the predecessor Item in ParentPage.
        ;
SLTI1   LDA     MetaRootPage    ;We rarely loop.
        CMP     H
        JZ      StartOfDB       ;Jmp/ there is no parent!
        MOV     L,H
        MVI     H,HI ParentOffsetTab
        MOV     A,M
        INR     H
        MOV     H,M
        MOV     L,A             ;If at InitItem,
        ORA     A               ;we have to move upwards.
        JZ      SLTI1           ;Jmp/ at InitItem. Move up.
        ;
        ;       Move downwards.  L>0. Level>0.
        ;
SLTI2   DCR     L               ;L>0 by JZ above, ALI below.
        MOV     H,M             ;HL-->PrevPage.
        MVI     L,CLevel
        MOV     A,M             ;A=Level.
        MVI     L,CAfterLastItem ;Goto last child in cell.
        MOV     L,M
        ORA     A
        JNZ     SLTI2           ;Jmp/ still at index level.
```

```
        RET                             ;NOT CARRY (by ORA A).
        ;
StartOfDB MVI   A,StartOfDBErr
        STC
        RET
;
;       Find, in the Meta-Tree, the leaf page address
;  where a given Cursor belongs, if it were to be inserted.
;  If this Cursor is already in the MetaTree as an item, then
;  we return NOT CARRY, and A=0.  If the Cursor is not in the
;  MetaTree, but it is a prefix of the item following it,
;  return NOT CARRY, and A=PrefixMatchErr.  If the Cursor is
;  not in the MetaTree and is not a prefix of the item
;  following it, or else there is no item following it in the
;  same page, return NOT CARRY, and A=NoMatchErr.  Unexpected
;  errors return with CARRY.
;       DE-->Cursor, B=CursorLen.  Return CursorLen:=B.
;  In all NOT CARRY cases, we ret HL-->Leaf item that is
;  Nearest Greater than or Equal to Cursor, or else after
;  the last item in the page, DE-->CursorSuffix, C=NewMatchLen.
;
Find    MOV     A,B
        STA     CursorLen
        LDA     MetaRootPage    ;MetaRoot always in RAM.
        MOV     H,A
F0      MVI     L,0             ;Start at first item.
        MVI     C,0             ;InitialMatchLen=0.
        MOV     B,L
        MVI     L,CLevel
        MOV     A,M
        ORA     A
        MOV     L,B
        JZ      Search          ;Jmp/ search leaf and return.
        ;
        PUSH    D               ;FOR NOW!!! No saving of the
        CALL    Search          ;prefix matching between
        POP     D               ;levels.
        RC
        ORA     A
        JNZ     F1              ;Jmp/ PartMatch or NoMatch.
        afteritem               ;ExactMatch:
F1      ;
        ;  Move back to DataArea of previous item, get the
        ;  PageNum, go down a level, and keep searching.
        ;       We will never have to move back to the
        ;  DataArea before the initial item (there is none
        ;  there) because the root and left tree edge have a
        ;  null initial item and all other cells are only
        ;  searched if their first item is equal to or less
        ;  than the Cursor being searched for.  (The leaf
        ;  cells may, however, have an InitItem greater than
        ;  the item that points at them, but we never get
        ;  to this point if we are looking at a leaf.)
        ;  HL-->current item, A=err.
        ;
        MOV     A,L
        DCR     L               ;HL-->PageNum of child.
        MOV     H,M             ;Go down a level.
        ORA     A               ;Are we at initial item?
        JNZ     F0              ;Keep searching.
        CALL    Trap            ;Can't be here with a LeafCell.
        RET
;
        END
```

```
;*********************************************************
;*                                                       *
;*          Infinity Database Operating System           *
;*                   Cell Allocator                      *
;*                                                       *
;*      Allocate Cells on disk in a localized fashion.   *
;*                                                       *
;* Copyright (C) 1982,1983,1984,1985,1986 Roger L.       *
;* Deran. All rights reserved.                           *
;*                                                       *
;*********************************************************
;
;<86>   INCLUDE C:INF-H.ASM
;<86>   INCLUDE C:KERNEL-H.ASM
;<86>   INCLUDE C:CELL-H.ASM
;<86>   INCLUDE C:MTREE-H.ASM
;<86>   INCLUDE C:BTREE-H.ASM
;<86>   INCLUDE C:DATA-H.ASM
;<86>   EXTRN   Trap:NEAR, Modulus:NEAR, DSUB:NEAR, PowerTwo:NEAR,
CheckCell:NEAR
;<86>   EXTRN   GetGroundCellNum:NEAR, FillShort:NEAR, FillPage:NEAR
;<86>   EXTRN   MovePage:NEAR, ScanPageNotEqual:NEAR, FindZeroBit:NEAR
;<86>   EXTRN   CheckGroundCell:NEAR, DDIV8:NEAR, DCMP:NEAR, Mul8:NEAR
;<86>   EXTRN   IncLong:NEAR, DecLong:NEAR, SysReadCell:NEAR
;<80>
        INCLUDE C:INF-H.I80
;<80>
        INCLUDE C:KERNEL-H.I80
;<80>
        INCLUDE C:CELL-H.I80
;<80>
        INCLUDE C:MTREE-H.I80
;<80>
        INCLUDE C:BTREE-H.I80
;<80>
        INCLUDE C:DATA-H.I80
;<80>
        EXTRN   Trap, Modulus, DSUB, PowerTwo, GetGroundCellNum, FillShort
;<80>
        EXTRN   CheckCell, FillPage, MovePage, ScanPageNotEqual, FindZeroBit
;<80>
        EXTRN   CheckGroundCell, DDIV8, DCMP, Mul8, IncLong, DecLong
;
        PUBLIC  InitCellAlloc, CreateCellAlloc, LogInCellAlloc,
LogOutCellAlloc
        PUBLIC  AllocCell, AllocCell1, DeallocCell, DeallocCell1,
CommitCellAlloc
        PUBLIC  ClearOldCellMap, ClearNewCellMap, SetNewCellMapBit
        PUBLIC  TestOldCellMapBit, IncCellNum
        PUBLIC  WarnokBuildCellMap, FastBuildCellMap
;
BEGIN   DB      'ALLOC'         ;Label for 'need' macro.
;
```

```
;       **** Data ****
;
FBCMLevel       DS      1
FBCMWarnokFlag  DS      1       ;Use Warnok-like fast algorithm
FBCMWarnokChangeFlag DS 1       ;>0: keep doing Warnok loop.
;
FBCMCellNum DS  MaxCellNumSz
                need    256
FBCMCell        DS      256
;
KPerCellMapPage EQU     512
        ;8CellsPerMapByte*256BytesPerMapPage/4CellsPerK
CellMapPages EQU        8192/KPerCellMapPage
;
;       For now, there is only one volume, and it has
;  permanent CylinderSize and derivative CylinderRotation.
;
CylSz   DB      64      ;For SA1000...
CylRot  DB      0       ;For SA1000...
;
        need    100
CellAllocCursor DS 100
;
        need    256
        PUBLIC  OldCellMap
OldCellMap DS   256*CellMapPages
        PUBLIC  NewCellMap
NewCellMap DS   256*CellMapPages
;
;       Cell allocation maps are bit maps, 2048 bits per
;  Cell of the map.  The TwoPhase index update protocol
;  requires two bit maps, NewCellMap and OldCellMap, in order
;  to prevent immediate re-use of deallocated Cells within the
;  same phase.  At the first write reference of an on-disk
;  CellMapCell, we read the Cell and copy it in RAM to produce
;  the two maps.  Both copies have a Cell on disk permanently
;  associated with them, but only the NewCellMap version is
;  significant, OldCellMap being just a temporary workspace
;  during a phase.  Allocation consists in searching the
;  OldCellMap for a zero, then turning on the corresponding bit
;  in both maps.  If the corresponding bit in NewCellMap was
;  already on, we have an error.  Deallocation uses only
;  NewCellMap; we turn off an addressed bit (no scan).
;  If the bit was already off, we have an error.
;         On commit, we force out all NewCellMapCells, delete
;  all OldCellMapCells from RAM, and write a validity marker.
;  The validity marker is used in order to guarantee the
;  consistency of the maps.  We write an invalidity marker
;  before modifying the maps, and then a validity marker after
;  they have been brought into agreement with the most recently
;  completed phase.  The next phase can begin before the
;  validity marker is written, in which case we forget about
;  the validity marker until the end of the next phase.
```

```
; The bitmaps are not considered reliable, and they are
; reconstructed during power-on if the validity marker is
; absent.
;       For now, both BitMaps are RAM-resident and always
; reconstructed on power-up.
;
InitCellAlloc
        RET
;
;       Create new, empty CellMaps for a Volume.  We pre-
; allocate everything from Cell 0 to GroundCell in order to
; preserve any O.S. dependent directories etc.
;       For now, only one volume is supported...
;       For now, CellMapLen is fixed at CellMapPages*256...
;
CreateCellAlloc
        CALL    ClearOldCellMap
        CALL    ClearNewCellMap
        ;
        ;       PreAlloc the GroundCell and all the Cells
        ; before it.  The previous Cells are usually directory
        ; information of some kind.
        ;
        LXI     H,CellAllocCursor
        CALL    GetGroundCellNum
        ;
CCA3    LXI     H,CellAllocCursor
        CALL    SetOldCellMapBit
        ;
        LXI     H,CellAllocCursor
        CALL    SetNewCellMapBit
        ;
        LXI     H,CellAllocCursor
        CALL    DecCellNum
        JNC     CCA3
        XRA     A
        RET
;
;       Write the CellMap to disk and write a validity
; indicator afterwards.  We leave the CellAlloc system
; 'Logged-In'.  This is called after IndexUpdate has
; committed the BTree.
;       For now, the CellMap is not stored on disk, so we do
; nothing.
;
CommitCellAlloc
        JMP     MoveNewToOld    ;OldCellMap:=NewCellMap.
;
;       LogIn a CellMap so we can do AllocCell/DeallocCell
; on an existing BTree.  This is part of the BLogIn
; function on a BTree.
;       For now, we don't store any CellMap on disk, so we
; have to reconstruct it from the on-disk BTree...  Somehow,
```

```
;  we must ensure no updates are occurring to the disk during
;  the reconstruction.
;
LogInCellAlloc
        JMP     WarnokBuildCellMap
;
;       LogOut a CellMap.  Write it to disk if necessary.
;  This is part of the BLogOut function for a BTree.
;       For now, this does nothing, since the CellMap is not
;  stored on disk anyway.  Later, it should WriteCellAlloc,
;  then delete any static structures needed to support paging
;  of the CellMap.
;
LogOutCellAlloc
        RET
;
;       HL-->Page.  Allocate a Permanent Storage Cell on
;  Disk for this page.  The Page is guaranteed to be pointed at
;  by a MetaTreeLeaf, so we can find its entry via the
;  ParentTab.  The AllocBit in the MetaParent must be off, or
;  we Trap.  If the CellNum is non-zero already, we use its
;  value as a locality target.
;       Allocation is localized within Cylinders.  A fast
;  modulus function is used to find the Cylinder-relative
;  CellNum.
;
AllocCell
        metaparentflags
        MOV     A,M             ;A:=MetaParentItem.FlagByte.
        XRI     AllocBit
        CMP     M
        CC      Trap            ;Trap/ A<M. Was already on.
        MOV     M,A
        INR     L
        INR     L               ;HL-->AfterMetaParentItem.
        MOV     A,L
        MVI     L,CDataLen
        SUB     M
        MOV     L,A             ;HL-->MetaParentItem.CellNum
        ;
        ;       We could test for CellNum=0 to see if we
        ;  have a target, but for now we just allow 0 to be the
        ;  target!
        ;
        ;       Fall into AllocCell1...
        ;
;
;       Allocate a new CellNum.  The locality policy is
;  embodied in this code.  Only the BitMaps are affected,
;  not the MetaTree.
;       We Scan upwards over ranges of CellNums, so that
;  contiguous allocations will come out maximally linear.
;  Normally, these ranges are Cylinders farther and farther
```

```
;  away from the 'TargetCylinder', which is the Cylinder
;  containing the TargetCell.
;       Cylinder-at-a-time scanning is slower when CylSz is
;  small, but in that case we have a small, slow disk anyway.
;  If helical allocation is desired, it must be done here by
;  skipping a minimum number of sectors from the target, and
;  returning the allocated bit as new target.
;       For now, we just scan TargetCylinder from bottom to
;  top, and if that fails, we scan over entire map from
;  bottom to top...
;       For now, we just use a single array of bits!
;  For systems limited to 65,536 total Cells, such
;  as the Poly, we can do everything in a 16 bit reg...
;       HL-->TargetCellNum. Return NOT CARRY:
;  HL-->AllocedCellNum. Pres HL.  CARRY: Out of Disk Space
;
AllocCell1
        PUSH    H
        MOV     A,M
        INR     L
        MOV     H,M
        MOV     L,A             ;HL=*HL.
        CALL    AC0
        XCHG                    ;DE=AllocatedCellNum.
        POP     H
        RC
        MOV     M,E
        INR     L
        MOV     M,D
        DCR     L
        RET
        ;
        ;       Find TargetCylinderBase.
        ;
AC0     LDA     CylSz           ;For now, only one CylSize!
        MOV     C,A
        LDA     CylRot          ;CylRot = CylSz-(256 MOD CylSz)
        MOV     E,A             ;E:=CylRot.
        CALL    Modulus         ;A=Modulus. Pres BC,E,HL.
        MOV     E,A
        MVI     D,0
        CALL    DSUB            ;HL=TargetCylinderBaseCellNum.
        LDA     CylSz
        MOV     E,A             ;DE:=CylSz
        XCHG
        DAD     D
        XCHG
        DCX     D               ;DE=NextCylinderBaseCellNum-1.
        ;
        ;       Scan TargetCylinder.
        ;
        CALL    OldCellMapRange ;Check from HL to and incl. DE.
        JNC     AC1Found        ;Jmp/ found bit.
```

```
        ;
        ;       For now, do a simple scan of the entire map...
        ;  This is a worst-case trick guaranteed to succeed,
        ;  but with probably poor locality.
        ;
        LXI     H,0
        LXI     D,CellMapPages*2048-1
        CALL    OldCellMapRange
        RC                      ;Ret/ no zeroes: CARRY.
        ;
        ;       Turn on the corresponding bit in the
        ;  NewCellMap, fix up the CellNum in the MetaParentItem
        ;  and turn on the AllocBit.
        ;  DE=AllocatedCellNum, HL-->NonFFByte, C=ZeroBitNum.
        ;
AC1Found MOV    A,C
        PUSH    H               ;Save HL-->NonFFByte.
        CALL    PowerTwo        ;A:=2**A, Pres DE,BC.
        POP     H
        MOV     B,A             ;B=BitMask
        ORA     M
        MOV     M,A             ;Turn on the NewCellMapBit.
        PUSH    D               ;Save DE=CellNum.
        LXI     D,NewCellMap-OldCellMap ;Adjacent for now...
        DAD     D
        MOV     A,M
        ORA     B
        MOV     M,A             ;Turn on the OldCellMapBit.
        POP     H               ;Restore HL=CellNum.
        RET                     ;NOT CARRY (by ORA).
;
;       Scan the OldCellMap for a zero bit within a given
;  range.  HL=FirstCellNum, DE=LastCellNum.  Note this is an
;  interval of shape [].
;  Return NOT CARRY: DE=CellNumOfZeroBit, HL-->MapByte, C=Mask.
;  CARRY: no zeroes found.
;
OldCellMapRange
        PUSH    D
        MOV     A,L
        ANI     7
        MOV     C,A             ;Save C=BitInByte.
        CALL    CellNumToOffset ;HL=ByteOffset, Pres BC.
        LXI     D,OldCellMap    ;Scan in old map for zero bit.
        DAD     D               ;HL-->FirstByte, C=BitInByte.
        POP     D
        ;
        XCHG
        PUSH    D
        MOV     A,L
        ANI     7
        MOV     B,A             ;Save B=BitInByte.
        CALL    CellNumToOffset ;HL=ByteOffset, Pres BC.
```

```
        LXI     D,OldCellMap
        DAD     D
        POP     D
        XCHG                    ;DE-->LastByte, B=LastBit#
        ;
        CALL    ScanBitRange
        RC                      ;Ret/ no zeroes: CARRY.
        ;
        PUSH    H
        LXI     D,OldCellMap
        CALL    DSUB
        DAD     H
        DAD     H
        DAD     H
        MOV     A,C
        ORA     L               ;NOT CARRY.
        MOV     E,A
        MOV     D,H
        POP     H               ;HL-->NonFFByte, C=ZeroBitNum.
        RET                     ;Return DE=CellNum.
;
;       Scan for a zero bit in a range of bits in a packed
;  array of bits.  Scan goes upwards in memory, and from
;  lower towards more significant bits in the byte.
;  HL-->FirstByte, C=BitInFirstByte (bits 0..2),
;  DE-->LastByte, B=LastBitInLastByte (bits 0..2).
;  Note this is an interval of shape [].
;  Return NOT CARRY if a zero found, HL-->Byte, C=BitNum.
;
ScanBitRange
        MOV     A,D
        CMP     H
        JZ      ScanBitRangeInPage ;Jmp/ Scan single page.
        CC      Trap            ;Trap/ H>D.
        ;
        ;       Got to scan multiple pages.  Use ScanRSingle
        ;  once on first page, once on last.  Use faster full-
        ;  page scans for intermediate pages.
        ;
        PUSH    D
        PUSH    B
        MOV     D,H
        MVI     E,255
        MVI     B,7             ;Scan to end of Page.
        CALL    ScanBitRangeInPage
        JC      SBR00
        POP     D
        POP     D
        RET                     ;Return HL,C-->Bit.
SBR00   POP     B
        POP     D
        ;
SBR0    INR     H
```

```
        MVI     L,0             ;In case at LastPage, point
        MOV     C,L             ;at first bit.
        MOV     A,D
        CMP     H
        JZ      ScanBitRangeInPage ;Jmp/ do front of LastPage
        CC      Trap
        CALL    ScanBitInPage           ;Pres H,DE,BC.
        JC      SBRO
        RET
;
;       Scan for a ZeroBit within a Page.
;  HL-->Page.  Return found: NOT CARRY HL,C-->ZeroBit.
;  Pres H,DE,BC.
;
ScanBitInPage
        MVI     A,OFFH
        CALL    ScanPageNotEqual ;Skip OFFH bytes.
        STC
        RZ                      ;Ret/ CARRY: not found.
        MOV     A,M
        JMP     FindZeroBitElseTrap ;C:=BitNum. Pres HL,DE,B.
;
;       Scan for a ZeroBit within a SubRange of a Page.
;  HL,C-->FirstBit, DE,B-->LastBit.  Return found:
;  NOT CARRY, HL,C-->ZeroBit.
;
ScanBitRangeInPage
        MOV     A,D
        CMP     H
        CNZ     Trap
        MOV     A,E
        CMP     L
        CC      Trap            ;Trap/ HL>DE.
        JNZ     SBRIPO          ;Jmp/ multiple byte scan.
        ;
        ;       Range is within one byte.
        ;
        MOV     A,C             ;C=FromBitNum
        RRC
        RRC
        RRC
        ORA     B               ;A:=(FromBitNum SHL 3)+ToBitNum
        PUSH    H
        LXI     H,BitSpanTab
        ADD     L
        MOV     L,A             ;No carry possible.
        MOV     A,M             ;A=RangeMask.
        POP     H
        CMA
        ORA     M               ;Turn on out-of-range bits.
        INR     A
        JNZ     FindZeroBitElseTrap ;Jmp/ got zero bits.
        STC
```

```
        RET                          ;Ret/ CARRY: No zeroes.
        ;
        ;       Multiple-Byte within-Page range.
        ;
SBRIP0  MOV     A,M                  ;Quick check of first byte.
        INR     A
        JZ      SBRIP1               ;Jmp/ was 255: no zeroes.
        MOV     A,C                  ;Possible zero bit.
        PUSH    H
        CALL    PowerTwo             ;A:=2**A, Pres DE,BC.
        POP     H
        DCR     A                    ;A:=LowBitsMask
        ORA     M                    ;Get byte, turn on low bits.
        CPI     255                  ;Test remaining high bits.
        JNZ     FindZeroBitElseTrap ;Jmp/ Got ZeroBit.
        ;
        ;       Top of FirstByte has no zeroes.  Now do
        ;  high speed byte-for-byte scan.
        ;
SBRIP1  MOV     A,E
        SUB     L                    ;May be zero.
        CZ      Trap                 ;Trap/ not multi-byte range!
        CC      Trap
        MOV     C,A                  ;C:=NumBytesCoveringRange-1.
        INR     L                    ;Skip FirstByte, incl. LastByte
        CZ      Trap
        MVI     A,0FFH
        CALL    ScanPageNotEqual ;Within HL Page.
        STC
        RZ                           ;Ret/ End of Scan: CARRY.
        MOV     A,M
        JMP     FindZeroBitElseTrap
        ;
        ;       Found a possible difference, but it depends
        ;  on the low bits.
        ;
SBRIP2  MOV     A,B
        PUSH    H
        CALL    PowerTwo             ;A:=2**A, Pres DE,BC.
        POP     H
        DCR     A
        CMA
        ORA     A
        RAL                          ;A:=BitsAfterLastBit
        ORA     M                    ;Get byte, turn on UpperBits.
        CPI     0FFH
        STC
        RZ                           ;Ret/ no zeroes: CARRY.
        ;
        ;       A=MaskedByteContainingZeroBit, HL-->Byte.
        ;  Find ZeroBit and return its BitNum in C.
        ;
FindZeroBitElseTrap
```

```
        CALL    FindZeroBit     ;C:=BitNum. Pres HL,DE,B.
        RNC                     ;Ret/ got zero: NOT CARRY.
        CALL    Trap            ;Trap/ zero bit disappeared!
        RET                     ;Ret/ no zeroes: CARRY.
;
;       The BitRangeTab is 8 by 8 and could be triangular,
;  but is fully symmetrical for simplicity; thus indexes are
;  reversible.  The BitSpanTab contains the same information,
;  but the upper limit of the BitRange is a 'LastBit', not an
;  'AfterLastBit'.
;
        IF      0
        ;
        need    64
BitRangeTab
        DB        0,  1,  3,  7, 15, 31, 63,127
        DB        1,  0,  2,  6, 14, 30, 62,126
        DB        3,  2,  0,  4, 12, 28, 60,124
        DB        7,  6,  4,  0,  8, 24, 56,120
        DB       15, 14, 12,  8,  0, 16, 48,112
        DB       31, 30, 28, 24, 16,  0, 32, 96
        DB       63, 62, 60, 56, 48, 32,  0, 64
        DB      127,126,124,120,112, 96, 64,  0
        ;
        ENDIF
        ;
        need    64
BitSpanTab
        DB        1,  3,  7, 15, 31, 63,127,255
        DB        3,  2,  6, 14, 30, 62,126,254
        DB        7,  6,  4, 12, 28, 60,124,252
        DB       15, 14, 12,  8, 24, 56,120,248
        DB       31, 30, 28, 24, 16, 48,112,240
        DB       63, 62, 60, 56, 48, 32, 96,224
        DB      127,126,124,120,112, 96, 64,192
        DB      255,254,252,248,240,224,192,128
;
;       Deallocate the HL-->Page from Disk, and turn off
;  its AllocBit.
;       For now, we just use a single array of bits!
;  For systems limited to 65,536 total Cells, such
;  as the Poly, we can do everything in a 16 bit reg...
;
DeallocCell
        metaparentflags
        MOV     A,M
        ANI     NOT AllocBit    ;AllocBit:=0.
        MOV     M,A
        INR     L
        INR     L
        MOV     A,L
        MVI     L,CDataLen
        SUB     M
```

```
        MOV     L,A             ;HL-->MetaParentItem.CellNum
        ;
        ;       Entry for HL-->CellNum to deallocate.
        ;
DeallocCell1
        MOV     A,M
        INR     L
        MOV     H,M
        MOV     L,A             ;HL=CellNum.
        ;
        MOV     C,L             ;Save bit number in C.
        CALL    CellNumToOffset ;HL:=HL/8. Pres BC.
        LXI     D,NewCellMap
        DAD     D
        MOV     A,C
        PUSH    H               ;HL-->Byte in NewCellMap.
        CALL    PowerTwo        ;A:=2**A. Pres DE,BC.
        POP     H
        CMA                     ;Turn off masked bit.
        ANA     M
        MOV     M,A
        RET
;
;       A fast algorithm for reconstructing the CellMaps.
;  It uses the CellMaps themselves to keep track of and
;  linearize the reading order of the BBranchCells.  It is a
;  multi-pass algorithm where each pass has the job of reading
;  in all BCells of a certain level, in a single upwards scan
;  over the disk.  The scan is upwards-only because to go down
;  fast, we would have to skip down to each cylinder base and
;  then scan up.  Also, maybe unidirectional scan makes tapes
;  possible to use...
;       Both Maps start out zeroed.  Then, during each pass,
;  the BCells that have already been read on a previous pass
;  have <OldCellMapBit,NewCellMapBit>=10; those to be read in
;  the current pass have 11, and those to be read in the next
;  pass have 01.   As each 11 Cell is read, its bits are set
;  to 10, and the Cells it points are set 01 (It would be
;  possible to delay the 11 to 10 conversion and do it in a
;  single, efficient scan later, but the optional 'Warnok'
;  speedup below would not work).  If a pointed-at Cell is not
;  already 00, we have a double-mapping, and we can even tell
;  if the doubly-mapped Cell is at the proper level (01) or
;  the same level as its parent (11) or a level above the
;  Parent (10).  Of course, we can also read the doubly-mapped
;  Cell itself to determine its level, if we trust it.  After
;  each pass, there will be no 11s, and we turn all 01s into
;  11s.  At the end of the entire algorithm, OldCellMap is
;  correct, so we copy it onto NewCellMap and return.
;       We can increment a level counter during each pass;
;  it should correspond to the level numbers found in each
;  Cell read.  If this level validity check is not desired,
;  the algorithm can possibly be sped up further by the follow-
```

```
;  ing method, similar to the Warnok transitive closure algo-
;  rithm.  We set all pointed-at Cells to 11 directly (except
;  BLeafCells, which are set to 10 directly), and simply
;  iterating until there are no more 11 Cells.  This will
;  happen in no more passes than the level-by-level algorithm,
;  but it is difficult to say whether it will often actually
;  be fewer passes.  Locality will tend to reduce the passes,
;  and a disk having a pre-order traversal organization would
;  take one pass.
;       Using this algorithm for a CellMap checker rather than
;  builder would be easiest if the CellMap to be checked were
;  copied away somewhere and then compared with the built
;  CellMap.  We could then merge back in the bits for
;  ExternalCells and BadCells, if these are implemented such
;  that they are not pointed at by any BTree pointers (which
;  is likely due to potentially large numbers of
;  ExternalCells).
;       For now, we do all reads into a single static
;  FBCMCell.  Later, we should read-ahead as many Cells as
;  will fit in available memory and get rid of FBCMCell.
;
WarnokBuildCellMap
        XRA     A
        STA     FBCMWarnokChangeFlag ;No changes yet.
        ;
        MVI     A,0FFH
        JMP     FBCM0
FastBuildCellMap
        XRA     A
FBCM0   STA     FBCMWarnokFlag
        ;
        CALL    CreateCellAlloc ;Preallocates special Cells.
        CALL    ClearNewCellMap ;Make them into 10s.
        ;
        LXI     H,FBCMCellNum
        CALL    GetGroundCellNum
        LXI     H,FBCMCellNum
        LXI     D,FBCMCell
        CALL    SysReadCell     ;Get in the GroundCell
        CC      Trap            ;Trap/ no GroundCell...
        ;
        LXI     H,FBCMCell
        CALL    CheckGroundCell ;GroundCellBits=10, already.
        CC      Trap
        ;
        LXI     H,FBCMCell
        itemda
        PUSH    H               ;HL-->GroundCell.InitItem.DA
        CALL    SetNewCellMapBit
        POP     H
        CALL    SetOldCellMapBit ;Set RootBits=11: 'ToBeRead'
        ;
        LDA     FBCMCell+GBRootLevel ;A=BRootLevel.
```

```
        STA     FBCMLevel       ;InitLevelCounter.
        JMP     FBCM02
        ;
        ;       Top of pass loop.
        ;
FBCM01  LXI     H,FBCMLevel
        DCR     M
        ;
FBCM02  LDA     FBCMLevel
        ORA     A               ;Don't read Leaves.
        JZ      MoveOldToNew
        ;
        LXI     H,FBCMCellNum
        LDA     CellNumLen
        MOV     C,A
        XRA     A
        CALL    FillShort       ;FBCMCellNum:=0.
        ;
        CALL    FBCM1           ;Do a pass.
        ;
        ;       There should be no 11s.  Change 01s to 11.
        ;  In Warnok, there are only 11s, so skip it.
        ;
        LDA     FBCMWarnokFlag
        ORA     A
        JNZ     FBCM03          ;Jmp/ Warnok.
        CALL    OrNewOntoOld    ;Let CellMapHandler do it.
        JMP     FBCM01          ;Loop.
        ;
        ;       Warnok.  Don't OrNewOntoOld, but must test
        ;  FBCMWarnokChangeFlag.
        ;
FBCM03  LXI     H,FBCMWarnokChangeFlag
        MOV     A,M
        MVI     M,0             ;Reset change flag.
        ORA     A
        JNZ     FBCM01          ;Loop/ had a change.
        JMP     MoveOldToNew    ;Done: OldCellMap is correct.
        ;
        ;       Top of Cell read loop.  Find a 11 Cell
        ;  to read in.
        ;
FBCM1   LXI     H,FBCMCellNum
        CALL    TestOldCellMapBit ;Test the least likely first.
        RC                      ;Ret/ EOCellMap
        JZ      FBCM10          ;Jmp/ got 0x: next CellNum.
        LXI     H,FBCMCellNum ;Got 1x.
        CALL    TestNewCellMapBit
        CC      Trap            ;Can't have EOCellMap!
        CNZ     FBCM2           ;Call/ got 11: go read it.
        ;
FBCM10  LXI     H,FBCMCellNum
        CALL    IncCellNum      ;Pres DE,B.
```

```
        JNC     FBCM1
        CALL    Trap                ;CellNum Oflow!
        RET                         ;Ret/ Assume EOCellMap
        ;
        ;       Got a 11.  Read the FBCMCellNum Cell, check
        ;  its validity, make sure its level equals FBCMLevel,
        ;  set its CellMapBits=10, and set all the CellMapBits
        ;  for Cells it points at to 01.  Turn on the Warnok-
        ;  ChangeFlag to request another pass in the Warnok
        ;  algorithm.
        ;
FBCM2   MVI     A,0FFH
        STA     FBCMWarnokChangeFlag
        LXI     H,FBCMCellNum
        LXI     D,FBCMCell          ;Where we read Cells.
        CALL    SysReadCell         ;Bypasses MetaParentItem:
        CC      Trap                ;we don't know Cell's name...
        ;
        LXI     H,FBCMCell
        CALL    CheckCell
        CC      Trap
        ;
        LDA     FBCMWarnokFlag
        ORA     A
        JNZ     FBCM20              ;Jmp/ Level varies in Warnok.
        LXI     H,FBCMCell+CLevel ;Check Cell's Level.
        LDA     FBCMLevel
        CMP     M
        CNZ     Trap                ;Trap/ wrong level!
FBCM20  ;
        ;       Set Bits for the Cell we are working on to 10
        ;  from 11 to indicate in advance that we are done
        ;  with it.
        ;
        LXI     H,FBCMCellNum
        CALL    ClearNewCellMapBit
        CC      Trap
        ;
        ;       Top of bit setting loop for a Cell.
        ;
        LXI     H,FBCMCell
FBCM21  MOV     A,L
        MVI     L,CAfterLastItem
        CMP     M
        MOV     L,A
        RZ                          ;Ret/ end of Cell.
        ;
        INR     L
        MOV     L,M
        PUSH    H                   ;Save HL-->NextItem.
        MOV     A,L
        MVI     L,CDataLen
        SUB     M
```

```
        MOV     L,A
        PUSH    H                   ;Save HL-->Item.DataArea.
        CALL    TestNewCellMapBit ;Must be off.
        CNZ     Trap                ;Trap/ not off!
        POP     H
        PUSH    H
        CALL    TestOldCellMapBit ;Must be off, except
        CNZ     Trap                ;ExternalCells and BadCells.
        POP     H
        ;
        ;       Doing Warnok algorithm?
        ;
        LDA     FBCMWarnokFlag
        ORA     A
        JNZ     FBCM22              ;Jmp/ Warnok.
        ;
        ;       Regular algorithm.  Set pointed-at Cells to
        ;   01s from 00s so they'll be read in next pass.
        ;       HL-->Item.DataArea.
        ;
        CALL    SetNewCellMapBit ;Leave with 01 state.
        POP     H                   ;HL-->NextItem.
        JMP     FBCM21              ;Loop.
        ;
        ;       Warnok.  If above BTwigLevel, set these
        ;   pointed-at BBranchCells to 11s from 00s so they
        ;   will be read later in this pass or as soon as
        ;   possible.  If at BTwigLevel, set these pointed-at
        ;   BLeafCells to 10s from 00s, so they will not be
        ;   read at all.
        ;
FBCM22  PUSH    H
        CALL    SetOldCellMapBit ;All Cells get OldBit.
        POP     H
        MOV     C,L
        MVI     L,CLevel
        MOV     A,M
        MOV     L,C
        CPI     1
        JZ      FBCM23              ;Jmp/ At BTwigLevel.
        CC      Trap                ;Trap/ below BTwig!
        CALL    SetNewCellMapBit ;BLeaves:10, BBranches:11.
FBCM23  POP     H                   ;HL-->NextItem.
        JMP     FBCM21              ;Loop.
;
;       **** CellMap and BitMap Utilities ****
;
ClearNewCellMap
        MVI     H,HI NewCellMap
        JMP     COCM1
ClearOldCellMap
        MVI     H,HI OldCellMap
COCM1   XRA     A
```

```
        MVI     C,CellMapPages
COCMO   CALL    FillPage         ;Pres H,DE,BC,A.
        INR     H                ;For now CellMap contiguous...
        DCR     C
        JNZ     COCMO
        RET
;
;       Copy the NewCellMap onto the OldCellMap.
;
MoveOldToNew
        MVI     H,HI OldCellMap
        MVI     D,HI NewCellMap
        JMP     MNTO1
MoveNewToOld
        MVI     H,HI NewCellMap
        MVI     D,HI OldCellMap
MNTO1   MVI     C,CellMapPages  ;>0
MNTO2   CALL    MovePage        ;Pres H,D,BC.
        INR     H
        INR     D
        DCR     C
        JNZ     MNTO2
        RET
;
;       Do a high-speed ORing of the NewCellMap onto the
;   OldCellMap. Used by FastBuildCellMap.
;
OrNewOntoOld
        MVI     H,HI NewCellMap
        MVI     D,HI OldCellMap
        MVI     C,CellMapPages  ;>0.
ONOOO   CALL    OrPages ;Or HL-->Page onto DE-->Page
        INR     H
        INR     D
        DCR     C
        JNZ     ONOOO
        RET
;
;       Or the HL-->Page onto the DE-->Page. Pres H,D,BC.
;
OrPages MVI     L,0
        MOV     E,L
OPO     LDAX    D
        ORA     M
        STAX    D
        INR     L
        INR     E
        LDAX    D
        ORA     M
        STAX    D
        INR     L
        INR     E
        JNZ     OPO
```

```
        RET
;
;       Test (Set, Clear) the New(Old)MapBit having
;  HL-->CellNum.  Pres B.
;
TestNewCellMapBit
        CALL    CellNumFromPtr
        RC
        LXI     D,NewCellMap
        JMP     TestBit
SetNewCellMapBit
        CALL    CellNumFromPtr
        RC
        LXI     D,NewCellMap
        JMP     SetBit
ClearNewCellMapBit
        CALL    CellNumFromPtr
        RC
        LXI     D,NewCellMap
        JMP     ClearBit
TestOldCellMapBit
        CALL    CellNumFromPtr
        RC
        LXI     D,OldCellMap
        JMP     TestBit
SetOldCellMapBit
        CALL    CellNumFromPtr
        RC
        LXI     D,OldCellMap
        JMP     SetBit
ClearOldCellMapBit
        CALL    CellNumFromPtr
        RC
        LXI     D,OldCellMap
        JMP     ClearBit
;
CellNumFromPtr
        MOV     A,M             ;Assume 16Bit CellNums
        INR     L
        MOV     H,M
        MOV     L,A             ;HL=CellNum.
        MVI     A,CellMapPages
        CMP     H               ;If bad CellNum, ret CARRY.
        RET
;
;       DE-->BitMap, HL=BitNum.
;
TestBit CALL    BitNumToPtrMask
        ANA     M
        RET
;
SetBit  CALL    BitNumToPtrMask
        ORA     M
```

```
        MOV     M,A
        RET
;
ClearBit CALL   BitNumToPtrMask
        CMA
        ANA     M
        MOV     M,A
        RET
;
XorBit  CALL    BitNumToPtrMask
        XRA     M
        MOV     M,A
        RET
;
BitNumToPtrMask
        MOV     C,L             ;C=BitNumInByte, HL=CellNum.
        CALL    DDIV8           ;HL:=HL/8
        DAD     D
        MOV     A,C
        PUSH    H               ;HL-->Byte in NewCellMap.
        CALL    PowerTwo        ;A:=2**A. Pres DE,BC.
        POP     H
        RET
;
;       Convert HL=CellNum into HL=Offset in CellMap.
;  Works only for 16 bit CellNums.  Pres BC.
;
CellNumToOffset
        LXI     D,CellMapPages*2048
        CALL    DCMP
        CNC     Trap
        JMP     DDIV8
;
;       HL,C:= HL,C + DE,B where HL,C and DE,B are
;  PointerMasks, whose numerical values are
;  Pointer<<3+Log2(Mask).
;
AddPM   DAD     D       ;Compute Pointer add.
        PUSH    H
        PUSH    D
        MOV     E,C
        MOV     H,B
        CALL    Mul8
        MOV     A,H
        ORA     A
        JZ      APM1    ;Jmp/ no carry.
        MOV     C,H     ;Got a carry from Mask addition.
        POP     D
        POP     H
        INX     H       ;Carry into the Pointer.
        RET
        ;
APM1    MOV     C,L
        POP     D
        POP     H
        RET
;
;       **** CellNum Math ****
;
IncCellNum LDA  CellNumLen
        MOV     C,A
        JMP     IncLong
;
DecCellNum LDA  CellNumLen
        MOV     C,A
        JMP     DecLong
;
        END
```

```
;**********************************************************
;*                                                        *
;*          Infinity DataBase Operating System            *
;*                 Concurrent B-Tree                      *
;*                                                        *
;*      Disk-Based BTree uses MetaTree as a caching       *
;*  subsystem.  Cell writes, splits and merges are done   *
;*  in background in order to reduce disk I/O waits,      *
;*  eliminate split/merge thrashing, and minimize         *
;*  redundant index updates.  We also follow a two-       *
;*  phase commit protocol that preserves the integrity    *
;*  of the tree structure through power failures,         *
;*  many hardware failures, and (later) media failures    *
;*  affecting uncommitted data.                           *
;*                                                        *
;* Copyright (C) 1982,1983,1984,1985,1986 Roger L.        *
;* Deran. All rights reserved.                            *
;*                                                        *
;**********************************************************
;
;<86>   INCLUDE C:INF-H.ASM
;<86>   INCLUDE C:KERNEL-H.ASM
;<86>   INCLUDE C:CELL-H.ASM
;<86>   INCLUDE C:MTREE-H.ASM
;<86>   INCLUDE C:BTREE-H.ASM
;<86>   INCLUDE C:DATA-H.ASM
;<86>   EXTRN   Trap:NEAR, Move:NEAR, InitMetaTree:NEAR, InitCellAlloc:NEAR
;<86>   EXTRN   Request:NEAR, Release:NEAR, FinishCell:NEAR,
CreateCellAlloc:NEAR
;<86>   EXTRN   GetGroundCellNum:NEAR, AllocCell1:NEAR, LogInCellAlloc:NEAR
;<86>   EXTRN   LogOutCellAlloc:NEAR, ReadCell:NEAR, CheckGroundCell:NEAR
;<86>   EXTRN   IndexUpdate:NEAR, SubSpaceMetaFirst:NEAR,
SubSpaceMetaNext:NEAR
;<86>   EXTRN   Find:NEAR, IncLong:NEAR, Fill:NEAR
;<86>   EXTRN   Insert:NEAR, Insert1:NEAR, InsertInPage:NEAR, DelFromPage:NEAR
;<86>   EXTRN   FreePage:NEAR, UsePage:NEAR, DirtyPage:NEAR,
LowWaterCheck:NEAR
;<86>   EXTRN   GetPreemptablePage:NEAR, GetStaticPage:NEAR
;<86>   EXTRN   MovePage:NEAR, DeChild:NEAR
;<86>   EXTRN   SkipRightToItem:NEAR, ScanToPrevItem:NEAR, SkipLeftToItem:NEAR
;<86>   EXTRN   Delete1:NEAR, ItemToCursor:NEAR, SuffixToCursor:NEAR
;<86>   EXTRN   ConstructPrefix:NEAR, Exchange:NEAR, Search:NEAR
;<80>
        INCLUDE C:INF-H.I80
;<80>
        INCLUDE C:KERNEL-H.I80
;<80>
        INCLUDE C:CELL-H.I80
;<80>
        INCLUDE C:MTREE-H.I80
;<80>
        INCLUDE C:BTREE-H.I80
;<80>
```

```
        INCLUDE C:DATA-H.I80
;<80>
        EXTRN   Trap, InitMetaTree, InitCellAlloc, Request, Release,
FinishCell
;<80>
        EXTRN   CreateCellAlloc, GetGroundCellNum, AllocCell1, LogInCellAlloc
;<80>
        EXTRN   LogOutCellAlloc, ReadCell, CheckGroundCell, IndexUpdate
;<80>
        EXTRN   SubSpaceMetaFirst, SubSpaceMetaNext, IncLong, Fill
;<80>
        EXTRN   Find, Insert, Insert1, Delete1, InsertInPage, DelFromPage
;<80>
        EXTRN   FreePage, UsePage, DirtyPage, LowWaterCheck
;<80>
        EXTRN   GetPreemptablePage, GetStaticPage
;<80>
        EXTRN   MovePage, DeChild, SkipRightToItem
;<80>
        EXTRN   ScanToPrevItem, SkipLeftToItem, ItemToCursor
;<80>
        EXTRN   SuffixToCursor, ConstructPrefix, Exchange, Move, Search
;
        PUBLIC  InitBTree, BOpen, BClose, BCreate, BInsert, BDelete,
BIndexUpdate
        PUBLIC  XBOpen, XBClose, XBCreate, XBInsert, XBDelete, XBIndexUpdate
        PUBLIC  BFind, BFirst, BNext, BFindFirst, BFindNext, BLast, BPrevious
        PUBLIC  XBFirst, XBNext, XBLast, XBPrevious
        PUBLIC  BSearch, BItemToCursor, BItemToBCursor, BSuffixToCursor
        PUBLIC  BMetaFind, CeilingSuffixToCursor, ItemToBCursor
        PUBLIC  SuffixToBCursor, ExchangeBCellPages, SetDirtyBit
        PUBLIC  MakeChildPair, DestroyChildPair
;
Locking EQU     0
;
BEGIN   DB      'BTREE'         ;Label for 'need' macro.
;
;       Initialize B-Tree Subsystem.
;
InitBTree
        MVI     A,1             ;Should be user configurable!!!
        STA     VolNamePrefixLen ;Includes (only!!!) Level Byte.
        LDA     CellNumLen      ;Should be set by system dependent module.
        ADI     2               ;For FlagByte, BCellPageNum.
        MOV     C,A             ;C=MetaLeafDataLen.
        CALL    InitMetaTree
        JMP     InitCellAlloc   ;Should Init MetaTree too!!!
;
;       Create a new BTree.
; For now, we can only create one tree since we don't pass in the VolName.
; Also, we don't handle Disk shape parameters in the GroundCell.  CellNumLen
; is used for DataLen no matter what the disk wants.
;
```

```
XBCreate
        IF      Locking
        LXI     H,DBSemaphore
        CALL    Request
        CALL    BCreate
        LXI     H,DBSemaphore
        JMP     Release                 ;Pres AF.
        ENDIF
        ;
BCreate CALL    CreateCellAlloc ;Later, will use VolNameCursor.
        CALL    MakeGroundPair
        RC                      ;Return A=VolumeErr.
        ;
        ;       Initialize a GroundCell.  First: InitItem.  HL--
>NewGroundCell.
        ;
        MVI     L,0
        MOV     M,L             ;InitItem.PL=0.
        INR     L
        LDA     CellNumLen      ;InitItem.NIO=CellNumLen+3
        ADI     3               ;For PL,NIO,SuffixLen=1.
        MOV     M,A
        INR     L               ;HL-->InitItem.Suffix.
        MVI     M,0             ;InitItem.Suffix=0.
        INR     L               ;HL-->Where to put CellNum.
        PUSH    H
        CALL    GetGroundCellNum ;Must have reasonable CellNum
        POP     H               ;for locality or we Trap.
        CALL    AllocCell1      ;Get a Cell for InitBRoot.
        ;
        ;       Initialize ExpansionArea.  For now, we do a
        ;  very simple job.
        ;
        MVI     L,GBRootLevel   ;BRootLevel=0.
        MVI     M,0
        MVI     L,CLevel
        MVI     M,GroundCellLevel ;Level=GroundCellLevel.
        MVI     L,CDataLen
        LDA     CellNumLen
        MOV     M,A             ;DataLen=CellNumLen
        MVI     L,1
        MOV     A,M
        MVI     L,CAfterLastItem
        MOV     M,A             ;AfterLastItem=InitItem.NIO.
        MVI     L,CItemLimit
        MVI     M,GBRootLevel   ;ItemLimit=GBRootLevel
        CALL    FinishCell
        CALL    ResetIOBitSetDirtyBit
        ;
        ;       Create an initial BRootCell.
        ;       H=NewGroundCellPage.
        ;
        XRA     A               ;DesiredLevel=0.
```

```
        MOV     L,A             ;HL-->NewGroundCell.InitItem.
        CALL    MakeChildPair   ;HL-->NewBRootCell
        ;
        IF      0               ;TRY IT WITHOUT INITITEM!!!
        MVI     L,0
        MVI     M,0             ;InitItem.PL=0
        INR     L
        MVI     M,3             ;InitItem.NIO=3
        INR     L
        MVI     M,0             ;InitItem.Suffix=0
        ENDIF
        ;
        MVI     L,CLevel
        MVI     M,0             ;Level=0
        MVI     L,CDataLen
        MVI     M,0             ;DataLen=0
        MVI     L,CAfterLastItem
        MVI     M,0             ;AfterLastItem=0!!!
        MVI     L,CItemLimit
        MVI     M,CExpansionArea ;ItemLimit=CExpansionArea
        CALL    FinishCell      ;Fixes CheckSum.
        JMP     ResetIOBitSetDirtyBit
;
;       Open a BTree for use.
;
XBOpen
        IF      Locking
        LXI     H,DBSemaphore
        CALL    Request
        CALL    BOpen
        LXI     H,DBSemaphore
        JMP     Release         ;Pres AF.
        ENDIF
        ;
BOpen   CALL    LogInCellAlloc
        CALL    MakeGroundPair
        RC                      ;H=NewGroundCellPage.
        CALL    ReadCell        ;Pres HL,DE,BC. Read GroundCell, leave static.
        CALL    CheckGroundCell ;Traps if invalid.
        ORA     A
        RET
;
;       Initiate and wait for completion of an IndexUpdate.
;       Later, must prevent multiple users from starting
;  UpdateCycles at the same time!!!  This function is
;  really only for the NonConcurrent version.
;
XBIndexUpdate
        IF      Locking
        LXI     H,DBSemaphore
        CALL    Request
        CALL    BIndexUpdate
        LXI     H,DBSemaphore
```

```
        JMP     Release
        ENDIF
        ;
        ;  Update the Index structure of the BTree.
        ;
BIndexUpdate JMP        IndexUpdate
;
;       Close the BTree.
;       Later, we should find a way to lock the entire database
;  so multiple users cannot simultaneously do XBCloses, and
;  so nobody can modify the database once an XBClose is in
;  progress!!!
;
XBClose
        IF      Locking
        LXI     H,DBSemaphore
        CALL    Request
        CALL    BClose
        LXI     H,DBSemaphore
        JMP     Release         ;Pres AF.
        ENDIF
        ;
BClose  CALL    LogOutCellAlloc
        ;
        ;       Force out all DirtyCells.
        ;
        CALL    IndexUpdate     ;NonConcurrent version!!!
        ;
        ;       Free all CellPages and Delete all MetaItems
        ;  related to the Volume being logged out.  We still
        ;  hold the database lock, so no CellPage can have
        ;  been modified.  Unlocked modifications affected via
        ;  the internal Insert/Delete entry points are lost.
        ;
        LXI     D,TempCursor
        XRA     A
        STA     TempCursor
        MVI     A,1             ;VNPL==1!!!
        STA     TempCursorLen
        ;
        ;       Top of Level loop.
        ;
BC10    CALL    BC11            ;Destroy this Level.
        ;
        ;       Go to next higher Level.
        ;
        LDA     TempCursor      ;TempCursor[0]=Level.
        INR     A
        CPI     InternalLevel
        RNC                     ;Ret/ >=InternalLevel.
        STA     TempCursor
        LDA     VolNamePrefixLen
        STA     TempCursorLen
```

```
        JMP     BC10            ;Loop/ at next level.
        ;
        ;       Destroy a Level.
        ;
BC11    LXI     D,TempCursor
        LDA     TempCursorLen
        MOV     B,A
        LDA     VolNamePrefixLen
        MOV     C,A             ;SubSpaceLen
        CALL    SubSpaceMetaFirst
        JC      BC113
        LDA     VolNamePrefixLen ;This fixes ZeroItem bug!!!
        CMP     B               ;Use Max(B,VolNamePrefixLen).
        JNC     BC111           ;Jmp/ B<=VolNamePrefixLen
        MOV     A,B             ;B>VNPL. Use B.
BC111   STA     TempCursorLen
        ;
        ;       Top of within-SubSpace DestroyMetaPair loop.
        ;
BC112   CALL    BC12            ;Destroy the Pair.
        ;
        LXI     D,TempCursor
        LDA     TempCursorLen
        MOV     B,A
        LDA     VolNamePrefixLen
        MOV     C,A             ;SubSpaceLen
        CALL    SubSpaceMetaNext
        JC      BC113
        MOV     A,B
        STA     TempCursorLen
        JMP     BC112           ;Loop/ got next MetaPair.
        ;
BC113   CPI     SubSpaceErr
        CNZ     Trap
        RET                     ;Ret/ End of Level.
        ;
        ;       Got a MetaPair within SubSpace.  Destroy it.
        ;  This means Delete Left and/or RightPairItems if
        ;  possible without disturbing adjacent MetaPairs,
        ;  Fix ParentTab, and Free any ChildPage.
        ;
BC12    LXI     D,TempCursor
        LDA     TempCursorLen
        MOV     B,A
        CALL    Find
        CC      Trap
        ORA     A
        CNZ     Trap
        ;
        JMP     DestroyChildPair ;Mods all.
;
;       Make a MetaPair for a GroundCell.  If error, ret CARRY, A=VolumeErr;
;  else not CARRY, H=GroundCellPage.
```

```
;
        PUBLIC  MakeGroundPair
MakeGroundPair
        ;
        ;       Set MGPCursorLen=VolNamePrefixLen,
        ; MGPCursor[0]:=GroundCellLevel, and DataPtr-->AfterMGPCursorText.
        ;
        LDA     VolNamePrefixLen
        CPI     1
        CNZ     Trap                    ;Assume VNPL==1!!!
        STA     MGPCursorLen
        LXI     H,MGPCursor
        MVI     M,GroundCellLevel ;MGPCursor[0]:=GCLevel.
        INR     L
        SHLD    DataPtr
        ;
        ;       Create DataArea for GroundCellLeftParentItem.
        ;
        CALL    GetGroundCellNum ;CellNum:=GroundCellNum.
        MVI     M,PairBit OR InRAMBit OR IOBit OR AllocBit
        INR     L
        PUSH    H
        CALL    GetStaticPage   ;GroundCells are Static.
        MOV     A,H
        POP     H
        MOV     M,A
        STA     MGPPage
        ;
        ;       Insert the GroundCellLeftPairItem.  If
        ;  already present, the volume already exists.
        ;
        LXI     D,MGPCursor
        LDA     MGPCursorLen
        MOV     B,A
        CALL    Find
        CC      Trap
        ORA     A
        MVI     A,VolumeErr
        STC
        RZ                      ;Ret/ ExactMatch: Vol exists.
        CALL    Insert1
        CC      Trap
        ;
        ;       Increment MGPCursor for RightPairItem.
        ; Note that VolNamePrefix may (and will, with VNPL==1 as is now
        ; assumed) overflow into the LevelByte.
        ;
        LXI     H,MGPCursor
        LDA     MGPCursorLen
        MOV     C,A
        CALL    IncLong
        ;
        ;       Create DataArea for RightPairItem.
```

```
        ;
        LHLD    DataPtr
        LDA     CellNumLen
        MOV     C,A
        XRA     A
        CALL    Fill            ;CellNum:=0.
        MVI     M,0             ;Non-Pair!!!
        INR     L
        MVI     M,0             ;No Page pointer.
        ;
        ;       Insert GroundCellRightPairItem.  If the
        ;  RightPairItem is already there, the DataArea is
        ;  left undisturbed.
        ;
        LXI     D,MGPCursor
        LDA     VolNamePrefixLen
        MOV     B,A
        CALL    Insert
        CC      Trap
        LDA     MGPPage
        MOV     H,A             ;Return H=NewGroundCellPage.
        XRA     A               ;NOT CARRY.
        RET
        ;
MGPPage DS      1
        need    MaxCursorSz+1
MGPCursorLen DS 1
MGPCursor DS    MaxCursorSz
;
;       Insert the Item represented by the DE-->Cursor into
;  BTree.  From the user task level, we must lock the DataBase
;  around BInsert, and we must save and restore Cursor[0],
;  the CursorLen.
;
XBInsert
        IF      Locking
        LXI     H,DBSemaphore
        CALL    Request
        ENDIF
        LDAX    D
        MOV     B,A             ;Preserve Cursor[0].
        XRA     A
        STAX    D               ;Insert at BLevel 0.
        PUSH    D               ;Preserve DE-->Cursor
        PUSH    B
        INR     B
        CALL    BInsert
        POP     B
        IF      Locking
        LXI     H,DBSemaphore
        CALL    Release
        ENDIF
        POP     H               ;Preserve AF.
```

```
        MOV     M,B             ;B=CursorLen=Cursor[0].
        XCHG                    ;DE-->Cursor.
        JMP     LowWaterCheck   ;Pres all. Ret AF as from BInsert.
;
;       Insert at level Cursor[0].  DE-->Cursor, B=CursorLen.
;
BInsert PUSH    D               ;BFind may delay for ReadCell.
        CALL    BFind           ;Find Cell at level Cursor[0].
        POP     D               ;DE-->Cursor, CursorLen short
        RC                      ;by VNPL bytes, C=MatchLen,
        ORA     A               ;HL-->InsertPoint.
        RZ                      ;Ret/ Already there.
        ;
        CALL    ShadowIfWriting ;Pres L,DE,BC,CursorLen. Page now in DirtySeg.
        ;
        ;       HL-->InsertPointInNonWritingPage.
        ;       Page is now not writing, so we can 'Use' it.
        ;  CursorLen is already correct for the InsertInPage,
        ;  having been shortened VNPL bytes by BFind.
        ;
        PUSH    D               ;DE,CursorLen-->Cursor.
        LDA     VolNamePrefixLen
        ADD     E
        MOV     E,A             ;Skip over VolNamePrefix.
        PUSH    H
        LHLD    BDataPtr        ;Input Param to BInsert.
        SHLD    DataPtr         ;Input Param to InsertInPage.
        POP     H
        XRA     A               ;Don't fix ParentTab for child:
        STA     FixPTFlag       ;BItems have no ChildPageNums.
        CALL    InsertInPage    ;Pres CursorLen.
        POP     D
        RNC                     ;Ret/ no split.
        CPI     SplitDoneErr    ;Must have split.
        CNZ     Trap
        ;
        ;       A split occurred.
        ;
        LDA     RightCellPage   ;The new Page from InsertInPage
        STA     BRightCellPage
        LDA     LeftCellPage
        STA     BLeftCellPage
        ;
        ;       Set the MoveBit in the LeftCell.  This will
        ;  signal to IndexServer that the Cell does not cover
        ;  the same range as before, and the CellNum it
        ;  contains (if valid) will have to be Deallocated
        ;  and a new one Allocated (a Move operation.)  The
        ;  LeftCell may be merged later with the Cell to its
        ;  left or even with the RightCell again after some
        ;  deletions, but it still will have MoveBit on,
        ;  hence will Move.
        ;
```

```
MOV     H,A
metaparentflags         ;HL-->LeftCellParentItem.Flags
MOV     A,M
ORI     MoveBit         ;Set MoveBit.
MOV     M,A
;
;       Create a MetaParent for the RightPage.  The
;  MetaParent serves as both the RightPairItem for the
;  LeftPage and the LeftPairItem for the RightPage.
;  We build the new ParentItem in TempCursor.
;
XCHG                    ;HL-->Cursor.
LXI     D,TempCursor
LDA     VolNamePrefixLen
MOV     C,A
CALL    Move            ;Get VolNamePrefix fm Cursor.
;
LDA     BRightCellPage
MOV     H,A
MVI     L,0             ;HL-->RightCellInitItem.
LXI     D,TempCursor    ;DE-->TempCursor.
CALL    BSuffixToCursor ;B=TempCursorLen, DE-->AfterTC.
;
XCHG
SHLD    DataPtr         ;DataPtr-->AfterTempCursor.
XCHG
;
LDA     BLeftCellPage
MOV     H,A
CALL    DirtyPage       ;Pres HLDEBC. Put new RightCell on DirtySeg.
metaparentda            ;HL-->LeftCellMetaParentItem.
LDA     CellNumLen      ;Copy old CellNum for locality.
MOV     C,A             ;DE-->AfterTempCursor.
CALL    Move            ;Pres B.
;
XCHG
MVI     M,PairBit OR InRAMBit OR DirtyBit OR MoveBit
INR     L               ;Not Allocated, No IO, not RAW.
LDA     BRightCellPage  ;Point NewParentItem at NewPage
MOV     M,A             ;ParentTab is fixed by Insert.
;
;  If we are at BLeaf Level, shorten TempCursor as much
;  as possible from the right;  only the difference
;  byte need remain, so we use Search on the LeftCell
;  to find the MatchLen, which gives the position of
;  the difference byte.
;
LDA     TempCursor
ORA     A
JNZ     BI1             ;Jmp/ not BLeaf Level.
;
LXI     D,TempCursor
MOV     A,B
```

```
        STA     CursorLen
        LDA     BLeftCellPage
        MOV     H,A             ;Could use LeftMPI.PL
        CALL    BSearch         ;for InitialMatchLen.
        CC      Trap
        ORA     A
        CZ      Trap
        MOV     A,L
        MVI     L,CAfterLastItem
        CMP     M
        CNZ     Trap
        LDA     VolNamePrefixLen
        ADD     C               ;C=MatchLen.
        MOV     B,A             ;B=MatchLen+VNPL.
        INR     B               ;Add in the difference byte.
        ;
BI1     LXI     D,TempCursor    ;B=TempCursorLen.
        JMP     Insert          ;Create RightCellMetaParent.
;
;       Delete the Item represented by the DE-->Cursor from
;  the BTree.  From the user task level, we must lock the
;  DataBase around BInsert, and we must save and restore
;  Cursor[0], the CursorLen.
;
XBDelete
        IF      Locking
        LXI     H,DBSemaphore
        CALL    Request
        ENDIF
        LDAX    D
        MOV     B,A             ;Preserve Cursor[0].
        XRA     A
        STAX    D               ;Insert at BLevel 0.
        PUSH    D               ;Preserve DE-->Cursor
        PUSH    B
        INR     B
        CALL    BDelete
        POP     B
        IF      Locking
        LXI     H,DBSemaphore
        CALL    Release
        ENDIF
        POP     H
        MOV     M,B             ;B=CursorLen=Cursor[0].
        XCHG                    ;DE-->Cursor.
        JMP     LowWaterCheck   ;Pres all. Ret AF from Delete.
        ;
        ;       Delete at level Cursor[0].  DE-->Cursor,
        ;  B=CursorLen.
        ;
BDelete PUSH    D               ;BFind may delay for ReadCell.
        CALL    BFind           ;Find cell at level Cursor[0].
        POP     D               ;DE-->Cursor, CursorLen short
```

```
        RC                          ;by VNPL bytes, HL-->DeletePt,
        ORA      A                  ;C=MatchLen.
        RNZ                         ;Ret/ Nothing to delete.
        ;
        ;        If IOBit is on, then we can't change
        ;   this Cell because it is undergoing I/O, and we
        ;   must either make a copy of it to modify (Shadowing) or
        ;   wait for the IOBit to go off.  Without a concurrent IU, we will
        ;   never encounter a writing Cell (IOBit=1,DirtyBit=1).
        ;   Since BFind is done, we will also never encounter a reading Cell
        ;   (IOBit=1,DirtyBit=0).  Non-concurrent IU means IOBit=0.
        ;        ShadowIfWriting does a SetDirtyBit.
        ;
        CALL     ShadowIfWriting ;Pres L,DE,BC, CursorLen.
        ;
        ;        HL-->DeletePointInNonWritingPage.
        ;        Actually do the Item Deletion.
        ;   CursorLen is already correct for the DelFromPage,
        ;   having been shortened VNPL bytes by BFind.
        ;
        LDA      VolNamePrefixLen ;Skip over VolNamePrefix.
        ADD      E
        MOV      E,A
        XRA      A                  ;Don't fix ParentTab:
        STA      FixPTFlag          ;BItems have no PageNums.
        CALL     DelFromPage
        RNC                         ;Return A=DelFromPageResult.
        CALL     Trap
        RET
;
;       ShadowIfWriting tests IOBit and DirtyBit of the HL-->BCell and if th
; indicate Writing (11), makes a copy of the BCell for the user to modify,
; while putting the original into the ShadowSpace so that it can complete it
; write in peace.  This way there is no need for a write lock or for
; cancelling writes that have been already initiated or for guaranteeing tha
; all initiated writes will eventually complete even when frequently cancell
; and reinitiated.
;       Newly Dirty Pages are placed into the DirtySeg by a call on DirtyPag
;       Of course, while in the DirtySeg or the IOSeg, Pages lose their
; priority positions within the PreemptSeg.  When they return, they are put
; the MRU position in PreemptSeg, since a read, written, or modified Page ha
; certainly been "used."  ShadowCells are Freed when their write completes.
;       If Shadowing occurs, Returns H=NewCellPage, else
; Returns H=OriginalPage. Pres L,DE,BC.
;
;       SetDirtyBit just turns on DirtyBit. Used in IndexUpdate.
; Pres HL,DE,B.  Return CARRY if IOBit on, and no side effects.
;
ResetIOBitSetDirtyBit
        PUSH     H
        metaparentflags             ;Now that Cell is complete,
        MOV      A,M                ;turn off IOBit as if we had
        ANI      NOT IOBit AND OFFH ;just read it.
```

```
        MOV     M,A
        POP     H
        ;
SetDirtyBit
        PUSH    H
        metaparentflags         ;HL-->MetaParentItem.FlagByte.
        ;
        MOV     A,M
        CMA
        ANI     PairBit OR InRAMBit
        CNZ     Trap            ;Trap/ No Cell in RAM!
        ;
        MOV     A,M
        ANI     IOBit
        JZ      SDB1            ;Jmp/ IOBit=0.
        ;
        ; Doing I/O.
        ;
        MOV     A,M
        ANI     DirtyBit
        CZ      Trap            ;Trap/ Reading: can't be dirty yet!
        POP     H               ;Writing. Must shadow it.
        STC                     ;CARRY. (for now, caller traps!!!)
        RET
        ;
        ; Not doing I/O.
        ;
SDB1    MOV     A,M
        ANI     DirtyBit
        JZ      SDB2            ;Jmp/ newly dirty.
        POP     H               ;HL-->OriginalPage, still dirty.
        XRA     A
        RET                     ;NOT CARRY.
        ;
        ; Newly Dirty. Make Static
        ;
SDB2    MOV     A,M
        ORI     DirtyBit        ;Turn on DirtyBit.
        MOV     M,A
        POP     H               ;HL-->OriginalPage, newly dirty.
        CALL    DirtyPage       ;Put page on DirtySeg.
        XRA     A
        RET                     ;NOT CARRY.
;
ShadowIfWriting
        CALL    SetDirtyBit     ;Pres HL,DE,B.
        RNC
        ;
        ;       Cell is writing.  Make a copy of Cell, and
        ;  move original copy into Shadow area.  We do this
        ;  by creating the copy in the Shadow area and
        ;  then exchanging the MetaParentPointers.
        ;       For now, we use the NewBCellInitItem as
```

```
        ;  a unique ShadowBCellName, even though it might not
        ;  be exactly the same as the VisibleBCellName!!!
        ;  (This is true because a BLeafInitItem is deletable.)
        ;       TOS=OldHL-->OldBCellPage.
        ;       HL-->OldPairItem.FlagByte.
        ;
        CALL    Trap                ;NO SHADOWING FOR NOW!!!
        LDA     CursorLen
        PUSH    D
        PUSH    B
        PUSH    PSW
        CALL    SIW1
        POP     PSW
        POP     B
        POP     D
        RET
        ;
SIW1    MOV     B,M                 ;Save B:=OldPairItem.FlagByte.
        ;
        XCHG
        CALL    GetPreemptablePage ;H,L:=NewPage. Pres DE,BC.
        XCHG                        ;D,E=NewPage.
        ;
        PUSH    D                   ;Save DE-->NewBCellPage.
        ;
        PUSH    B                   ;Save B=OldPairItem.FlagByte.
        ;
        CALL    MovePage            ;NewPage:=OldPage. Pres H,D,BC
        ;
        MVI     L,0                 ;HL-->OldPage, which has MPI.
        LXI     D,TempCursor        ;DE-->Cursor
        CALL    BItemToBCursor
        MOV     A,B
        STA     ShadowCursorLen
        XCHG
        SHLD    DataPtr             ;For Insert later.
        ;
        LDA     CellNumLen          ;Assume DataLen=CellNumLen+2!!!
        MOV     C,A
        XRA     A
        CALL    Fill                ;CellNum:=0. Pres. DE,B.
        ;
        ;       Build the FlagByte of the old VisiblePairItem,
        ;  which will temporarily be stuck into the new
        ;  ShadowPairItem until ExchangeBCellPages, which
        ;  switches the PairItem.DataAreas.
        ;
        POP     B                   ;B:=OldPairItem.FlagByte.
        MOV     A,B
        ORI     DirtyBit            ;PairBit, InRAMBit already on.
        ANI     (NOT IOBit) AND OFFH ;Use old AllocBit,
        MOV     M,A                 ;(DividerBit), MoveBit, RawBit.
        INR     L
```

```
        ;
        POP     D               ;DE-->NewPage
        PUSH    D
        MOV     M,D
        ;
        ;       Redirect Cursor into ShadowSpace.
        ;
        LXI     H,TempCursor    ;HL-->TempCursor.
        MOV     A,M
        ADI     ShadowLevel
        MOV     M,A             ;Fix TempCursor[0].
        ;
        ;       Insert New ShadowParentItem.
        ;
        XCHG                    ;DE-->ShadowCursor.
        LDA     TempCursorLen
        MOV     B,A             ;B:=ShadowCursorLen.
        CALL    Insert
        CC      Trap
        ;
        ;       We remembered the BCellPages, which are
        ;  invariant over MetaTreeInserts.
        ;
        POP     D               ;DE-->NewPage
        POP     H               ;HL-->OldPage
        MOV     E,L             ;NewPageOffset:=OldPageOffset.
        PUSH    D
        CALL    ExchangeBCellPages ;Swap DataAreas, PTEntries.
        POP     H               ;H=NewPage, L=OldPageOffset.
        RET
;
;       Exchange the Pages pointed at by two MetaParentItems.
;  Do this with interrupts disabled so DiskServer will never
;  see a weird MetaBTree.
;       We assume that the DataLens of the MetaParentItems are
;  equal, and we just use the HParentItemDataLen.
;       HL-->HBCellPage, DE-->DBCellPage.  Destroys HL,DE,BC.
;
ExchangeBCellPages
        DI
        ;
        ;       Find and exchange both ParentTabEntries.
        ;
        MOV     A,H             ;A:=HPage, D=DPage.
        MVI     H,HI ParentOffsetTab
        ;
        MOV     L,A
        MOV     C,M             ;C:=HParentOffset.
        MOV     L,D
        MOV     E,M             ;E:=DParentOffset.
        MOV     M,C             ;DParentOffTabEntry:=HPO.
        MOV     L,A
        MOV     M,E             ;HParentOffTabEntry:=DPO.
```

```
        ;
        INR     H
        ;
        MOV     B,M             ;B:=HParentPage.
        MOV     L,D
        MOV     D,M             ;D:=DParentPage.
        MOV     M,B             ;DParentPageTabEntry:=HPP.
        MOV     L,A
        MOV     M,D             ;HParentPageTabEntry:=DPP.
        ;
        MOV     H,B
        MOV     L,C             ;HL-->HMetaParentItem.
        ;
        ;       Exchange the MetaParentItemDataAreas.
        ;       HL-->HMetaParentItem, DE-->DMetaParentItem.
        ;
        MOV     A,L
        MVI     L,CDataLen
        MOV     C,M             ;C:=HParentItem.DataLen.
        MOV     L,A             ;Assume H,D DataLens equal.
        ;
        INR     L
        MOV     A,M
        SUB     C
        MOV     L,A             ;HL-->HMetaParent.DataArea
        ;
        INR     E
        LDAX    D
        SUB     C
        MOV     E,A             ;DE-->DMetaParent.DataArea
        ;
        CALL    Exchange        ;DE@:=:HL@ for C bytes.
        ;
        EI
        RET
;
;       BFirst, BNext, BLast, and BPrevious all work like the corresponding
;  MetaTree functions. XBFirst and so on are external functions which work on
;  external Cursors having length at front.
;
XBFirst
        IF      Locking
        LXI     H,DBSemaphore
        CALL    Request
        ENDIF
        LDAX    D
        MOV     B,A             ;Preserve Cursor[0].
        INR     B
        XRA     A
        STAX    D               ;Cursor[0]:=0.
        PUSH    D               ;Preserve DE-->Cursor
        CALL    BFirst
        IF      Locking
```

```
        LXI     H,DBSemaphore
        CALL    Release          ;Pres AF.
        ENDIF
        POP     H
        DCR     B                ;Pres CARRY.
        MOV     M,B              ;B=CursorLen=Cursor[0].
        XCHG                     ;DE-->Cursor.
        JMP     LowWaterCheck    ;Pres all. Ret AF from BFirst.
;
XBNext
        IF      Locking
        LXI     H,DBSemaphore
        CALL    Request
        ENDIF
        LDAX    D
        MOV     B,A              ;Preserve Cursor[0].
        INR     B
        XRA     A
        STAX    D                ;Cursor[0]:=0.
        PUSH    D                ;Preserve DE-->Cursor
        CALL    BNext
        IF      Locking
        LXI     H,DBSemaphore
        CALL    Release
        ENDIF
        POP     H                ;Preserve AF.
        DCR     B                ;Pres CARRY.
        MOV     M,B              ;B=CursorLen=Cursor[0].
        XCHG                     ;DE-->Cursor.
        JMP     LowWaterCheck    ;Pres all. Ret AF from BNext.
;
XBLast
        IF      Locking
        LXI     H,DBSemaphore
        CALL    Request
        ENDIF
        LDAX    D
        MOV     B,A              ;Preserve Cursor[0].
        INR     B
        XRA     A
        STAX    D                ;Cursor[0]:=0.
        PUSH    D                ;Preserve DE-->Cursor
        CALL    BLast
        IF      Locking
        LXI     H,DBSemaphore
        CALL    Release
        ENDIF
        POP     H                ;Preserve AF.
        DCR     B                ;Pres CARRY.
        MOV     M,B              ;B=CursorLen=Cursor[0].
        XCHG                     ;DE-->Cursor.
        JMP     LowWaterCheck    ;Pres all. Ret AF from BLast.
;
```

```
XBPrevious
        IF      Locking
        LXI     H,DBSemaphore
        CALL    Request
        ENDIF
        LDAX    D
        MOV     B,A             ;Preserve Cursor[0].
        INR     B
        XRA     A
        STAX    D               ;Cursor[0]:=0.
        PUSH    D               ;Preserve DE-->Cursor
        CALL    BPrevious
        IF      Locking
        LXI     H,DBSemaphore
        CALL    Release
        ENDIF
        POP     H               ;Preserve AF.
        DCR     B               ;Pres CARRY.
        MOV     M,B             ;B=CursorLen=Cursor[0].
        XCHG                    ;DE-->Cursor.
        JMP     LowWaterCheck   ;Pres all. Ret AF from BPrevious.
;
BFirst  CALL    BFindFirst
        RC
        JMP     BSuffixToCursor
        ;
BFindFirst
        PUSH    D
        PUSH    B
        CALL    BFind
        POP     B
        POP     D
        RC
        ORA     A
        RZ                      ;Ret/ ==, else skip right.
        JMP     BSkipRightToItem
;
BNext   CALL    BFindNext
        RC
        JMP     BSuffixToCursor
        ;
BFindNext
        PUSH    D
        PUSH    B
        CALL    BFind
        POP     B
        POP     D
        RC
        ORA     A
        JNZ     BSkipRightToItem
        INR     L
        MOV     L,M
        JMP     BSkipRightToItem
```

```
;
BLast   CALL    BFindLast
        RC
        JMP     BItemToCursor
        ;
BFindLast PUSH  D
        PUSH    B
        CALL    BFind
        POP     B
        POP     D
        RC
        ORA     A
        RZ                      ;Ret/ ExactMatch: got LastItem.
        CALL    BSkipLeftToItem
        RC
        CALL    ScanToPrevItem
        MOV     L,C
        RET
;
BPrevious
        CALL    BFindPrevious
        RC
        JMP     BItemToCursor
        ;
BFindPrevious
        PUSH    D
        PUSH    B
        CALL    BFind
        POP     B
        POP     D
        RC
        CALL    BSkipLeftToItem
        RC
        CALL    ScanToPrevItem
        MOV     L,C
        RET
;
;       This is similar to MetaTree SkipRightToItem except
;  it requires that DE,B-->ACursor that can be modified in
;  order to do BFinds.
;
        PUBLIC  BSkipRightToItem
BSkipRightToItem
        MOV     A,L
        MVI     L,CAfterLastItem
        CMP     M
        MOV     L,A
        CMC
        RNC             ;Ret/ L<ALI.
        CNZ     Trap    ;L must = ALI.
        ;
        aftermetaparent ;HL-->AfterBCellMetaParentItem.
        CALL    SkipRightToItem ;Pres DE,BC.
```

```
        CC      Trap
        ;
        ;       If RightMetaPairItem is at next level,
        ;  return EndOfDBErr.
        ;
        MOV     C,L
        MOV     A,M             ;Is RMPI.PL=0?
        ORA     A
        JNZ     BSRTI2          ;Jmp/ PL>0: same level.
        INR     L
        INR     L
        MOV     A,M
        MOV     L,C
        XCHG
        CMP     M
        XCHG
        JZ      BSRTI2          ;Jmp/ same level.
        STC
        MVI     A,EndOfDBErr
        RET
        ;
BSRTI2  INR     L
        MOV     L,M
        DCR     L
        DCR     L
        MOV     A,M
        CMA
        ANI     PairBit OR InRAMBit
        JNZ     BSRTI3  ;Jmp/ must load next Cell in.
        ;
        ;       Easy case: NextBCell already InRAM.
        ;
        INR     L
        MOV     H,M
        MVI     L,0
        JMP     BSkipRightToItem ;Loop/ Cell might be empty!
        ;
        ;       Hard case: Must modify cursor and do BFind.
        ;
BSRTI3  MOV     L,C             ;Back to RightPairItem.
        PUSH    D
        CALL    ItemToBCursor
        POP     D
        PUSH    D
        PUSH    B
        CALL    BFind           ;Load NextBCell into RAM.
        POP     B
        POP     D
        RC
        ORA     A
        JNZ     BSkipRightToItem ;Loop/ might be empty Cell!
        RET
;
```

```
;       This is similar to MetaTree SkipLeftToItem except
;  it requires that DE,B-->ACursor that can be modified in
;  order to do BFinds.
;
        PUBLIC  BSkipLeftToItem
BSkipLeftToItem
        MOV     A,L
        ORA     A
        RNZ                     ;Ret/ L>0. NOT CARRY.
        ;
        metaparent              ;HL-->BCellMetaParentItem.
        ;
        ;       If LeftMetaPairItem is InitialItem, return StartOfDBErr.
        ;
        MOV     C,L
        LDA     VolNamePrefixLen
        SUB     M
        JC      BSLTI2          ;Jmp PL>VNPL: Can't be InitItem.
        INR     L
        INR     L
        ADD     L
        MOV     L,A             ;HL-->AfterVolNamePrefix (may be beyond Text!)
        PUSH    H
        MOV     L,C
        itemda
        MOV     A,L             ;A:=OffsetOfItemDataArea
        POP     H
        CMP     L               ;If OffsetOfItemDA=OffsetAfterVNP, got
NilItem.
        JZ      BSLTI0          ;Jmp/ NilItem.
        CC      Trap            ;Trap/ Item is shorter than VolNamePrefixLen!
        INR     A               ;Zero Item is one byte longer (ItemDA
further).
        CMP     L
        JNZ     BSLTI2          ;Jmp/ wrong length for ZeroItem.
        MOV     A,M             ;Test byte AfterVNP.
        JNZ     BSLTI2          ;Jmp/ not ZeroItem.
        ;
BSLTI0  MOV     L,C             ;Restore HL-->MetaParentItem.
        STC
        MVI     A,StartOfDBErr
        RET
        ;
        ;       MetaParentItem is not InitialItem.
        ;
BSLTI2  MOV     L,C
        CALL    SkipLeftToItem
        DCR     L
        DCR     L
        MOV     A,M
        CMA
        ANI     PairBit OR InRAMBit
        JNZ     BSLTI3          ;Jmp/ must load PreviousBCell in.
```

```
        ;
        INR     L
        MOV     H,M
        MVI     L,CAfterLastItem
        MOV     L,M
        JMP     BSkipLeftToItem ;Loop: Cell might be empty!
        ;
        ;       Load PreviousBCell in by modifying Cursor and doing a BFind.
        ;  We subtract an infinitesimal from Cursor to avoid BFinding the sa
        ;  Cell.
        ;
BSLTI3  MOV     L,C
        PUSH    D
        CALL    ItemToBCursor   ;Cursor:=LeftMetaParentItem.
        POP     D
        ;
        CALL    DecrementInfinitesimal
        ;
        PUSH    D
        PUSH    B
        CALL    BFind           ;Load NextBCell into RAM.
        POP     B
        POP     D
        RC
        ORA     A
        JNZ     BSkipLeftToItem ;Loop/ might be empty Cell!
        RET
;
;       Decrement DE,B-->Cursor by an Infinitesimal.  Return B=MaxCursorSz-1
;  (-1 for safety!) Pres DE, Mod HL,C.  If Cursor is Nil or full of zeroes,
;  return CARRY, Pres DE,B.
;
        PUBLIC  DecrementInfinitesimal
DecrementInfinitesimal
        ;
        ;       See if Cursor can be decremented.
        ;
        MOV     A,B
        ADD     E
        MOV     L,A
        MOV     H,D
        MOV     C,B
        INR     C
        DCR     C
        STC
        RZ                      ;Ret/ Nil.
DecI1   DCX     H
        MOV     A,M
        ORA     A
        JNZ     DecI2           ;Got a non-zero: the decrement will work.
        DCR     C
        JNZ     DecI1
        STC
```

```
        RET
        ;
        ;       Extend the Cursor with OFFHs.
        ;
DecI2   MOV     A,B
        ADD     E
        MOV     L,A
        MVI     A,MaxCursorSz-1
        SUB     B
        MOV     C,A
        MVI     A,OFFH
        CALL    Fill
        ;
        ;       Decrement the original part of the Cursor.
        ;
        MOV     A,B
        ADD     E
        MOV     L,A
        MOV     C,B
DecI3   DCX     H
        DCR     M
        MOV     A,M
        INR     A
        JNZ     DecI4           ;Jmp/ no borrow.
        DCR     C
        JNZ     DecI3
        CALL    Trap            ;Trap/ overflow in spite of our earlier tests!
        ;
DecI4   MVI     B,MaxCursorSz-1
        XRA     A               ;NOT CARRY.
        RET
;
;       BFind locates a BItem at the BLevel given by Cursor[0] by reading any
; necessary cells including the BRoot, the BIndex cells on the path, and the
; BLeaf itself.  Returns as after a Find.  Should we do a UsePage?!!!
; B=CursorLen, DE-->Cursor.
; Return NOT CARRY: HL-->NGEBItem, A=MatchCode;
; CARRY: A=AboveBRootErr, Cursor[0]>BRootLevel.
; Pres Cursor[0].
;
        PUBLIC  BFind
BFind   CALL    BMetaFind       ;Pres. DE,B if error.
        RNC                     ;Ret/ found right at our level!
        CPI     FaultErr
        CNZ     Trap
        LDAX    D
        STA     BFindLevel      ;BFindLevel:=Cursor[0].
        ;
        ;       Top of upwards scanning loop.  After a
        ;  CellFault, we are trying to find lowest BIndexCell
        ;  in RAM that includes our Cursor.  We can skip
        ;  levels quickly by going immediately to the level
        ;  of the NGTMetaItem, if that level is higher than
```

```
        ;  ours and less than GroundCellLevel.  BMetaFind
        ;  returns HL-->AfterNLEMetaItem on faults.
        ;
BF1     CALL    SkipRightToItem ;Pres DE,BC.
        JC      BFVolErr        ;Jmp/ EndOfDBErr
        MOV     A,M             ;HL-->NGTMetaItem.
        ORA     A               ;Must have zero PrefixLen.
        LDAX    D               ;A:=Cursor[0]
        JNZ     BF10            ;Jmp/ NGTI.PL>0.
        INR     L               ;NGTI.PL=0.
        INR     L
        CMP     M               ;HL-->NGTI[0]
        JZ      BF10            ;Jmp/ Cursor[0]=NGTI[0].
        CNC     Trap            ;Trap/ Cursor[0]>NGTI[0]!
        MOV     A,M             ;Use NGTI[0], since it is
        DCR     A               ;larger.
BF10    INR     A               ;A=NextLevelToTry.
        ;
        CPI     GroundCellLevel+1
        JNC     BFVolErr        ;Jmp/ NGTMI[0]>GroundCellLevel
        ;
        STAX    D               ;Cursor[0]:=NextLevelToTry.
        PUSH    D
        PUSH    B
        CALL    BMetaFind
        POP     B
        POP     D
        JNC     BF11            ;Jmp/ no Fault.
        CPI     FaultErr        ;Fault?
        JZ      BF1             ;Jmp/ fault. Loop.
        CALL    Trap
        STC
        RET
BF11    ORA     A               ;In eq case, HL-->BParentItem.
        JZ      BF12            ;Jmp/ equal. Skip STPI.
        CALL    ScanToPrevItem  ;Move to start of BParentItem.
        MOV     L,C             ;HL-->BParentItem.
BF12    ;
        ;       We have found a cell whose range includes the
        ;  Cursor.  Now move back down, iteratively, by
        ;  creating a MetaTreeItemPair for the necessary child
        ;  cell, loading child cell from disk, and searching
        ;  child for Cursor.  Unfortunately, we can't always
        ;  directly to the Child Cell once it loads, because
        ;  during the read, we may have switched and the lower
        ;  levels of the tree may have been loaded and even
        ;  modified.  So, we have to start again at the bottom.
        ;  H=PageNum of new child.
        ;
        LDAX    D
        CPI     GroundCellLevel
        JC      BF2             ;Jmp/ <GroundCellLevel.
        CNZ     Trap            ;Trap/ >GroundCellLevel.
```

```
        LDA     BFindLevel
        MOV     C,A
        PUSH    H
        MVI     L,GBRootLevel    ;Go down to BRootLevel unless
        MOV     A,M              ;that's below BFindLevel.
        POP     H                ;Restore HL-->GC.InitItem.
        CMP     C
        JC      BFAboveBRootErr  ;Jmp/ BFindLevel too high.
        INR     A                ;Anticipate decrementing below.
        STAX    D                ;Goto BRootLevel.A=ChildLevel.
        ;
BF2     LDAX    D                ;--Cursor[0].
        DCR     A
        STAX    D                ;A=DesiredLevel.
        CALL    MakeChildPair    ;Pres DE,BC. H=NewChildPage.
        CALL    ReadCell         ;Pres HL,DE,BC. Read H=Page.
        PUSH    PSW
        CALL    UsePage          ;Make H Page preemptable. Pres HLDEBC.
        POP     PSW
        RC
        ORA     A                ;0 means Asynch or Unswitched.
        JZ      BF21             ;Jmp/ 0: go down to ChildLevel.
        ;
        LDA     BFindLevel       ;Go back to original level.
        STAX    D
        JMP     BFind            ;Loop. (Infinitely?)
        ;
        ;       Asynchronous ReadCell implementation or else
        ;  fortuitous ReadCell call in which no switching to
        ;  another BTree user occurred.  We can stay at the
        ;  level of the Cell we just read.  (For the BRoot,
        ;  this may be more than one Level lower.)
        ;       H-->BChildCell, Cursor[0]=BChildCellLevel
        ;  DE,B-->Cursor.
        ;
BF21    LDA     BFindLevel
        XCHG
        CMP     M
        XCHG
        JZ      BSearch
        PUSH    D
        PUSH    B
        CALL    BSearch
        POP     B
        POP     D
        ORA     A                ;In eq case, HL-->BParentItem.
        JZ      BF2              ;Jmp/ equal. Go scan down.
        CALL    ScanToPrevItem   ;Move to start of BParentItem.
        CC      Trap
        MOV     L,C              ;HL-->BParentItem.
        JMP     BF2
        ;
        ;       No GroundCell for the required Volume.
```

```
        ;
BFVolErr MVI    A,VolumeErr
        STC
        RET
        ;
        ;       The caller asked to Find a Cell that is
        ;  above the BRoot and does not exist.
        ;
BFAboveBRootErr
        MOV     A,C             ;Leave Cursor[0]=BFindLevel.
        STAX    D
        MVI     A,AboveBRootErr
        STC
        RET
;
;       Find the DE,B-->Cursor in the BMetaTree.
;  This tree has BTree cells of all levels as its leaves, and
;  the MetaTree as all higher index levels.  The MetaTree
;  indexes the subset of BTree cells that are in RAM or which
;  are being read or written.  A FaultErr results if the
;  necessary BCell is not in RAM, DE,B-->Cursor are preserved,
;  and we return HL-->AfterNLEMetaItem.  In absence of other
;  errors from Find, we return from a Search of BCell.
;       Won't work with RawCells!!!
;
        PUBLIC  BMetaFind
BMetaFind
        PUSH    D
        PUSH    B
        CALL    Find
        POP     B
        POP     D
        RC                      ;Return weird errors.
        ORA     A
        JNZ     BMF1            ;Jmp/ not exact match.
        INR     L               ;Exact match: skip over Item.
        MOV     L,M
        JMP     BMF2
BMF1    CALL    SkipLeftToItem  ;Returns HL-->AfterNLTItem.
BMF2    DCR     L               ;HL-->NLEItem.ChildPage
        DCR     L               ;HL-->NLEItem.FlagByte
        MOV     A,M
        CMA
        ANI     PairBit OR InRAMBit ;Test these bits.
        JNZ     BMF3            ;Jmp/ no Pair or not InRAM.
        ;
        ;       BCell has Pair and is in RAM.  Search it.
        ;
        INR     L               ;HL-->NGEItem.BTreePage
        MOV     H,M
        JMP     BSearch
        ;
        ;       Fault exit.  Return HL-->AfterNLEMetaItem.
```

```
        ;
BMF3    INR     L
        INR     L
        MVI     A,FaultErr
        STC
        RET
;
;       BSearch accounts for the VolNamePrefix.  It sets
;  L=SearchFrom=0 and C=MatchLen=0.  Note the returned
;  C=MatchLen does not include the VolNamePrefixLen, so it
;  is appropriate as a parameter to InsertInPage on the
;  BCell.  Return DE-->DifferencePoint,
;  HL-->NGEItem just like Search.
;
        PUBLIC  BSearch
BSearch MVI     L,0             ;HL-->SearchFrom
        LDA     VolNamePrefixLen
        MOV     C,A
        ADD     E
        MOV     E,A             ;DE-->Cursor[VNPLen]
        MOV     A,B
        SUB     C               ;A=RemainingCursorLen.
        STA     CursorLen       ;CursorLen:=B-VolNamePrefixLen.
        MOV     C,L             ;MatchLen:=0
        CC      Trap
        JMP     Search          ;Jmp/ just reached stop level.
;
;       MakeChildPair constructs the Left- and RightPairItems
;  in a MetaParentItemPair using the HL-->BParentItem and its
;  CeilingItem.  A=Level at which the ChildCell is to be
;  created.  This allows there to be a multiple level gap
;  between the BParent and its BChild, such as exists between
;  the GroundCell and the BRoot.
;       Later, we should zero fill DataAreas from the BTree
;  out to MetaCell.DataLen, so that various BTrees can be
;  on-line at once.
;       Some day, we should check that there are no garbage
;  MetaItems between the Left- and RightPairItems.
;       HL-->BParentItem, A=DesiredChildLevel.
;  Return H=PageNum.
;
;       THIS CAN BE SPED UP BY TRYING TO FIND THE BCHILD'S
;  METAPAIR FIRST, WITHOUT CONSTRUCTING THE CEILINGITEM AND
;  COLLECTING ALL THE DATA.  WE NEVER SWITCH IN HERE.  IF THE
;  PAIRBIT IS ON, WITH AN EXACTMATCH ON THE BMETAFIND, WE ARE
;  DONE WITH A COMMON CASE.
;
        PUBLIC  MakeChildPair
MakeChildPair
        PUSH    D
        PUSH    B
        PUSH    PSW             ;Save A:=DesiredChildLevel
        PUSH    H               ;Save HL-->BParentItem.
```

```
        ;
        ;       TempCursor:=BParentItem.
        ;   If BParentItem is zero item, we don't concatenate
        ;   it onto the VolNamePrefix!
        ;
        LXI     D,TempCursor
        CALL    BItemToBCursor  ;B=CursorLen. C,A=?
        MOV     A,B             ;DE-->AfterTempCursor
        STA     TempCursorLen   ;HL-->ItemDataArea
        ;
        LDA     VolNamePrefixLen ;If we have the ZeroBItem,
        DCR     B
        CMP     B               ;don't concatenate it onto the
        JNZ     MCPO
        DCR     E               ;DE-->TempCursor[TCLen-1]
        LDAX    D
        INR     E
        ORA     A
        JNZ     MCPO
        MOV     A,B
        STA     TempCursorLen
        DCR     E
MCPO    ;
        MOV     A,L
        MVI     L,CDataLen
        MOV     C,M             ;C:=BParent.DataLen
        MVI     L,CLevel
        MOV     B,M
        DCR     B               ;If Level=1, remove BFlagByte.
        JNZ     MCPOO
        DCR     C
MCPOO   MOV     B,C
        MOV     L,A
        CALL    Move            ;Pres. B.
        LDA     CellNumLen      ;BParentDataLen<=CellNumLen.
        SUB     B
        CC      Trap
        MOV     C,A
        XRA     A
        XCHG
        CALL    Fill            ;Zero out to CellNumLen.
        XCHG
        MVI     A,PairBit OR InRAMBit OR IOBit OR AllocBit
        STAX    D
        INR     E
        XRA     A               ;PageNum=0 until Insert shows
        STAX    D               ;we really need to GetPage.
        ;
        ;       TempCursor2:=RightPairItem.
        ;   Need not do a ConstructPrefix again, because Temp
        ;   Cursor is immediately to the left of the RightPair
        ;   Item, and therefore contains the proper prefix.
        ;
```

```
LDA     TempCursorLen
MOV     C,A                ;Could be Min(C,RPI.PL)
LXI     D,TempCursor2
LXI     H,TempCursor
CALL    Move
;
POP     H                  ;Restore HL-->BParentItem.
INR     L
MOV     L,M                ;HL-->AfterBParentItem.
LXI     D,TempCursor2      ;DE-->TempCursor2.
CALL    CeilingSuffixToCursor ;TempCursor2:=CeilingItem
MOV     A,B                ;DE-->AfterTempCursor2.
STA     TempCursor2Len
XCHG
SHLD    DataPtr
LDA     CellNumLen
ADI     2                  ;FlagByte, PageNum:=0.
MOV     C,A                ;C=CellNumLen+2.
XRA     A                  ;The PairBit=0 invalidates
CALL    Fill               ;the rest of this Item.
;
;       Point the two cursors at the desired level.
;  We do this by adding an equal correction value
;  to both of them.  This correctly handles the
;  RightMetaParent  Item for the Cell at the end of a
;  volume.
;
POP     PSW
LXI     H,TempCursor
MOV     C,M                ;C:=OldLev.
MOV     M,A                ;TempCursor[0]:=DesiredLevel.
SUB     C                  ;C=DesiredLev-OldLev=DeltaLevel
LXI     H,TempCursor2
ADD     M
MOV     M,A                ;TempCursor2[0] += DeltaLevel
;
;       Create actual ChildPair.  We have collected
;  all necessary info from BTreeParentCell in case it
;  is pre-empted.  Note the preemption can happen
;  without any switching because of MetaTree GetPage
;  calls!  The info is in TempCursor and TempCursor2.
;  DataPtr-->TempCursor2.DataArea.
;       Insert RightPairItem.  If already there, its
;  data area is left alone.
;
LXI     D,TempCursor2      ;B=TempCursor2Len
LDA     TempCursor2Len
MOV     B,A                ;DataPtr already set.
CALL    Insert             ;Put NextCellName in MetaTree
CC      Trap
;
;       Now Insert LeftPairItem.
;
```

```
        LXI     D,TempCursor     ;Should check DataLens here!!!
        LDA     TempCursorLen
        MOV     B,A
        ADD     E
        MOV     L,A              ;HL-->AfterTempCursor.
        MOV     H,D
        SHLD    DataPtr          ;For Insert.
        PUSH    D
        CALL    Find             ;Find sets CursorLen:=B.
        POP     D
        CC      Trap
        ORA     A
        JZ      MCP1             ;Jmp/ already there.
;
;       LeftPairItem is not in MetaTree, so get
;  a page for it and insert it.
;
        PUSH    H                ;Save HL-->Where to Insert.
        CALL    GetPreemptablePage ;Pres DE,BC,MTStruct,CL,DP
        MOV     B,H              ;B=GottenPageNum.
        CC      Trap
        POP     H
        PUSH    H
        MVI     L,CDataLen
        MOV     A,M
        LHLD    DataPtr
        ADD     L
        DCR     A
        MOV     L,A              ;HL-->DataArea.PageNum
        MOV     M,B              ;DataArea.PageNum:=GottenPage.
        POP     H                ;C=MatchLen, DE-->Cursor.
        PUSH    B                ;CursorLen, DataPtr still OK.
        CALL    Insert1          ;Entry for Insert after Find.
        POP     B                ;B=PageNum
        MOV     H,B              ;Return H=NewChildCellPageNum.
        POP     B
        POP     D
        RET
;
;       HL-->LeftPairItem, which was already there.
;  If it is not in-RAM, get a page for it.
;
MCP1    PUSH    H                ;Save HL-->LeftPairItem.
        INR     L
        MOV     L,M              ;HL-->AfterLeftPairItem.
        DCR     L
        MOV     B,M
        DCR     L                ;HL-->LeftPairItem.FlagByte.
        MOV     A,M
        CMA
        ANI     PairBit OR InRAMBit
        JNZ     MCP2             ;Jmp/ not an InRAM Pair.
        POP     H
```

```
        MOV     H,B             ;Return H=ChildCellPageNum.
        POP     B
        POP     D
        RET                     ;NOT CARRY (By ANI)
        ;
        ;       LeftPairItem already in MetaTree, but was not a
        ;  PairItem or was not In-RAM.  Get a Page,  fix
        ;  ParentTab, copy in the CellNum.  Set Flags=PairBit
        ;  | InRAMBit | IOBit | AllocBit.  IOBit indicates
        ;  Cell has not yet been read.
        ;
MCP2    MOV     A,M             ;Was either NonPair or not
        ANI     NOT (PairBit OR AllocBit) AND OFFH ;InRAM.
        CNZ     Trap            ;All but PairBit, AllocBit=0.
        CALL    GetPreemptablePage ;Pres DE,BC. H=L=Page.
        CC      Trap            ;GetPage preserves MetaTree
        MOV     B,H             ;B=GottenPageNum in PreemptSeg.
        ;
        POP     D               ;DE-->LeftPairItem.
        MOV     L,B
        MVI     H,HI ParentOffsetTab
        MOV     M,E
        INR     H
        MOV     M,D             ;Fix the PT for new page.
        ;
        XCHG
        INR     L
        MOV     A,M             ;A=LeftPairItem.NIO.
        MVI     L,CDataLen
        MOV     C,M
        SUB     C
        MOV     L,A
        XCHG                    ;DE-->LeftPairItem.DataArea.
        ;
        DCR     C               ;Don't copy PageNum or Flags.
        DCR     C
        LHLD    DataPtr         ;HL-->TempCursor.CellNum
        CALL    Move            ;DE-->LeftPairItem.FlagByte.
        MVI     A,PairBit OR InRAMBit OR IOBit OR AllocBit
        STAX    D
        INR     E               ;DE-->LeftPairItem.PageNum.
        MOV     A,B
        STAX    D
        ;
        MOV     H,B             ;Ret H=NewChildPage.
        POP     B
        POP     D
        RET
;
;       Destroy the HL-->ChildPair.  The LeftPairItem
;  is deleted if there is no PairItem immediately to its left;
;  if there is, its PairBit is simply turned off.  The
;  RightPairItem is deleted unless its PairBit is on.
```

```
;  The ChildPage is Freed, its ParentTab entry is set zero,
;  and the PageNum in its MetaParent is zeroed.
;       Pres no regs.
;
        PUBLIC  DestroyChildPair
DestroyChildPair
        ;
        ;       Do we have a ChildPage to get rid of?
        ;
        PUSH    H
        itemflags
        MOV     A,M
        ANI     IOBit
        CNZ     Trap
        MOV     A,M
        POP     H
        CMA
        ANI     PairBit OR InRAMBit
        JNZ     DCPO                    ;Jmp/ not InRAM.
        ;
        ;       Get rid of the existing ChildPage.
        ;
        PUSH    H
        itempn
        MOV     H,M
        ;
        IF      0                       ;DEBUG!!!
        MVI     L,CLevel
        MOV     A,M
        CPI     GroundCellLevel
        CZ      Trap                    ;Don't destroy the GroundCellPair!
        ENDIF
        ;
        MOV     L,H
        CALL    FreePage                ;Pres L,DE,BC.
        POP     H
        MVI     A,OFFH
        STA     FixPTFlag
        CALL    DeChild                 ;Pres HL,DE,BC.
DCPO    ;
        ;       No ChildPage.  Install ZombiePage as ChildPage
        ;  for reference after the deletion.
        ;
        PUSH    H
        itempn
        MVI     M,ZombiePage
        POP     H
        MOV     A,L
        STA     ParentOffsetTab+ZombiePage
        MOV     A,H
        STA     ParentPageTab+ZombiePage
        ;
        ;       Delete the RightPairItem if necessary.
```

```
        ;
        afteritem
        CALL    SkipRightToItem ;Pres. DE,BC.
        JC      DCP1            ;Jmp/ no RPI: Half a Pair!
        MOV     B,L             ;B=RightPairItemOffset.
        itemflags
        MOV     A,M             ;Is RightPairItem.PairBit on?
        ANI     PairBit
        MOV     L,B
        JNZ     DCP1            ;Jmp/ PairBit on. Don't delete.
        CALL    Delete1         ;Delete HL-->RightPairItem.
        CC      Trap
DCP1    ;
        ;       Now do LeftPairItem.  Use the ParentTab on the
        ;  ZombiePage to find it.  The Zombie method is
        ;  necessary in case LeftPairItem moved after the
        ;  deletion of the RightPairItem.  If the Item Previous
        ;  to the LeftPairItem has PairBit on, then simply
        ;  turn off the PairBit in the LeftPairItem, because
        ;  LeftPairItem is serving as a RightPairItem in the
        ;  previous Pair.  Otherwise, delete LeftPairItem.
        ;
        LXI     H,ZombiePage*256
        metaparent
        MVI     A,0FFH
        STA     FixPTFlag
        CALL    DeChild         ;Pres HL,DE,BC.
        ;
        MOV     A,L
        itemflags
        MVI     M,0             ;Make into NonPairItem.
        MOV     L,A
        ;
        PUSH    H               ;Save HL-->LeftPairItem.
        CALL    SkipLeftToItem  ;Pres DE,BC.
        JNC     DCP2            ;Jmp/ found PrevItem.
        CPI     StartOfDBErr
        CNZ     Trap
        POP     H               ;Leave the LeftPairItem since
        RET                     ;it is first Item in DB.
        ;
DCP2    DCR     L
        DCR     L               ;HL-->PrevItem.Flags.
        MOV     A,M             ;Is PrevItem's PairBit on?
        ANI     PairBit         ;If so leave its RightPairItem.
        POP     H               ;HL-->LeftPairItem.
        RNZ                     ;Ret/ PairBit on.
        CALL    Delete1         ;Entry point after a Find.
        CC      Trap
        RET
;
;       Construct the BTree item after HL in the DE-->Cursor,
;  but if HL is after last item, use the RightPairItem for
```

```
;  this BCell.  Return B=CursorLen, DE-->AfterCursor,
;  no errors.
;
        PUBLIC  CeilingSuffixToCursor
CeilingSuffixToCursor
        MOV     A,L
        MVI     L,CAfterLastItem
        CMP     M
        MOV     L,A
        JNZ     BSuffixToCursor ;Always rets NOT CARRY, A=0.
        ;
        ;       After last item.
        ;
        aftermetaparent
        CALL    SkipRightToItem ;Justify to RightPairItem.
        JNC     SuffixToBCursor ;Always rets NOT CARRY, A=0.
        CALL    Trap
        RET
;
;       Copy an item over a cursor.  BSuffixToCursor assumes that the cursor
; was used to find the item or there is some other guarantee that the prefix
; of item matches the corresponding bytes in the cursor.  Both BItemToCursor
; and BSuffixToCursor work the same way as ItemToCursor and SuffixToCursor,
; but on BCells, whose Items have no LevelNum byte nor VolNamePrefix in
; front.  BItemToBCursor requires that the BCell have a correct MetaParentIte
; from which to extract the VolNamePrefix in the process of creating the
; 'BCursor', which is guaranteed to be VNPL bytes long, padded with zeroes if
; necessary.  BItemToCursor assumes the Cursor is already a BCursor so the VN
; construction can be skipped.  BSuffixToCursor assumes the Cursor is a
; 'BCursor' and also that it has the Prefix for the HL-->BItem.
;        HL-->Item, DE-->Cursor.  We assume cursor is long enough.  Return
; B=NewCursorLen, HL-->AfterItemSuffix=ItemDataArea, DE-->AfterCursor.
; C,A destroyed.
;
        PUBLIC  BItemToBCursor
BItemToBCursor
        PUSH    H
        PUSH    D
        metaparent              ;HL-->MetaParentItem.
        CALL    ItemToBCursor   ;Start with the MetaParentItem.
        POP     D
        POP     H
        PUBLIC  BItemToCursor
BItemToCursor
        LDA     VolNamePrefixLen ;Includes LevelByte.
        ADD     E
        MOV     E,A
        CALL    ItemToCursor    ;DE-->AfterCursor.
        LDA     VolNamePrefixLen
        ADD     B
        MOV     B,A
        RET
;
```

```
        PUBLIC  BSuffixToCursor
BSuffixToCursor
        LDA     VolNamePrefixLen ;Includes LevelByte.
        ADD     E
        MOV     E,A
        CALL    SuffixToCursor  ;DE-->AfterCursor.
        LDA     VolNamePrefixLen
        ADD     B
        MOV     B,A
        RET
;
;       ItemToBCursor and SuffixToBCursor pad out the
;  Cursor to VolNamePrefixLen with zeroes if necessary, so
;  that the Cursor is a 'BCursor', which is guaranteed to have
;  a complete VolNamePrefix.  No need to use these on
;  BItems or with DE-->Cursor[VNPL].
;       Return DE-->AfterCursor, B=CursorLen (including
;  any padding), HL-->AfterItemSuffix.
;
        PUBLIC  ItemToBCursor
ItemToBCursor CALL ItemToCursor
        JMP     STBC1
        PUBLIC  SuffixToBCursor
SuffixToBCursor CALL SuffixToCursor
STBC1   LDA     VolNamePrefixLen
        SUB     B
        RC                      ;Ret/ Cursor long enough.
        RZ
        MOV     C,A             ;C=VNPL-CursorLen>0
        ADD     B
        MOV     B,A             ;B=VNPL.
        XCHG
        XRA     A
        CALL    Fill            ;Pres DE,B, HL-->AfterFill.
        XCHG                    ;DE-->AfterCursor.
        RET
;
;       Non-VolNamePrefix versions of BItemToCursor,
;  BSuffixToCursor.
;
        IF      0
;
        PUBLIC  BItemToCursor
BItemToCursor
        MOV     C,L
        MVI     L,CLevel
        MOV     A,M             ;A=BCell.Level.
        MOV     L,C
        STAX    D               ;Cursor[0]:=Level.
        INR     E
        MVI     C,0             ;C=ScanFrom
        CALL    ConstructPrefix ;Pres HL,DE. BC,A=?
        CALL    SuffixToCursor
        INR     B               ;Account for Cursor[0].
        RET
;
        PUBLIC  BSuffixToCursor
BSuffixToCursor
        INR     E
        CALL    SuffixToCursor
        INR     B
        RET
;
        ENDIF
;
        END
```

```
;*********************************************************
;*                                                       *
;*         Infinity Database Operating System            *
;*                      Kernel                           *
;*                                                       *
;*      Memory Management and Tasking.                   *
;*                                                       *
;* Copyright (C) 1982,1983,1984,1985,1986 Roger L.       *
;* Deran. All rights reserved.                           *
;*                                                       *
;*********************************************************
;
;<80>
        INCLUDE C:INF-H.I80
;<80>
        INCLUDE C:KERNEL-H.I80
;<80>
        INCLUDE C:DATA-H.I80
;<80>
        EXTRN   PageSpace, Trap, ClockReset, FindMemTop, DCMP
;<86>   INCLUDE C:INF-H.ASM
;<86>   INCLUDE C:KERNEL-H.ASM
;<86>   INCLUDE C:DATA-H.ASM
;<86>   EXTRN   Trap:NEAR, ClockReset:NEAR, FindMemTop:NEAR, DCMP:NEAR
;<86>   EXTRN   PageSpace:BYTE, FreeSegHeadPage:BYTE
;
        PUBLIC  InitKernel, InitMemory, InitTasking
        PUBLIC  AllocPage, FreePage
        PUBLIC  EnSeg, DeSeg, DeSegFast, DeSegFastPresDE
        PUBLIC  Request, Release, SemaTest
        IF      0                ;UNUSED CODE!!!
        PUBLIC  Disable, Restore
        PUBLIC  EnQueue, DeQueue, QueueNull, Predecessor, Successor,
CheckQueueNode
        PUBLIC  Wait, UnWait, Switch
        PUBLIC  Send, Receive, MsgGone
        PUBLIC  MutexRequest, MutexRequestExclusive, MutexRelease
        ENDIF                    ;UNUSED CODE!!!
;
;       **** Initialization ****
;
;       Initialize the memory management system, including the SegTab, the
; FreeSeg, and the multi-tasking system.  FreeSeg is initialized to contain
all
; pages from PageSpace, at the end of the resident code and data, to MemTop.
;
InitKernel CALL InitMemory
;
InitTasking
        LXI     H,0
        SHLD    Running
        RET
;
```

```
;       **** Page Memory Management ****
;
InitMemory
        CALL    InitSegTab      ;Each page is its own segment.
        ;
        ;  We assume program won't load if MemTop<PageSpace.
        ;
        CALL    FindMemTop      ;In system interface package.
        INX     H               ;HL-->After last byte in RAM.
        MOV     L,H             ;If L was 0FFH, We have a complete page to
use.
IT1     DCR     L
        CALL    FreePage        ;Pres HLDEBC.
        MOV     A,L
        CPI     HI PageSpace
        JNZ     IT1
        RET
;
;       Allocate a Page from FreeSeg.  Ret CARRY if none, or else
; H=L=AllocatedPage.  AllocatedPage is grounded. Pres DEBC.
;
AllocPage
        MVI     H,HI FreeSegHeadPage
        MOV     L,H
        MVI     H,HI ForwardSegTab
        MOV     A,M                ;LDA ex becomes MOV AL,ex!!!
        CPI     HI FreeSegHeadPage
        JZ      NoSpace
        MOV     L,A
        PUSH    D
        CALL    DeSeg           ;Pres LBC.
        POP     D
        MOV     H,L
        XRA     A
        RET
        ;
NoSpace MVI     A,NoSpaceErr
        STC
        RET
;
;       Free the L=Page. Restores a page to FreeSeg. Pres HLDEBC.
;
FreePage
        MOV     A,L
        CPI     HI PageSpace
        CC      Trap            ;Trap/ Page is not in PageSpace!
        PUSH    H
        PUSH    D
        CALL    DeSeg           ;Remove L Page from any seg. Pres LBC.
        MVI     D,HI FreeSegHeadPage ;Can't do MVI E,HI...
        MOV     E,D
        CALL    EnSeg           ;Pres LBC. Put L Page after E Page.
        POP     D
```

```
        POP     H
        XRA     A
        RET
;
;       **** Segmentation ****
;
;       A segment is a bidirectional ring in the SegTab.
;
;       Initialize segment table so that every page points
;  at itself, making a segment of lengh one.
;
InitSegTab
        MVI     L,0
ISTO    MVI     H,HI ForwardSegTab
        MOV     M,L
        MVI     H,HI BackwardSegTab
        MOV     M,L
        INR     L
        JNZ     ISTO
        RET
;
;       Put a Page into a segment ring.  L=PageNum,
;  E=SegmentPage new Page goes after.  Pres. L,BC.
;
EnSeg   MVI     H,HI BackwardSegTab
        MOV     M,E                 ;New^.Prev:=SegmentPage.
        MVI     D,HI ForwardSegTab
        LDAX    D
        MOV     H,D
        MOV     M,A                 ;New^.Next:=SegPage^.Next.
        MOV     A,L
        STAX    D                   ;SegPage^.Next:=New.
        MOV     E,M
        MVI     D,HI BackwardSegTab
        MOV     A,L
        STAX    D                   ;SegPage^.Next^.Prev:=New.
        RET
;
;       Remove L Page from Segment it is in.  Pres L,BC.
;  Point the L Page at itself.
;
DeSeg   MVI     H,HI ForwardSegTab       ;7
        MOV     E,M                      ;7
        MVI     D,HI BackwardSegTab      ;7
        MOV     H,D                      ;5
        MOV     A,M                      ;7
        STAX    D                        ;7 Next.Prev:=L.Prev.
        MOV     M,L                      ;7 L.Prev:=L.
        MVI     H,HI ForwardSegTab       ;7
        MOV     D,H                      ;5
        MOV     E,A                      ;5 Prev.Next:=L.Next.
        MOV     A,M                      ;7
        STAX    D                        ;7
```

```
        MOV     M,L                             ;7 L.Next:=L.
        RET                                     ;10. Total=70+15+10=95
;
;       Faster version of DeSeg which does not preserve L and
;  which does not point the L page at itself.  Pres BC.
;
DeSegFast
        MVI     H,HI ForwardSegTab              ;7
        MOV     A,M                             ;7
        MOV     D,H                             ;5
        MVI     H,HI BackwardSegTab             ;7
        MOV     E,M                             ;7
        STAX    D                               ;7
        MOV     H,D                             ;5
        MOV     L,A                             ;5
        MOV     M,E                             ;7
        RET                                     ;10. Total=42+15+10=67
;
;       DeSegFast but also preserve DE.  Pres DE,BC.
;
DeSegFastPresDE
        MVI     H,HI ForwardSegTab              ;7
        MOV     A,M                             ;7
        MVI     H,HI BackwardSegTab             ;7
        MOV     L,M                             ;7
        MVI     H,HI ForwardSegTab              ;7
        MOV     M,A                             ;7
        MOV     H,A                             ;5
        MOV     A,L                             ;5
        MOV     L,H                             ;5
        MVI     H,HI BackwardSegTab             ;7
        MOV     M,A                             ;7
        RET                                     ;10. Total=56+15+10=81.
;
;       **** Semaphores ****
;
;       A semaphore has only Get and Release, providing
;  exclusive ownership by one task at a time.
;
;       HL-->Semaphore.
;
;       Test a semaphore without committing to a Get.
;  Ret CARRY if not free (a task has called Request on it).
;  Note all non-semaphore objects always appear locked.
;
        sharedfunc      SemaTest
        MOV     A,M
        CPI     SemaType        ;If SemaType, unlocked.
        RZ                      ;Ret/Free: NOT CARRY.
        STC
        RET                     ;Ret/Held by someone: CARRY.
;
;       Acquire a semaphore, waiting for it if necessary.
```

```
;  We have a tricky method for avoiding convoys; you can
;  request and release a semaphore repeatedly inside a quantum
;  without relinquishing the CPU.  After a quantum, when
;  other tasks not waiting for the semaphore have executed
;  (Which means non DBMS tasks in present system) the
;  TickFlag will have been set by the ClockInt code, and the
;  next Release will switch.
;
        sharedfunc      Request
        DI                              ;Non-stackable!!!
        ;
        IF      SemaValidity
        CALL    CheckSemaphore
        ENDIF
        ;
        XRA     A                       ;Reset tick flag so we know
        STA     TickFlag                ;if clock ticks during lock.
        MOV     A,M
        CPI     SemaType
        MVI     M,SemaLockedType
        JNZ     Wait                    ;Jmp/ quantum done.
        EI
        RET
;
        sharedfunc      Release
        DI                              ;Not nestable!!!
        LDA     TickFlag
        ORA     A                       ;If >0, we had a clock tick.
        JNZ     Rel0
        MVI     M,SemaType              ;Unlock Semaphore.
        EI
        RET
        ;
        ;       We have held the semaphore through a
        ;  quantum interrupt.  Now we switch to a waiter,
        ;  if there is one.  If there is a waiter, we leave the
        ;  semaphore flag set, so it will be set for him.
        ;
Rel0    XRA     A                       ;Reset for next quantum.
        STA     TickFlag
        INR     L                       ;Is queue empty?
        MOV     A,M
        CMP     L                       ;Empty if pointing at self.
        JNZ     Rel1                    ;If empty, done.
        INR     L
        MOV     A,M
        DCR     L
        CMP     H
        JNZ     Rel1
        DCR     L
        MVI     M,SemaType              ;Unlock Semaphore.
        RET
        ;
```

```
        ;       Not empty.  Fire up a waiting task.
        ;
Rell    DCR     L
        CALL    UnWait          ;Activate a waiter.
        ;
        ;       We could return to Running here, since the
        ;  lock is set for the waiter, and everything is
        ;  consistent.  But for now, we will do a switch.
        ;
        JMP     Switch
;
;       Check a Semaphore for validity.  Its type must be
;  either SemaType or SemaLockedType, and it must have a
;  valid QueueNode.
;
CheckSemaphore
        DI
        MOV     A,M
        CPI     SemaType
        JZ      CSemal
        CPI     SemaLockedType
        CNZ     Trap
CSemal  INR     L
        CALL    CheckQueueNode
        DCR     L
        EI
        RET
;
;       **** Queues ****
;
;       A QueueNode is a node on a bidirectional ring.
;  It is normally found immediately after the Type byte of the
;  object it is a part of, so that one can identify the object
;  while traversing the queue.  A queue node that is not immed-
;  iatly after the object type byte must have a special object
;  defined for it with its own initial type byte and some
;  defined method for finding the base of the containing
;  object.  Entries are an example: each entry has type byte
;  EntryType, then queue node, then pointer to base of task
;  it is part of, then pointer to code etc.
;       Note: Next points at the Next of the next node on
;  the ring, not the base of the next object.  Similarly, Prev
;  points at the Prev pointer of the previous node.
;
;       Test to see if a QueueNode is null (points at itself.)
;  Ret NOT CARRY if true.  HL-->QueueNode.  HL preserved.
;
        IF      0               ;UNUSED CODE!!!
;
QueueNull
        IF      QValidity
        CALL    CheckQueueNode
        ENDIF
```

```
        ;
        MOV     A,M             ;Next must point at self for
        CMP     L               ;queue to be null.
        STC
        RNZ
        INR     L
        MOV     A,M
        DCR     L
        CMP     H
        RZ
        STC
        RET
;
;       Enqueue.  Put a queue node on a queue (on a ring).
;  HL-->Queued node new node goes after, BC-->New node.
;  Wrecks A,HL,DE,BC.  No page boundary checking is done.
;  Always ret NO CARRY so users can JMP Enqueue.
;
Enqueue
        IF      QValidity
        CALL    CheckQueueNode
        ENDIF
        ;
        MOV     E,M
        MOV     M,C             ;Point next of new prev at new.
        MOV     A,E
        STAX    B               ;Point next of new at new next.
        INR     L
        INR     E
        INR     C
        MOV     D,M             ;DE-->new next.
        MOV     M,B             ;Point next of new prev at new.
        MOV     A,D
        STAX    B               ;Point next of new at new next.
        INR     L               ;HL-->prev of new prev,
        INR     E               ;DE-->prev of new next.
        INR     C               ;BC-->prev of new.
        XCHG                    ;HL-->prev of new next...
        MOV     M,C             ;Point prev of new next at
        MOV     A,E             ;prev of new.
        STAX    B               ;Point prev of new at prev of
        INR     L               ;new prev.
        INR     E
        INR     C
        MOV     M,B             ;Point prev of new next at
        MOV     A,D             ;prev of new.
        STAX    B               ;Point prev of new at prev of
        ORA     A               ;new prev. 26 instructions!
        RET                     ;NOT CARRY.
;
;       Dequeue an queue node from a ring it is on.
;  HL-->queue node.  No page boundary crossings are checked
;  for; we just blow up.  Always return NO CARRY.
```

```
;  Returns BC-->PrevQueueNode, DE-->NextQueueNode,
;  Preserves HL.
;
Dequeue
        IF      QValidity
        CALL    CheckQueueNode
        ENDIF
        ;
        ;       Point current at self while getting old ptrs.
        ;
        MOV     A,L                 ;Save Cur.LowByte for return.
        ;
        MOV     E,M                 ;DE:=Cur.Next.
        MOV     M,L                 ;Cur.Next:=&(Cur.Next)=Cur.
        INR     L
        MOV     D,M
        MOV     M,H
        INR     L
        MOV     C,M                 ;BC:=Cur.Prev.
        MOV     M,L                 ;Cur.Prev:=&(Cur.Prev)=Cur+2.
        INR     L
        MOV     B,M
        MOV     M,H
        ;
        MOV     L,A                 ;Restore HL-->self for return.
        ;
        INR     E                   ;Next.Prev:=Prev
        INR     E
        MOV     A,C
        STAX    D
        INR     E
        MOV     A,B
        STAX    D
        DCR     E                   ;Restore DE-->Next for return.
        DCR     E
        DCR     E
        ;
        DCR     C                   ;Prev.Next:=Next
        MOV     A,D
        STAX    B
        DCR     C                   ;BC-->Prev.
        MOV     A,E                 ;DE-->Next.
        STAX    B                   ;HL-->DequeuedNode.
        ORA     A                   ;NOT CARRY.
        RET
;
;       Find the predecessor (successor) queue node given node
;  pointer in HL.
;
Predecessor
        IF      QValidity
        CALL    CheckQueueNode
        ENDIF
```

```
        ;
        INR     L
        INR     L
        MOV     A,M
        INR     L
        MOV     H,M
        SUI     2                   ;Faster than DCR, DCR.
        MOV     L,A
        RET
;
Successor
        IF      QValidity
        CALL    CheckQueueNode
        ENDIF
        ;
        MOV     A,M
        INR     L
        MOV     H,M
        MOV     L,A
        RET
;
;       Check a node of a WaitQueue.  HL-->QueueNode to be
;  checked.  Its Next must point at a node whose Prev points
;  at us, and its Prev must point at a node whose Next points
;  at us.  This is conveniently true also for an unqueued node,
;  which points at itself.  Preserves HL,DE,BC.
;
CheckQueueNode
        PUSH    D
        MOV     E,M
        INR     L
        MOV     D,M
        INR     L                   ;DE-->Next.Next, HL-->Cur.Prev.
        INR     E                   ;DE-->Next.Prev==&Cur.Prev?
        INR     E
        LDAX    D
        CMP     L
        CNZ     Trap
        INR     E
        LDAX    D
        CMP     H
        CNZ     Trap
        ;
        MOV     E,M
        INR     L                   ;HL-->Cur.Prev.HiByte.
        MOV     D,M                 ;DE-->Prev.Prev.
        DCR     L                   ;HL-->Cur.Prev.
        DCR     L
        DCR     L                   ;HL-->Cur.Next.
        DCR     E
        LDAX    D                   ;Prev.Next==&Cur.Next?
        CMP     H
        CNZ     Trap                ;Trap/ high bytes differ.
```

```
        DCR     E
        LDAX    D
        CMP     L
        CNZ     Trap                ;Trap/ low bytes differ.
        POP     D
        RET
;
;       **** Scheduler ****
;
;       Dispatch the current task on the run queue, starting
;  with CPU state already pushed completely.  It is not known
;  at this point whether there actually are tasks to run.  If
;  not, we wait in a halt loop for an interrupt to change
;  the situation.
;
Dispatch
        DI
        LHLD    Running
        MOV     A,H                 ;No task is at zero.
        ORA     L
        JNZ     Displ               ;Jmp/ got a task to run.
        EI                          ;No task to run, so just wait.
        HLT                         ;Turn on front panel light!!!
        JMP     Dispatch
;
;       Relinquish the CPU and switch from the current task to
;  next on run queue.  This is a user callable function.
;  It assumes there is something to run; this means the user
;  function must not have suspended itself before getting
;  here.  There is theoretically no way for user tasks to
;  do this, but kernel functions must be careful.
;
Switch  PUSH    PSW
        PUSH    H
        PUSH    D
        PUSH    B
;
;       Entry point from clock interrupt.
;  Assume registers already on task's stack: BC,DE,HL,PSW,PC.
;
ClockInt
        CALL    ClockReset          ;Re-arm clock for next time.
        ;
        LHLD    Running             ;Save SP in running task.
        LXI     D,SPSave
        DAD     D
        XCHG
        LXI     H,0
        DAD     SP
        XCHG                        ;DE=TaskSP, HL-->SP dest.
        MOV     M,E
        INR     L
        MOV     M,D
```

```
        ;
        LHLD    Running         ;Find next task in run queue.
        CALL    Successor
        SHLD    Running
        ;
        MVI     A,OFFH          ;Signal a tick has occurred.
        STA     TickFlag
        ;
        ;       Dispatch HL-->RunningTask.
        ;
Displ   LXI     D,SPSave
        DAD     D
        MOV     E,M
        INR     L
        MOV     D,M
        XCHG
        SPHL
        POP     B
        POP     D
        POP     H
        POP     PSW
        EI
        RET
;
;       Suspend running task by putting it on a wait queue
;  for an object.  HL-->Wait queue for object to wait on.
;
Wait    DI                      ;At end, Dispatch will EI.
        PUSH    H               ;Save wait-on object.
        LHLD    Running         ;-->WaitQNode of current task.
        PUSH    H
        CALL    Successor       ;Find next.
        POP     D
        CALL    DCMP            ;If next=running,
        JNZ     Wait1           ;then zero Running so we will
        LXI     H,0             ;hang in Dispatch (Simplify!!!)
Wait1   SHLD    Running         ;Next is new running.
        XCHG
        PUSH    H
        CALL    Dequeue         ;dequeue old running from runQ.
        POP     B               ;BC-->Old running.
        POP     H               ;HL-->Object to wait for.
        INR     L
        CALL    Enqueue
        JMP     Dispatch        ;Go run new running, if any.
;
;       HL-->Wait-on object that is to be granted to next
;  task waiting for it.  The Running task continues to run.
;  Note we cannot let the Running task subsequently try to
;  lock this object again, because there is no way to put the
;  activated waiter back on the WaitQueue. Hence the Running
;  task should leave the lock set so that a later lock attempt
;  by this same task will cause a Wait.  This will also leave
```

```
;  the lock set for when the Awakened task runs.
;
UnWait  INR     L               ;Move from object base to q.
        CALL    Successor       ;Who is waiting for object?
        PUSH    H
        CALL    Dequeue         ;Remove him: he is next.
        POP     B               ;BC-->New node,
        LHLD    Running
        CALL    Predecessor     ;HL-->node it goes after.
        CALL    Enqueue         ;It goes at very end of RunQ.
        ORA     A
        RET
;
;       **** Interrupt flag Handlers ****
;
;  These allow a subroutine to turn off interrupts while it
;  works, and then avoid enabling them if it was entered
;  disabled.  It must be used around every call to a routine
;  that disables.  Preserves all but Flags.
;
Disable DI
        PUSH    H
        LXI     H,DisableDepth
        INR     M
        POP     H
        RET
;
Restore PUSH    H
        LXI     H,DisableDepth
        DCR     M               ;There is always a matching
        POP     H               ;Disable for each Restore!
        RNZ
        EI
        RET
;
;       **** MailBox Driver ****
;
;       Send puts a message on a mailbox queue or, if there
;  is already a task waiting for a message, gives it to
;  that task.
;       HL-->MailBox, DE-->Message.
;
        sharedfunc      Send
        PUSH    H
        INR     L
        CALL    Successor
        DCR     L
        MOV     A,M             ;A:=NextQueuedObject.Type
        POP     H
        CPI     TaskType        ;If task, give it msg.
        JZ      Send2
        CPI     MsgType         ;If a message, enqueue another.
        JZ      Send1
```

```
        CPI     MbxType         ;If empty queue, enqueue msg.
        CNZ     Trap            ;Trap on anything else.
        ;
        ;       Enqueue another message.
        ;
Send1   INR     L
        CALL    Predecessor     ;Get pred, which is last.
        MOV     B,D
        MOV     C,E
        INR     C               ;BC-->Msg's queue node.
        CALL    Enqueue         ;Put msg at end of Mbx queue.
        ORA     A
        RET
        ;
        ;       There is a task: give Msg to it.
        ;  HL-->Mbx.
        ;
Send2   PUSH    H
        INR     L
        CALL    Successor       ;Get -->task.
        MOV     A,L
        ADI     Parm-1          ;Return -->Msg in task's HL.
        MOV     L,A
        MOV     M,E
        INR     L
        MOV     M,D
        POP     H
        CALL    UnWait          ;Take task off Mbx queue.
        JMP     Switch          ;And switch.
;
;       HL-->Mbx to get a message from.
;
        sharedfunc      Receive
        PUSH    H
        INR     L
        CALL    Successor       ;Get Type of next.
        DCR     L
        MOV     A,M
        POP     H
        CPI     TaskType        ;If task, wait at QueueEnd.
        JZ      Recv1
        CPI     MsgType         ;If a message, get it.
        JZ      Recv2
        CPI     MbxType         ;If empty queue, wait.
        CNZ     Trap            ;Trap on anything else.
        ;
        ;       Wait on mailbox, then return value of Parm
        ;  in HL.  It will be the pointer to Msg.
        ;
Recv1   CALL    Wait
        LHLD    Running
        LXI     D,Parm
        DAD     D
```

```
        MOV     E,M
        INR     L
        MOV     D,M
        XCHG                    ;HL-->Msg.
        RET
        ;
        ;       Get Msg waiting on Mbx queue.
        ;
Recv2   INR     L
        CALL    Successor
        PUSH    H
        CALL    Dequeue
        POP     H
        DCR     L               ;Ret HL-->Msg.
        RET
;
        sharedfunc      MsgGone
        PUSH    H
        INR     L
        CALL    QueueNull       ;If Msg's QNode is null,
        POP     H               ;then message has been sent.
        RET                     ;Ret CARRY as per QueueNull.
;
;       **** Mutex Driver ****
;
;       A mutual exclusion object can be shared or used
;  exclusively.  The shared mode is implemented with a count.
;
MutexRequest
MutexRequestExclusive
MutexRelease
;
        ENDIF                   ;UNUSED CODE!!!
;
        END
```

```
;*******************************************************
;*                                                     *
;*           Infinity DataBase Operating System        *
;*                      Data Section                   *
;*                                                     *
;* Copyright (C) 1982,1983,1984,1985,1986 Roger L.     *
;* Deran. All rights reserved.                         *
;*                                                     *
;*******************************************************
;
;<86>    INCLUDE C:INF-H.ASM
;<86>    INCLUDE C:KERNEL-H.ASM
;<86>    INCLUDE C:CELL-H.ASM
;<80>
         INCLUDE C:INF-H.ASM
;<80>
         INCLUDE C:KERNEL-H.ASM
;<80>
         INCLUDE C:CELL-H.ASM
;
        PUBLIC  FreeSegHeadPage, Running, TickFlag, DisableDepth, SysErrCode
        PUBLIC  ForwardSegTab, BackwardSegTab, CursorPtr, CursorLen, DataPtr
        PUBLIC  NGTItemLowByte, NGTItem, NGTPrefixLen, NewNGTItemLowByte
        PUBLIC  NewNGTItem, MatchLen, NewItemLen, Growth, LeftCellPage
        PUBLIC  RightCellPage, SplitPoint, MetaRootPage, FixPTFlag, ChildPage
        PUBLIC  ParentOffsetTab, ParentPageTab, DBSemaphore
        PUBLIC  PreemptSegHeadPage, DirtySegHeadPage, LowWater
        PUBLIC  VolNamePrefixLen, BFindLevel, BLeftCellPage, BRightCellPage
        PUBLIC  PrevDataPtr, BDataPtr, CellNumLen, ScanCell, ScanItemPtr
        PUBLIC  NextScanItemPtr, PrevNonPairItemPtr, TightPacking, ICCellPtr
        PUBLIC  ICGroundCellPtr, BalancePrefixLen
        PUBLIC  FLMPILeftCellPtr, FLMPIRightCellPtr, FLMPICellPtr
        PUBLIC  BRDLeftCursorLen, BRDLeftCursorPtr
        PUBLIC  BRDRightCursorLen, BRDRightCursorPtr
        PUBLIC  BRDLeftItemPtr, BRDRightItemPtr
        PUBLIC  IUCursor, IUCursorLen, IULeftCursor, IULeftCursorLen
        PUBLIC  IULeftCursor2, IULeftCursor2Len, IURightCursor,
IURightCursorLen
        PUBLIC  ShadowCursor, ShadowCursorLen, TempCursor, TempCursorLen
        PUBLIC  TempCursor2, TempCursor2Len
        PUBLIC  PageSpace
;
BEGIN           DB      'DATA'  ;Label for 'need' macro.
;
;       **** KERNEL ****
;
Running         DS      2       ;Running task pointer.
TickFlag        DS      1       ;Set to 0FFH by ClockInt.
DisableDepth    DS      1       ;For nestable critical sects.
SysErrCode      DS      2       ;System dependent error code.
;
;       SegTab is full of rings of Pages.  Position in SegTab
; corresponds to physical page number.  ForwardSegTab has
```

```
;  forward pointer for each entry, BackwardSegTab has
;  backward.
;
        need    256
FreeSegHeadPage
ForwardSegTab   DS      256
BackwardSegTab  DS      256
;
;       **** CELL ****
;
CursorPtr       DS      2       ;-->Cursor to be Inserted.
CursorLen       DS      1       ;Length of Cursor.
DataPtr         DS      2       ;-->DataArea to be Inserted.
;<86>NGTItemLowByte LABEL BYTE
;<80>
NGTItemLowByte
NGTItem         DS      2       ;-->ItemAfterInsertPoint
NGTPrefixLen    DS      1       ;NGTItem.PL before compression.
;<86>NewNGTItemLowByte LABEL BYTE
;<80>
NewNGTItemLowByte
NewNGTItem      DS      2       ;-->NGTItemCommpressed for Ins.
MatchLen        DS      1       ;Result of Search.
NewItemLen      DS      1       ;2+NewItemSuffixLen+DataLen.
Growth          DS      1       ;Increase of AfterLastItem.
LeftCellPage    DS      1       ;PageNum of LeftCell in split.
RightCellPage   DS      1       ;PageNum of RightCell in split.
SplitPoint      DS      1       ;Offset in LeftCell of split.
;
;       **** META TREE ****
;
MetaRootPage    DS      1       ;Root page for Meta-Tree.
FixPTFlag       DS      1       ;>0: RelocItems fixes ParentTab
ChildPage       DS      1       ;New DataArea for ParentItem.
;
;       The ParentTab is composed of two parts, each
;  containing half of the two byte ParentPtr.
;
        need    256
PreemptSegHeadPage
ParentOffsetTab DS      256
DirtySegHeadPage
ParentPageTab   DS      256
;
;       **** B TREE ****
;
DBSemaphore     DB      SemaType ;Locks entire MetaTree!!!
                DS      QNodeSz
LowWater        DB      8       ;#Pages below which we do automatic IU.
VolNamePrefixLen DB     1       ;Length of VolNamePrefixes.
BFindLevel      DS      1       ;Level to stop at in BFind.
BLeftCellPage   DS      1       ;Like Left-, Right- CellPage,
BRightCellPage  DS      1       ;but for BTree.
```

```
PrevDataPtr      DS      2       ;-->DataArea for PrevBPrntItem.
BDataPtr         DS      2       ;Like DataPtr in MetaTree.
;
;       Cell Allocator
;
CellNumLen       DS      1       ;Length of CellNums.
;
;       IndexUpdate
;
ScanCell         DS      1       ;PackCell
ScanItemPtr      DS      2
NextScanItemPtr DS       2
PrevNonPairItemPtr DS    2
TightPacking     DS      1       ;IU Packs Cells "Tightly."
ICCellPtr        DS      2       ;IndexCell
ICGroundCellPtr DS       2
BalancePrefixLen DS      1
FLMPILeftCellPtr DS      2       ;FixLeftMetaParentItem.
FLMPIRightCellPtr DS     2
;
;       BRangeDelete.
;
BRDLeftCursorLen DS      1
BRDLeftCursorPtr DS      2       ;-->LeftCursor.
BRDRightCursorLen DS     1
BRDRightCursorPtr DS     2       ;-->RightCursor.
BRDLeftItemPtr  DS       2       ;-->LeftMetaParentItem.
BRDRightItemPtr DS       2       ;-->RightMetaParentItem.
;
;       FixLeftMetaParentItem
;
FLMPICellPtr     DS      2
;
;       **** Cursors ****
;
                 need    MaxCursorSz+1
IUCursorLen      DS      1
IUCursor         DS      MaxCursorSz      ;Owned by IndexUpdate.
;
                 need    MaxCursorSz+1
IULeftCursorLen DS       1
IULeftCursor     DS      MaxCursorSz      ;Owned by IndexUpdate.
;
                 need    MaxCursorSz+1
IULeftCursor2Len DS      1
IULeftCursor2    DS      MaxCursorSz      ;Owned by IndexUpdate.
;
                 need    MaxCursorSz+1
IURightCursorLen DS      1
IURightCursor    DS      MaxCursorSz      ;Owned by IndexUpdate.
;
                 need    MaxCursorSz+1
ShadowCursorLen DS       1
```

```
ShadowCursor     DS      MaxCursorSz     ;Used by ShadowIfWriting.
;
                 need    MaxCursorSz+1
TempCursorLen    DS      1
TempCursor       DS      MaxCursorSz     ;Used by MakeChildPair, etc.
;
                 need    MaxCursorSz+1
TempCursor2Len   DS      1
TempCursor2      DS      MaxCursorSz
;
;       Allocatable Pages from here to MemTop.
;
        need    256
PageSpace DS    1
;
        END
```

```
;*******************************************************
;*                                                     *
;*          Infinity DataBase Operating System         *
;*            Concurrent B-Tree Index Update           *
;*                                                     *
;*      Index Update does Cell writes, splits and      *
;*  merges in background in order to reduce disk I/O   *
;*  waits, eliminate split/merge thrashing, and        *
;*  minimize redundant index updates.  We also follow  *
;*  a two-phase commit protocol that preserves the     *
;*  integrity of the tree structure through power      *
;*  failures, many hardware failures, and (later)      *
;*  media failures affecting uncommitted data.         *
;*                                                     *
;* Copyright (C) 1982,1983,1984,1985,1986 Roger L.     *
;* Deran. All rights reserved.                         *
;*                                                     *
;*******************************************************
;
;<86>   INCLUDE C:INF-H.ASM
;<86>   INCLUDE C:CELL-H.ASM
;<86>   INCLUDE C:MTREE-H.ASM
;<86>   INCLUDE C:BTREE-H.ASM
;<86>   INCLUDE C:DATA-H.ASM
;<86>   EXTRN   Trap:NEAR, Request:NEAR, Release:NEAR
;<86>   EXTRN   Find:NEAR, Search:NEAR, BFind:NEAR, BSearch:NEAR
;<86>   EXTRN   Insert1:NEAR, BInsert:NEAR, Delete1:NEAR, Merge:NEAR,
DeChild:NEAR
;<86>   EXTRN   StartWriteCell:NEAR, WriteCell:NEAR
;<86>   EXTRN   CommitCellAlloc:NEAR, DeallocCell:NEAR
;<86>   EXTRN   AllocCell:NEAR, SkipLeftToItem:NEAR, SkipRightToItem:NEAR
;<86>   EXTRN   ItemToBCursor:NEAR
;<86>   EXTRN   Move:NEAR, SuffixToBCursor:NEAR, MakeChildPair:NEAR
;<86>   EXTRN   MovePage:NEAR, Fill:NEAR, FinishCell:NEAR
;<86>   EXTRN   CeilingSuffixToCursor:NEAR, Compare:NEAR, SetDirtyBit:NEAR
;<86>   EXTRN   DestroyChildPair:NEAR, RangeDelFromPage:NEAR, ReadCell:NEAR
;<86>   EXTRN   FreePage:NEAR, UsePage:NEAR, DirtyPage:NEAR
;<86>   EXTRN   ExchangeBCellPages:NEAR
;<86>   EXTRN   BItemToBCursor:NEAR, ChooseSplitPt:NEAR, CheckBCellPtr:NEAR
;<86>   EXTRN   CheckInRamStructures:NEAR
;<80>
        INCLUDE C:INF-H.I80
;<80>
        INCLUDE C:CELL-H.I80
;<80>
        INCLUDE C:MTREE-H.I80
;<80>
        INCLUDE C:BTREE-H.I80
;<80>
        INCLUDE C:DATA-H.I80
;<80>
        EXTRN   Trap, Request, Release, Find, Search, BFind, BSearch, Insert1
;<80>
```

```
        EXTRN   BInsert, Deletel, Merge, DeChild, StartWriteCell, WriteCell
;<80>
        EXTRN   CommitCellAlloc, DeallocCell, AllocCell
;<80>
        EXTRN   SkipLeftToItem, SkipRightToItem, ItemToBCursor, Move
;<80>
        EXTRN   SuffixToBCursor, MakeChildPair, MovePage, Fill, FinishCell
;<80>
        EXTRN   CeilingSuffixToCursor, Compare, SetDirtyBit, DestroyChildPair
;<80>
        EXTRN   RangeDelFromPage, ReadCell, FreePage, DirtyPage, UsePage
;<80>
        EXTRN   ExchangeBCellPages, BItemToBCursor, ChooseSplitPt,
CheckBCellPtr
;<80>
        EXTRN   CheckInRamStructures
;
;       IndexUpdate does a scan of all LeafCells, then all
;  Level 1 Cells, and on upwards, updating each level onto
;  disk.  It does merge checking and merging, balancing,
;  re-indexing, and allocation and deallocation of Cells, all
;  following the integrity preservation protocol.
;
        PUBLIC  XIndexUpdate
XIndexUpdate reqdb
        CALL    IndexUpdate
        reldb
        XRA     A
        RET
        ;
        PUBLIC  IndexUpdate
IndexUpdate
        LXI     H,0             ;=0: PrevItem was a PairItem or
        SHLD    PrevNonPairItemPtr ;nonexistent or something.
        ;
        LXI     D,IUCursor      ;Find the beginning.
        XRA     A
        STAX    D
        MVI     B,1
        CALL    Find
        CC      Trap            ;HL-->FirstScanItem.
        ;
        ;       Top of Scan loop.  Find a Dirty BCell or a
        ;  MetaItem which is not part of any Pair and may be
        ;  garbage collected.
        ;  HL-->AfterLastScanItem or -->ScanItem.
        ;
        PUBLIC  IU1
IU1     CALL    IUValidityCheck
        CALL    SkipRightToItem ;Find work to do.
        JNC     IU10
        CPI     EndOfDBErr
        CNZ     Trap
```

```
        RET
IU10    ;
        MOV     A,M             ;If PrefixLen=0, maybe got
        ORA     A               ;beginning of new level.
        JNZ     IU11            ;Jmp/ not new level.
        INR     L
        INR     L
        MOV     A,M             ;Get Item[0]
        DCR     L
        DCR     L
        CPI     ShadowLevel+GroundCellLevel+1
        RNC             ;Done if >ShadowedGroundCellLevel.
        ;
IU11    MOV     A,L
        itempn
        MOV     D,M             ;D:=ScanCellPageNum.
        DCR     L
        MOV     E,M
        MOV     L,A             ;HL-->ScanItem.
        MOV     A,E
        ANI     PairBit
        JNZ     IU2             ;Jmp/Got a Pair.
        ;
        ;       ScanItem is not a PairItem.
        ;       Delete it if it was preceded by another non-
        ;  PairItem.  We have to be tricky and use our own
        ;  special ZombiePage in order to maintain a reference
        ;  point in the MetaTree.  To do this, we set
        ;  ScanItem.PageNum:=ZombiePage, delete NextScanItem,
        ;  then restore ScanItem-->ParentTab[ZombiePage].
        ;  Note that leaving ScanItem intact is necessary in
        ;  order to maintain the reference point, but it is
        ;  only possible because we already know that the
        ;  previous Item is a PairItem.  The ZeroItem provides
        ;  an initial PairItem which is never deleted.  Must
        ;  remember to remove ZombiePage as reference or
        ;  multiple Items will have ZombiePage and it won't
        ;  work.
        ;       HL-->ScanItem.
        ;
        XCHG
        LHLD    PrevNonPairItemPtr
        XCHG
        MOV     A,D
        ORA     E
        JNZ     IU12            ;Jmp/ PrevItem was a NonPair.
        ;
        ;       PrevItem wasn't a NonPair, but current Item is.
        ;  Just set the PrevNonPairItemPtr and loop.
        ;       HL-->ScanItem, DE-->PrevNonPairItem.
        ;
        SHLD    PrevNonPairItemPtr
        afteritem
```

```
        JMP     IU1             ;Loop.
        ;
        ;       PrevItem was a NonPair.  Delete ScanItem, and
        ;  leave the PrevNonPairItemPtr alone.  The PrevItem
        ;  will become the ScanItem after the Deletion, so
        ;  in a way we are backing up here.
        ;       HL-->ScanItem, DE-->PrevNonPairItem.
        ;
IU12    XCHG
        MOV     A,H
        STA     ParentPageTab+ZombiePage
        MOV     A,L
        STA     ParentOffsetTab+ZombiePage
        INR     L
        MOV     L,M
        DCR     L               ;HL-->ScanItem.PageNum.
        MVI     M,ZombiePage    ;ScanItem.PageNum=ZombiePage.
        DCR     L
        MVI     M,PairBit OR InRAMBit
        XCHG
        ;
        CALL    Delete1         ;Delete NextScanItem.
        CC      Trap
        ;
        MVI     H,ZombiePage
        metaparent
        SHLD    PrevNonPairItemPtr ;Resync after Delete.
        MVI     A,0FFH
        STA     FixPTFlag       ;So DeChild won't just return.
        CALL    DeChild         ;Pres HL,DE,BC. Undo Zombie.
        itemflags               ;Skip PrevNonPairItem.
        MVI     M,0             ;Make into a NonPair again.
        INR     L
        INR     L
        JMP     IU1             ;Loop on deleting NonPairItem.
        ;
        ;       Got a PairItem.  Set PrevNonPairItemPtr=0
        ;  to indicate this fact for the next pass.
        ;  HL-->ScanItem, D=ScanItem.PageNum, E=ScanItem.Flags.
        ;
        PUBLIC  IU2
IU2     PUSH    H
        LXI     H,0
        SHLD    PrevNonPairItemPtr
        POP     H
        ;
        MOV     A,E             ;E=FlagByte.
        ANI     DirtyBit
        JNZ     IU20
        INR     L
        MOV     L,M
        JMP     IU1             ;Loop/ Item needs no work.
IU20    ;
```

```
        ;       Got a Dirty PairItem.
        ;
        MOV     A,E
        ANI     InRAMBit OR IOBit ;Must be InRAM to be Dirty!
        CPI     InRAMBit          ;Can't have IOBit: only
        CNZ     Trap              ;IU can set it!
        ;
        ;       If the Cell is a GroundCell, it takes
        ;  special treatment.
        ;
        MOV     H,D               ;H=ScanCellPage.
        MVI     L,CLevel
        MOV     A,M
        CPI     GroundCellLevel
        JNZ     IU21
        ;
        ;       Got Dirty GroundCell.  Wait for all Writes
        ;  on this volume to complete and then write the
        ;  GroundCell.
        ;       I/O system concurrency levels: (1) full
        ;  concurrency, with IOSeg queue; (2) each disk locked;
        ;  (3) each controller locked; (4) entire disk I/O
        ;  system locked; (5) BTree locked, but non-BTree
        ;  processes continue; (6) Infinity operating system
        ;  locked, with no processes continuing during I/O.
        ;       For now, we have level 6 concurrency, we don't
        ;  worry at all about the IOBit or IOSeg etc, and we
        ;  don't wait on writes at all.
        ;
        PUSH    H
        metaparentflags
        MOV     A,M
        CMA
        ANI     PairBit OR InRAMBit
        CNZ     Trap              ;Trap/ GroundCell not InRAM or has no
MetaPair!
        POP     H
        PUSH    H
        CALL    WriteCell         ;WriteCell waits, unlike StartWriteCell.
        ;
        ;       Leave the GroundCell static after the write.
        ;
        CALL    CommitCellAlloc ;Now we can commit CellMaps.
        POP     H
        aftermetaparent
        JMP     IU1               ;Loop.
        ;
        ;       Pack the NonGroundCell ScanCell.
        ;
IU21    PUSH    H
        CALL    PackCell
        POP     H
        ;
```

```
;       Cell has been packed.  Deallocating the Cell is
;  necessary if the MoveBit and the AllocBit are both
;  on.  MoveBit on means that either the Cell's range
;  changed in PackCell or else IndexCell modified it
;  and we need to move it as part of the integrity
;  preservation protocol.
;       What about Cell being split right after
;  packing, say, during Dealloc or Alloc switching?
;  It would then be written unpacked.  Maybe we can
;  just ignore this rare case of lost efficiency.
;  Actually, the LeftCell efficiency is at least 50%,
;  and the RightCell is still pending packing.
;       If we try to do the Dealloc and Alloc in
;  advance, we get a circularity because PackCell
;  creates the need for Dealloc/Alloc when it
;  changes the range and necessitates a move.
;
        PUSH    H
        metaparentflags         ;HL-->CellMetaParentItem.Flags
        MOV     A,M
        CMA
        ANI     AllocBit OR MoveBit
        POP     H
        JNZ     IU22            ;Jmp/ 11: no need to Dealloc.
;
        PUSH    H               ;Got a moving, allocated Cell.
        CALL    DeallocCell     ;Resets AllocBit.
        POP     H
;
IU22    PUSH    H
        metaparentflags
        MOV     A,M
        ANI     NOT MoveBit AND OFFH ;Reset MoveBit.
        MOV     M,A
        POP     H
;
;       Allocate the Cell if necessary.  If we do
;  allocate it, Indexing is necessary too.
;  (If it is already allocated, then it must have
;  never had MoveBit, and we know: (1) it is not the
;  result of a split; (2) PackCell has not changed
;  its range by merging, balancing, or in some other
;  way adjusting it; and (3) IndexCell has not
;  modified it as a BBranchCell.)
;
        ANI     AllocBit
        JNZ     IU23            ;Jmp/ no Alloc/Index necessary.
;
;       Allocate ScanCell.
;
        PUSH    H
        CALL    AllocCell       ;Sets AllocBit.
        POP     H
```

```
;
;  Index the ScanCell so that its range is exactly
;  covered by its BParentPair, and this range is
;  contained entirely within the range of its
;  BParentCell so that there is no ambiguity in the
;  search path. Since the range of the BParentCell
;  while it is in RAM is controlled only by its
;  MetaPair, and since its MetaPair will in turn
;  be used to determine the BParentCell's range when
;  it is to be indexed, we simply alter the MetaPair
;  for the BParent, if necessary, so that it contains
;  the ScanCell's range.
;       ScanCell must have been allocated by this time
;  since we need its CellNum for the BParentItem.Cell-
;  Num.
;       IndexCell leaves the ScanCell's IOBit on to
;  protect it from splitting before it is actually
;  written.  Instead of splitting, it will Shadow.  If
;  it is Shadowed, we have to use Find to locate our
;  NextScanItem.  (ScanCell's DirtyBit is already on,
;  or we would not be working on it in the first place.
;  Thus the IOBit signifies writing, not reading.)
;       H=ScanCell.
;
PUSH    H               ;Index the H BCellPage,
CALL    IndexCell       ;leaving its IOBit on to delay possible split.
POP     H
;
PUSH    H
CALL    StartWriteCell  ;Turns off DirtyBit, IOBit, makes Page static.
POP     H
;
CALL    UsePage         ;Pres HLDEBC. Put H Page back onto PreemptSeg.
;
aftermetaparent
CALL    SkipRightToItem
CC      Trap
;
LXI     D,TempCursor
PUSH    H
CALL    ItemToBCursor
POP     H               ;HL-->AfterScanItem.
LDA     TempCursor      ;Is it Shadowed?
SUI     ShadowLevel
JC      IU1             ;Loop/ <ShadowLevel: Visible.
;
;       Its Shadowed.  Do a Find in Visible space.
;
STA     TempCursor
LXI     D,TempCursor    ;B=TempCursorLen.
CALL    Find
CC      Trap
ORA     A               ;Must have ExactMatch!
```

```
        CNZ     Trap
        JMP     IU1
        ;
IU23    PUSH    H
        CALL    StartWriteCell
        POP     H
        CALL    UsePage
        aftermetaparent
        JMP     IU1             ;Loop.
;
;       Index the Dirty H BCellPage and set its IOBit to
;  protect it from splitting before being actually written.
;  Assume Cell is Dirty, is already packed, allocated, and if
;  BBranchCell, is non-empty and has LeftMetaPairItem=InitItem.
;       If the BCellPage has a Range that covers an entire
;  volume, it becomes the new BRoot, and we index it by one of
;  three methods:
;       (1) BRootLevel did not change: just write BRootCellNum
;  into GroundCell;
;       (2) BRootLevel higher: like (1) but also update
;  BRootLevel in GroundCell;
;       (3) BRootLevel lower: must deallocate all old Cells
;  above NewBRoot and delete them from RAM before we can write
;  BRootCellNum and BRootLevel into GroundCell. Deleting
;  OldHigherCells from RAM prevents their use by BFind (the
;  covering principle) and avoids IU being confused by encoun-
;  tering them later in the IU pass.
;       Large changes in BRootLevel are infrequent.  For large
;  databases they never occur because the size of RAM limits
;  how much can be inserted or deleted per IU pass.
;       Normal Indexings (BCell is not NewBRootCell) create
;  NewBRootCells as needed (whenever BFind returns
;  AboveBRootErr) to accomplish the indexing.
;       H=BCellPage.
;
        PUBLIC  IndexCell
IndexCell SHLD  ICCellPtr       ;Save HL-->Cell.
        ;
        ;       The MetaParentPair defines the range of the
        ;  Cell.  We construct the Pair in IULeft- and
        ;  IURightCursors for use by BRangeDelete etc.
        ;
        metaparent
        PUSH    H               ;Save HL-->Cell.LeftMPI.
        LXI     D,IULeftCursor
        CALL    ItemToBCursor   ;Pres H,D.
        MOV     A,B
        STA     IULeftCursorLen
        MOV     A,L             ;Put MetaItem.DataArea after
        MVI     L,CDataLen      ;Cursor.
        MOV     C,M
        MOV     L,A
        CALL    Move
```

```
        ;
        LXI     H,IULeftCursor
        LXI     D,IULeftCursor2
        LDA     IULeftCursorLen
        STA     IULeftCursor2Len
        MOV     C,A
        PUSH    H
        PUSH    B
        CALL    Move
        POP     B
        POP     H
        LXI     D,IURightCursor
        CALL    Move
        POP     H               ;Restore HL-->Cell.LeftMPI.
        ;
        INR     L
        MOV     L,M
        CALL    SkipRightToItem
        CC      Trap
        LXI     D,IURightCursor
        CALL    SuffixToBCursor
        MOV     A,B
        STA     IURightCursorLen
        ;
        ;       Now that we have created Cursors to describe
        ;  the range of the BCell we are indexing, we have to
        ;  set the IOBit of the BCell so that nobody can split
        ;  it and change the range during the BParent updates,
        ;  which switch.  This is only necessary when indexing
        ;  BLeaves, but for now we do it for all Levels.
        ;
        LHLD    ICCellPtr
        metaparentflags
        MOV     A,M
        ORI     IOBit           ;Set IOBit to simulate writing
        MOV     M,A             ;and prevent splitting.
        ;
        ;       See if we are indexing the NewBRootCell.
        ;  Does it cover the entire Volume?
        ;
        LDA     VolNamePrefixLen
        MOV     C,A
        LDA     IULeftCursorLen
        CMP     C               ;If equal, at VolumeStart.
        JNZ     IC0             ;Jmp/ !=: non-BRoot.
        LDA     IURightCursorLen
        CMP     C               ;If equal, at VolumeEnd.
        JZ      IC3             ;Jmp/ Got BRoot.
IC0     ;
        ;       Non-BRoot Cell to be indexed.
        ;       Try quick index method for Cells which already
        ;  have correct BParentItemRange but need
        ;  BParentItem.CellNum to be changed.  We also discover
```

```
        ;  whether we need to create a new, higher BRootCell.
        ;  We do a BFind at the BParentLevel, and if it returns
        ;  AboveBRootErr, we need to make a new BRootCell.
        ;
        LXI     H,IULeftCursor
        INR     M
        XCHG
        LDA     IULeftCursorLen
        MOV     B,A
        CALL    BFind
        JNC     IC01
        CPI     AboveBRootErr
        CNZ     Trap
        ;
        ;       Must make a NewBRootCell at the level above
        ;  the Cell being indexed.
        ;       We initialize the NewBRootCellPage by copying
        ;  the OldBRootCellPage, setting a new DataLen if
        ;  necessary, making a new InitItem, and incrementing
        ;  the level.
        ;  At Level 1, DataLen becomes GroundCellDataLen+1.
        ;  At Level 2, DataLen becomes GroundCellDataLen.
        ;  At higher levels, DataLen stays the same.
        ;       IULeftCursor is at BParentLevel,
        ;  HL-->GroundCell.
        ;
        SHLD    ICGroundCellPtr
        LDA     IULeftCursor      ;A=BParentLevel.
        CALL    MakeChildPair     ;HL-->NewBRootCellPage.
        ;
        MOV     D,H               ;D=NewBRootCellPage.
        LHLD    ICCellPtr         ;H=OldBRootCellPage.
        CALL    MovePage          ;Fast copy H Page to D Page.
        MOV     H,D
        ;
        MVI     L,CLevel
        INR     M                 ;Level++
        MOV     A,M
        DCR     A
        JZ      IC00              ;Jmp/ NewLevel==1
        DCR     A
        JZ      IC001             ;Jmp/ NewLevel==2
        JMP     IC002
        ;
IC00    PUSH    H                 ;NewLevel==1
        LHLD    ICGroundCellPtr
        MVI     L,CDataLen
        MOV     A,M
        POP     H
        MVI     L,CDataLen
        INR     A
        MOV     M,A               ;A:=DataLen=GC.DataLen+1,
        JMP     IC002             ;leaving room for FlagByte.
```

```
        ;
IC001   MVI     L,CDataLen          ;NewLevel==2
        DCR     M                   ;DataLen--. No more flag byte.
        ;
IC002   MVI     L,0                 ;Create a Zero InitItem.
        MVI     M,0                 ;II.PL:=0
        MVI     L,CDataLen
        MOV     A,M
        ADI     3
        MVI     L,1
        MOV     M,A                 ;II.NIO:=DataLen+3
        INR     L
        MVI     M,0                 ;II.Suffix:=0
        INR     L
        SUI     3
        MOV     C,A
        XRA     A
        CALL    Fill    ;II.DataArea:=0. HL-->AfterII.
        ;
        MOV     A,L
        MVI     L,CAfterLastItem
        MOV     M,A                 ;ALI:=AfterInitItem.
        CALL    FinishCell          ;Zero fill, do checksum etc.
        ;
        PUSH    H
        metaparentflags
        MVI     M,PairBit OR InRAMBit OR DirtyBit OR MoveBit
        POP     H                   ;Not Alloc.
        CALL    DirtyPage           ;Put newly dirty Page in DirtySeg.
        ;
        MVI     L,0
        JMP     IC1                 ;Go do quick indexing method.
        ;
        ;       Found a containing IndexCell.  Check whether
        ;  BParentItem = IULeftCursor and BParentCeilingItem =
        ;  IURightCursor.  If so, we can use the quick
        ;  indexing method.
        ;       HL-->BParentItem.  IULeftCursor is at
        ;  BParentLevel
        ;
IC01    ORA     A
        JNZ     IC2                 ;Jmp/ ~ExactMatch: range diff.
        ;
        PUSH    H                   ;Save HL-->BParentItem.
        LXI     H,IULeftCursor
        LXI     D,TempCursor
        LDA     IULeftCursorLen
        MOV     C,A
        CALL    Move                ;TempCursor:=IULeftCursor.
        POP     H                   ;Restore HL-->BParentItem.
        ;
        PUSH    H
        INR     L
```

```
        MOV     L,M             ;HL-->AfterBParentItem.
        LXI     D,TempCursor
        CALL    CeilingSuffixToCursor ;TC:=ABPCeilingItem.
        POP     H
;
        LDA     IURightCursorLen
        CMP     B
        JNZ     IC2             ;Jmp/ ranges differ.
;
        PUSH    H
        MOV     C,A
        LXI     H,TempCursor
        DCR     M               ;Both cursors to ChildLevel.
        XCHG
        LXI     H,IURightCursor
        CALL    Compare
        POP     H
        JNZ     IC2             ;Jmp/ ranges differ.
;
;       Ranges match, so quick method applies.  Just update the
; BParentItem.CellNum, SetDirtyBit and turn on MoveBit of BParentCell.
;       HL-->BParentItem.
;
        PUBLIC  IC1
IC1     CALL    SetDirtyBit     ;Pres HL,DE,BC.
;
        INR     L
        MOV     A,M
        MVI     L,CDataLen
        MOV     C,M
        SUB     C
        MOV     L,A             ;HL-->BParentItem.DataArea.
        LXI     D,IULeftCursor  ;Contains new CellNum.
        LDA     IULeftCursorLen
        ADD     E
        MOV     E,A             ;DE-->NewCellNum
        XCHG
        CALL    Move
        XCHG                    ;HL-->BParentCell.
;
        metaparentflags
        MOV     A,M
        ORI     MoveBit
        MOV     M,A
        RET
;
;       Slower, completely general indexing process
;  must be used because quick indexing method above
;  does not apply.
;       Delete all BParentItems within the Child's
;  range.  Then we will (re)Insert the BParentItem
;  with proper CellNum to effect the indexing.
;       BRangeDelete modifies its LeftCursor
```

```
        ;  parameter, so we pass in IULeftCursor2, which is
        ;  a copy of IULeftCursor.
        ;
        PUBLIC  IC2
IC2     LXI     D,IULeftCursor2
        LDAX    D
        INR     A
        STAX    D
        LDA     IULeftCursor2Len
        MOV     B,A
        LXI     H,IURightCursor
        INR     M
        LDA     IURightCursorLen
        MOV     C,A             ;BRangeDelete Mods IULeftCurs,
        CALL    BRangeDelete    ;but returns BRDLeftItemPtr.
        ;
        ;       (Re)Insert the BParentItem which we remembered
        ;  in IULeftCursor.  The CellNum is after IULeftCursor.
        ;  IULeftCursor already at BParentLevel.
        ;
        LXI     D,IULeftCursor  ;DE-->IULeftCursor.
        ;
        LDA     IULeftCursorLen
        MOV     B,A             ;B:=IULeftCursorLen.
        ADD     E
        MOV     L,A
        MOV     H,D
        SHLD    BDataPtr        ;BDataPtr-->AfterIULeftCursor.
        ;
        JMP     BInsert
        ;
        ;       BCellPage covers the entire VolumeRange, so
        ;  it becomes the NewBRoot.
        ;       First, a validity check on Left- and Right-
        ;  Cursors: they must differ by one.
        ;       ICCellPtr-->Cell.
        ;
        PUBLIC  IC3
IC3     LXI     H,IULeftCursor  ;Validity Check.  Must have
        LXI     D,IURightCursor ;Left, RightCursor different
        LDA     VolNamePrefixLen ;by one.
        ORA     A
        CZ      Trap            ;VolNameLen must be >0.
        MOV     C,A
        CALL    Compare         ;HL-->RightOpand, DE-->Left.
        CC      Trap            ;Can't have Right<Left.
        CZ      Trap            ;Can't have Left=Right.
        INR     C
        DCR     C
        CZ      Trap            ;C can't be zero.
IC30    LDAX    D               ;Loop over remaining bytes.
        INR     E
        SUB     M               ;Each byte must differ by
```

```
        INR     L
        DCR     A               ;one because of the borrow in.
        CNZ     Trap
        DCR     C
        JNZ     IC30            ;Loop/ more bytes.
;
;       The two cursors are different by one and
;  are valid.  See if OldBRootLevel>NewBRootLevel,
;  in which case we will have to Deallocate all the
;  BCells up to OldBRootLevel.
;
        LXI     D,IULeftCursor2
        LDA     IULeftCursor2Len
        MOV     B,A
        CALL    BFindGroundCell ;HL-->GroundCell.
        SHLD    ICGroundCellPtr ;Save for later.
        MVI     L,GBRootLevel
        MOV     C,M             ;C=OldBRootLevel.
;
        LHLD    ICCellPtr       ;H=NewBRootCellPage
        MVI     L,CLevel
        MOV     A,M             ;A=NewBRootLevel.
        CMP     C               ;C=OldBRootLevel.
        JNC     IC32            ;Jmp/ Old<=NewBRootLevel.
;
;       OldBRoot is above NewBRoot.  Deallocate the
;  OldBRoot and all Cells between it and NewBRoot.
;  Although  there is no theoretical limit on the
;  time the deallocations might take, we know that
;  the BRootLevel changes slowly, and the deallocations
;  will be few, because only about a RAMFull of changes
;  to the BTree can be performed in each IU pass.
;       Top of Level deleting loop.  The loop
;  preserves IULeftCursor, after which we have stored
;  the NewCellNum for the Cell we are indexing.
;       A=NewBRootLevel, C=OldBRootLevel.
;
        MOV     B,A
        PUBLIC  IC31
IC31    PUSH    B               ;Save B=NewBRootLevel, C=Old.
;
;       Do a RangeDelete at the BParentLevel.
;
        LXI     H,IULeftCursor
        INR     M               ;IULC[0]++.
        LDA     IULeftCursorLen
        STA     IULeftCursor2Len
        MOV     C,A
        LXI     D,IULeftCursor2
        CALL    Move
;
        LXI     H,IURightCursor
        INR     M               ;IURC[0]++.
```

```
LDA     IURightCursorLen
MOV     C,A
LXI     D,IULeftCursor2
LDA     IULeftCursor2Len
MOV     B,A
CALL    BRangeDelete    ;Mods IULeftCursor2.
CC      Trap
;
;       The BRangeDelete leaves a single empty Cell
;  which we must Delete.  We do not merge any ranges,
;  so the Range of the deleted BCell is left uncovered.
;  This is allowable since uncovered Ranges are
;  permitted (in fact required) between the BRoot and
;  the GroundCell (and, in fact, nowhere else.)
;
LXI     D,IULeftCursor
LDA     IULeftCursorLen
MOV     B,A
CALL    BFind           ;Force in BCell via BFind.
CC      Trap            ;An ExactMatch check here
;ORA    A               ;like this will bomb on
;CNZ    Trap            ;EmptyCells and some LeafCells.
;
PUSH    H               ;Save HL-->BCell.
CALL    DeallocCell     ;H=PageToDealloc.
POP     H
;
metaparent
CALL    DestroyChildPair ;Remove its MetaItemPair.
;
POP     B               ;Restore B=NewBRootLevel, C=Old
;
LDA     IULeftCursor
CMP     C
JC      IC31            ;Loop/ IULC[0]<OldBRootLevel.
CNZ     Trap            ;Trap/ IULC[0]>OldBRootLevel!
;
;       Restore IULeft and IURightCursorLevels to
;  their values before the loop.  They may not be
;  the same, as IURC may indicate the first item at
;  the next level!  This restoration necessary in
;  multiple-BTree situations so that IU will scan into
;  the same level of the next BTree.
;
LXI     H,IULeftCursor  ;IULC[0]=OldBRootLevel.
MOV     A,B             ;B=NewBRootLevel.
SUB     M               ;A=New-Old <0
CNC     Trap
MOV     M,B             ;IULC[0] = NewBRootLevel.
LXI     H,IURightCursor
ADD     M
CNC     Trap
MOV     M,A             ;IURC[0] += NewBRLevel-OldBRL.
```

```
        ;
        ;       Index the BRoot in the GroundCell.
        ;
        PUBLIC  IC32
IC32    LHLD    ICGroundCellPtr ;Set Dirty so we'll Commit.
        CALL    SetDirtyBit     ;Pres HL.
        ;
        MVI     L,1             ;InitItem contains
        MOV     A,M             ;BRootCellNum.
        MVI     L,CDataLen
        MOV     C,M             ;C:=GroundCell.DataLen
        SUB     M
        CC      Trap
        MOV     L,A
        XCHG                    ;DE-->InitItem.DataArea.
        LXI     H,IULeftCursor
        LDA     IULeftCursorLen
        ADD     L
        MOV     L,A             ;HL-->NewBRootCellNum.
        CALL    Move
        ;
        ;       Fix GroundCell.BRootLevel.
        ;
        LHLD    ICCellPtr
        MVI     L,CLevel
        MOV     A,M
        LHLD    ICGroundCellPtr
        MVI     L,GBRootLevel
        MOV     M,A
        JMP     FinishCell      ;Fix Cksum etc.
;
;       Find the Non-Preemptable GroundCell for the
;  DE,B-->Cursor.  Pres DE,B,Cursor. Ret HL-->GroundCell.
;
        PUBLIC  BFindGroundCell
BFindGroundCell
        LDAX    D
        MOV     C,A
        MVI     A,GroundCellLevel
        STAX    D               ;Go up to GroundCell.
        PUSH    D
        PUSH    B               ;Save Cursor[0], CursorLen.
        LDA     VolNamePrefixLen
        MOV     C,A
        MOV     A,B
        CMP     C               ;Must have VNPL<=CursorLen
        CC      Trap
        MOV     B,C             ;Use VNPL for CursorLen.
        CALL    Find             ;Can't use BFind or BMetaFind
        POP     B               ;to locate the GroundCell.
        POP     D
        XCHG
        MOV     M,C             ;Restore Cursor[0].
```

```
        XCHG
        CC      Trap
        ORA     A
        CNZ     Trap            ;Trap/ not ExactMatch.
        ;
        INR     L
        MOV     L,M
        DCR     L
        DCR     L
        MOV     A,M
        CMA
        ANI     PairBit OR InRAMBit
        CNZ     Trap            ;Must be InRAM!
        INR     L
        MOV     H,M             ;HL-->GroundCell.
        RET
;
;       Delete all Items at level LeftCursor[0] between
;  LeftCursor and RightCursor, including LeftCursor but not
;  RightCursor.  This range constitutes an interval closed on
;  the left and open on the right: [).  Probably someday we
;  will need (], [], and () too.
;       To prevent RAM resource deadlock, we are careful to
;  set the dirty bit of only two Cells - LeftCell and
;  RightCell - before returning.  In left-to-right scans such
;  as in IU, the LeftCell is writeable (after Packing), so we
;  really only create one Dirty, non-Writeable Cell - the
;  RightCell.  At the same time, the child Cell becomes
;  writeable since it has just become indexed.  Hence the
;  transaction has no incremental effect on the Page resource
;  and cannot deadlock except for temporary shortages, which
;  are preventable.
;         PROBLEM HERE IS THAT WE DON'T IN FACT
;  STARTWRITE THE LEFTBPARENTCELL AFTER USING BRANGEDELETE
;  IN INDEXCELL!!!  I THINK IT WORKS ANYWAY, BUT FOR DIFFERENT
;  REASONS.
;       DE,B-->LeftCursor, HL,C-->RightCursor.  We assume that
;  LeftCursor<RightCursor and that the range does not cross
;  volumes. Pres RightCursor, Mod LeftCursor.
;       Interesting situation arises when RightCursor
;  indicates first item in next or higher level.  You can get
;  AboveBRootErr, but it is OK because you can use the
;  GroundCell as the RightCell.
;
        PUBLIC  BRangeDelete
BRangeDelete
        SHLD    BRDRightCursorPtr
        MOV     A,C
        STA     BRDRightCursorLen
        XCHG
        SHLD    BRDLeftCursorPtr
        XCHG
        MOV     A,B
```

```
STA     BRDLeftCursorLen
;
;       Find LeftCursor.
;
CALL    BFind           ;Find LeftCursor
CC      Trap
SHLD    BRDLeftItemPtr
PUSH    H               ;Save HL-->NGEItem or ALI.
CALL    SetDirtyBit     ;Pres L,DE,B. Lock in LeftCell.
POP     H
CC      Trap            ;Trap/ writing in IU!!!
;
;       Find RightCursor.  Use Search to speed up
;  same-Page case.  For now, Search from InitItem;
;  some day, Search from LeftItemPtr.
;
XCHG
LHLD    BRDRightCursorPtr
XCHG
LDA     BRDRightCursorLen
MOV     B,A
LDA     VolNamePrefixLen
CMP     B
JZ      BRDO            ;Jmp/ can't use quick method.
CNC     Trap            ;Trap/ BRDRightCursorLen<VNPL.
CALL    BSearch
CC      Trap
;
XRA     A
STA     FixPTFlag       ;Don't fix ParentTab for BCells
MOV     A,L
MVI     L,CAfterLastItem
CMP     M
MOV     L,A
XCHG
LHLD    BRDLeftItemPtr
JNZ     RangeDelFromPage ;Pres H,B. Interval [HL,DE).
;
;       Either (1) Not in Same Cell; or (2) unlucky
;  case where we are actually in same Cell but at ALI
;  so we can't be sure; or (3) BRDRightCursorLen=
;  VolNamePrefixLen and we can't use BSearch since it
;  would regard the RightCursor as a NilItem at the
;  same level as whatever Cell it searches.
;       Since the range of LeftCell will change, set
;  its MoveBit.
;       The actual RangeDelete is done as follows:
;  Delete to end of LeftCell, then Delete all MidCells,
;  and finally Delete up to RightCursor position in
;  RightCell.
;       HL-->LeftCellLeftItem.
;
PUBLIC  BRDO
```

```
BRD0    PUSH    H               ;Turn on LeftCell.MoveBit.
        metaparentflags
        MOV     A,M
        ORI     MoveBit
        MOV     M,A
        POP     H
        ;
        ;       Delete Right part of LeftCell.
        ;
        MOV     D,H
        MVI     E,CAfterLastItem
        LDAX    D
        MOV     E,A             ;DE-->LeftCellALI.
        XRA     A
        STA     FixPTFlag       ;Don't fix ParentTab for BCells
        CALL    RangeDelFromPage
        ;
        ;       Delete all intermediate 'MidCells'. We scan the
        ;  MetaTree, Deallocating Cells and Deleting their
        ;  MetaParentItems.  If we come to a non-PairItem,
        ;  we do a MakeChildPair on the BParent in order to
        ;  make it into a PairItem, then Deallocate the Cell
        ;  and Delete the MetaParentItem as usual.
        ;  By using the MetaTree whenever possible for the
        ;  search, we will avoid the possibly very important
        ;  delay of reading the BParent.
        ;
        LHLD    BRDLeftItemPtr  ;Points at BCell.
        aftermetaparent         ;HL-->LeftCellLeftPairItem.
        CALL    SkipRightToItem ;HL-->LeftCellRightPairItem.
        CC      Trap            ;Trap/ EndOfDBErr
        ;
        XCHG
        LHLD    BRDRightCursorPtr
        XCHG
        LDA     BRDRightCursorLen
        MOV     B,A
        CALL    CompareCursorToItem ;Pres HL,DE,BC. Cursor-Item
        RZ                      ;Ret/ No RightCell exists.
        CMC
        RNC                     ;Ret/ Range is within LeftCell.
        ;
        ;       Top of MidCell Deallocate/ MidMetaItem Delete
        ;  Loop.  HL-->MidMetaItem.
        ;
        PUBLIC  BRD1
BRD1    LDA     VolNamePrefixLen ;Are we still in same level?
        MOV     C,A
        PUSH    H
        CALL    SubSpaceCheck   ;Pres DE,BC.
        POP     H
        CMC
        RNC                     ;Ret/ not in same level: NOT CARRY.
```

```
;
;       Set LeftCursor:=HL-->MetaItem.
;
PUSH    H
XCHG
LHLD    BRDLeftCursorPtr
XCHG
CALL    SuffixToBCursor
MOV     A,B
STA     BRDLeftCursorLen
POP     H
;
MOV     A,L
INR     L
MOV     L,M
DCR     L
MOV     B,M             ;B=MidMetaItem.PageNum.
DCR     L
MOV     C,M             ;C=MidMetaItem.FlagByte
MOV     L,A             ;HL-->MetaMetaItem.
;
MOV     A,C             ;Check the FlagByte.
CMA
ANI     PairBit OR InRAMBit
JZ      BRD10           ;Jmp/ got InRAM PairItem.
;
;       Got a Non-PairItem or a PairItem which is not
;  InRAM.  Convert it to an InRAM PairItem by using
;  MakeChildPair on the BParent.  This is a little
;  drastic for a NotInRAM PairItem, but such Items are
;  probably rare, and this is a reliable method.
;       The MetaItem is guaranteed to be in the
;  BParentCell as the BParentItem because only a split
;  can cause a BParentItem to be lacking, but a split
;  has not occurred since the Pair is not Dirty. (If
;  it were Dirty, it would be InRAM.)
;
LHLD    BRDLeftCursorPtr
INR     M
XCHG
LDA     BRDLeftCursorLen
MOV     B,A
CALL    BFind
CC      Trap
ORA     A
CNZ     Trap            ;Trap/ Not found in BParent!
;
;       HL-->BParentItem.
;
XCHG
LHLD    BRDLeftCursorPtr
DCR     M
MOV     A,M     ;A=DesiredChildLevel.
```

```
        XCHG
        CALL    MakeChildPair
        ;
        ;       HL-->GarbageChildPage, which is in PreemptableSeg with
        ; IOBit on (should be in IOSeg someday!!!). Read it.
        ;
        CALL    ReadCell        ;Pres HL,DE,BC.  IOBit zeroed.
        ;
        MOV     B,H             ;B=BChildPage.
        metaparent
        MOV     A,L
        INR     L
        MOV     L,M
        DCR     L
        DCR     L
        MOV     C,M             ;C:=MetaPairItem.FlagByte.
        MOV     L,A             ;HL-->MetaPairItem.
        ;
        ;       Got an InRAM PairItem. B=PageNum.
        ;
        PUBLIC  BRD10
BRD10   MOV     A,C
        ANI     IOBit
        JZ      BRD11           ;Jmp/ no IO in progress.
        ;
        ;       The Cell was already undergoing a Read! This only makes sense
        ; if a user has called BRangeDelete (at the leaf level.)  IU uses it
        ; only over the range of a Dirty Page, which should hide the upper
        ; levels and make it impossible for a user to start a Read within
        ; the range.
        ;       Since we are going to delete this MetaItem, and since its data
        ; is invalid with respect to the lower levels anyway, it is not
        ; possible for processes waiting on reads to assume that switching
        ; preserves all ReadingCells.  Such processes must start at the
        ; bottom and work up again.  (See BFind.)
        ;       When finished waiting on someone else's Read, we know that the
        ; B=PageNum is still valid, because only we as IU can cause it not to
        ; be.  Also, if we can assume we were at the end of the queue for the
        ; B Page, then all other waiters have run until they switched out
        ; again, which means they are done with it.     No more waiters can
        ; have accumulated after us, because of the Dirty range at a lower
        ; level.
        ;
        CALL    Trap            ;FOR NOW!!! See if this is dead
        PUSH    B               ;code as we hope it is.
        MOV     H,B             ;B=PageNum.
        CALL    ReadCell        ;Pres HL,DE,BC. Wait for IO completion.
        POP     B
        ;
        ;       B=BCellPage, HL-->BCellMetaParentItem.
        ;  Is it a MidCell or is it the RightCell?  To find
        ;  out, we compare the BRDRightCursor with the
        ;  BCellRightPairItem.
```

```
        ;
        PUBLIC  BRD11
BRD11   PUSH    H               ;Save HL-->MetaParentItem.
        afteritem
        CALL    SkipRightToItem
        CC      Trap            ;HL-->RightPairItem.
        XCHG
        LHLD    BRDRightCursorPtr
        XCHG
        LDA     BRDRightCursorLen
        MOV     B,A
        CALL    CompareCursorToItem ;Cursor-Item. Pres HL,DE,BC
        POP     H               ;Restore HL-->MetaParentItem
        ;
        JZ      BRDDeleteCell   ;Jmp/ =: No RightCell exists.
        JC      BRD2            ;Jmp/ C<I: got RightCell.
        CALL    BRDDeleteCell   ;Got a complete cell to delete.
        ;
        ;       The Delete modifies the MetaTree, so we do a
        ;  Find to re-sync with it.  We could avoid this Find
        ;  by using a Zombie in the NextMetaItem, but it is too
        ;  much work for now and is not general.
        ;
        LHLD    BRDLeftCursorPtr
        XCHG
        LDA     BRDLeftCursorLen
        MOV     B,A
        CALL    Find
        CC      Trap
        JMP     BRD1            ;Loop. HL-->NextMetaItem.
        ;
        ;       Got RightCell.  Delete the left part of the
        ;  RightCell and change its LeftMPI to be equal to
        ;  its new InitialItem.
        ;       HL-->RightCellMetaParentItem.
        ;
        PUBLIC  BRD2
BRD2    itempn
        MOV     D,M
        DCR     L
        MOV     A,M
        ORI     MoveBit         ;Range changed, so Move it.
        MOV     M,A
        ;
        MOV     H,D
        PUSH    H
        CALL    SetDirtyBit     ;Pres L,DE,B.
        POP     H
        ;
        ;       Figure out where in the RightPage the interval
        ;  ends using BSearch.
        ;
        XCHG
```

```
        LHLD    BRDRightCursorPtr
        XCHG
        LDA     BRDRightCursorLen
        MOV     B,A
        CALL    BSearch
        CC      Trap              ;ExactMatch doesn't matter.
        MOV     D,H
        MOV     E,L               ;DE-->RightBItem
        MVI     L,CAfterLastItem
        MOV     A,M
        CMP     E                 ;Will RDFP empty the Page?
        JNZ     BRD21             ;Jmp/ no.
        metaparent
        JMP     BRDDeleteCell
        ;
        PUBLIC  BRD21
BRD21   MVI     L,0               ;HL-->InitItem.
        XRA     A
        STA     FixPTFlag
        CALL    RangeDelFromPage ;Pres H,B. Interval [HL,DE).
        ;
        XCHG
        LHLD    BRDLeftItemPtr  ;HL-->LC, DE-->RC.
        JMP     FixLeftMetaParentItem
;
;       Delete BCell.  HL-->BCellMetaParentItem.
;  BCell has a complete Pair, has InRAMBit set and has a Page
;  associated with it, although it may not have been read yet,
;  so the data in the Page is of unknown validity.  Deallocate
;  it, Free its Page, and Delete its LeftPairItem so that its
;  range merges with that of the Cell to its left.
;
        PUBLIC  BRDDeleteCell
BRDDeleteCell
        PUSH    H
        INR     L
        MOV     L,M
        DCR     L
        MOV     H,M               ;H:=BCellPageNum to dealloc.
        PUSH    H
        CALL    DeallocCell       ;Switches.
        POP     H
        MOV     L,H               ;L=PageToFree.
        CALL    FreePage          ;Return BCellPage to FreeSeg.
        POP     H
        ;
        JMP     Delete1           ;Get rid of the MetaParentItem.
;
;       Fix the LeftMetaParentItem of the DE-->RightBCellPage.
;  The BCellPage must have a valid LeftMetaParentItem
;  already, from which BItemToBCursor gets the VolNamePrefix.
;  Look at HL-->LeftBCellPage while figuring out how much
;  InitItem.Suffix to compress out in creating the new MPI.
```

```
;
        PUBLIC  FixLeftMetaParentItem
FixLeftMetaParentItem
        SHLD    FLMPILeftCellPtr
        IF      PtrValidity
        CALL    CheckBCellPtr
        ENDIF
        XCHG
        SHLD    FLMPIRightCellPtr
        IF      PtrValidity
        CALL    CheckBCellPtr
        ENDIF
        XCHG
        ;
        CALL    DividerToTempCursor;DE-->AfterTC,TCL set
        ;
        ;       After TempCursor, create DataArea with
        ;  CellNum=0, FlagByte=(PairBit | InRAMBit), and
        ;  PageNum=ZombiePage.
        ;
        XCHG
        SHLD    DataPtr         ;DataPtr-->AfterTempCursor.
        LDA     CellNumLen
        MOV     C,A
        XRA     A
        CALL    Fill            ;DataLen# of zeroes.
        MVI     M,PairBit OR InRAMBit
        INR     L
        MVI     M,ZombiePage
        INR     L
        ;
        LXI     D,TempCursor
        LDA     TempCursorLen
        MOV     B,A
        PUSH    D
        CALL    Find
        POP     D
        CC      Trap
        ORA     A
        JNZ     FLMPI1          ;Jmp/ not ExactMatch.
        ;
        ;       Already correctly indexed? See if CellPageNum
        ;  equals MetaItem.PageNum, and return if so.
        ;
        PUSH    H
        itempn
        MOV     A,M
        LHLD    FLMPIRightCellPtr
        CMP     H
        POP     H
        RZ                      ;Ret/ already got proper MPI.
        ;
        ;       DataPtr-->AfterTempCursor, other Regs as after
```

```
        ;  Find.
        ;
FLMPI1  CALL    Insert1         ;Put into MetaTree.
        CC      Trap
        ;
        LXI     D,ZombiePage*256
        LHLD    FLMPIRightCellPtr
        MVI     L,0
        CALL    ExchangeBCellPages ;With Interrupts off.
        ;
        MVI     H,ZombiePage
        metaparent
        JMP     Delete1         ;Delete the new ZombieItem.
;
;       Change TempCursor so that it contains a value that
;  efficiently divides the ranges of HL-->LeftCell,
;  DE-->RightCell.  If the Cells are Leaves, create a suffix-
;  compressed version of RightCell.InitItem in TempCursor,
;  otherwise put the entire RightCell.InitItem into TempCursor.
;  Use HL-->LeftCell in computing the virtual PrefixLen, which
;  is incremented to get the CompressedTotalLen.
;
        PUBLIC  DividerToTempCursor
DividerToTempCursor
        IF      PtrValidity
        XCHG
        CALL    CheckBCellPtr
        XCHG
        ENDIF
        ;
        MVI     E,CLevel
        LDAX    D
        ORA     A
        JZ      DTTC1
        MOV     H,D
        MVI     L,0
        LXI     D,TempCursor
        CALL    BItemToBCursor
        MOV     A,B
        STA     TempCursorLen
        RET
        ;
DTTC1   CALL    FindRightInitItemPrefixLen;Pres H,D. A,C=PL
        LDA     VolNamePrefixLen
        ADD     C
        INR     A
        STA     TempCursorLen
        MOV     H,D
        MVI     L,0
        LXI     D,TempCursor
        CALL    BItemToBCursor
        LXI     D,TempCursor
        LDA     TempCursorLen
```

```
        MOV     B,A             ;B=CompressedTempCursorLen.
        ADD     E
        MOV     E,A             ;DE-->AfterCompressedTempCursor
        RET
;
;       DE,B-->Cursor, HL-->Item.  Return CY, Z as if
;  we computed the Cursor-Item difference.  Works only for
;  MetaItems unless the Cursor has been shortened by
;  moving DE past the VolNamePrefix and B has been reduced
;  by VolNamePrefixLen.
;       Pres HL,DE,BC.
;
        PUBLIC  CompareCursorToItem
CompareCursorToItem
        PUSH    H
        PUSH    D
        PUSH    B
        MOV     A,B
        STA     CursorLen
        MVI     L,0
        MOV     C,L
        CALL    Search
        CC      Trap
        POP     B
        POP     D
        ORA     A
        JZ      CCIT1           ;Jmp/ ExactMatch: might be =.
        MOV     A,L             ;Can't be =.
        POP     H
        SUB     L               ;NGTItemPtr-ItemPtr.
        RNZ                     ;Ret/ NGTI<>IP: Cursor<>Item.
        SUI     1               ;NGTItem=ItemPtr: Cursor<Item
        RET                     ;CARRY, NOT ZERO.
        ;
CCIT1   MOV     A,L             ;ExactMatch.
        POP     H
        SUB     L
        RET                     ;If Ptrs equal, Cursor=Item.
;
;       Pack a Cell.  Only hitting the end of a Level or a
;  Volume can prevent returning with a Cell more than half
;  full.
;       During Packing, there is no need to Insert or Delete
;  BParentItems for the Cells being packed, since (1) Insertion
;  is only necessary when a new Cell is being created and
;  PackCell creates no Cells; and (2) Deletion is handled by
;  IndexCell after the Packing is all done.  IndexCell does
;  this with a BRangeDelete at the BParent Level over the range
;  of the BChildCell.  The BRangeDelete makes it possible to
;  forget the division points of the merged Cells during
;  Packing and yet delete all of their BParentItems during
;  Indexing.  It is the key to the concurrent BTree algorithm.
;       Since PackCell Deallocates all allocated Cells that it
```

```
;  deletes, the BParentItem.CellNums of deleted Cells are
;  obsolete and not necessary during the BRangeDelete.  This
;  means that entire BParentCells in the middle of a long
;  BRangeDelete need not be read at all!  All RangeDelete
;  needs to do is Deallocate them using BParentBParent-
;  Item.CellNum and delete from RAM, if present.
;       H=Cell to Pack.
;
        PUBLIC  PackCell
PackCell MOV    A,H
        STA     ScanCell
        ;
        ;       Top of Cell Merging loop.  Loop terminates on
        ;  first failure to Merge, which normally means
        ;  the first Balancing, but for now we skip the
        ;  Balancing!!!
        ;
        PUBLIC  PC1
PC1     CALL    RestorePtrs       ;Restore B,D,HL,ScanItemPtr...
        MVI     E,CAfterLastItem ;DE-->ScanCell.ALI
        LDAX    D                 ;A:=ScanCell.ALI.
        ADD     A                 ;If ALI*2>=256, over half full.
        JC      PC2               ;Jmp/ more than half full.
        ;
        ;       Less than half full.  Force in a NextScanCell
        ;  if it is not part of the next Level or a different
        ;  Volume.
        ;
        PUSH    H
        LHLD    ScanItemPtr
        INR     L
        MOV     L,M
        CALL.   SkipRightToItem
        CC      Trap
        LDA     VolNamePrefixLen
        MOV     C,A
        CALL    SubSpaceCheck     ;Pres DE,BC. See if at Vol/Level boundary.
        POP     H
        JC      PC2               ;Jmp/ Level or Volume break.
        ;
        MOV     A,M               ;Is NextScanItem a PairItem
        CMA                       ;and InRAM?
        ANI     PairBit OR InRAMBit
        JZ      PC11              ;Jmp/ its a PairItem and InRAM.
        ;
        ;       Must Read NextCell into RAM.
        ;
        LHLD    NextScanItemPtr
        CALL    ItemToIUCursor    ;Save NextItem for Deindexing.
        LXI     D,IUCursor        ;B=IUCursorLen still.
        CALL    BFind             ;Switches.
        CC      Trap              ;HL-->PossibleNextCell.
        CALL    RestorePtrs       ;Restore B,D,HL,ScanItemPtr...
```

```
        MOV     A,M             ;A:=NextScanItem.FlagByte.
        CMA
        ANI     PairBit OR InRAMBit ;Must both be on now.
        CNZ     Trap
;
;       Deallocate NextCell if necessary.
;
        PUBLIC  PC11
PC11    MOV     A,M
        ANI     AllocBit
        JZ      PC12            ;Jmp/ already Deallocated.
;
        MOV     H,B     ;B=NextScanCellPageNum.
        CALL    DeallocCell     ;Deallocate H Cell. AllocBit=0.
        CC      Trap
        CALL    RestorePtrs
;
;       Merge or Balance Cell with NextCell.
;
        PUBLIC  PC12
PC12    MOV     H,D             ;HL-->LeftCellPage
        MOV     D,B             ;DE-->RightCellPage
        XRA     A
        STA     FixPTFlag       ;BCells have no PageNum ptrs.
        CALL    Merge           ;Pres H,D, MetaTree.
        JNC     PC13            ;Jmp/ Merged.
        CPI     MergeTooFullErr
        JZ      PC14            ;Jmp/ didn't Merge. Go balance.
        CALL    Trap            ;Trap weird errors.
        JMP     PC2             ;Exit as cleanly as possible.
;
;       Merged.  Free D=RightCellPage and Delete
;  NextScanItem.
;
        PUBLIC  PC13
PC13    MOV     L,D
        CALL    FreePage        ;Free the ChildPage.
;
        LHLD    NextScanItemPtr
        CALL    Delete1         ;Delete HL-->MetaItem.
        CC      Trap            ;BMetaTree consistent again.
        JMP     PC1             ;Loop. Pack in another Cell.
;
;       Merge not possible.  Balance Cells.
;
        PUBLIC  PC14
PC14    CALL    RestorePtrs
        LDA     TightPacking
        ORA     A
        JZ      PC141
;
;       If NextCell not InRAM, goto PC141.  This
;  prevents TightPacking from causing extra reads.
```

```
        ;  If TightPackingCounter has run out, goto PC141.
        ;  This prevents infinite runs.
        ;
        ;       TightPacking not supported for now.
        ;
        CALL    Trap
        ;
        IF      0

        MOV     H,D                 ;HL-->LeftCellPage
        MOV     D,B                 ;DE-->RightCellPage
        XRA     A
        STA     FixPTFlag           ;BCells have no PageNum ptrs.
        CALL    BalanceLeft
        ENDIF
        ;
        JMP     PC2                 ;For now, Exit.
        ;
        ;       A non-TightPacking balance.  We do an even
        ;  balancing because we must leave NextCell at least
        ;  half full.
        ;
PC141   MOV     H,D                 ;HL-->LeftCellPage
        MOV     D,B                 ;DE-->RightCellPage
        XRA     A
        STA     FixPTFlag           ;BCells have no PageNum ptrs.
        PUSH    H
        PUSH    D                   ;We know only LeftCell is low.
        CALL    BalanceEven
        POP     D
        POP     H
        PUSH    D
        CALL    FixLeftMetaParentItem
        POP     H
        CALL    SetDirtyBitSetMoveBit
        CC      Trap
        ;
        ;       Packing loop exit.  Set MoveBit, DirtyBit
        ;  of PackedCell.
        ;
        PUBLIC  PC2
PC2     CALL    RestorePtrs
        MOV     H,D                 ;HL-->ScanCell.
;
        PUBLIC  SetDirtyBitSetMoveBit
SetDirtyBitSetMoveBit
        PUSH    H
        CALL    SetDirtyBit
        CC      Trap
        POP     H
        metaparentflags
        MOV     A,M
        ORI     MoveBit
```

```
        MOV     M,A
        RET
;
        PUBLIC  ItemToIUCursor
ItemToIUCursor
        LXI     D,IUCursor
        CALL    ItemToBCursor
        MOV     A,B
        STA     IUCursorLen
        RET                     ;Return B=IUCursorLen.
;
;       BalanceEven slides Items into HL-->LeftCellPage,
;  which is low, from DE-->RightCellPage, which is not low,
;  so that they are roughly equally full.  Neither Cell is
;  empty, since that would result in a merge, and we assume
;  Merge is always attempted before Balance.
;
        PUBLIC  BalanceEven
BalanceEven
        RET                     ;FOR NOW!!!
        ;
        PUSH    H               ;HL-->LeftCell
        PUSH    D               ;DE-->RightCell
        ;
        ;       Choosing the split point is tricky.  The
        ;  Bias for CSP is the total length of the compressed
        ;  run of Items that is to be split minus twice the
        ;  offset due to Items being in the wrong place in
        ;  the Page, which in this case is equal to
        ;  LeftCell.AfterLastItem.  Thus we have Bias=(LC.ALI+
        ;  RC.ALI-RC.II.PL)-2*(LC.ALI) where RC.II.PL is the
        ;  virtual PrefixLen of the RightCell.InitItem (which
        ;  applies after balancing.)  This gives Bias=RC.II-
        ;  RC.II.PL-LC.ALI.  If Bias is negative, balancing
        ;  is useless.
        ;
        CALL    FindRightInitItemPrefixLen ;Pres H,D. A,C=RC.PL
        STA     BalancePrefixLen
        MVI     E,CAfterLastItem
        LDAX    D
        SUB     C               ;A=RC.ALI-RC.II.PL
        CC      Trap
        MOV     L,E
        SUB     M
        JC      BE1             ;Jmp/ skip it. Can't bal right.
        MOV     H,D             ;HL-->RC.
        MVI     L,CAfterLastItem
        MOV     C,M             ;C=ScanEnd.
        MVI     L,0             ;L=ScanStart
        MOV     E,A
        MOV     D,L             ;DE=Bias=RC.ALI-RC.II.PL-LC.ALI
        CALL    ChooseSplitPt
        CNC     Trap            ;Trap/ scanned entire RC.
```

```
        ;
        ;       L=SplitPt, B=OldI, D=I.
        ;
        MOV     A,L
        ORA     A
        JZ      BE1             ;Jmp/ no work to do.
        ;
        POP     D
        POP     H
        PUSH    H
        PUSH    D
        MOV     E,A             ;DE-->RC.SplitPt.
        ;
        ;       BalancePrefixLen is correct.
        ;


BE1     POP     D
        POP     H
        RET
;
;       THIS BELONGS IN METATREE CODE.
;       Find the TotalLen or SuffixLen of the HL-->Item.
;  Pres H,DE,BC.  Return A=SuffixLen.
;
itemtotallen MACRO
        MOV     A,M
        INR     L
        ADD     M
        INR     L
        SUB     L
        MVI     L,CDataLen
        SUB     M
        ENDM
;
itemsuffixlen MACRO
        INR     L
        MOV     A,M
        INR     L
        SUB     L
        MVI     L,CDataLen
        SUB     M
        ENDM
;
;       Find the PrefixLen of the DE-->RightCellPage.InitItem,
;  which is physically always zero, by searching for it in the
;  HL-->LeftCellPage.  Return A,C=PrefixLen. Pres H,D.
;
        PUBLIC  FindRightInitItemPrefixLen
FindRightInitItemPrefixLen
        XCHG
        MVI     L,0
        itemsuffixlen           ;Pres H,DE,BC, A=Item.SuffixLen
```

```
        STA     CursorLen       ;CursorLen=II.SuffixLen=II.TL
        MVI     L,2
        XCHG                    ;DE,CursorLen-->RC.InitItem.
        MVI     L,0             ;HL-->LeftCell.InitItem.
        MOV     C,L             ;InitMatchLen=0.
        CALL    Search
        CC      Trap
        ORA     A
        CZ      Trap
        MOV     A,C
        RET
;
;       Check whether the HL-->MetaLeafItem is the first Item of a new
SubSpace
; having C=SubSpaceLen.  Don't use HL-->ALI!
;       Pres DE,BC.  Ret CARRY if at an item beginning new subspace.
;
        PUBLIC  SubSpaceCheck
SubSpaceCheck
        MOV     A,M             ;If PL>=SubSpaceLen, inside.
        CMP     C
        RNC                     ;Ret/ PL>=SSL: Inside SubSpace, NOT CARRY.
        MOV     A,L             ;PL<SSL.
        ORA     A               ;If not InitItem, outside.
        STC
        RNZ                     ;Ret/ Not InitItem: New SubSpace, CARRY.
        ;
        ;       Determine effective InitItemPrefixLen by Searching
        ;  for InitItem in LeftMetaSiblingPage.
        ;
        PUSH    H
        PUSH    D
        PUSH    B               ;Save C=SubSpaceLen
        itemtotallen
        STA     CursorLen       ;CursorLen=itemtotallen
        MOV     D,H
        MVI     E,2             ;DE-->InitItemSuffix=InitItemText
        MVI     C,0             ;C=InitialMatchLen=0;
        MOV     L,C             ;HL-->InitItem
        CALL    SkipLeftToItem  ;Pres DE,BC.
        JNC     SSC1
        POP     B
        POP     D
        POP     H
        RET                     ;Ret/ StartOfDB: New SubSpace, CARRY.
SSC1    MOV     L,C             ;HL-->LeftSiblingPageInitItem
        CALL    Search
        MOV     A,C             ;A=NewMatchLen=EffectivePrefixLen.
        POP     B               ;C=SubSpaceLen
        CMP     C
        POP     D
        POP     H
        RET                     ;CARRY if EffectivePL<SubSpaceLen
```

```
;
;       Restore D=ScanCell, B=PossibleNextScanCell,
;  ScanItemPtr-->ScanItem,  NextScanItemPtr-->NextScanItem,
;  HL-->NextScanItem.FlagByte.  We do this starting with only
;  ScanCell, which never changes during Switching because
;  the Cell ScanCell points at is dirty and only IU can
;  cause it to write (hence it cannot be pre-empted or
;  Shadowed.)
;       Pres C,E.
;
        PUBLIC  RestorePtrs
RestorePtrs
        LDA     ScanCell
        MOV     D,A
        MOV     H,A
        metaparent
        SHLD    ScanItemPtr
        INR     L
        MOV     L,M             ;HL-->AfterScanItem.
        CALL    SkipRightToItem ;HL-->NextScanItem. Pres DE,BC.
        CC      Trap
        SHLD    NextScanItemPtr
        INR     L
        MOV     L,M
        DCR     L
        MOV     B,M             ;B=PossibleNextScanCell.
        DCR     L               ;HL-->NextScanItem.FlagByte.
        RET
;
        PUBLIC  IUValidityFlag
IUValidityFlag  DB      0
;
        PUBLIC  IUValidityCheck
IUValidityCheck
        PUSH    PSW
        LDA     IUValidityFlag
        ORA     A
        JZ      IUVC1
        PUSH    H
        PUSH    D
        PUSH    B
        CALL    CheckInRAMStructures
        POP     B
        POP     D
        POP     H
IUVC1   POP     PSW
        RET
;
        END
```

```
;*********************************************************
;*                                                       *
;*          Infinity DataBase Operating System           *
;*                    Cell Functions                     *
;*                                                       *
;*       The Infinity B-Trees use 256 byte Cells -       *
;*  matching the SPAM page size.  They store variable    *
;*  length strings of bytes called Items in binary       *
;*  fractional order, compressing out common inter-      *
;*  Item prefixes within each cell. Complete Items are   *
;*  passed in and out in Cursors, which are writeable    *
;*  Page-contiguous arrays of bytes conventionally       *
;*  pointed at by DE with current length in B.           *
;*                                                       *
;* Copyright (C) 1982,1983,1984,1985,1986 Roger L.       *
;* Deran. All rights reserved.                           *
;*                                                       *
;*********************************************************
;
;<86>    INCLUDE C:INF-H.ASM
;<86>    INCLUDE C:CELL-H.ASM
;<86>    INCLUDE C:DATA-H.ASM
;<86>    EXTRN   Trap:NEAR, Compare:NEAR, Fill:NEAR
;<86>    EXTRN   Move:NEAR, MoveRight:NEAR, MoveLeft:NEAR
;<86>    EXTRN   RelocateItemsSamePage:NEAR, RelocateItemsDiffPage:NEAR
;<86>    EXTRN   GetStaticPage:NEAR, DeChild:NEAR, CheckSumPage:NEAR
;
;<80>
        INCLUDE C:INF-H.I80
;<80>
        INCLUDE C:CELL-H.I80
;<80>
        INCLUDE C:DATA-H.I80
;<80>
        EXTRN   Trap, Compare, Fill, Move, MoveRight, MoveLeft, GetStaticPage
;<80>
        EXTRN   RelocateItemsSamePage, RelocateItemsDiffPage, DeChild
;<80>
        EXTRN   CheckSumPage
        PUBLIC  InsertInPage, ChooseSplitPt, ConstructPrefix, FinishCell,
        PUBLIC  DelFromPage, RangeDelFromPage, Merge
        PUBLIC  FindRightCellInitItemPrefixLen, CompareSuffixToCursor
        PUBLIC  ScanToPrevItem, ItemToCursor, SuffixToCursor
        PUBLIC  Search, SkipLongerPrefixes
;
BEGIN   SET     $       ;Used by 'need' macro.
;
NewNGTItemPrefixLen DS  1
;
;       Insert an Item in a page, splitting the page if
;  necessary, non-recursively.  If split occurs, return
;  with SplitDoneErr, and LeftCellPage, RightCellPage
;  are valid.
```

```
;
;  DE-->Cursor, CursorLen = length of DE-->Cursor,
;  HL-->where to Insert, as returned by Find or Search,
;  C=MatchLen, as returned by Find or Search,
;  DataPtr-->DataArea for new Item.
;
InsertInPage
        SHLD    NGTItem
        MOV     A,M             ;A=PrefixLen of NGT
        STA     NGTPrefixLen
        ;
        XCHG
        SHLD    CursorPtr
        MOV     A,C
        STA     MatchLen
        LDAX    D               ;NGTItemPrefixLen.
        ADD     L
        MOV     L,A
        XCHG                    ;HL-->Cursor[NGTItemPrefLen]
        LDA     CursorLen       ;CursorLen is an 'in' parm.
        SUB     C               ;CursorLen-MatchLen=SuffixLen
        MOV     B,A             ;B=CursorSuffixLen
        CC      Trap
        JNZ     I01
        ;
        ;       SuffixLen=0: Got NilItem.
        ;
        ADD     C               ;A=CursorLen again.
        JNZ     I00             ;Jmp/ CursorLen>0: ~NilItem.
        MVI     A,1
        STA     CursorLen       ;CursorLen:=A=1. C=MatchLen=0,
I00     MOV     B,A             ;so B=SuffixLen=CursorLen.
        LXI     D,ZeroCursor
        XCHG
        SHLD    CursorPtr
        XCHG
I01     ;
        ;       Compress NGTItem, leaving a possible hole.
        ;  HL-->NGTItem (Not NGE, because equal case never
        ;  gets here), DE-->Cursor.
        ;
        MOV     A,L             ;Is there an NGTItem?
        MVI     L,CDataLen
        MOV     C,M
        INR     L               ;HL-->AfterLastItem.
        CMP     M               ;If NGTItem=AfterLastItem, no.
        MOV     L,A             ;Calc NGT SuffixLen.
        JZ      I10             ;SuffixLen=NGTItem.NextItemOff-
        INR     L               ;(NGTItem+1)-DataLen+1.
        MOV     A,M             ;L=ThisItem+1, A=NextItemOffset
        SUB     L
        SUB     C               ;B=CursorSuffixLen
        DCR     A               ;A=SuffixLen of NGT
```

```
        CMP     B                 ;Which suffix is shorter?
        MOV     C,B               ;Assume B is shorter or same.
        JNC     I0                ;Jmp/B<=A: CursorSL<=NGTSL.
        MOV     C,A               ;A was shorter.
I0      MOV     B,C               ;Duplicate shorter in B,C.
        INR     L
        XCHG                      ;Compare uses (DE)-(HL).
        CALL    Compare           ;Scan for difference.
        XCHG
        CC      Trap
        DCR     L
        DCR     L
        LDA     NGTPrefixLen      ;NGTPrefixLen
        ADD     B                 ;+CursorSuffixLen (NGTSLen)
        SUB     C                 ;-RemainingPNSLen (RemNGTSLen)
        STA     NewNGTItemPrefixLen
I10     SHLD    NewNGTItem
        ;
        ;       Figure out whether we need to split.
        ;
        MOV     A,L
        MVI     L,CDataLen
        MOV     B,M               ;B=DataLen
        MOV     L,A
        LDA     MatchLen
        MOV     C,A
        LDA     CursorLen
        SUB     C                 ;A=CursorSuffixLen.
        ADD     B
        ADI     2                 ;For PL,NIO.
        MOV     B,A               ;B=NewItemLen
        STA     NewItemLen        ;Assuming prefix compressed.
        LDA     NGTItemLowByte
        SUB     L                 ;HL-->NewNGTItem
        ADD     B
        STA     Growth            ;Growth=NewItemLen-HoleSize.
        MOV     B,A               ;B=Growth.
        ;
        MVI     L,CItemLimit
        MOV     A,M
        DCR     L                 ;HL-->AfterLastItem.
        SUB     M                 ;A=Available ItemSpace.
        CMP     B                 ;Is there space for NewItem?
        JZ      IMustSplit        ;Jmp/must split: need 0 at end.
        JC      IMustSplit        ;Jmp/no space: must split.
        ;
        ;       There is space.  Make and expand hole to fit NewItem.
        ;  Note the code works when NewItem is last.
        ;
        LHLD    NGTItem
        INR     L
        MOV     C,M               ;C=NGTItem.NextItemOffset.
        LHLD    NewNGTItem
```

```
        LDA     NewNGTItemPrefixLen
        MOV     M,A
        INR     L
        MOV     M,C
;
;       Hole has been created. Now expand.
;
        MVI     L,CAfterLastItem
        MOV     A,M             ;A=AfterLastItem
        LHLD    NewNGTItem
        SUB     L
        MOV     C,A             ;C=#Bytes to move.
        LDA     Growth
        MOV     B,A             ;B=Relocation distance
        ADD     L
        MOV     E,A
        MOV     D,H
        PUSH    D
        CALL    MoveRight       ;Slide C Bytes from HL@ to DE@.
        MOV     C,E             ;C=Reloc stop point.
        POP     H
        CALL    RelocateItemsSamePage
        MVI     L,CAfterLastItem
        MOV     M,C             ;Fix AfterLastItem
;
        IF      NOT CellsClean
        MOV     L,C             ;HL-->AfterLastItem.
        MVI     M,0             ;Put in a zero if necessary.
        ENDIF
;
        LHLD    NGTItem         ;HL-->hole for NewItem.
        CALL    CursorInstall   ;Put in NewItem.
        JMP     FixCheckSum     ;Clean up Cell and write.
;
;       Must split Cell.  Allocate only RightPage.
;  We create the LeftPage in RAM from split Cell Page.
;  HL-->AfterLastItem, B=Growth.
;
IMustSplit
        MOV     A,H
        STA     LeftCellPage    ;Page# of LeftCell.
        XCHG
        CALL    GetStaticPage   ;Allocate or Preempt a Page and
        XCHG                    ;make Static (Non-Preemptable.)
        CC      Trap
        MOV     A,D
        STA     RightCellPage   ;Page# of new RightCell.
;
;       Now that the GetStaticPage is done, we can modify the MetaTree
;  by creating the hole.  GetStaticPage needs a valid MetaTree, and
;  modifies the MetaTree only by changing the FlagByte and PageNum
;  of the preempted page's MetaParentPair.
;
```

```
LHLD    NGTItem
INR     L
MOV     C,M             ;C=NGTItem.NextItemOffset.
LHLD    NewNGTItem
LDA     NewNGTItemPrefixLen
MOV     M,A
INR     L
MOV     M,C
;
;       Copy the LeftCellExpansionArea into RightPage.
;  HL-->LeftPage, DE-->RightPage.
;
MVI     L,CItemLimit
MOV     A,M
MOV     L,A
MOV     E,A
CMA
INR     A
MOV     C,A
CALL    Move
;
;       Split Items between the two new Cells.
;
;       If we put NewItem at front of RightCell,
;  would we be imbalanced to the right or to the
;  left?  If heavy on right, test again with NewItem
;  at end of LeftCell.  If still to right, go scan
;  for proper splitpoint within RightSegment, else
;  NewItem covers splitpoint and should go whichever
;  way minimizes the imbalance.  For heavy on left,
;  scan for splitpoint in LeftSegment.  If scan in
;  left comes to NGTItem, remember to use prefix
;  length of Cursor for NextItem.
;       Remember that we must actually split something;
;  it is not acceptable to split before the first
;  or after LastItem.  Also, check whether the
;  found split point allows the data to actually fit.
;  It may not be possible to fit if the NewItem is
;  longer than ItemLimit/2.
;
LDA     NGTItemLowByte
MOV     B,A             ;B=#Bytes in LeftSegment.
LDA     NewNGTItemLowByte
MOV     C,A
MVI     L,CAfterLastItem
MOV     A,M
SUB     C               ;No CARRY possible.
MOV     C,A             ;C=#Bytes in RightSegment.
PUSH    B
LDA     NewItemLen
MOV     B,A
LDA     MatchLen
ADD     B               ;A=#Bytes for full NewItem.
```

```
        POP     B
        ADD     C               ;A=#Bytes for hypo. RightCell.
        JC      ISplitRight     ;Jmp/ right won't even fit!
        SUB     B               ;Which side bigger?
        MOV     E,A             ;Keep imbalance.
        JC      ISplitLeft      ;Jmp/ LeftCell bigger.
        ;
        ;       With NewItem in it, the RightCell is the
        ; biggest.  See if putting the NewItem in left would
        ; make left biggest.  If so, NewItem covers split pt.
        ;
        LDA     NewItemLen      ;A=NewItemLen pfx. compressed.
        ADD     B               ;Extend left by NewItem len.
        JC      ICursorRight    ;Jmp/ left can't hold NewItem!
        MOV     B,A             ;B=#Bytes for LeftCell.
        LDA     NewNGTItemLowByte ;The prefix of the new initial
        MOV     L,A             ;RightCell Item will expand.
        MOV     A,M             ;Get PrefixLen to expand.
        ADD     C               ;A=#Bytes for RightCell.
        JC      ISplitRight     ;Jmp/ RightCell grew too much!
        SUB     B               ;Compare with LeftCell.
        JNC     ISplitRight     ;Jmp/ RightCell still biggest.
        ;
        ;       Split point is under NewItem.  Put NewItem
        ; at end of LeftCell or front of right to minimize
        ; imbalance.  Negative left imbalance in A.
        ;
        CMP     E               ;Compare the two imbalances.
        JC      ICursorLeft     ;Jmp/ Left imbalance smallest.
        ;
        ;       Put NewItem at front of RightSegment.  Right
        ; imbalance was smallest.  Or, LeftCell simply can't
        ; hold the new Item, while RightCell can, and the
        ; SplitPoint is under NewItem.  Or, tried to split
        ; LeftSegment but decided on SplitPoint at end of
        ; LeftSegment, at NewItem.
        ;
ICursorRight
        LDA     RightCellPage
        MOV     D,A
        XCHG
        CALL    CursorToRight   ;Leave HL-->AfterNewItem,
        XCHG
        MVI     L,CAfterLastItem ;DE-->AfterNewItem=RSegDest.
        MOV     A,M             ;C=AfterLastItem to be moved.
        LHLD    NewNGTItem      ;AfterLastItem-NewNGTItem=
        SUB     L
        MOV     C,A             ;C=#bytes for Move.
        ;
        PUSH    D               ;Save DE-->Dest in RightCell.
        CALL    Move            ;Works even if NewItem last.
        MOV     A,E             ;DE-->AfterDest
        SUB     L               ;HL-->AfterSource
```

```
        MOV     B,A                 ;B=Reloc distance. Maybe<0.
        MOV     C,E                 ;C=Reloc stop=AfterDest.
        POP     D
        XCHG                        ;HL-->Dest in RightCell.
        CALL    RelocateItemsDiffPage ;Preserves HL,DE,BC.
        ;
        MVI     L,CAfterLastItem ;HL-->RightCAfterLastItem.
        MOV     E,L                 ;DE-->LeftCAfterLastItem.
        MOV     M,C                 ;RightCell.ALI:=RelocStop.
        LDA     NGTItemLowByte
        STAX    D                   ;LeftCell.ALI:=NGTItem.
        CALL    FinishCell
        XCHG
        JMP     FinishCellSplit
        ;
        ;       Put Cursor at end of LeftSegment.  Left
        ;  imbalance was smallest.  Copy RightSegment into
        ;  RightCell first.  Then NewItem can be put on end
        ;  of LeftCell.
        ;
ICursorLeft
        LDA     RightCellPage       ;Work on RightCell first.
        MOV     D,A
        XRA     A
        MOV     E,A
        STAX    D                   ;RightInitItemPrefixLen=0.
        INR     E
        LHLD    NewNGTItem
        MOV     C,M                 ;A=NewNGTItemPrefixLen
        INR     L                   ;HL-->NewNGTItem.NIO
        MOV     A,M                 ;A=RightInitItem.NIO unreloc
        INR     L                   ;HL-->NewNGTItem.Suffix.
        STAX    D
        INR     E
        PUSH    H
        LHLD    CursorPtr
        CALL    Move                ;Put CursorPrefix in.
        MVI     L,CAfterLastItem
        MOV     A,M                 ;C=AfterLastItem=RelocStop.
        POP     H                   ;DE-->RightInitItem.SuffixDest.
        SUB     L                   ;HL-->NewNGTItem.SuffixDest
        MOV     C,A                 ;C=#Bytes to move.
        CALL    Move                ;RightCell correct.
        MOV     A,E
        SUB     L                   ;HL-->NewNGTItem.Suffix
        MOV     B,A                 ;B=Relocation distance.
        XCHG
        MOV     C,L
        MVI     L,0
        CALL    RelocateItemsDiffPage ;Preserves HL,DE,BC.
        ;
        MVI     L,CAfterLastItem
        MOV     M,C
```

```
        CALL    FinishCell      ;Finish up the RightCell.
        XCHG
        ;
        ;       Now do LeftCell.
        ;
        LHLD    NGTItem         ;Where to put NewItem.
        CALL    CursorInstall
        MOV     A,L
        MVI     L,CAfterLastItem
        MOV     M,A             ;Set NewAfterLastItem in left.
        JMP     FinishCellSplit
        ;
        ;       Split the RightSegment.  The RightCell is
        ;  still bigger than Left even when Left has NewItem.
        ;  Or, RightCell grew too large when its InitItem
        ;  prefix expanded.  Note we may split before FirstItem
        ;  of the RightSegment, i.e., after NewItem,
        ;  if it is less imbalanced than after FirstItem.
        ;  Remember that there might be no Items in
        ;  RightSegment at all!
        ;
        ; right_search_bias:=AfterLastItem-Growth; -- 0..255
        ; split_pt:=NewNGTItem;
        ; choose_split(split_pt,AfterLastItem,
        ;                               right_search_bias);
        ;
ISplitRight
        LDA     Growth
        MOV     E,A
        MVI     L,CAfterLastItem
        MOV     A,M             ;Stop point.
        MOV     C,A
        SUB     E
        MOV     E,A             ;E=LowBias=AfterLastItem-Growth
        CC      Trap            ;Trap/ Bias negative! How!?
        MVI     D,0             ;D=HighBias=0 here always.
        LDA     NewNGTItemLowByte ;Where to scan from.
        MOV     L,A
        MOV     A,C
        CMP     L               ;Are there Items in RightSeg?
        CC      Trap            ;Trap/ AfterLastItem<NewNGTItem
        JNZ     ISR0            ;Jmp/ there are Items in right.
        ;
        CALL    CheckRightFitCursorRight ;No Items: Cursor->rt.
        CC      Trap            ;Trap/ Won't fit right.
        JMP     ICursorRight
        ;
ISR0    CALL    ChooseSplitPt
        JC      ISR1            ;Jmp/ found split pt.
        ;
        ;       The split point is under the LastItem in
        ;  the RightSegment.  We must put this LastItem
        ;  in RightCell, or else no splitting would occur!
```

```
        ;  There is at least one Item in RightSegment.
        ;
        MOV     L,B                 ;Put LastItem in RightCell.
        CALL    CheckRightFitRightSplit ;LastItem must fit.
        CC      Trap
        CALL    CheckLeftFitRightSplit ;LeftSegment must fit.
        CC      Trap
        JMP     ISRFits
        ;
        ;       Split point has been found inside RightSegment
        ;  (but not under LastItem.)
        ;
ISR1    MOV     A,B
        CMP     L                   ;are we splitting to left?
        JZ      ISR11               ;Jmp/ yes.
        CALL    CheckRightFitRightSplit ;If right fits, left
        JNC     ISRFits             ;must too: its smaller.
        MOV     L,D                 ;Doesn't fit! Try to right.
        CALL    CheckLeftFitRightSplit
        CC      Trap                ;If this doesn't work either,
        JMP     ISRFits             ;its impossible to split.
        ;
ISR11   CALL    CheckLeftFitRightSplit ;Splitting to left.
        JNC     ISRFits
        MOV     L,B                 ;Doesn't fit! Try to left.
        CALL    CheckRightFitRightSplit
        CC      Trap
        ;
        ;       The proper split point in RightSegment has
        ;  been chosen (in L).  Both sides fit.
        ;
ISRFits MOV     A,L                 ;First work on RightCell.
        STA     SplitPoint
        LDA     RightCellPage
        MOV     D,A
        XRA     A
        MOV     E,A
        STAX    D
        INR     E
        MOV     C,M                 ;C=SplitPointItem.PrefixLen
        INR     L
        MOV     A,M                 ;A=SplitPointItem.NIO
        DCR     L                   ;HL-->SplitPointItem.
        STAX    D                   ;=InitialItem.NextItemOffset
        INR     E                   ;DE-->Where to put PNText.
        PUSH    H
        LHLD    CursorPtr           ;Initialize the prefix of the
        CALL    Move                ;InitItem for ConstructPrefix.
        POP     H                   ;HL-->SplitPointItem
        PUSH    D                   ;DE-->where IItemSuffix goes.
        MVI     E,2                 ;DE-->InitItem text area.
        LDA     NewNGTItemLowByte
        MOV     C,A                 ;C=NewNGTItem=ScanFromItem.
```

```
        CALL    ConstructPrefix ;Preserves DE,HL.
        POP     D               ;DE-->Where IItemSuffix goes.
        CC      Trap
        INR     L
        INR     L               ;Don't move PL, NIO.
        MOV     C,L
        MVI     L,CAfterLastItem
        MOV     A,M
        MOV     L,C
        SUB     L
        MOV     C,A             ;C=#Bytes to move.
        CALL    Move
        MOV     A,E
        SUB     L
        MOV     B,A             ;B=Relocation distance.
        XCHG
        MOV     C,L
        MVI     L,0
        CALL    RelocateItemsDiffPage
        MVI     L,CAfterLastItem
        MOV     M,C
        CALL    FinishCell      ;RightCell done.
        XCHG
        ;
        LDA     SplitPoint      ;Now work on LeftCell.
        LHLD    NewNGTItem      ;Where to start relocating.
        SUB     L
        MOV     C,A             ;C=Number of bytes to move.
        LDA     Growth
        MOV     B,A             ;Dest=NewNGTItem+Growth.
        ADD     L
        MOV     E,A             ;HL-->src, DE-->dest of move.
        MOV     D,H
        PUSH    D
        CALL    MoveRight       ;Slide C bytes from HL^ to DE^.
        MVI     L,CAfterLastItem ;Fix Cell's AfterLastItem.
        MOV     M,E             ;E=NewAfterLastItem
        MOV     C,E             ;C:=RelocStop
        POP     H
        CALL    RelocateItemsSamePage
        LHLD    NGTItem         ;HL-->hole for NewItem.
        CALL    CursorInstall   ;Put in NewItem.
        JMP     FinishCellSplit ;Clean up Cell and write.
        ;
        ;       Split the LeftSegment.  LeftCell bigger than
        ;  Right even when Right has NewItem.  Remember that
        ;  initial Item in LeftCell never moves to RightCell.
        ;  We may choose to split at NewItem, which
        ;  means the end of LeftSegment.
        ;
ISplitLeft
        LDA     Growth
        MOV     E,A
```

```
        MVI     D,0
        PUSH    H
        MVI     L,CAfterLastItem
        MOV     L,M
        MOV     H,D
        DAD     D
        XCHG                    ;DE=AfterLastItem+Growth.
        POP     H
        ;
        LDA     NGTItemLowByte
        MOV     C,A             ;C=NGTItem (where to stop)
        MVI     L,0             ;Start at InitItem.
        CALL    ChooseSplitPt
        JC      ISL1            ;Jmp/ Found split pt.
        ;
        ;       The split point is under LastItem in
        ;  LeftSegment.  Do we split at LastItem in LeftSegment
        ;  or at NewItem?  If there is only one Item in
        ;  LeftSegment, we must split at NewItem.
        ;
        MOV     A,B             ;If PrevItem=InitItem,
        ORA     A               ;LeftSeg has only one Item.
        JNZ     ISL0            ;Jmp/ multiple Items.
        CALL    CheckRightFitCursorRight ;New must fit in rt.
        CC      Trap
        JMP     ICursorRight    ;Go split at NewItem.
        ;
ISL0    MOV     L,B             ;Multiple Items in LeftSeg.
        LDA     MatchLen        ;A=NewItemPrefixLen.
        CMP     M               ;Comp w/PrefixLen of PrevItem.
        JC      ISL01           ;Jmp/ PrevItem.PL longer.
        CALL    CheckRightFitCursorRight ;If NewItem fits,
        JNC     ICursorRight    ;split at NewItem.
        CALL    CheckRightFitLeftSplit ;Split @ PrevLeftItem.
        JNC     ISLFits         ;Jmp/ go do complex split.
        CALL    Trap            ;Trap/ Neither fits!
        RET
        ;
ISL01   CALL    CheckRightFitLeftSplit ;Try PrevItem for size.
        JNC     ISLFits         ;Jmp/ fits.
        CALL    CheckRightFitCursorRight ;Try NewItem to rt.
        JNC     ICursorRight    ;Jmp/ it fits.
        RET                     ;Ret/ Neither fits!
        ;
        ;       ChooseSplitPt has split somewhere in
        ;  LeftSegment.  Interestingly, if ChooseSplitPt splits
        ;  to the right of the central Item, the LeftSegment is
        ;  guaranteed to fit, because it already fits and is
        ;  not going to change.
        ;
ISL1    MOV     A,L
        ORA     A               ;Did we skip InitItem?
        CZ      Trap            ;The InitItem stays!
```

```
        MOV     A,B                 ;Which side of split point?
        CMP     L                   ;If L=B, left side.
        JNZ     ISLFits             ;Jmp/ right side. Must fit!
        CALL    CheckRightFitLeftSplit ;Left side.
        JNC     ISLFits
        MOV     L,D                 ;LeftSegment>Right. It fits.
;
;       The proper left split point has been chosen.
;  Actually split LeftSegment.  L=split point.
;
ISLFits MOV     A,L                 ;First work on RightCell.
        STA     SplitPoint
        LDA     RightCellPage       ;Copy right part of
        MOV     D,A                 ;LeftSegment into right page.
        XRA     A
        MOV     E,A                 ;RightCellInitItem.PL:=0.
        STAX    D
        INR     E
        INR     L
        MOV     A,M                 ;A=SplitPointItem.NIO
        DCR     L                   ;HL-->SplitPointItem.
        STAX    D                   ;RCInitItem.NIO:=SPItem.NIO
        INR     E                   ;DE-->Where InitItemText goes.
        MVI     C,0                 ;ScanFrom beginning of Cell.
        CALL    ConstructPrefix ;Preserves HL,DE.
        CC      Trap
        MOV     E,M                 ;Get SplitPointItem.PL
        INR     E
        INR     E                   ;DE-->where IItemSuffix goes.
        INR     L
        INR     L
        LDA     NGTItemLowByte  ;NGTItem is AfterDest.
        SUB     L                   ;how much to copy.
        MOV     C,A
        CALL    Move                ;DE-->NewItemDest.
        MOV     A,E
        SUB     L
        MOV     B,A                 ;B=RelocDist.
        XCHG
        MOV     C,L
        PUSH    H
        MVI     L,0
        CALL    RelocateItemsDiffPage ;Pres HL,DE,BC.
        POP     H
        CALL    CursorInstall ;HL-->Dest.
        XCHG
;
        MVI     L,CAfterLastItem
        MOV     A,M
        LHLD    NewNGTItem
        SUB     L
        MOV     C,A
        PUSH    D
```

```
        CALL    Move
        MOV     A,E
        SUB     L
        MOV     B,A             ;B:=RelocDist.
        MOV     C,E             ;C:=RelocStop.
        POP     D
        XCHG
        CALL    RelocateItemsDiffPage
        MVI     L,CAfterLastItem
        MOV     M,C
        CALL    FinishCell
        XCHG
        ;
        LDA     SplitPoint      ;Finish up LeftCell.
        MVI     L,CAfterLastItem
        MOV     M,A
        ;
FinishCellSplit
        CALL    FinishCell
        MVI     A,SplitDoneErr
        STC
        RET
;
;       InsertInPage inserts ZeroCursor if given a NilCursor.
;
        need    2               ;2 for safety!!!
ZeroCursor DB   0
;
;       Check the RightCell for fit for a split of LeftSegment
;  at L Item.  (No need to check for LeftCell fitting during a
;  left split - there is no way it could not fit.)
;
CheckRightFitLeftSplit
        PUSH    H
        MVI     L,CAfterLastItem
        MOV     A,M             ;Bytes to right of splitpoint.
        POP     H
        SUB     L               ;-Bytes to left of splitpoint.
        ADD     M               ;+PrefixLen of splitpoint.
        RC                      ;Ret/ CARRY: much too big.
        PUSH    H
        MOV     L,A
        LDA     Growth
        ADD     L
        POP     H
        RC                      ;Ret/ CARRY: still too big.
        PUSH    H
        MVI     L,CItemLimit
        CMP     M
        POP     H
        CMC
        RET                     ;Ret/ CARRY if too big.
;
```

```
;       Check the LeftCell for overflow assuming a right
;  split at Item L.
;
CheckLeftFitRightSplit
        LDA     Growth
        ADD     L
        RC
        PUSH    H
        MVI     L,CItemLimit
        CMP     M
        POP     H
        CMC
        RET
;
;       Check the RightCell for overflow assuming a right
;  split at Item L.
;
CheckRightFitRightSplit
        PUSH    H
        MVI     L,CAfterLastItem
        MOV     A,M
        POP     H
        SUB     L
        ADD     M
        RC
        PUSH    H
        MVI     L,CItemLimit
        CMP     M
        POP     H
        CMC
        RET
;
;       Check RightCell for overflow assuming a split
;  before NewItem (NewItem going into RightCell.)
;
CheckRightFitCursorRight
        PUSH    H
        MVI     L,CAfterLastItem
        MOV     A,M
        LHLD    NewNGTItem
        SUB     L
        MOV     L,A
        LDA     NewItemLen
        ADD     L
        POP     H
        RC
        PUSH    H
        MVI     L,CItemLimit
        CMP     M
        POP     H
        CMC
        RET
;
```

```
;       Check LeftCell for overflow assuming a split
;  after NewItem (NewItem going into LeftCell.)
;
CheckLeftFitCursorLeft
        PUSH    H
        LHLD    NewNGTItem      ;Tricky.
        LDA     Growth
        ADD     L
        POP     H
        RC
        PUSH    H
        MVI     L,CItemLimit
        CMP     M
        POP     H
        CMC
        RET
;
;       A C formulation of ChooseSplitPt
;
; /*
;  *    Choose left split point.
;  * LeftSearchBias is always 256..511
;  */
; LeftSearchBias=AfterLastItem+Growth;
; SplitPt=ChooseSplit(0,NGTItem,LeftSearchBias);
;
; /*
;  *    Choose right split point.
;  *  RightSearchBias is always 0..255 because AfterLastItem>=
;  *  ItemLimit/2, (or else no split could have occurred) while
;  *  ItemLimit/2>=NewItemLen>=Growth.
;  */
; RightSearchBias=AfterLastItem-Growth;
; SplitPt=ChooseSplit(NewNGTItem,AfterLastItem,RightSearchBias)
;
; ChooseSplit(PagePtr, ScanStart, ScanEnd, Bias)
; char *PagePtr; BYTE ScanStart,ScanEnd; WORD Bias;
; {
;       register BYTE I,OldI;
;       I=ScanStart; OldI=0; /* So we can tell if no scan */
;       while (I<ScanEnd) {
;               if (I+I>=Bias+PagePtr[I].PrefixLen) break
;               else {  OldI=I; I=PagePtr[I].NextItemOffset }
;       }
;       if (PagePtr[OldI].PrefixLen < PagePtr[I].PrefixLen)
;               return(OldI)
;       else return(I)
; }
;
;       DE=Bias, C=end, L=start.  Ret CARRY: L=split point,
;  B=OldI, D=I.  If L=B, we did not scan.
;  This is important in splitting the left: we never move the
;  InitItem into RightCell.  NOT CARRY: B=OldI,
```

```
;  L=C, we ran out of things to scan before split point
;  was found.  In left split case with NOT CARRY, we must
;  select either NewItem as split point (L or C or NGTItem)
;  or else B.  In right split case, with NOT CARRY, we just
;  use B, because we must put something in RightCell.
;       The Bias is the Length of the virtual single run of
;  Items - 2 * Offset, where Offset is the difference between
;  the virtual position of a given Item the single run of
;  Items and actual offset of the same Item in the HL-->Cell.
;       Note that every possible split point adds bytes to
;  left and subtracts from right with respect to the
;  splitpoint to its left.  So, we have a monotonic balancing
;  characteristic, in spite of prefix compression.  This
;  results from the fact that a prefix is always shorter than
;  the total length of the PrevItem.  As a result, there are
;  always two candidate splitpoints, and they are consecutive.
;  One (i) causes LeftCell to be the bigger, the other (OldI)
;  RightCell.
;       Since the algorithm for selecting the optimum between
;  OldI and I on return is simply to select the one with
;  the smallest PrefixLen, we must check that the selection
;  produced a split that fits in the Cells.  This "smallest
;  PrefixLen" algorithm tends to reduce the lengths of
;  Items in index levels, when coupled to the suffix
;  compression technique that is applied to first level Index
;  Cells.  Even without the suffix compression, Items with
;  short PrefixLens tend to be the first Item in a SubSpace,
;  and these often are shorter than Items within the SubSpace.
;  The Item length reduction effect is multiplicative at the
;  upper levels.
;
ChooseSplitPt
        MOV     B,L             ;So CSPWhich works w/no scan.
CSP0    MOV     A,L
        CMP     C               ;C=AfterLastItemToScan.
        RZ                      ;Ret/ NOT CARRY: end!
        MOV     A,M             ;Get PageP[I].PrefixLen
        PUSH    D               ;Save bias.
        ADD     E               ;Add PrefixLen to bias.
        MOV     E,A
        MOV     A,D
        ACI     0
        JZ      CSP2            ;Jmp/ Bias+PageP[I].PL<256
        ;
        ;       We know Bias+PageP[I].PrefixLen>=256.
        ;
        MOV     A,L
        RAL
        JNC     CSPNext         ;Jmp/ Bias+Prefix>=256,I+I<256.
        JMP     CSPHighsEqual   ;Jmp/ high bits equal.
        ;
        ;       We know Bias+PageP[I].PrefixLen<256.
        ;
```

```
CSP2    MOV     A,L
        RAL
        JC      CSPWhich        ;Hmp/ I+I>=256,Bias+Prefix<256.
        ;
        ;       We know both I+I and Bias+PageP[I].PrefixLen
        ;  are >=256.
        ;
CSPHighsEqual
        CMP     E
        JNC     CSPWhich        ;jmp/ I+I>=Bias+PrefixLen
        ;
        ;       Go to NextItem.
        ;
CSPNext POP     D
        MOV     B,L             ;OldI:=I;
        afteritem
        JMP     CSP0
        ;
        ;       Which of OldI or I is the best split point?
        ;
CSPWhich POP    D
        MOV     E,M             ;E=PageP[I].PrefixLen
        MOV     D,L
        MOV     L,B
        MOV     A,M             ;A=PageP[OldI].PrefixLen
        MOV     L,D             ;Compare two PrefixLens.
        CMP     E               ;We want shorter prefix Item.
        CMC
        RC                      ;Ret/ got shorter prefix Item.
        MOV     L,B             ;Get the shorter prefix Item.
        STC                     ;Ret CARRY for either case.
        RET
;
;       Old Method of ConstructPrefix.
;       Construct the prefix of the HL Item by scanning from
;  the C Item, putting the prefix at DE.  Preserve HL, DE.
;  If validity error, L points at last scanned Item.
;       We scan from ScanFrom Item, ignoring Items whose
;  prefixes are longer than our Item's prefix.  Those shorter
;  are copied over the bytes of the prefix of our Item, but
;  the bytes after the prefix are not copied.  Note that if
;  the ScanFrom Item is not the first in a Cell, then it
;  will have nonzero PrefixLen, and ConstructPrefix will
;  only work if the DE area has already been initialized with
;  this prefix.  This is true in Insert while splitting
;  RightSegment, when we put the new Item there and use
;  ScanFrom=NewNGTItem.
;
        IF      0
        ;
OldConstructPrefix
        MOV     A,L
        CMP     C
```

```
        RZ                          ;Ret/ no scanning needed.
        MOV     B,M                 ;B=PrefixLen of desired Item.
        INR     B
        DCR     B                   ;If B=0, all done.
        RZ
        MOV     L,C                 ;Scan from C Item to HL Item.
        MOV     C,A                 ;We leave L=C on success.
        JMP     OConsP1
        ;
OConsP0 afteritem
OConsP1 MOV     A,B                 ;Keep DesiredPL in B in loop.
        CALL    SkipLongerPrefixes ;Scan for PrefixLen<=A.
        RC                          ;Ret/ error: scanned too many!
        MOV     A,L
        CMP     C
        RZ                          ;Ret/ at desired Item. done.
        MOV     A,B
        SUB     M                   ;A=#Bytes to copy.
        JZ      OConsP0             ;Jmp/ no bytes: keep scanning.
        CC      Trap
        PUSH    H
        PUSH    D
        PUSH    B
        MOV     C,A                 ;C=#bytes to copy.
        MOV     A,M                 ;Offset the DE pointer by the
        INR     L
        INR     L
        ADD     E                   ;PrefixLen of this scan Item.
        MOV     E,A                 ;Sometimes we copy more than
        CALL    Move                ;necessary, but it is simpler,
        POP     B                   ;and no damage is done.
        POP     D
        POP     H                   ;Restore HL-->ItemNIO.
        JMP     OConsP0
        ;
        ENDIF
;
;       ConstructPrefix.  Construct the prefix of the
;   HL-->DesiredItem in the DE-->Cursor.  C=ScanFromItemOffset.
;   If ScanFromItemOffset>0, the Cursor must already contain
;   the complete ScanFromItem, or at least DesiredItemPrefixLen
;   bytes of it.  ConstructPrefix does not copy the Suffix of
;   the DesiredItem into the Cursor.
;       Three passes are used:
;       (1) Scan the Cell from ScanFromItem to DesiredItem to
;   find the Item with the minimum PrefixLen.  After the scan,
;   we zero the Cursor from MinItemPrefixLen to DesiredItem-
;   PrefixLen.
;       (2) Scan the Cell from MinItem to DesiredItem, and
;   while skipping Items with Prefixes longer than DesiredItem-
;   PrefixLen, write each ScanItemOffset at
;   Cursor[ScanItemPrefixLen].
;       (3) Scan the Cursor from MinItemPrefixLen to Desired-
```

```
;  ItemPrefixLen, copying SourceItemSuffix into the Cursor.
;  Initially, the SourceItem is the MinItem.  Thereafter, when-
;  ever the CursorItemOffset is greater than the SourceItem-
;  Offset,  the CursorItem becomes the new SourceItem.
;       Note that for scanning from the InitItem in a Cell,
;  pass one is not needed, however, it may speed things up
;  to use it anyway.
;
ConstructPrefix
        MOV     A,M             ;If desired Item PrefixLen=0,
        ORA     A               ;then no scanning needed.
        RZ
        MOV     A,L
        CMP     C               ;If ScanFrom=DesiredItem,
        RZ                      ;Ret/ no scanning needed.
        MOV     L,C             ;Exchange L and C.
        MOV     C,A
        MOV     A,L
        ORA     A               ;If ScanFrom=InitItem,
        MVI     B,0             ;B=MinPrefixLen:=0.
        JZ      ConsP2          ;Jmp/ no MinPrefixLen scan!!!
        ;
        ;       Pass one.  Scan for B:=MinPrefixLen of any
        ;  Item from the C Item to the L Item.  For Items of
        ;  equal PrefixLen, the later Item has priority.
        ;
        DCR     B               ;Start MinPrefixLen:=255.
        PUSH    D
        MOV     E,L             ;Start MinItem at L.
        JMP     ConsP11         ;Enter loop in middle.
ConsP10 afteritem
ConsP11 MOV     A,B             ;5 Compare with PrefixLen.
        CMP     M               ;7
        JC      ConsP12         ;10 Jmp/ A<PrefixLen: no chg.
        MOV     B,M             ;(rare) B:=NewMinItemPL.
        MOV     E,L             ;(rare) E:=NewMinItemOffset.
ConsP12 MOV     A,C             ;5
        CMP     L               ;4
        JNZ     ConsP10         ;10 Jmp/ loop. Total=53
        MOV     L,E             ;HL-->MinItem, B=MinPrefixLen.
        POP     D               ;Restore DE-->Cursor.
        CMP     L               ;If L=C, no shorter PLs found.
        RZ                      ;Ret/ done. L=C=DesiredItemOff.
        ;
        ;       Now zero from MinPrefixLen to DesiredPrefixLen
        ;  for building the offset table inside the Cursor.
        ;       HL-->MinItem, the Item with the MinPrefixLen.
        ;  B=MinPrefixLen, which may equal DesiredPrefixLen.
        ;
ConsP2  PUSH    H
        MOV     L,C
        MOV     A,M             ;A:=DesiredItemPrefixLen.
        SUB     B               ;-MinPrefixLen
```

```
        CC      Trap                ;Cant zero a negative length!!!
        MOV     C,A                 ;C:=#Bytes to zero fill.
        MOV     A,B                 ;A:=MinPrefixLen.
        MOV     B,L                 ;B:=DesiredItemOffset.
        ADD     E                   ;C may be zero.
        MOV     L,A
        MOV     H,D                 ;HL-->Cursor[MinPrefixLen]
        XRA     A
        CALL    Fill                ;Zero from MinPL to DesiredPL.
        MOV     C,B                 ;C=DesiredItemOffset
        POP     H                   ;Restore HL-->MinItem.
        ;
        ;       Pass two. Build the offset table over the
        ;  zeroed area in the Cursor.  B=DesiredItemPrefixLen.
        ;
        PUSH    H                   ;Save HL-->MinItem.
        MOV     A,L
        MOV     L,C
        MOV     B,M                 ;B=DesiredItemPrefixLen.
        MOV     L,A                 ;HL-->MinItem.
        JMP     ConsP32             ;Enter loop in the middle.
ConsP30 MOV     A,E                 ;5
        ADD     M                   ;7
        MOV     E,A                 ;5 DE:=DE+PrefixLen.
        MOV     A,L                 ;5
        STAX    D                   ;7 DE^:=ItemOffset.
        MOV     A,E                 ;5
        SUB     M                   ;7
        MOV     E,A                 ;5 DE:=DE-PL.  DE-->Cursor
ConsP31 afteritem
ConsP32 MOV     A,B                 ;5 B=DesiredItemPL, so SLP will
        CALL    SkipLongerPrefixes ;stop. May skip no Items.
        CC      Trap                ;5 Trap/ bad Cell.
        JNZ     ConsP30             ;10 Jmp/ can't be end yet.
        MOV     A,L                 ;5 ScanItemPL=DesiredItemPL.
        CMP     C                   ;4 Stop if at DesiredItem.
        JNZ     ConsP31             ;10 Jmp/ loop. 4+9*5+4*7=77
        POP     H                   ;HL-->MinItem.
        ;
        ;       Pass 3.  B=DesiredItemPL. DE-->Cursor.
        ;  HL-->MinItem.
        ;
        MOV     A,B                 ;A:=DesiredItemPL
        SUB     M                   ;-MinPL.
        MOV     B,A                 ;B:=#Bytes to scan.
        PUSH    D                   ;Save DE-->Cursor.
        MOV     A,E
        ADD     M
        MOV     E,A                 ;DE-->Cursor[MinPL]
        INR     L
        INR     L                   ;HL-->MinItemSuffix.
ConsP40 LDAX    D                   ;Get an offset out of Cursor.
        CMP     L                   ;Is it higher than L offset?
```

```
        JC      ConsP41             ;Jmp/ L>Offset: no change.
        ADI     2                   ;Equal case impossible.
        MOV     L,A                 ;Point HL at Suffix.
ConsP41 MOV     A,M
        INR     L
        STAX    D
        INR     E
        DCR     B
        JNZ     ConsP40
        MOV     L,C                 ;Return L=C-->DesiredItem.
        POP     D                   ;DE-->Cursor.
        ORA     A                   ;NOT CARRY.
        RET
;
;       Do the final work on a newly altered Cell.  We put
;  zeroes from AfterLastItem to ItemLimit, check to see that
;  there really is some space left in the Cell, especially for
;  the zero byte where AfterLastItem points, and correct the
;  checksum.  Preserves H,DE,B. Return A=0, NOT CARRY.
;
FinishCell
        MVI     L,CItemLimit        ;Just to make it pretty,
        MOV     A,M                 ;we fill 0s after LastItem.
        MVI     L,CAfterLastItem
        SUB     M                   ;ItemLimit-AfterLastItem
        CC      Trap                ;Must have ALI<ItemLimit, so
        CZ      Trap                ;there can be a zero at ALI.
        MOV     C,A                 ;C=number of bytes to fill.
        MOV     L,M                 ;HL-->AfterLastItem.
        IF      CellsClean
        XRA     A                   ;Fill with zeros.
        CALL    Fill
        ELSE
        MVI     M,0
        ENDIF
        ;
FixCheckSum
        IF      CheckSumValidity
        CALL    CheckSumPage
        MVI     L,CCheckSum
        MOV     A,C                 ;A=CheckSum of page.
        ADD     M
        MOV     M,A                 ;Give page correct checksum.
        ENDIF
        ;
        XRA     A                   ;A=0, NOT CARRY.
        RET
;
;       Construct NewItem from Cursor at HL spot.
;  Include data read from DataPtr for DataLen.
;  Leave HL-->AfterNewItem.  Preserves DE.
;
CursorToRight
```

```
        XRA     A               ;For InitItem, no prefix comp.
        MVI     L,0             ;HL-->InitItem.
        JMP     CIComm
CursorInstall
        LDA     MatchLen        ;MatchLen is new PrefixLen.
CIComm  MOV     C,A
        PUSH    D
        MOV     M,A
        INR     L               ;We fix NextItemOffset later.
        PUSH    H
        INR     L
        XCHG                    ;DE-->dest for Item suffix text
        LHLD    CursorPtr
        ADD     L
        MOV     L,A             ;HL-->src
        LDA     CursorLen
        SUB     C
        MOV     C,A             ;C=CursorSuffixLen.
        CALL    Move            ;Move C bytes from HL^ to DE^.
        MOV     H,D
        MVI     L,CDataLen      ;Now put new CellNum after.
        MOV     C,M
        LHLD    DataPtr         ;HL-->where to get data from.
        CALL    Move
        XCHG                    ;HL-->AfterNewItem.
        MOV     A,L             ;This is new NextItemOffset.
        POP     D               ;DE-->NewItem.NextItemOffset.
        STAX    D
        LDA     FixPTFlag       ;If NewItem not to be
        ORA     A               ;updated in PT, skip.
        JZ      CIComm1
        ;
        ;       Update ParentTab for NewItem.
        ;
        DCR     E               ;DE-->NewItem
        MOV     A,E
        DCR     L               ;HL-->NewItem.ChildPage
        MOV     E,M
        INR     L               ;HL-->AfterNewItem.
        MVI     D,HI ParentOffsetTab
        STAX    D
        INR     D
        MOV     A,H
        STAX    D
CIComm1 POP     D
        RET
;
;       Delete the HL-->Item from its page.
;       Deletion is done by copying NextItem and
;  the Items to its right over the DeletedItem.  If the
;  NextItem's suffix grows as a result of the deletion,
;  the new part of the suffix comes from DeletedItem
;  suffix, which is simply left in place.
```

```
;       Pres H.
;
DelFromPage
        MOV     D,H
        MVI     E,CAfterLastItem
        LDAX    D
        MOV     B,A             ;B=ALI.
        CMP     L               ;If L=ALI, we are at end.
        CZ      Trap            ;Trap/ no Item to delete!
        ;
        ;       Unlink child from HL-->ParentItem.
        ;
        CALL    DeChild         ;ChildPage:=0, PT[CP]:=0.
        ;
        INR     L
        MOV     A,M             ;A=DelItem.NIO
        DCR     L               ;If DelItem.NIO=ALI, LastItem.
        CMP     B
        MOV     C,L             ;New ALI if no NextItem.
        JZ      DFP2            ;Jmp/ no next Item.
        ;
        ;       Tricky case: must collapse two Items.
        ;  If second Item's PrefixLen is greater than the
        ;  deleted Item's, then the NextItem grows by the
        ;  amount of the difference, getting its additional
        ;  suffix bytes from the beginning of
        ;  DeletedItemSuffix.  HL-->Item, B=ALI, A=DelItem.NIO,
        ;  D=H.
        ;
        MOV     E,A             ;DE-->NextItem.
        LDAX    D               ;A=NextItem.PrefixLen.
        SUB     M               ;Get Max(0,NextI.PL-DelI.PL)
        JNC     DFP1            ;Jmp/ NextItem.PL<=DelItem.PL
        XRA     A               ;Negative result. Use 0.
DFP1    MOV     C,A             ;C=NextItemGrowth.
        XCHG                    ;HL-->NextIteml DE-->DelItem.
        MOV     A,M
        INR     L
        SUB     C
        PUSH    D               ;Save DE-->DelItem for Reloc.
        STAX    D               ;DelItem.PL:=NextItem.PL-C.
        INR     E
        MOV     A,M
        INR     L
        STAX    D               ;DelItem.NIO:=NextItem.NIO.
        INR     E
        MOV     A,C
        ADD     E
        MOV     E,A             ;DE-->NextItemSuffixDest.
        MOV     A,B             ;B=AfterLastItem.
        SUB     L               ;HL-->NextItemSuffix.
        MOV     C,A             ;C=#Bytes to move.
        CALL    MoveLeft
```

```
        MOV     A,E
        SUB     L
        MOV     B,A             ;B=RelocDist.
        MOV     C,E             ;C=RelocStop.
        POP     H
        CALL    RelocateItemsSamePage ;Pres HL,DE,BC.
        ;
DFP2    MVI     L,CAfterLastItem
        MOV     M,C
        JMP     FinishCell      ;Ret A=0, NOT CARRY.
;
;       RangeDelete a range that is within a Page.  Interval is
;  [), which means LeftItem is deleted, RightItem stays.  This
;  is the standard user function interval, which is frequently
;  called with LeftItem=PrefixOfASubTree, RightItem=PrefixOf
;  SubTree+1.  The [) interval is important because it
;  describes the Items physically between the two pointers,
;  and makes it possible to delete all the Items in a Page.
;       HL-->LeftItemInPage, DE-->RightItemInPage.
;  For now, we use a very slow repetitive call of DelFromPage.
;  Pres H,B.
;
RangeDelFromPage
        MOV     A,H
        CMP     D
        CNZ     Trap            ;Must be within Page.
        MOV     A,E
        CMP     L
        RZ                      ;Ret/ nothing to delete.
        CC      Trap            ;Can't have HL>DE.
        ;
        ;       Count the Items in the interval.
        ;
        PUSH    H               ;Save HL-->LeftItem.
        MVI     C,0
RDFP1   INR     C
        afteritem
        MOV     A,E
        CMP     L
        CC      Trap
        JNZ     RDFP1
        POP     H
        ;
RDFP2   PUSH    B
        PUSH    H
        CALL    DelFromPage     ;Pres H,?.
        CC      Trap            ;Trap/ DelOffEndErr?
        POP     H
        POP     B
        DCR     C
        JNZ     RDFP2
        RET
;
```

```
;       Try to merge the HL Cell with its right sibling.
;  HL-->Cell from which an Item has been deleted.
;  DE-->Right Sibling Page, with which to attempt merge.
;  Return CARRY, MergeTooFullErr the two Cells contain too
;  much data to fit in LeftCell.
;       It does not matter to the caller which page is
;  deleted in a merge, if one is, because in either case,
;  LeftCellPage.InitItem will remain in the parent Item as the
;  key to whichever is left.  However, in order to make
;  adjusting the pointer easy, and simplify Merge, we always
;  leave the data in LeftCell, and RightCell possibly empty.
;       This code is separate from Delete so it can be used
;  by the BTree 'client'.
;       Pres H,D.
;
Merge   MVI     E,CAfterLastItem
        MOV     L,E
        LDAX    D                   ;Can we merge Cells?
        ORA     A                   ;If RightCell empty, we can.
        RZ                          ;Ret/ done: NOT CARRY.
        ADD     M                   ;If TotalBytes>=256, no merge.
        JC      MergeTooFull        ;Jmp/ we can't merge Cells.
        MVI     L,CItemLimit        ;A=TotalBytes.
        CMP     M
        JNC     MergeTooFull        ;Jmp/ TotalBytes>=ItemLimit
        ;
        ;       Merge two Cells together.
        ;       For now, we skip the balancing.  The less
        ;  efficient Cells are faster to search anyway. Minimum
        ;  efficiency for unidirectional merge checking is
        ;  33%, which happens with a repeating 50%, 50%, 0%
        ;  pattern, which can be created by filling every
        ;  Cell, deleting all possible Items from every other
        ;  Cell while avoiding a merge, and finally splitting
        ;  the still full Cells with single insertions.
        ;       HL-->LeftCell, DE-->Right.
        ;
        CALL    FindRightCellInitItemPrefixLen ;Pres H,D A,C=PL
        ;
        MVI     L,CAfterLastItem
        MOV     L,M
        XCHG                        ;DE-->LeftCell[ALI], HL-->RC.
        MOV     A,C
        PUSH    D                   ;Save DE-->JoinPointItem
        STAX    D                   ;JoinPointItem.PL:=MatchLen.
        INR     E
        MVI     L,1
        MOV     A,M                 ;A=RightInitItem.NIO.
        STAX    D                   ;JoinPointItem.NIO:=A.
        INR     E                   ;DE-->JoinPointItem.Suffix
        MVI     L,CAfterLastItem
        MOV     A,M
        MOV     L,C                 ;Src-->RightCell[2+MatchLen]
```

```
        INR     L
        INR     L               ;HL-->RC.II.CompressedSuffix.
        SUB     L
        MOV     C,A             ;C=#Bytes to Move.
        CALL    Move
        MOV     A,E
        SUB     L
        MOV     B,A             ;B=RelocDist.
        MOV     C,E             ;C=RelocStop.
        POP     D               ;DE-->JoinPointItem.
        XCHG
        CALL    RelocateItemsDiffPage
        MVI     L,CAfterLastItem
        MOV     M,C
        JMP     FinishCell      ;A=0, NOT CARRY.
MergeTooFull MVI        A,MergeTooFullErr
        STC
        RET
;
;       Find the PrefixLen of the DE-->RightCellPage.InitItem,
;  which is physically always zero, by searching for it in the
;  HL-->LeftCellPage.  Return A,C=PrefixLen. Pres H,D.
;
FindRightCellInitItemPrefixLen
        XCHG
        MVI     L,0
        itemsuffixlen           ;Pres H,DE,BC, A=Item.SuffixLen
        STA     CursorLen       ;CursorLen=II.SuffixLen=II.TL
        MVI     L,2
        XCHG                    ;DE,CursorLen-->RC.InitItem.
        MVI     L,0             ;HL-->LeftCell.InitItem.
        MOV     C,L             ;InitMatchLen=0.
        CALL    Search
        CC      Trap
        ORA     A
        CZ      Trap
        MOV     A,C
        RET
;
;       Slow search is an example of use of
;  CompareSuffixToCursor, for which DE-->CursorSuffix,
;  HL-->ItemSuffix, B=CursorLen (TotalLen); C=InitialMatchLen.
;       Returns DE-->NewCursorSuffix, C=NewMatchLen;
;  A=LessThanErr, Pres HL,B, Cursor.
;  ExactMatchErr, PartMatchErr, or NoMatchErr.  We assume
;  the Cursor is less than the Item or that the Item is the
;  first one greater than the Cursor.  In other words, Cursor
;  is used as a Limit while scanning over Items.  Notice also
;  that in order to get a MatchLen, you have to start at the
;  beginning of the Cell or something.  CSTC can be thought of
;  as a primitive for building a slow Search!
;
SlowSearch
```

```
        CALL    CompareSuffixToCursor
        RNC                     ;Ret No-, Part-, or ExactMatch.
        CPI     LessThanErr
        STC
        RNZ
        INR     L
        MOV     A,M
        MVI     L,CAfterLastItem
        CMP     M
        MOV     L,A
        JNZ     SlowSearch
        ;
        ;       IS NOMATCH REALLY RIGHT?!!!  THAT'S WHAT
        ;  SEARCH DOES, BUT IT DOESN'T MAKE SENSE!!!
        ;
        MVI     A,NoMatchErr    ;End of Cell: NoMatchErr.
        RET
;
CompareSuffixToCursor
        MOV     A,C
        CMP     M
        MVI     A,LessThanErr   ;Item<Cursor
        RC                      ;Ret/ Item.PL>MatchLen.
        MVI     A,NoMatchErr
        RNZ                     ;Ret/ Item.PL<MatchLen.
        LDAX    D
        PUSH    H
        INR     L
        INR     L
        CMP     M
        JZ      CSTC1           ;Jmp/ equal: go compare bytes.
        POP     H
        MVI     A,LessThanErr   ;Item<Cursor.
        RNC
        MVI     A,NoMatchErr
        ORA     A
        RET
        ;
        ;       TOS=HL-->ItemSuffix[0]
        ;
CSTC1   PUSH    B               ;Save B
        MOV     B,L
        MVI     M,CAfterLastItem
        MOV     A,M
        MOV     L,B
        CMP     C


        RET
;
;       Scan to the Item just before the HL Item.  Ret with
;  C=PrevItem.  Preserves HL,DE,B.
;
```

```
ScanToPrevItem
        MOV     A,L
        ORA     A
        RZ                          ;If no prev., stop now.
        MVI     L,0                 ;A=Where to stop.
STPI1   MOV     C,L                 ;If done, C=PrevItem.
        afteritem
        CMP     L
        RZ
        MOV     C,L
        afteritem
        CMP     L
        RZ
        MOV     C,L
        afteritem
        CMP     L
        RZ
        MOV     C,L
        afteritem
        CMP     L
        JNZ     STPI1
        RET                         ;Ret/ C=PrevItem, Pres. HL,DE,B
;
;       Copy an Item over a Cursor.  The SuffixToCursor
;  function assumes that the Cursor was used to find the
;  Item or there is some otherguarantee that the prefix
;  of the Item matches the corresponding bytes in the Cursor.
;  We assume Cursor is long enough to hold the Item.
;  ZeroItem is translated into NilCursor.
;       HL-->Item, DE-->Cursor.  Return B=NewCursorLen,
;  HL-->AfterItemSuffix=ItemDataArea, DE-->AfterCursor, A=0.
;
ItemToCursor
        MVI     C,0                 ;C=ScanFrom
        CALL    ConstructPrefix ;Pres HL,DE.  BC,A=?
        ;
SuffixToCursor
        MOV     A,M
        MOV     B,A                 ;B=PrefixLen.
        ORA     A
        JNZ     STC1                ;Jmp/ PL>0: not ZeroItem.
        MOV     A,L
        ORA     A
        JNZ     STC1                ;Jmp/ L>0: not ZeroItem.
        INR     L                   ;It is InitItem. TextLen=1?
        MOV     A,M                 ;A:=NIO.
        INR     L                   ;HL-->InitItem.Text.
        SUB     L
        MOV     C,L
        MVI     L,CDataLen
        SUB     M
        MOV     L,C                 ;HL-->ItemSuffix.
        MOV     C,A
```

```
        MOV     B,A                 ;B:=TextLen=SuffixLen.
        CPI     1
        JNZ     STC2                ;Jmp/ TextLen!=1: not ZeroItem.
        MOV     A,M                 ;A=InitItem.Text.
        ORA     A
        JNZ     STC2                ;Jmp/ Text!=0: not ZeroItem.
        ;
        ;       Got ZeroItem.  Return NilCursor.
        ;
        INR     L                   ;HL-->AfterItemSuffix.
        DCR     B                   ;B=0.
        XRA     A                   ;NOT CARRY.
        RET
        ;
STC1    MOV     A,E                 ;Offset by Item.PrefixLen.
        ADD     B                   ;B=PrefixLen.
        MOV     E,A
        ;
        INR     L
        MOV     A,M
        INR     L
        SUB     L
        MOV     C,L
        MVI     L,CDataLen
        SUB     M
        MOV     L,C                 ;HL-->ItemSuffix.
        MOV     C,A                 ;C=SuffixLen
        ADD     B                   ;+PrefixLen
        MOV     B,A                 ;B=ItemTotalLen=CursorLen
STC2    CALL    Move                ;Pres. B.
        XRA     A                   ;NOT CARRY.
        RET
;
;       HL-->page to search, DE-->CursorSuffix, CursorLen
;  contains TotalLen of DE-->Cursor, C=InitialMatchLen=
;  distance from actual (or virtual) start of Cursor
;  to DE spot.  Ret HL-->NGEItem in this page (which may not
;  exist - in that case, HL-->AfterLastItem), DE-->Cursor
;  Suffix, C=NewMatchLen, CursorLen preserved, A modified.
;       InitialMatchLen is number of bytes guaranteed to
;  already match, as, for example, when we have already
;  matched some of the Cursor during the search of an upper
;  index Cell level.
;
Search
        IF      CheckSumValidity
        MOV     B,L
        CALL    CheckSumPage        ;Preserves DE,BC.
        MOV     L,B
        RC                          ;Ret/ checksum bad!
        ENDIF
        ;
        LDA     CursorLen
```

```
         ORA     A
         JNZ     Srch00
         ;
         ;       NilCursor: act as if Cursor is ZeroCursor.
         ;
         INR     L
         INR     L
         MOV     A,M
         ORA     A
         JNZ     Srch01          ;Jmp/ no ZeroItem.
         DCR     L
         MOV     A,M             ;A=NIO.
         MVI     L,CDataLen
         SUB     M
         SUI     3
         MOV     L,A             ;L=0 if A=0.
         RZ
         ;
Srch01   MVI     L,0
         MVI     A,PartMatchErr
         ORA     A               ;NOT CARRY.
         RET
         ;
Srch00   LDAX    D               ;B:=Cursor[MatchLen]
         MOV     B,A
         JMP     Srch10          ;Enter loop in middle.
         ;
         ;       Top of Item search loop.  HL-->ItemSuffix
         ;  on stack.
         ;
Srch0    MOV     A,C             ;HL@<DE@. Keep scanning.
         ADD     L               ;Increase MatchLen, in C.
         POP     H               ;Go back to ItemSuffix.
         SUB     L               ;C:=C+(DiffPoint-ItemSuffix)
         MOV     C,A
         DCR     L               ;Go back to NextItemOffset.
         LDAX    D
         MOV     B,A             ;B:=Cursor[MatchLen]
Srch1    MOV     L,M             ;Goto NextItem.
         ;
         ;  C=MatchLen, DE-->CursorSuffix, CursorLen=total
         ;  length of DE-->Cursor, HL-->Item to scan from.
         ;
Srch10   MOV     A,C             ;Get MatchLen.
         CALL    SkipLongerPrefixes
         JNZ     SrchNoMatch2    ;If Prefix<MatchLen, done.
         MOV     A,L
         MVI     L,CAfterLastItem ;Points at the 0 after end.
         CMP     M
         MOV     L,A
         JZ      SrchNoMatch2    ;Jmp/ We're at LastItem.
         ;
         ;       ItemPrefixLen=MatchLen.  Now check suffix text.
```

```
;  For speed, we first compare the initial suffix
;  byte of Item and Cursor.  If they are equal we
;  compare more bytes.  If not, we go back to scanning
;  for equal PrefixLens.  HL-->PrefixLen.
;
INR     L                   ;HL-->NextItemOffset.
INR     L                   ;HL-->FirstItemByte.
MOV     A,M                 ;A=first Item byte.
DCR     L                   ;HL-->NextItemOffset.
CMP     B                   ;B=Cursor[MatchLen].
JC      Srch1               ;Jmp/ B>A: Cursor>Item. Loop.
JNZ     SrchNoMatch1        ;Jmp/ Cursor<Item. done.
;
MOV     A,M                 ;NextItemOffset
MOV     B,L
MVI     L,CDataLen
SUB     M                   ;-DataLen
MOV     L,B
INR     L                   ;-(CurrentItemOffset+2)
SUB     L                   ;=ItemSuffixLen.
MOV     B,A                 ;B=ItemSuffixLen.
;
PUSH    H                   ;Save HL-->ItemSuffix.
PUSH    B                   ;Save MatchLen (in C).
LDA     CursorLen
SUB     C                   ;A=CursorSuffixLen. No CY.
CMP     B                   ;Compare with ItemSuffixLen.
JZ      Srch40              ;Jmp/ Cursor same length.
JNC     Srch41              ;Jmp/ CursorSuffix longer.
;
;       CursorSuffix was shorter.  If they compare
;  equal, we return PartialMatch or SubTreeMatch,
;  since the Cursor is a prefix of the item.
;
MOV     C,A                 ;Use shorter CursorSuffixLen.
XCHG
CALL    Compare             ;Compare C bytes, (DE)-(HL).
XCHG
POP     B
JC      Srch0               ;Jmp/ Cursor>Item. Loop.
JNZ     SrchNoMatch
;
;       Partial Match.
;
POP     H
DCR     L
DCR     L
MVI     A,PartMatchErr      ;Partial match.
ORA     A                   ;NO CARRY.
RET
;
;       CursorSuffixLen=ItemSuffixLen,
;  If they compare equal, we return ExactMatch.
```

```
        ;
Srch40  MOV     C,B             ;Use ItemSuffixLen.
        XCHG
        CALL    Compare
        XCHG
        POP     B
        JC      Srch0           ;Jmp/ Cursor>Item. Loop.
        JNZ     SrchNoMatch
        ;
        MOV     A,C             ;Exact match.
        ADD     L               ;Increase MatchLen.
        POP     H
        SUB     L
        MOV     C,A
        DCR     L
        DCR     L
        XRA     A               ;Exact Match.
        RET                     ;A=0, NOT CARRY.
        ;
        ;       CursorSuffix is longer.  If they compare
        ;  equal, we continue scanning, since the Cursor is
        ;  still too big because it has bytes beyond the end
        ;  of the item.
        ;
Srch41  MOV     C,B
        CALL    Compare
        POP     B
        JNC     Srch0           ;Jmp/ Cursor>=Item. Loop.
        ;
SrchNoMatch
        POP     H
        DCR     L
SrchNoMatch1
        DCR     L
SrchNoMatch2
        MVI     A,NoMatchErr    ;No match. Cursor<Item.
        ORA     A               ;NOT CARRY.
        RET
;
;       SkipLongerPrefixes finds the next item with PrefixLen<=
;  MatchLen.  A=MatchLen.  HL-->PrefixLen of item to be
;  immediately skipped.  Returns CARRY after 84 items
;  searched, else NOT CARRY, possible ZERO for earlier
;  termination.
;       The maximum number of possible items in a Cell is
;  (256-5)/3=84.  It is 3 bytes per item because of PrefixLen,
;  NextItemOffset, and at least one byte of Suffix.  For con-
;  venience, we round up to 92 (see code).  Thus we will scan
;  over no more than 92 items before Trapping. This may be far
;  too many, especially near the end of a Search, but we
;  expect to find a PrefixLen of 0 at the end to actually
;  terminate us.  The 92 limitation is just protection against
;  some kinds of badly formatted cells.
```

```
;
slp     MACRO
        CMP     M
        RNC
        afteritem
        ENDM
        ;
SkipLongerPrefixes
        slp                     ;1
        slp                     ;2
        slp                     ;3
        slp                     ;4
        CALL    SLP8Max         ;12
        RNC
        CALL    SLP16Max        ;28
        RNC
        CALL    SLP32Max        ;60
        RNC
        CALL    SLP32Max        ;92
        RNC
        CALL    Trap
        RET
        ;
SLP32Max CALL   SLP16Max
        RNC
SLP16Max CALL   SLP8Max
        RNC
SLP8Max slp
        slp
        slp
        slp
        ;
        slp
        slp
        slp
        slp
        ;
        STC
        RET
;
        END
```

```
;**********************************************************
;*                                                       *
;*          Infinity DataBase Operating System           *
;*                   Page Allocator                      *
;*                                                       *
;* Copyright (C) 1982,1983,1984,1985,1986 Roger L.       *
;* Deran. All rights reserved.                           *
;*                                                       *
;**********************************************************
;
;<86>   INCLUDE C:INF-H.ASM
;<86>   INCLUDE C:KERNEL-H.ASM
;<86>   INCLUDE C:CELL-H.ASM
;<86>   INCLUDE C:MTREE-H.ASM
;<86>   INCLUDE C:BTREE-H.ASM
;<86>   INCLUDE C:DATA-H.ASM
;<86>   EXTRN   Trap:NEAR, EnSeg:NEAR, DeSeg:NEAR
;<86>   EXTRN   AllocPage:NEAR, FreePage:NEAR, IndexUpdate:NEAR
;<80>
        INCLUDE C:INF-H.I80
;<80>
        INCLUDE C:KERNEL-H.I80
;<80>
        INCLUDE C:CELL-H.I80
;<80>
        INCLUDE C:MTREE-H.I80
;<80>
        INCLUDE C:BTREE-H.I80
;<80>
        INCLUDE C:DATA-H.I80
;<80>
        EXTRN   Trap, EnSeg, DeSeg, AllocPage, FreePage, IndexUpdate
;
        PUBLIC  UsePage, DirtyPage, StaticPage, GetPreemptablePage
        PUBLIC  GetStaticPage, PreemptStaticPage, PreemptPage, LowWaterCheck
;
BEGIN   DB      'PAGE'
;
;       Use H Page. Pres HLDEBC.
;
UsePage MOV     A,H
        CPI     HI PageSpace
        CC      Trap                ;Trap/ Page is not in PageSpace!
        PUSH    H
        MOV     L,H
        PUSH    D
        CALL    DeSeg               ;Pres LBC.
        MVI     D,HI PreemptSegHeadPage ;Can't do MVI E,HI...
        MOV     E,D
        MVI     D,HI BackwardSegTab
        LDAX    D                   ;Get Page before HeadPage, which is MRU pos.
        MOV     E,A                 ;E=Page before HeadPage, possibly=HeadPage.
        CALL    EnSeg               ;Pres LBC. Put L Page after E Page.
```

```
        POP     D
        POP     H
        XRA     A               ;NOT CARRY
        RET
;
;       Get a StaticPage, by Preemption if necessary. Pres DEBC.
;
GetPreemptablePage
        CALL    AllocPage       ;Returns Grounded StaticPage.
        JNC     UsePage         ;Put at MRU posn in PreemptSeg.
PreemptPage
        CALL    PreemptStaticPage ;Pres DEBC. Return H=L=GroundedStaticPage.
        JMP     UsePage         ;Pres all, ret NOT CARRY.
;
GetStaticPage
        CALL    AllocPage
        RNC
;
;       Pre-empt a Page.  Use LRU algorithm by pre-empting
;  next thing in round-robin sequence.  Leave it on the
;  PreemptSeg.
;       For now, we trap if the PreemptSeg is empty.  We
;  assume PreemptPage has been called only after AllocPage
;  has failed, so there really is no free memory right now.
;  Later, we should wait for any outstanding IO, which will
;  always yield PreemptablePages.
;       Pres DEBC. Return H=L=GottenPageNum.
;
PreemptStaticPage
        PUSH    D
        ; LDA (HI ForwardSegTab)*256 + (HI PreemptSegHeadPage) won't work!!!
        MVI     H,HI PreemptSegHeadPage
        MOV     L,H
        MVI     H,HI ForwardSegTab
        MOV     A,M
        CPI     HI PageSpace
        CC      Trap            ;Trap/ PreemptSeg empty or bad segment.
        ;
        MOV     L,A
        CALL    DeSeg           ;LPage-->Self. Pres LBC.
        ;
        MVI     H,HI ParentOffsetTab
        MOV     E,M
        MVI     H,HI ParentPageTab
        MOV     D,M
        INR     E
        LDAX    D
        MOV     E,A
        DCR     E
        DCR     E
        LDAX    D
        CMA
        ANI     PairBit OR InRAMBit
```

```
        CNZ     Trap                ;Trap/ not an InRAM PairItem.
        STAX    D                   ;A=0. ItemFlags:=0 (NonPairItem).
        INR     E
        LDAX    D                   ;A=PageNum.
        CMP     L                   ;Must equal L PageNum.
        CNZ     Trap
        XRA     A
        STAX    D                   ;Point ZombieItem at ZeroPage.
        MOV     H,L                 ;H=L=GottenPageNum.
        POP     D                   ;Pres DEBC.
        RET                         ;NOT CARRY, A=0.
;
;       Put H Page onto DirtySeg.  Pres HLDEBC.
;
DirtyPage
        MOV     A,H
        CPI     HI PageSpace
        CC      Trap                ;Trap/ Page is not in PageSpace!
        PUSH    H
        MOV     L,A
        PUSH    D
        CALL    DeSeg               ;Remove L Page from any seg. Pres LBC.
        MVI     D,HI DirtySegHeadPage ;Can't do MVI E,HI...
        MOV     E,D
        CALL    EnSeg               ;Put L Page after E Page. Pres LBC.
        POP     D
        POP     H
        XRA     A
        RET
;
;       Make H Page static ("grounded", i.e., with "self-pointers".)
;  In this state, it is not preemptable, free, dirty, or undergoing I/O.
;  (The GroundCell remains static, as do all MetaTree Pages.   ReadCell,
;  WriteCell, and StartWriteCell leave the affected Page static.)
;
StaticPage
        MOV     A,H
        CPI     HI PageSpace
        CC      Trap
        PUSH    H
        MOV     L,A
        PUSH    D
        CALL    DeSeg               ;Remove L Page, ground it. Pres LBC.
        POP     D
        POP     H
        XRA     A
        RET
;
;       LowWaterCheck does an IndexUpdate if there are fewer than
;  LowWater Pages in PreempSeg.  For now, we actually count the pages.
;  Later, we could maintain a counter!!! Pres all.
;
LowWaterCheck
```

```
        PUSH    PSW
        PUSH    H
        PUSH    D
        PUSH    B
        LDA     LowWater
        MOV     C,A
        ; LXI H,HI ForwardSegTab+(HI PreemptSegHeadPage) won't work!!!
        MVI     H,HI ForwardSegTab
        MVI     D,HI PreemptSegHeadPage
        MOV     L,D
        CALL    LWC1
        JNC     LWC0
        MVI     D,HI FreeSegHeadPage
        MOV     L,D
        CALL    LWC1            ;FSHP really belongs to the Kernel!!!
        CC      IndexUpdate
LWC0    POP     B
        POP     D
        POP     H
        POP     PSW
        RET
        ;
LWC1    MOV     A,L     ;A=L=HeadPage, C=#Pages still required
LWC10   CMP     M
        STC
        RZ
        MOV     L,M
        DCR     C
        JNZ     LWC10
        ORA     A
        RET
;
        END
```

What is claimed is:

1. In a database management system having storage means, editor means, input means, and display means, a machine-implementing method comprising the steps of:

storing a plurality of triples in said storage means, each said triple includes an entity, an atribute of said entity, and a value of said attribute; each of said triples are arranged in a predetermined order according to relative significance of said entities, each of said triples having a common entity are arranged sequentially in said predetermined order according to relative significance of the corresponding attributes, each of said triples having the common entity and a common attribute are arranged sequentially in said predetermined order according to relative significance of the corresponding values;

selectively establishing an inverse relationship between one or more of said attributes and another one or more of said attributes in response to one of inputted information from the system and information inputting via the input means;

displaying a sequence of subset of said plurality of triples in said display means;

interactively inputting a new triple with an entity, an attribute, and a value via said input means wherein said attribute of said new triple is inputted explicitly or implicitly;

inserting said new triple into a specified location of said plurality of arranged triples according to the significance of said entity, said attribute, and said value of said new triple;

determining by said editor means whether said atribute of said inputted triple has an inverse attribute, and, if so, storing an inverted triple having said value, said inverse attribute, and said entity of said inputted triple into another specified location of said plurality of arranged triples according to the significance of said entity, said attribute, an said value of said inverted triple.

2. A database management system of claim 1 further comprises the steps of:

deleting said inputted triple from said plurality of arranged triples;

determining by said editor means whether said attribute of said inputted triple has an inverse attribute, and, if so, deleting an inverted triple having said value, said inverse attribute, and said entity of said inputted triple from said plurality of arranged triples.

3. A data base management system of claim 1 further comprises the steps of:

interactively inputting with an entity;

determining whether said entity already exists in the system;

if non-existent, retrieving one of said triple with an entity closest in significance with said non-existent entity; and, if existent, retrieving at least one of said triples with an entity matching the significance of said existent entity; and displaying the retrieved triple.

4. A data base management system of claim 1, wherein said storing step further comprises the steps of:

encoding said entity, said attribute, and said value of each said triples into a sequence of bits;

concatenating said encoded bits of said entity, said attribute, and said value of each said triples to form an item; and inserting each said item into an index according to the magnitude of said item.

5. A database management system of claim 4 wherein said index is a balanced tree.

6. A database management system of claim 4 wherein said index is a balanced tree with prefix compression.

7. A database management system of claim 4 wherein each of said item has a variable and positive number of encoded bits.

* * * * *